US012703451B2

(12) United States Patent
Vigen et al.

(10) Patent No.: US 12,703,451 B2
(45) Date of Patent: Aug. 11, 2026

(54) RECREATIONAL VEHICLE HEAT EXCHANGER END CAPS AND ASSEMBLY

(71) Applicant: Arctic Cat Inc., Thief River Falls, MN (US)

(72) Inventors: David Vigen, Thief River Falls, MN (US); Todd MacDonald, Montague (CA)

(73) Assignee: Arctic Cat Inc., Thief River Falls, MN (US)

( * ) Notice: Subject to any disclaimer, the term of this patent is extended or adjusted under 35 U.S.C. 154(b) by 773 days.

(21) Appl. No.: 18/103,068

(22) Filed: Jan. 30, 2023

(65) Prior Publication Data

US 2023/0257053 A1 Aug. 17, 2023

Related U.S. Application Data

(63) Continuation of application No. 18/090,074, filed on Dec. 28, 2022.

(60) Provisional application No. 63/435,986, filed on Dec. 29, 2022, provisional application No. 63/435,879, filed on Dec. 29, 2022, provisional application No. 63/434,382, filed on Dec. 21, 2022, provisional application No. 63/405,176, filed on Sep. 9, 2022, provisional application No. 63/405,016, filed on Sep. 9, 2022, provisional application No. 63/405,121, filed on Sep. 9, 2022, provisional application No. 63/405,033, filed on Sep. 9, 2022, provisional (Continued)

(51) Int. Cl.
*B62J 41/00* (2020.01)
*B60H 1/00* (2006.01)
*B62M 27/02* (2006.01)

(52) U.S. Cl.
CPC .......... *B62J 41/00* (2020.02); *B60H 1/00328* (2013.01)

(58) Field of Classification Search
CPC ............ B62M 27/02; B62M 2027/023; B62M 2027/028; F01P 3/18; F01P 3/20; B62J 41/00; B60K 11/04
USPC .......................................................... 180/190
See application file for complete search history.

(56) References Cited

U.S. PATENT DOCUMENTS

| | | | |
|---|---|---|---|
| 745,862 | A | 12/1903 | Kerr |
| 3,529,494 | A | 9/1970 | Matte |

(Continued)

FOREIGN PATENT DOCUMENTS

| | | | |
|---|---|---|---|
| CA | 2456088 | A1 | 8/2001 |
| CA | 2456088 | C | 3/2005 |

(Continued)

OTHER PUBLICATIONS

"2007 Arctic Cat Jaguar Z1 Next Generation Performance 4-Stroke", Snowtech Magazine, retrieved May 26, 2022 from https://www.snowtechmagazine.com/2007-arctic-cat-jaguar-z1-next-generation-performance-4-stroke/, Sep. 20, 2006.

(Continued)

*Primary Examiner* — Anne Marie M Boehler
(74) *Attorney, Agent, or Firm* — Billion & Armitage

(57) ABSTRACT

A heat exchange assembly includes a body extending between right and left end caps. The longitudinal extent of the end caps may be greater than the longitudinal extent of the body. Each end cap includes a forward mounting tab, an inward mounting tab, and/or an outward mounting tab. The shape of the right end cap may be a mirror image of the shape of the left end cap.

20 Claims, 167 Drawing Sheets

Related U.S. Application Data application No. 63/404,992, filed on Sep. 9, 2022, provisional application No. 63/404,617, filed on Sep. 8, 2022, provisional application No. 63/404,731, filed on Sep. 8, 2022, provisional application No. 63/404,171, filed on Sep. 6, 2022, provisional application No. 63/402,768, filed on Aug. 31, 2022, provisional application No. 63/400,056, filed on Aug. 23, 2022, provisional application No. 63/344,165, filed on May 20, 2022, provisional application No. 63/310,983, filed on Feb. 16, 2022, provisional application No. 63/310,264, filed on Feb. 15, 2022.

(56) References Cited

U.S. PATENT DOCUMENTS 3,548,961 A 12/1970 Newman
3,688,604 A 9/1972 Schlosser
3,688,856 A 9/1972 Boehm et al.
3,750,774 A 8/1973 Trapp
3,758,169 A 9/1973 Trapp
3,963,083 A 6/1976 Reese
4,502,353 A 3/1985 Beaudoin
4,602,525 A 7/1986 Moroto et al.
4,667,758 A 5/1987 Tamura
4,892,165 A 1/1990 Yasui et al.
4,940,100 A 7/1990 Ueda
4,987,965 A 1/1991 Bourret
5,000,056 A 3/1991 Crawford et al.
5,152,255 A 10/1992 Fukuda
5,232,066 A 8/1993 Schnelker
5,251,718 A 10/1993 Inagawa et al.
5,660,245 A 8/1997 Marier et al.
5,862,662 A 1/1999 Fukuda et al.
5,924,514 A 7/1999 Bullerdick
5,957,230 A 9/1999 Harano et al.
5,992,552 A * 11/1999 Eto ........................ B62M 27/00 180/312
6,109,217 A 8/2000 Hedlund et al.
6,161,908 A 12/2000 Takayama et al.
6,170,589 B1 1/2001 Kawano et al.
6,224,134 B1 5/2001 Johnson et al.
6,270,106 B1 8/2001 Maki et al.
6,419,533 B2 7/2002 Lecours
6,446,744 B2 9/2002 Wubbolts et al.
6,561,297 B2 5/2003 Yatagai et al.
6,561,302 B2 5/2003 Karpik
6,604,594 B2 8/2003 Wubbolts et al.
6,644,261 B2 11/2003 Morii et al.
6,651,764 B2 11/2003 Fournier et al.
6,651,765 B1 11/2003 Weinzierl
6,681,724 B1 1/2004 Berg
6,695,087 B2 2/2004 Fournier et al.
6,749,036 B1 6/2004 Schrapp et al.
6,758,497 B2 7/2004 Bergman
6,823,957 B2 11/2004 Girouard et al.
6,823,960 B2 11/2004 Shimizu et al.
6,860,352 B2 3/2005 Mallette et al.
6,860,826 B1 3/2005 Johnson
6,890,010 B2 5/2005 Bergman
6,904,990 B2 6/2005 Etou
6,923,284 B2 8/2005 Bédard et al.
6,923,287 B2 8/2005 Morii
6,926,107 B2 8/2005 Nishijima
6,941,924 B2 9/2005 Morii et al.
6,942,050 B1 9/2005 Honkala et al.
6,942,052 B1 9/2005 Blakely
6,951,523 B1 10/2005 Dieter et al.
6,955,237 B1 10/2005 Przekwas et al.
6,966,395 B2 11/2005 Schuehmacher et al.
6,976,550 B2 12/2005 Vaisanen
6,981,564 B2 1/2006 Bédard et al.
7,011,173 B2 3/2006 Cadotte et al.
7,025,161 B2 4/2006 Bertrand et al.
7,032,561 B2 4/2006 Morii et al.
7,036,619 B2 5/2006 Yatagai et al.
7,048,293 B2 5/2006 Bédard
7,063,178 B2 6/2006 Etou
7,080,704 B1 7/2006 Kerner et al.
7,083,024 B2 8/2006 Bergman et al.
7,096,988 B2 8/2006 Moriyama
7,104,352 B2 9/2006 Weinzierl et al.
7,104,355 B2 9/2006 Hoi
7,124,846 B2 10/2006 Bédard et al.
7,124,847 B2 10/2006 Girouard et al.
7,124,848 B2 10/2006 Girouard et al.
7,128,176 B1 10/2006 Mills et al.
7,140,463 B2 11/2006 Morii et al.
7,147,074 B1 12/2006 Berg et al.
7,150,336 B2 12/2006 Desmarais
7,152,706 B2 12/2006 Pichler et al.
7,188,693 B2 3/2007 Girouard et al.
7,198,126 B2 4/2007 Vaisanen
7,198,127 B2 4/2007 Yatagai et al.
7,204,355 B2 4/2007 Akiyama et al.
7,213,668 B2 5/2007 Richard et al.
7,213,669 B2 5/2007 Fecteau et al.
7,249,647 B2 7/2007 Nietlispach
7,255,068 B2 8/2007 Ashida
7,255,195 B2 8/2007 Haruna
7,264,075 B2 9/2007 Schuemacher et al.
7,281,598 B2 10/2007 Hoi
7,296,645 B1 11/2007 Kerner et al.
7,296,657 B2 11/2007 Ohno et al.
7,300,382 B2 11/2007 Yamamoto
7,303,037 B2 12/2007 Yatagai et al.
7,328,765 B2 2/2008 Ebert et al.
7,353,898 B1 4/2008 Bates
7,353,899 B2 4/2008 Abe et al.
7,353,901 B2 4/2008 Abe et al.
7,357,207 B2 4/2008 Vaeisaenen
7,360,618 B2 4/2008 Hibbert et al.
7,370,724 B2 5/2008 Saito et al.
7,374,016 B2 5/2008 Yamaguchi et al.
7,377,348 B2 5/2008 Girouard et al.
7,389,842 B2 6/2008 Inoguchi et al.
7,401,674 B1 7/2008 Berg et al.
7,401,816 B2 7/2008 Abe et al.
7,409,949 B1 8/2008 Zauner et al.
7,410,182 B1 8/2008 Giese
7,413,046 B2 8/2008 Okada et al.
7,451,846 B2 11/2008 Wubbolts et al.
7,458,593 B2 12/2008 Saito et al.
7,472,771 B2 1/2009 Yatagai et al.
7,475,751 B2 1/2009 Pard et al.
7,484,584 B1 2/2009 Kerner et al.
7,533,749 B1 5/2009 Sampson et al.
7,540,511 B2 6/2009 Saito et al.
7,543,669 B2 6/2009 Kelahaara
7,543,672 B2 6/2009 Codere et al.
7,591,332 B1 9/2009 Bates
7,594,557 B2 9/2009 Polakowski et al.
7,597,069 B2 10/2009 Ashida
7,610,132 B2 10/2009 Yanai et al.
7,708,096 B2 5/2010 Vezina
7,753,154 B2 7/2010 Maltais
7,775,313 B1 8/2010 Sampson et al.
7,779,944 B2 8/2010 Bergman et al.
7,779,946 B2 8/2010 Okada et al.
7,789,184 B2 9/2010 Maltais
7,798,529 B2 9/2010 Sato
7,802,644 B2 9/2010 Brodeur et al.
7,802,645 B2 9/2010 Mallette et al.
7,802,646 B2 9/2010 Matsudo
7,806,215 B2 10/2010 Codere et al.
7,878,293 B2 2/2011 Okada et al.
7,913,785 B2 3/2011 Korsumaki et al.
7,918,299 B2 4/2011 Yoshihara
7,980,629 B2 7/2011 Bedard
7,997,372 B2 8/2011 Maltais
8,001,862 B2 8/2011 Albulushi et al.
8,028,795 B2 10/2011 Hisanaga et al.
8,037,961 B2 10/2011 Fecteau
8,127,877 B2 3/2012 Fredrickson et al.

(56) References Cited

U.S. PATENT DOCUMENTS

| | | | |
|---|---|---|---|
| 8,167,073 B2 | 5/2012 | Polakowski et al. | |
| 8,191,665 B1 | 6/2012 | Sampson et al. | |
| 8,225,896 B2 | 7/2012 | Eichenberger et al. | |
| 8,235,164 B2 | 8/2012 | Okada et al. | |
| 8,240,417 B2 | 8/2012 | Takata | |
| 8,281,889 B2 | 10/2012 | Inoue | |
| 8,381,857 B1 | 2/2013 | Sampson et al. | |
| 8,408,348 B2 | 4/2013 | Nakamura et al. | |
| 8,430,197 B2 | 4/2013 | Matsudo | |
| 8,453,779 B2 | 6/2013 | Vezina | |
| 8,474,783 B2 | 7/2013 | Hu | |
| 8,490,731 B2 | 7/2013 | Eaton et al. | |
| 8,528,683 B2 | 9/2013 | Beavis et al. | |
| 8,567,546 B2 | 10/2013 | Berg et al. | |
| 8,590,654 B2 | 11/2013 | Kerner et al. | |
| 8,607,912 B2 | 12/2013 | Mallette et al. | |
| 8,657,054 B2 | 2/2014 | Mallette et al. | |
| 8,733,773 B2 | 5/2014 | Sampson | |
| 8,763,745 B2 | 7/2014 | Nagao et al. | |
| 8,881,856 B2 | 11/2014 | Fecteau et al. | |
| 8,919,477 B2 | 12/2014 | Conn et al. | |
| 8,944,204 B2 | 2/2015 | Ripley et al. | |
| 8,994,494 B2 | 3/2015 | Koenig et al. | |
| 9,022,156 B2 | 5/2015 | Bedard et al. | |
| 9,061,732 B1 | 6/2015 | Vezina | |
| 9,073,604 B2 | 7/2015 | Mallette et al. | |
| 9,090,313 B2 | 7/2015 | Bedard | |
| 9,096,289 B2 | 8/2015 | Hedlund et al. | |
| 9,114,852 B2 | 8/2015 | Fecteau et al. | |
| 9,139,255 B1 | 9/2015 | Glissmeyer et al. | |
| 9,162,731 B2 | 10/2015 | Maltais | |
| 9,228,581 B2 | 1/2016 | Bernier et al. | |
| 9,327,789 B1 | 5/2016 | Vezina et al. | |
| 9,346,508 B1 | 5/2016 | Lemieux | |
| 9,346,518 B2 | 5/2016 | Polakowski et al. | |
| 9,352,801 B2 | 5/2016 | Makitalo et al. | |
| 9,352,802 B2 | 5/2016 | Sampson | |
| 9,359,022 B2 | 6/2016 | Bedard et al. | |
| 9,387,907 B2 | 7/2016 | Nasca et al. | |
| 9,428,232 B2 | 8/2016 | Ripley et al. | |
| 9,446,810 B2 | 9/2016 | Ripley | |
| 9,481,370 B2 | 11/2016 | Bernier et al. | |
| 9,540,072 B2 | 1/2017 | Hedulnd | |
| 9,545,844 B2 | 1/2017 | Forty et al. | |
| 9,610,986 B2 | 4/2017 | Conn | |
| 9,618,071 B2 | 4/2017 | Hirota | |
| 9,682,746 B2 | 6/2017 | Yasuda et al. | |
| 9,683,492 B2 | 6/2017 | Bernier et al. | |
| 9,688,354 B2 | 6/2017 | Nagao et al. | |
| 9,694,872 B2 | 7/2017 | Laroche et al. | |
| 9,738,301 B2 | 8/2017 | Vezina et al. | |
| 9,751,552 B2 | 9/2017 | Mangum et al. | |
| 9,789,930 B1 | 10/2017 | Vezina et al. | |
| 9,796,437 B2 | 10/2017 | Wilson et al. | |
| 9,809,195 B2 | 11/2017 | Giese et al. | |
| 9,828,064 B2 | 11/2017 | Pard et al. | |
| 9,828,065 B2 | 11/2017 | Pard | |
| 9,845,004 B2 | 12/2017 | Hedlund et al. | |
| 9,873,485 B2 | 1/2018 | Mangum et al. | |
| 9,988,067 B1 | 6/2018 | Mangum et al. | |
| 10,001,200 B2 | 6/2018 | Parraga Gimeno et al. | |
| 10,029,567 B2 | 7/2018 | Lefebvre et al. | |
| 10,035,554 B2 | 7/2018 | Mertens et al. | |
| 10,065,708 B2 | 9/2018 | Labbe et al. | |
| 10,144,486 B2 | 12/2018 | Yasuda et al. | |
| 10,195,999 B1 | 2/2019 | Glickman et al. | |
| 10,202,169 B2 | 2/2019 | Mangum et al. | |
| 10,215,083 B2 | 2/2019 | Vezina et al. | |
| 10,232,910 B2 | 3/2019 | Mangum et al. | |
| 10,259,507 B1 | 4/2019 | Johnson et al. | |
| 10,293,885 B2 | 5/2019 | Vezina et al. | |
| 10,300,989 B2 | 5/2019 | Vezina | |
| 10,300,990 B2 | 5/2019 | Vezina | |
| 10,358,187 B2 | 7/2019 | Vistad et al. | |
| 10,377,446 B2 | 8/2019 | Thibault et al. | |
| 10,392,079 B2 | 8/2019 | Vezina et al. | |
| 10,406,910 B2 | 9/2019 | Vezina et al. | |
| 10,435,059 B2 | 10/2019 | Mallette et al. | |
| 10,450,968 B2 | 10/2019 | Bernier et al. | |
| 10,513,970 B2 | 12/2019 | Vezina et al. | |
| 10,526,045 B2 | 1/2020 | Vezina et al. | |
| 10,538,262 B2 | 1/2020 | Mangum et al. | |
| 10,543,792 B2 | 1/2020 | Yoshioka et al. | |
| 10,597,105 B2 | 3/2020 | Lefebvre et al. | |
| 10,619,615 B2 | 4/2020 | Dale et al. | |
| 10,675,962 B2 | 6/2020 | Urabe et al. | |
| 10,676,157 B2 | 6/2020 | Vigen | |
| 10,730,576 B2 | 8/2020 | Labbe et al. | |
| 10,766,571 B2 | 9/2020 | Sampson et al. | |
| 10,766,572 B2 | 9/2020 | Pard et al. | |
| 10,766,573 B2 | 9/2020 | Vezina et al. | |
| 10,773,684 B2 | 9/2020 | Koenig et al. | |
| 10,773,774 B2 | 9/2020 | Mangum et al. | |
| 10,780,949 B2 | 9/2020 | Crain et al. | |
| 10,793,226 B2 | 10/2020 | Crain et al. | |
| 10,800,490 B2 | 10/2020 | Foxhall et al. | |
| 10,814,935 B2 | 10/2020 | Vaisanen et al. | |
| 10,822,054 B2 | 11/2020 | Lemieux | |
| 10,843,758 B2 | 11/2020 | Hebert et al. | |
| 10,870,465 B2 | 12/2020 | Crain et al. | |
| 10,875,595 B2 | 12/2020 | Laberge et al. | |
| 10,875,605 B2 | 12/2020 | Pard | |
| 10,899,415 B2 | 1/2021 | Mangum et al. | |
| 10,913,512 B2 | 2/2021 | Thompson et al. | |
| 10,960,914 B2 | 3/2021 | Mangum et al. | |
| 10,974,790 B2 | 4/2021 | Hosaluk et al. | |
| 11,027,794 B2 | 6/2021 | Vigen | |
| 11,097,793 B2 | 8/2021 | Marchildon et al. | |
| 11,110,994 B2 | 9/2021 | Hedlund et al. | |
| 11,142,286 B2 | 10/2021 | Sampson et al. | |
| 11,208,168 B2 | 12/2021 | Hedlund et al. | |
| 11,214,320 B2 | 1/2022 | Bates et al. | |
| 11,220,310 B2 | 1/2022 | Pard et al. | |
| 11,225,302 B2 | 1/2022 | Vigen | |
| 11,230,351 B2 | 1/2022 | Vezina | |
| 11,235,634 B2 | 2/2022 | Lavallee et al. | |
| 11,286,019 B2 | 3/2022 | Hedlund et al. | |
| 11,358,661 B2 | 6/2022 | Laugen et al. | |
| 11,384,679 B2 | 7/2022 | Matsumoto et al. | |
| 11,415,207 B2 | 8/2022 | Pard et al. | |
| 11,505,263 B2 | 11/2022 | Hedlund et al. | |
| 11,524,569 B2 | 12/2022 | Vezina et al. | |
| 2001/0047900 A1 | 12/2001 | Fecteau et al. | |
| 2003/0127265 A1 | 7/2003 | Watson et al. | |
| 2004/0090119 A1 | 5/2004 | Ebert et al. | |
| 2005/0016784 A1 | 1/2005 | Fecteau | |
| 2005/0241867 A1 | 11/2005 | Abe et al. | |
| 2006/0162977 A1 | 7/2006 | Etou | |
| 2008/0277184 A1 | 11/2008 | Marleau | |
| 2011/0168477 A1 | 7/2011 | Yokomori et al. | |
| 2012/0205902 A1* | 8/2012 | Beavis | B62M 27/02<br>280/781 |
| 2013/0175106 A1 | 7/2013 | Bédard et al. | |
| 2013/0206494 A1 | 8/2013 | Hedlund et al. | |
| 2015/0021898 A1 | 1/2015 | Serbinski | |
| 2016/0068227 A1 | 3/2016 | Yasuda et al. | |
| 2017/0101142 A1 | 4/2017 | Hedlund et al. | |
| 2018/0334211 A1 | 11/2018 | Mertens et al. | |
| 2019/0233055 A1 | 8/2019 | Vezina | |
| 2019/0256170 A1 | 8/2019 | Labbe | |
| 2019/0344657 A1 | 11/2019 | Vezina et al. | |
| 2019/0344859 A1 | 11/2019 | Vistad et al. | |
| 2020/0101833 A1* | 4/2020 | Matsushima | B62M 7/02 |
| 2020/0148056 A1 | 5/2020 | Forty et al. | |
| 2020/0224628 A1 | 7/2020 | Dale et al. | |
| 2020/0398785 A1 | 12/2020 | Koenig et al. | |
| 2021/0053652 A1 | 2/2021 | Fuchs et al. | |
| 2021/0053653 A1 | 2/2021 | Mangum et al. | |
| 2021/0115835 A1 | 4/2021 | Diehl et al. | |
| 2021/0122445 A1 | 4/2021 | Thompson et al. | |
| 2021/0129943 A1 | 5/2021 | Mangum et al. | |
| 2021/0163086 A1 | 6/2021 | Mallette et al. | |
| 2021/0188182 A1 | 6/2021 | Edwards et al. | |
| 2021/0188185 A1 | 6/2021 | Hedlund et al. | |

(56) References Cited

U.S. PATENT DOCUMENTS

| | | | |
|---|---|---|---|
| 2021/0188376 | A1 | 6/2021 | Laugen et al. |
| 2021/0188382 | A1 | 6/2021 | Hedlund |
| 2021/0213899 | A1 | 7/2021 | Yotsuyanagi et al. |
| 2021/0214044 | A1 | 7/2021 | Krings et al. |
| 2021/0229731 | A1 | 7/2021 | Stoxen et al. |
| 2021/0245837 | A1 | 8/2021 | Vigen |
| 2021/0323629 | A1 | 10/2021 | Blackburn et al. |
| 2021/0347432 | A1 | 11/2021 | Halvorson |
| 2021/0362807 | A1 | 11/2021 | Hedlund et al. |
| 2022/0024541 | A1 | 1/2022 | Korsumaki |
| 2022/0097801 | A1 | 3/2022 | Vigen |
| 2022/0111929 | A1 | 4/2022 | Matsushita |
| 2022/0119049 | A1 | 4/2022 | Bates et al. |
| 2022/0177077 | A1 | 6/2022 | Vistad et al. |
| 2022/0205454 | A1 * | 6/2022 | Kawabata ............. F04D 29/541 |
| 2022/0212754 | A1 | 7/2022 | Stock et al. |
| 2022/0349339 | A1 | 11/2022 | Schuehmacher et al. |
| 2023/0052282 | A1 | 2/2023 | Hedlund et al. |
| 2023/0399069 | A1 * | 12/2023 | Magele .................. B60K 11/04 |

FOREIGN PATENT DOCUMENTS

| | | | |
|---|---|---|---|
| CA | 2411964 | C | 7/2005 |
| CA | 2371477 | C | 7/2006 |
| CA | 2363856 | C | 1/2008 |
| CA | 2639857 | A1 | 6/2009 |
| CA | 2877554 | A1 | 1/2014 |
| CA | 2987534 | A1 | 12/2016 |
| CA | 2925800 | A1 | 10/2017 |
| CA | 2925822 | A1 | 10/2017 |
| CA | 3117886 | A1 | 5/2020 |
| CA | 2863952 | C | 6/2020 |
| CA | 3030691 | C | 10/2020 |
| CA | 3103308 | A1 | 6/2021 |
| CN | 105422273 | A | 3/2016 |
| JP | S55125312 | A | 9/1980 |
| JP | H10217921 | A | 8/1998 |
| JP | 2005193788 | A | 7/2005 |
| JP | 4840406 | B2 | 10/2011 |
| WO | 8607423 | A1 | 12/1986 |
| WO | 2009114414 | A1 | 9/2009 |

OTHER PUBLICATIONS

"Cooling Assembly Arctic Cat, Snowmobile, 1997 ZR 440 [97ZRA-1997-22-25]", https://www.countrycat.com/arctic-cat-parts?gclid=EAlalQobChMI7O-P-JzGgAMVdqtaBR1Dbg33EAAYASABEgKGPvD_BwE#/Arctic_Cat/1997_ZR_440_%5b97ZRA-1997-22-25%5d/COOLING_ASSEMBLY_%5b65743%5d/97ZRA-1997-22-25/65743/y.

"Front Frame and Footrest Assembly [65748]", https://www.countrycat.com/arctic-cat-parts?gclid=EAlalQobChMI7O-P-JzGgAMVdqtaBR1Dbg33EAAYASABEgKGPvD_BwE#/Arctic_Cat/1997_ZR_440_%5b97ZRA-1997-22-25%5d/FRONT_FRAME_AND_FOOTREST_ASSEMBLY_%5b65748%5d/97ZRA-1997-22-25/65748/y.

"Running Board Support Bracket", https://www.countrycat.com/arctic-cat-parts?gclid=EAlalQobChMI7O-P-JzGgAMVdqtaBR1Dbg33EAAYASABEgKGPvD_BwE#/Arctic_Cat/1992_PANTHER_%5b0650-173-1992-17-02%5d/TUNNEL_AND_REAR_BUMPER_%5b59192%5d/0650-173-1992-17-02/59192/y.

"Tunnel and Rear Bumper [65742]—1997 ZR 440 [97ZRA-1997-22-25]", https://www.countrycat.com/arctic-cat-parts?gclid=EAlalQobChMI7O-P-JzGgAMVdqtaBR1Dbg33EAAYASABEgKGPvD_BwE#/Arctic_Cat/1997_ZR_440_%5b97ZRA-1997-22-25%5d/TUNNEL_AND_REAR_BUMPER_%5b65742%5d/97ZRA-1997-22-25/65742/y.

* cited by examiner

RECREATIONAL VEHICLE HEAT EXCHANGER END CAPS AND ASSEMBLY

CROSS REFERENCE TO RELATED APPLICATIONS

This application is related to commonly-owned U.S. Provisional Application No. 63/310,264, filed on Feb. 15, 2022 and entitled "Accessory Attachment System", U.S. Provisional Application No. 63/310,254, filed on Feb. 15, 2022 and entitled "Recreational Vehicle Spindle", U.S. Provisional Application No. 63/310,276, filed on Feb. 15, 2022 and entitled "Spindle for Recreational Vehicle", U.S. Provisional Application No. 63/310,232, filed on Feb. 15, 2022 and entitled "Headlight Assembly", U.S. Provisional Application No. 63/310,951, filed on Feb. 16, 2022 and entitled "Clutch Guard with Integrated Torque Control Link", U.S. Provisional Application No. 63/310,983, filed on Feb. 16, 2022 and entitled "Composite Running Board", U.S. Provisional Application No. 63/310,994, filed on Feb. 16, 2022 and entitled "Two-Stroke Engine", U.S. Provisional Application No. 63/342,447, filed on May 16, 2022 and entitled "Off-Road Vehicle", U.S. Provisional Application No. 63/344,165, filed on May 20, 2022 and entitled "Snowmobile Frame", U.S. Provisional Application No. 63/350,553, filed on Jun. 9, 2022 and entitled "Snowmobile with Seat and Gas Tank Assembly", U.S. Provisional Application No. 63/400,056, filed on Aug. 23, 2022 and entitled "Taillight Housing, Snow Flap and Assembly Thereof", U.S. Provisional Application No. 63/402,768, filed on Aug. 31, 2022 and entitled "Snow Vehicle Heat Exchanger Shield", U.S. Provisional Application No. 63/404,171, filed on Sep. 6, 2022 and entitled "Bumper Mount for a Snowmobile", U.S. Provisional Application No. 63/404,167, filed on Sep. 6, 2022 and entitled "Intake, Airbox, and Storage Assembly for Snowmobile", U.S. Provisional Application No. 63/404,856, filed on Sep. 8, 2022 and entitled "Recreational Vehicle Spindle", U.S. Provisional Application No. 63/404,841, filed on Sep. 8, 2022 and entitled "Spindle for a Recreational Vehicle", U.S. Provisional Application No. 63/404,655, filed on Sep. 8, 2022 and entitled "Snowmobile with Seat Assembly", U.S. Provisional Application No. 63/404,682, filed on Sep. 8, 2022 and entitled "Snowmobile with Seat Assembly", U.S. Provisional Application No. 63/404,822, filed on Sep. 8, 2022 and entitled "Recoil Housing, Engine Assembly, and Method of Assembling Engine Assembly", U.S. Provisional Application No. 63/404,617, filed on Sep. 8, 2022 and entitled "Recreational Vehicle Running Board", U.S. Provisional Application No. 63/404,731, filed on Sep. 8, 2022 and entitled "Muffler Assembly, Snow Vehicle Including a Muffler Assembly, Snow Vehicle Including Electronic Power Steering, and Methods of Assembling Thereof", U.S. Provisional Application No. 63/405,121, filed on Sep. 9, 2022 and entitled "Snowmobile Drive Shaft", U.S. Provisional Application No. 63/405,033, filed on Sep. 9, 2022 and entitled "Recreational Vehicle Toe Stop, Toe Stop Assemblies, and Methods of Assembling a Recreational Vehicle", U.S. Provisional Application No. 63/405,016, filed on Sep. 9, 2022 and entitled "Skid Plate, Secondary Skid Plate, and Track Drive Protector for a Recreational Vehicle", U.S. Provisional Application No. 63/405,176, filed on Sep. 9, 2022 and entitled "Recreational Vehicle Heat Exchanger End Caps and Assembly", U.S. Provisional Application No. 63/404,992, filed on Sep. 9, 2022 and entitled "Recreational Vehicle Bottom-Out Protector and Assemblies Thereof", and U.S. Provisional Application No. 63/434,382 filed on Dec. 21, 2022 and entitled "Skid Plate, Secondary Skid Plate, and Track Drive Protector for a Recreational Vehicle", and which applications are hereby incorporated by reference in their entirety.

A claim of priority is made to commonly-owned U.S. Provisional Application No. 63/310,264, filed on Feb. 15, 2022 and entitled "Accessory Attachment System", U.S. Provisional Application No. 63/310,983, filed on Feb. 16, 2022 and entitled "Composite Running Board", U.S. Provisional Application No. 63/344,165, filed on May 20, 2022 and entitled "Snowmobile Frame", U.S. Provisional Application No. 63/400,056, filed on Aug. 23, 2022 and entitled "Taillight Housing, Snow Flap and Assembly Thereof", U.S. Provisional Application No. 63/402,768, filed on Aug. 31, 2022 and entitled "Snow Vehicle Heat Exchanger Shield", U.S. Provisional Application No. 63/404,171, filed on Sep. 6, 2022 and entitled "Bumper Mount for a Snowmobile", U.S. Provisional Application No. 63/404,617, filed on Sep. 8, 2022 and entitled "Recreational Vehicle Running Board", U.S. Provisional Application No. 63/404,731, filed on Sep. 8, 2022 and entitled "Muffler Assembly, Snow Vehicle Including a Muffler Assembly, Snow Vehicle Including Electronic Power Steering, and Methods of Assembling Thereof", U.S. Provisional Application No. 63/405,121, filed on Sep. 9, 2022 and entitled "Snowmobile Drive Shaft", U.S. Provisional Application No. 63/405,033, filed on Sep. 9, 2022 and entitled "Recreational Vehicle Toe Stop, Toe Stop Assemblies, and Methods of Assembling a Recreational Vehicle", U.S. Provisional Application No. 63/405,016, filed on Sep. 9, 2022 and entitled "Skid Plate, Secondary Skid Plate, and Track Drive Protector for a Recreational Vehicle", U.S. Provisional Application No. 63/405,176, filed on Sep. 9, 2022 and entitled "Recreational Vehicle Heat Exchanger End Caps and Assembly", U.S. Provisional Application No. 63/404,992, filed on Sep. 9, 2022 and entitled "Recreational Vehicle Bottom-Out Protector and Assemblies Thereof", and U.S. Provisional Application No. 63/434,382 filed on Dec. 21, 2022 and entitled "Skid Plate, Secondary Skid Plate, and Track Drive Protector for a Recreational Vehicle", U.S. patent application Ser. No. 18/090,074, filed on Dec. 28, 2022, and entitled "Running Board Support Member", U.S. Provisional Application No. 63/435,879, filed on Dec. 29, 2022 and entitled "Recreational Vehicle Heat Exchanger End Caps and Assembly", U.S. Provisional Application No. 63/435,986, filed on Dec. 29, 2022 and entitled "Snowmobile Frame", and which applications are hereby incorporated by reference in their entirety.

BACKGROUND

Snowmobiles are popular land vehicles used as transportation vehicles or as recreational vehicles in cold and snowy conditions. Generally, snowmobiles are available for various applications such as deep snow, high performance, luxury touring, and trail riding, for example. In general, a snowmobile has a chassis on or around which the various components of the snowmobile are assembled. Typical snowmobiles include one or more skis for steering, a seat, handlebars, and an endless track for propulsion mounted to a central chassis. The engine drives a ground-engaging endless track disposed in a longitudinally extending drive tunnel. One or more skis serve to facilitate steering as well as to provide flotation of the front of the snowmobile over the snow in which it is operated. A handlebar assembly, positioned forward of the seat, is operatively linked to the skis for steering the snowmobile. The skis may be pivoted to steer the snowmobile, for example, by turning the handlebars. The snowmobile also includes a footrest for the rider while riding.

SUMMARY

Embodiments include an end cap for a heat exchanger assembly, the end cap including: a flat body; and a first mounting flange extending outwardly from a bottom edge of the flat body.

Embodiments further include an end cap for a heat exchanger assembly, the end cap comprising a bottom edge configured to mate with an edge of a support member configured to attach to a tunnel of a snowmobile.

Embodiments include an end cap for a heat exchanger assembly, the end cap including: an upper edge; and a forward edge forming a curve downward from the upper edge to a tab extending forward from the curve, a bottom edge of the tab forming a part of a bottom edge of the end cap, the tab including an aperture configured to receive a fastener.

Embodiments further include a heat exchanger end cap that includes a forward edge with a single mounting tab with a horizontally oriented aperture configured to receive a fastener.

Embodiments include an end cap for a heat exchanger assembly, the end cap including: a first integrated mount positioned along a forward edge of the end cap; a second integrated mount curving outwards from a bottom edge of the end cap; and a third integrated mount curving inwards from an upper edge of the end cap.

Embodiments further include a heat exchanger assembly that includes a body extending between end caps, wherein a shape of one end cap is a mirror image of a shape of the other end cap.

Embodiments include a heat exchanger assembly that includes: a body extending between, and attached to, two end caps. Each end cap comprising a single forward mount positioned forward of the body, the forward mount including a horizontally oriented aperture.

Embodiments further include a heat exchanger assembly that includes end caps attached to a curved body. Each end cap includes: a curved forward edge where the curved forward edge and the curved body have the same curved shape, the curved body attached to the end caps rearward of the curved forward edge.

Embodiments also include a snowmobile including: a support member coupled to a tunnel, the support member comprising an edge; and a heat exchanger end cap comprising a bottom edge abutting the edge of the support member.

Embodiments further include a snowmobile that includes: a tunnel having a first thickness; a support member coupled to the tunnel, the support member having a second thickness greater than the first thickness; and an end cap of a heat exchanger assembly coupled to the tunnel and to the support member, the end cap having a third thickness greater than the first thickness.

Embodiments include a snowmobile that includes: a tunnel; a support member coupled to the tunnel; an end cap of a heat exchanger assembly, the end cap including: an upper mount coupled to the tunnel; and a lower mount coupled to the support member. The support member extends rearward from the lower mount, an edge of the support member abutting a bottom edge of the end cap extending rearward from the lower mount Embodiments further include a snowmobile that includes: a tunnel with a forward edge; a heat exchanger assembly including: a body attached to the forward edge of the tunnel by tabs positioned along an upper end of the body; and end caps attached to the body. Each end cap includes an upper mount positioned rearward of the body, the end caps further attached to the tunnel by the upper mount.

Embodiments include a snowmobile that includes: a heat exchanger assembly including a body, a first end cap attached to a first side of the body, a second end cap attached to a second side of the body and a track drive shaft extending through the track drive openings of the first and second end caps. The first end cap includes a wall comprising a rear edge; and a track drive opening in the wall, the track drive opening positioned rearward of the body and forward of the rear edge of the wall. The second end cap includes a wall comprising a rear edge and a track drive opening in the wall, the track drive opening positioned rearward of the body and forward of the rear edge of the wall.

Embodiments further include a snowmobile that includes: a heat exchanger assembly attached to: a tunnel by a first mount; a support member by a second mount; a bottom-out protector by the second mount; and a forward frame assembly by a third mount.

Embodiments include a method of assembling a snowmobile that includes: attaching a support member to a tunnel; and attaching a heat exchanger to the tunnel, wherein the heat exchanger comprises a right end cap and a left end cap, wherein a shape of the right end cap is a mirror image of a shape of the left end cap.

Embodiments further include a method of assembling different snowmobiles with a common forward frame. The method including: providing a common forward frame including a mounting feature; providing a track drive shaft positionable with respect to the common forward frame in a first position for a first snowmobile, and a second position that is different than the first position for a second snowmobile; and securing a first heat exchanger end cap to the mounting feature of the common forward frame when the track drive shaft is in the first position, or securing a second heat exchanger end cap that is different than the first heat exchanger end cap to the mounting feature of the common forward frame when the track drive shaft is in the second position.

BRIEF DESCRIPTION OF THE DRAWINGS

This written disclosure describes illustrative embodiments that are non-limiting and non-exhaustive. Reference is made to illustrative embodiments that are depicted in the figures, in which:

FIG. 85A illustrates a view of the right side toe stop of FIGS. 77A and 77B installed as part of the running board assembly 120A, according to some embodiments.

FIG. 85B illustrates a view of the left side toe stop of FIGS. 81A and 81B installed as part of the running board assembly 120A, according to some embodiments.

FIG. 86A illustrates a view of the forward facing surface of the right side toe stop of FIGS. 77A and 77B installed as part of the running board assembly 120A, according to some embodiments.

FIG. 86B illustrates a bottom view of the right side toe stop of FIGS. 77A and 77B installed as part of the running board assembly 120A, according to some embodiments.

FIG. 87A illustrates a bottom view of the left side toe stop of FIGS. 81A and 81B installed as part of the running board assembly 120A, according to some embodiments.

FIG. 87B illustrates a bottom view of the left side toe stop of FIGS. 81A and 81B installed as part of the running board assembly 120A, according to some embodiments.

FIG. 88A illustrates an isometric view of the left side toe stop of FIGS. 81A and 81B installed as part of the running board assembly 120A, according to some embodiments.

FIG. 88B illustrates left side view of the left side toe stop of FIGS. 81A and 81B installed as part of the running board assembly 120A, according to some embodiments.

FIG. 89 illustrates the forward facing surface of the left side toe stop of FIGS. 81A and 81B installed as part of the running board assembly 120A, according to some embodiments.

FIG. 90A illustrates a left side view of a right toe stop that may be part of the running board assembly 120B of FIG. 10, according to some embodiments.

FIG. 90B illustrates a perspective view of an inboard side of the right toe stop of FIG. 90A that may be part of the running board assembly 120B of FIG. 10, according to some embodiments.

FIG. 91A illustrates a perspective view of the outboard side of the right side toe stop of FIGS. 90A and 90B, according to some embodiments.

Figure 90A:
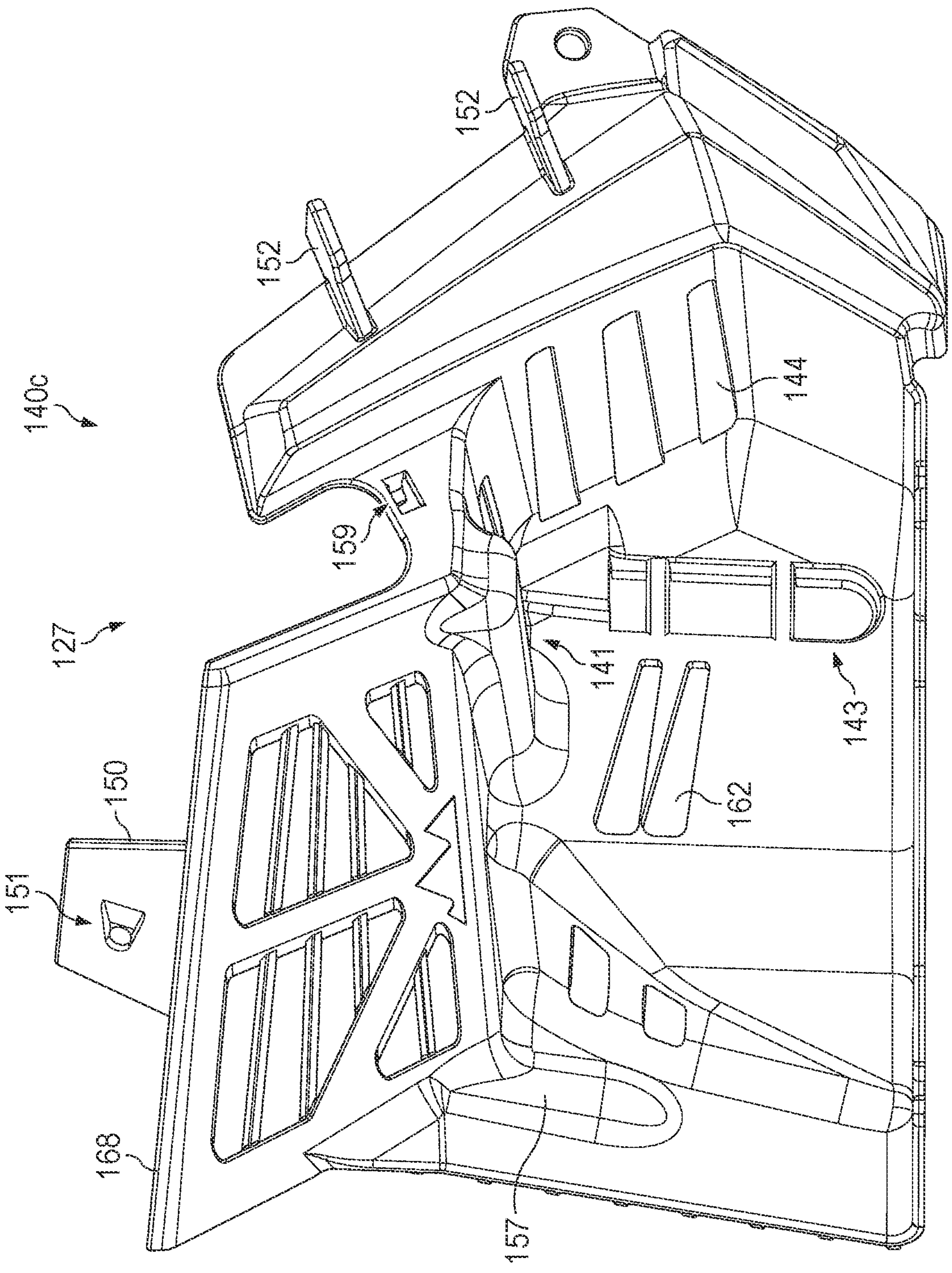
Figure 90B:
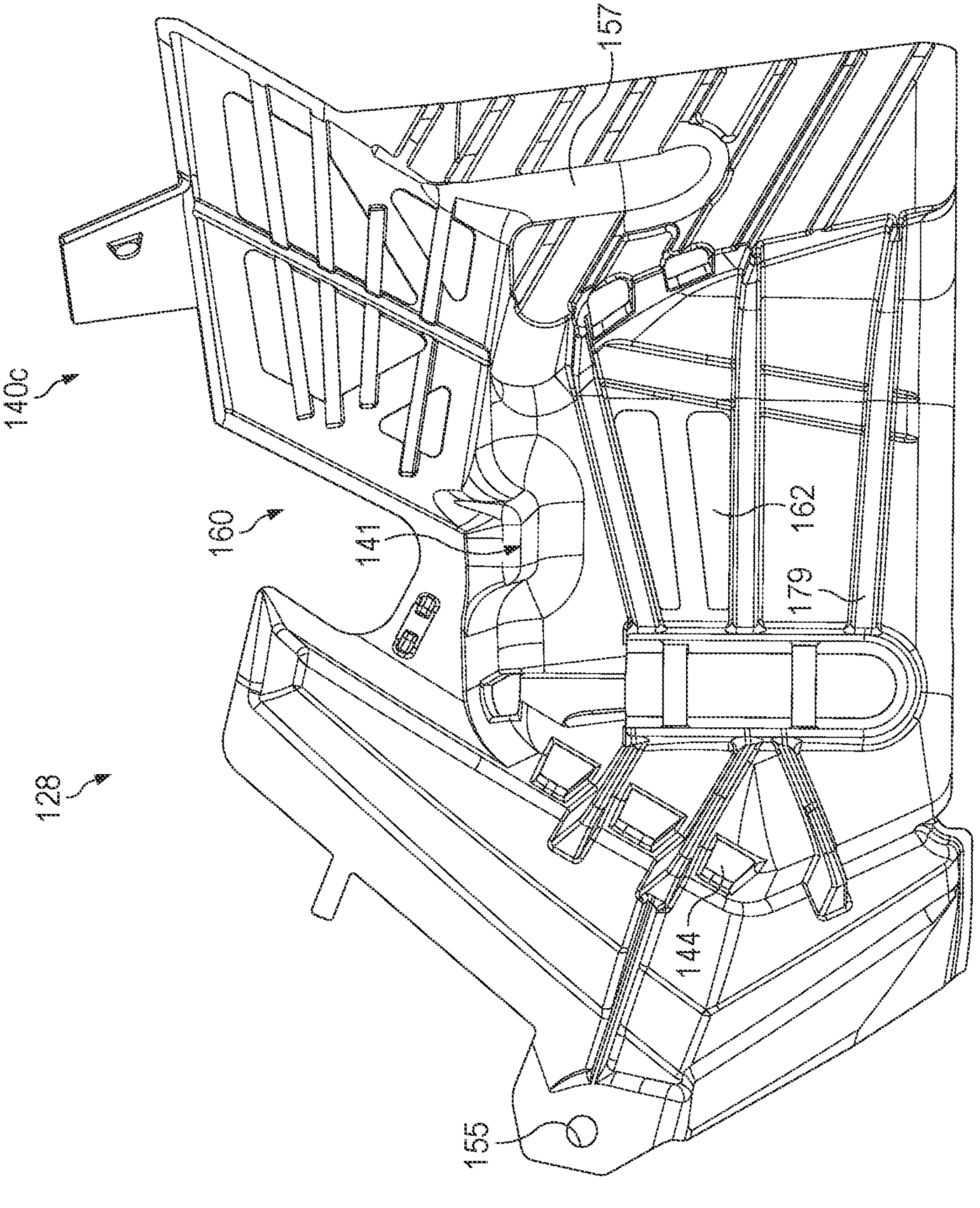
Figure 91A:
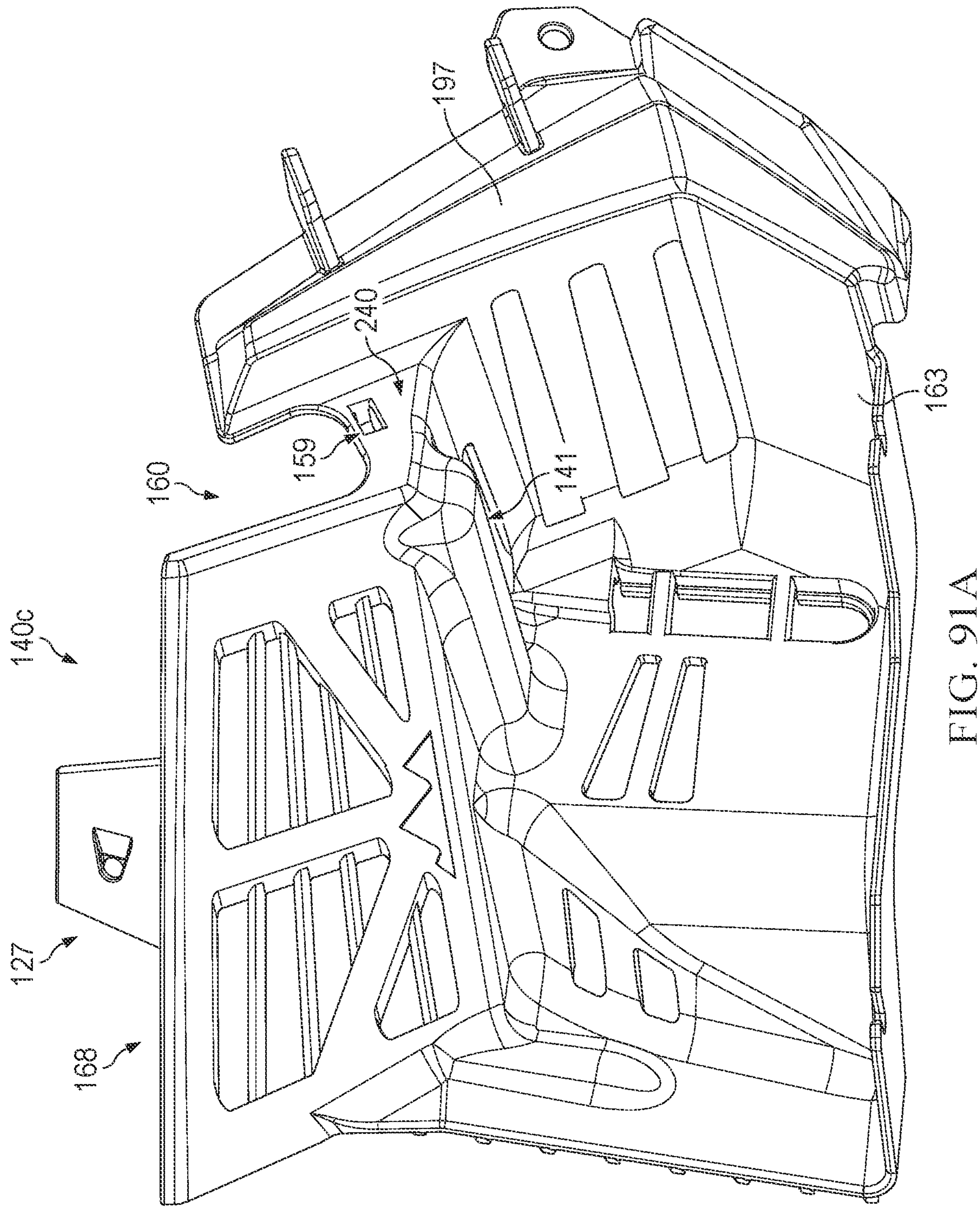
Figure 91B:
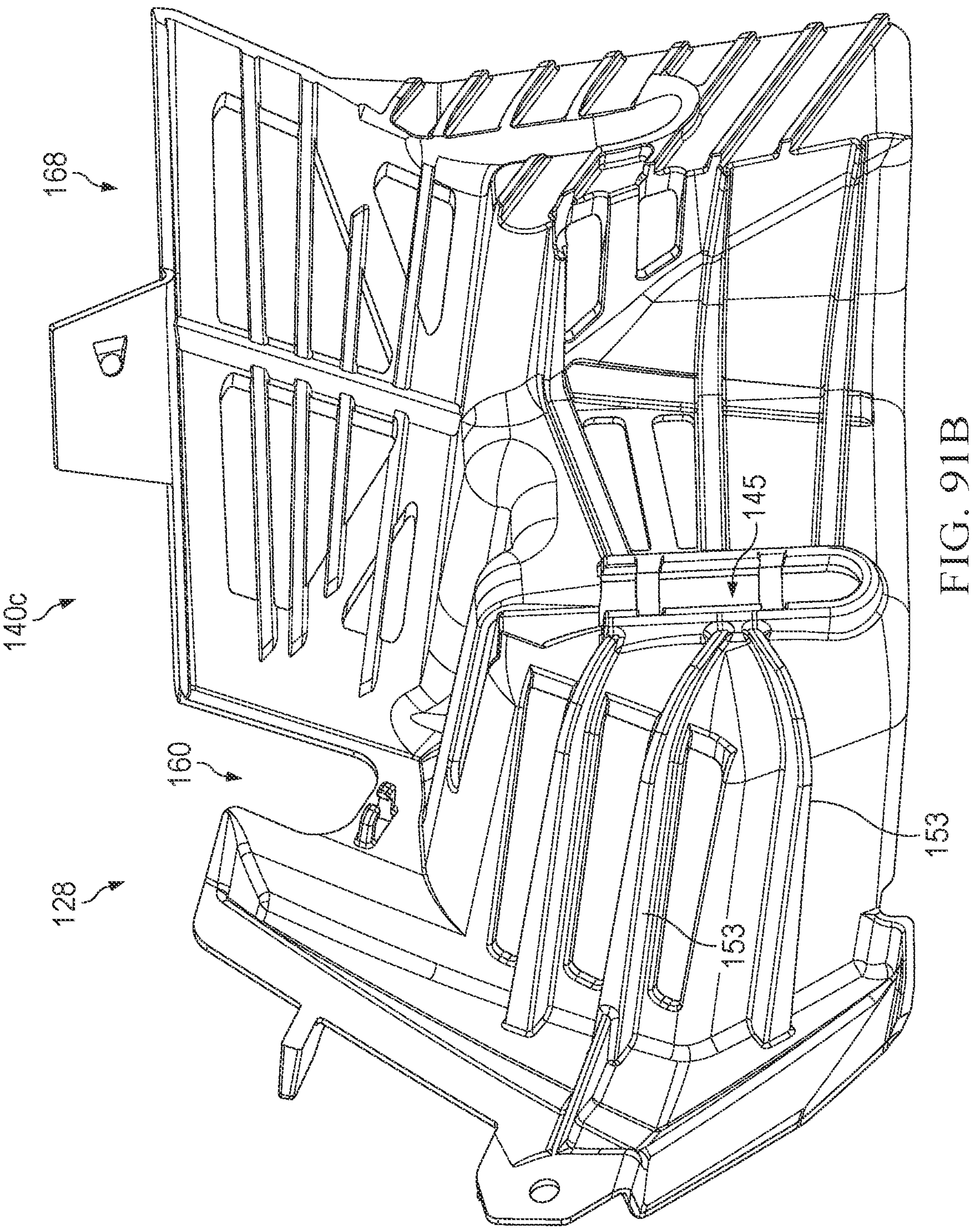

FIG. 91B illustrates a perspective view of the inboard side of the right toe stop of FIGS. 90A and 90B, according to some embodiments.

Figure 92A:
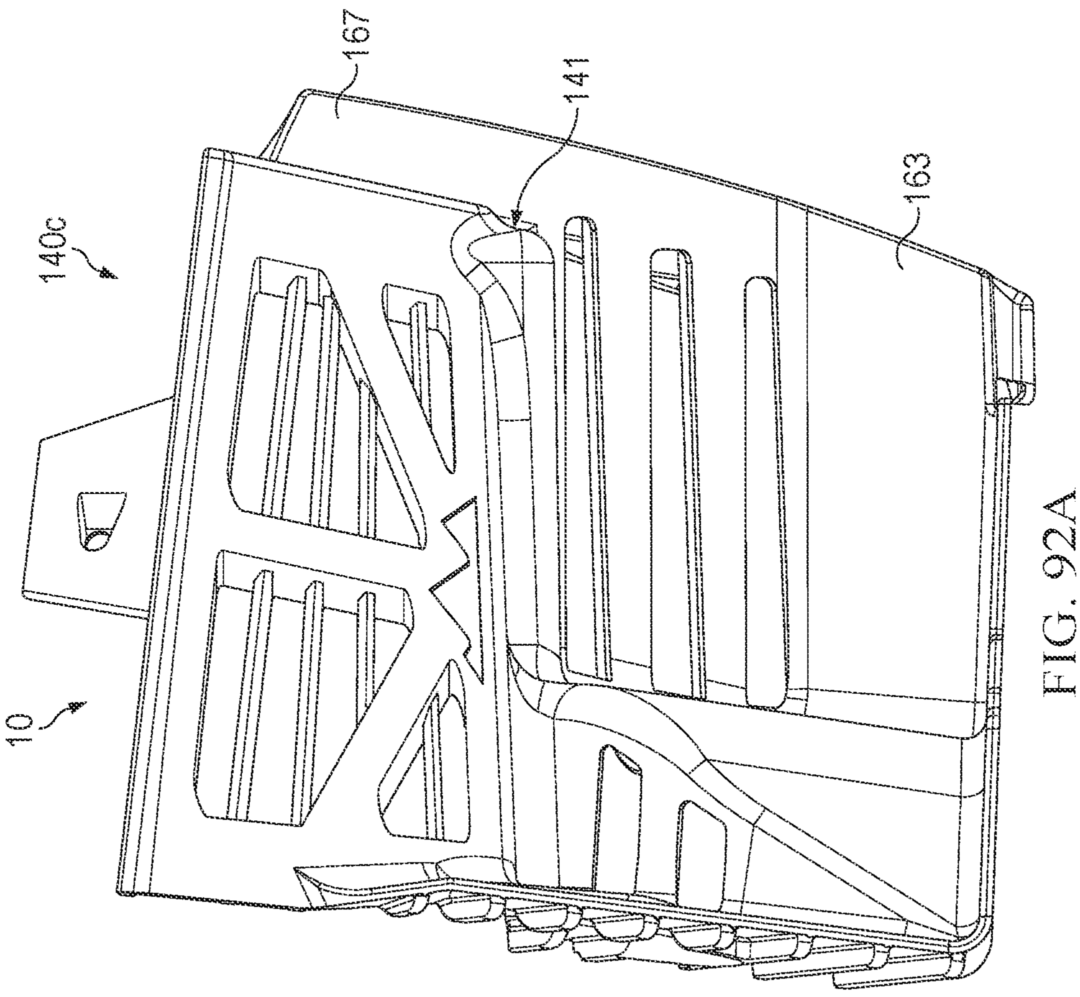

FIG. 92A illustrates a rear view of the rearward facing side of the toe stop of FIGS. 90A and 90B, according to some embodiments.

Figure 92B:
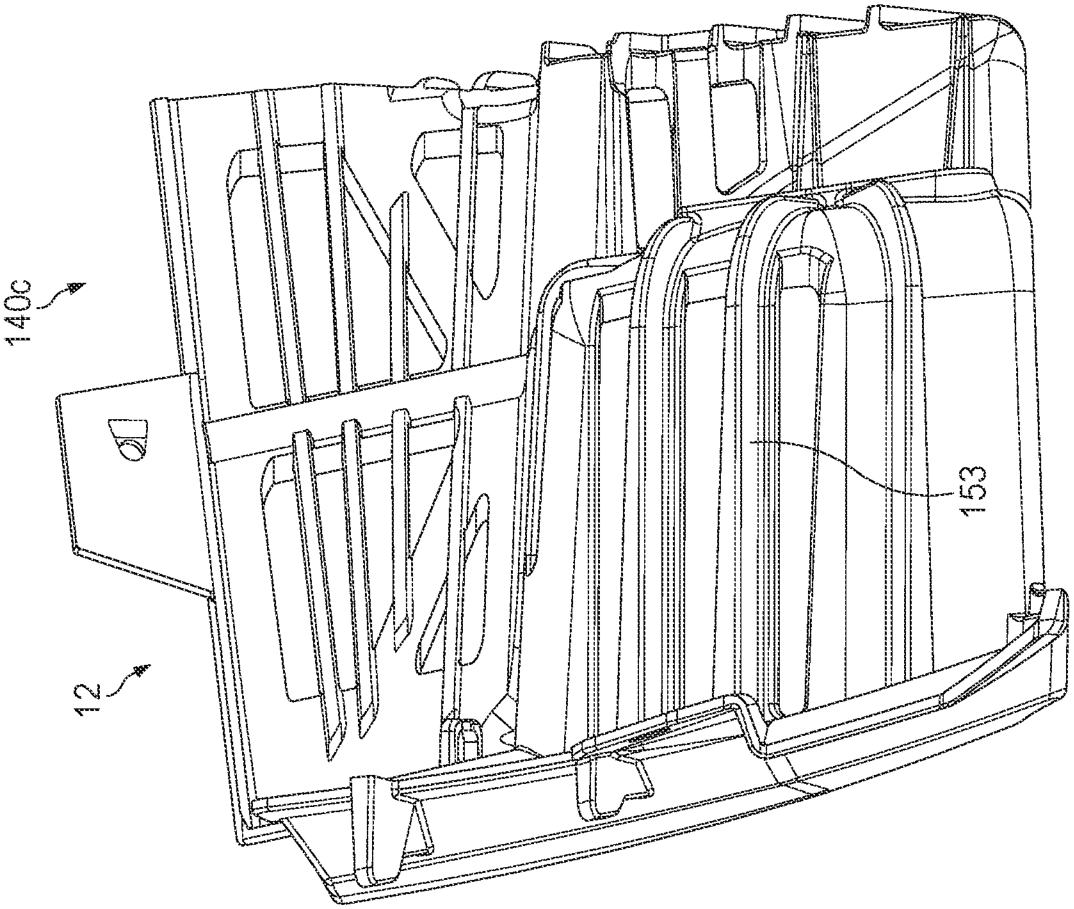

FIG. 92B illustrates a front view of the forward facing side of the toe stop of FIGS. 90A and 90B, according to some embodiments.

Figure 93A:
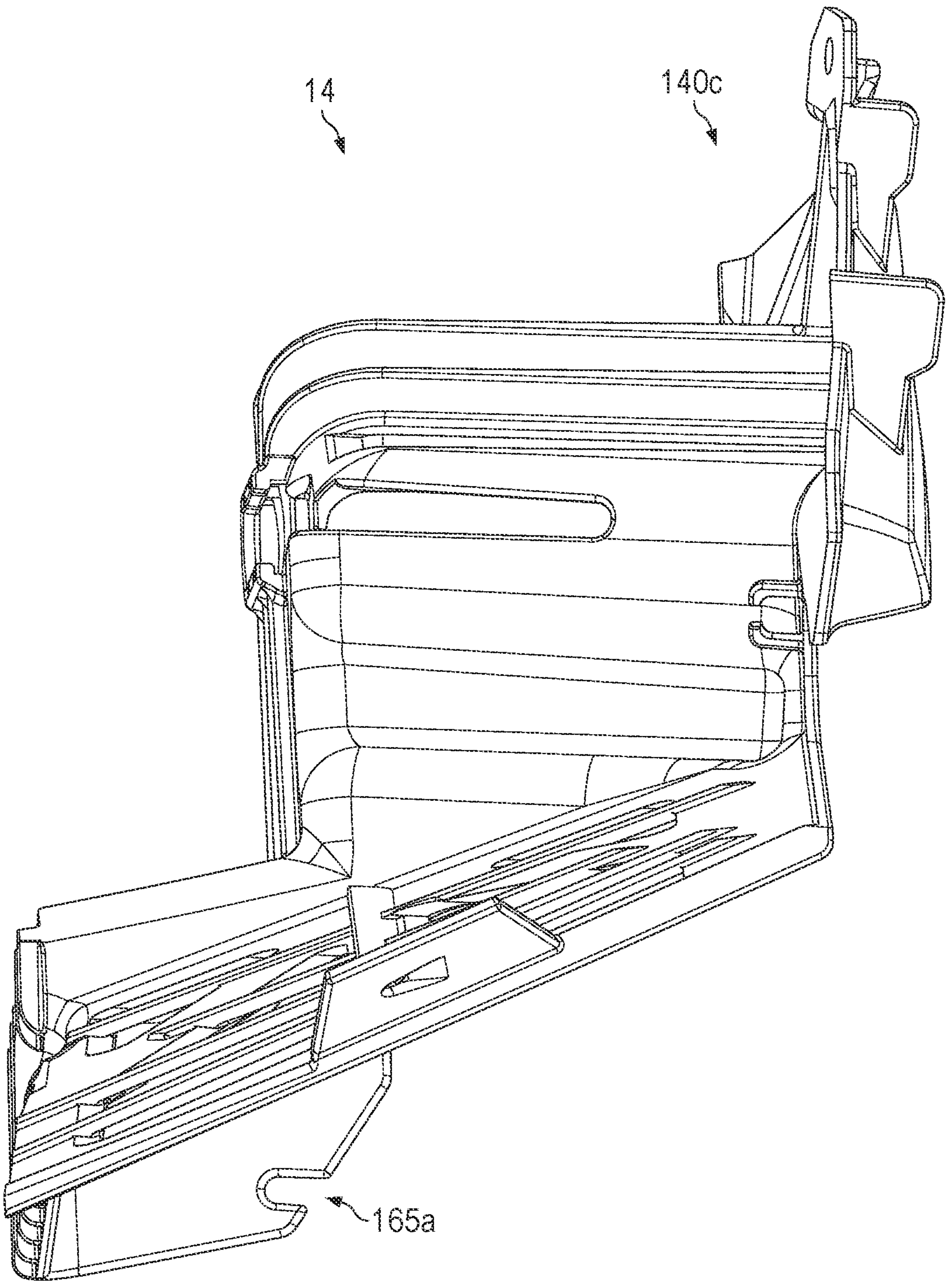

FIG. 93A illustrates a top view of the toe stop of FIGS. 90A and 90B, according to some embodiments.

Figure 93B:
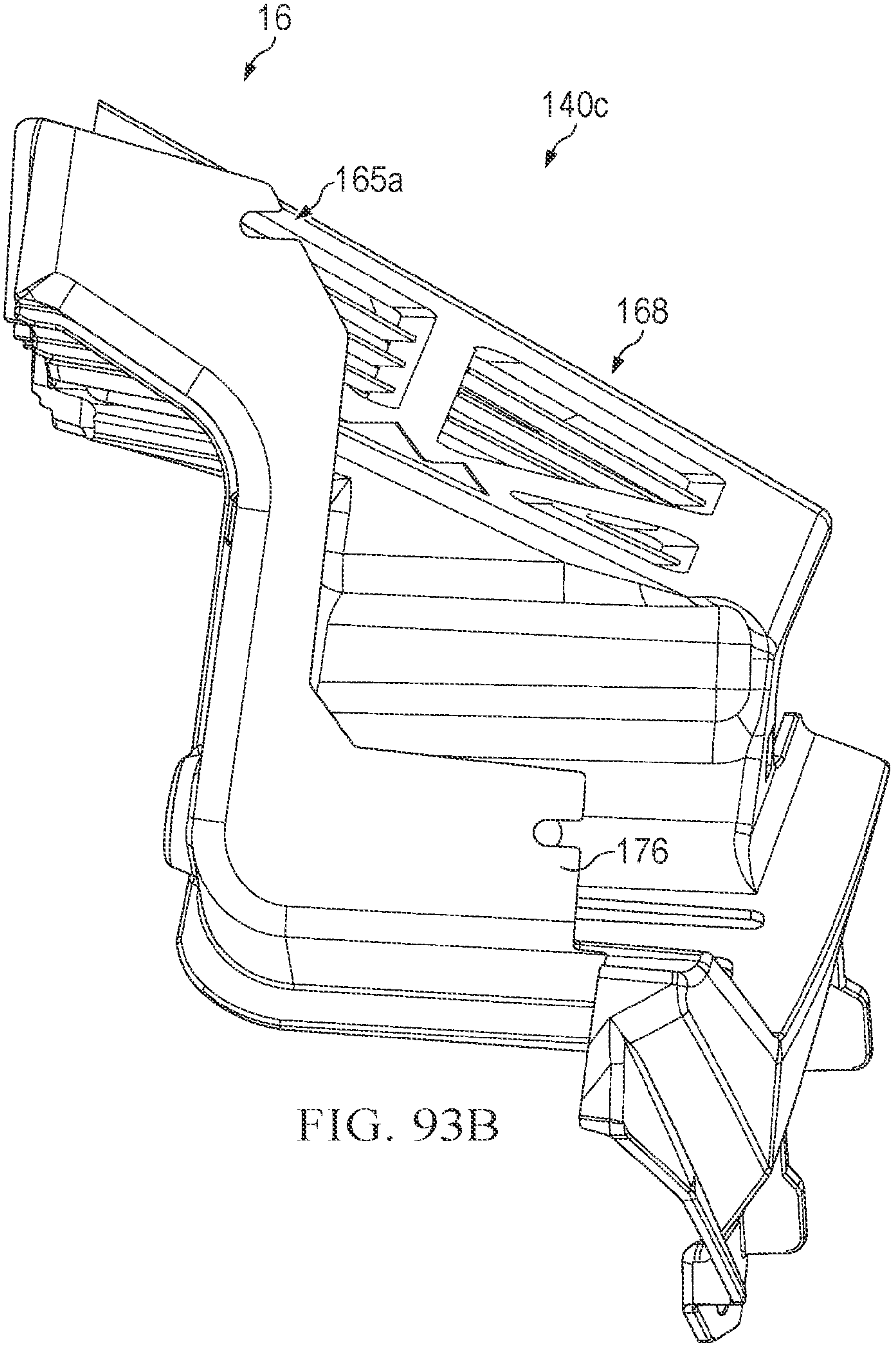

FIG. 93B illustrates a bottom view of the toe stop of FIGS. 90A and 90B, according to some embodiments.

Figure 10:
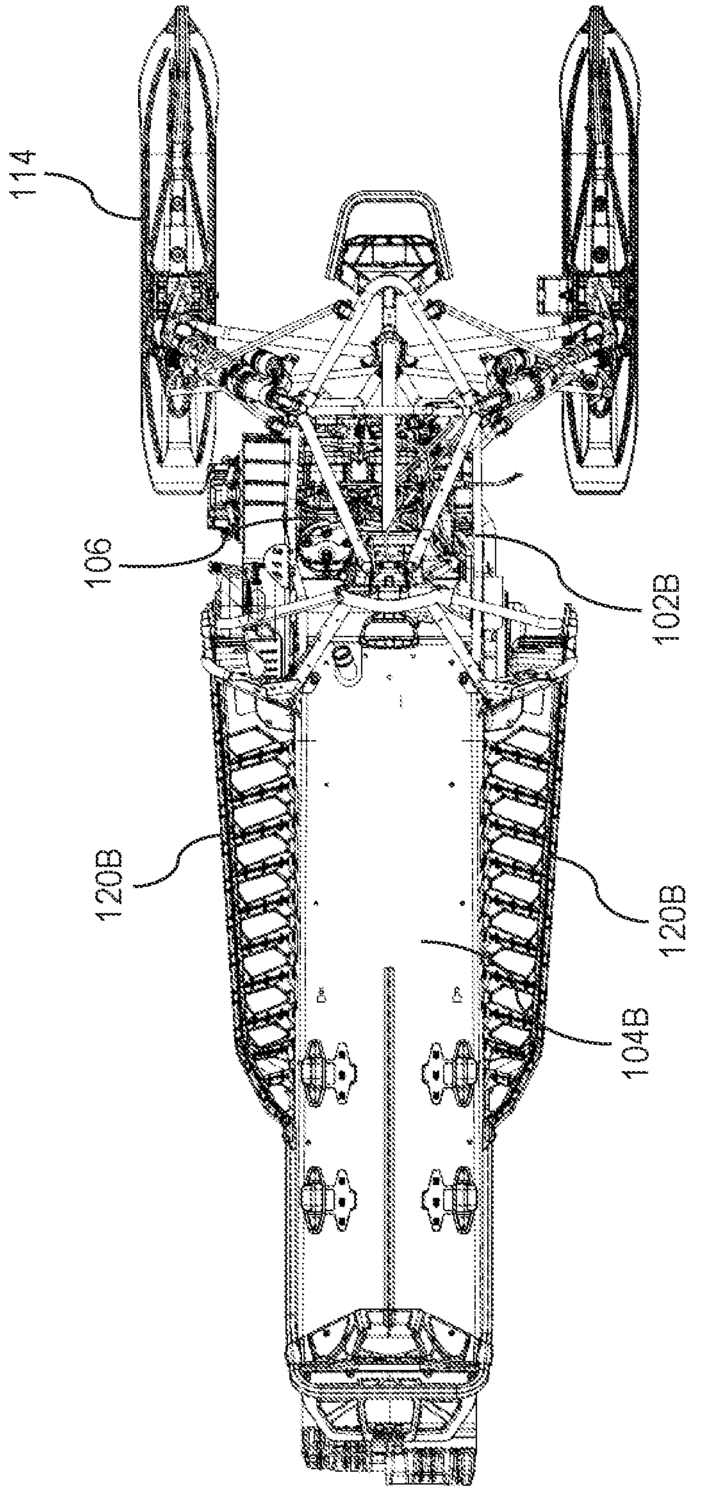
FIG. 10 illustrates a top view of a snowmobile with portions of the engine cover removed, according to some embodiments.
Figure 94A:
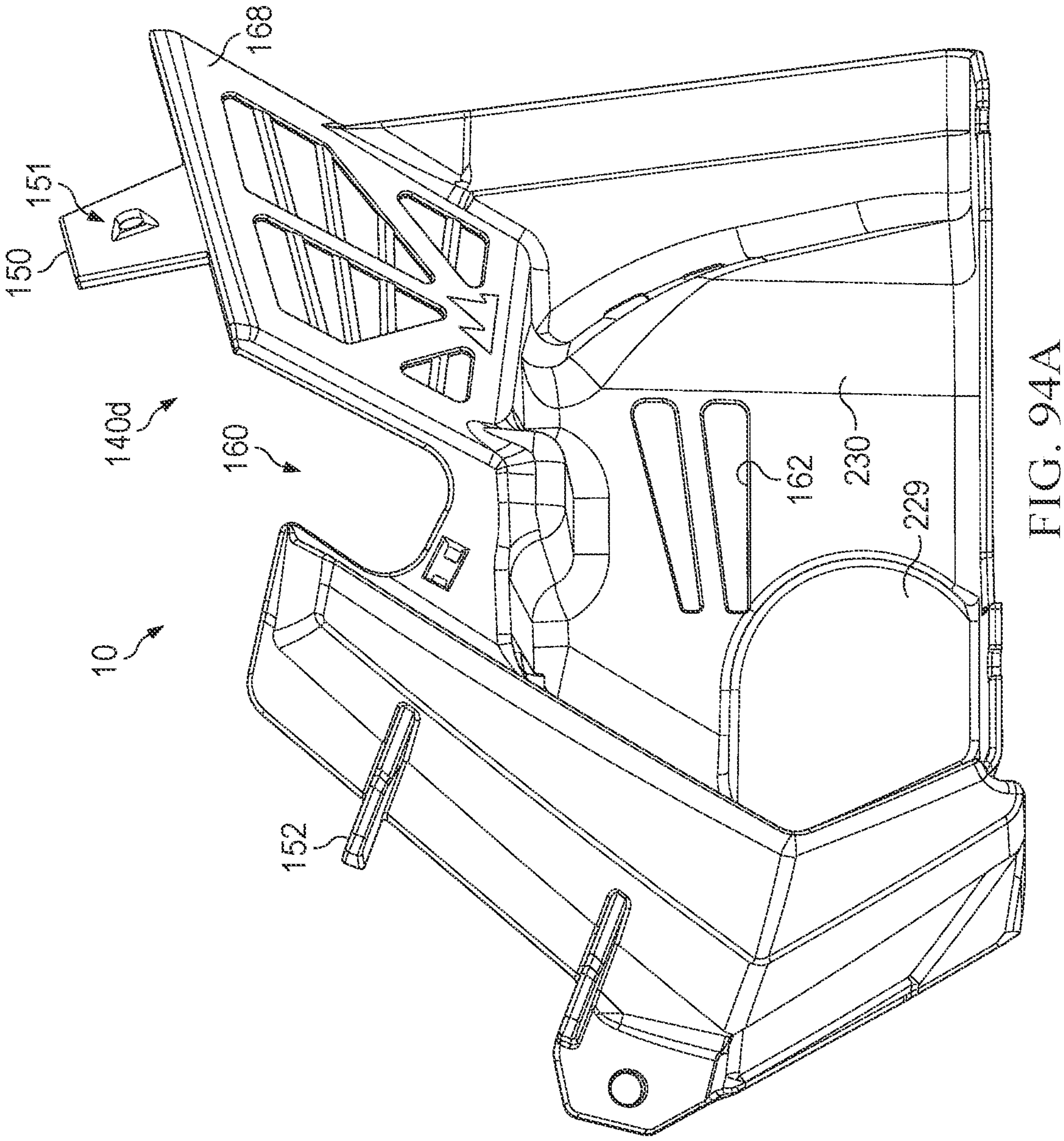

FIG. 94A illustrates a perspective view of an outboard side of a left side toe stop that may be part of the running board assembly 120B of FIG. 10, according to some embodiments.

Figure 94B:
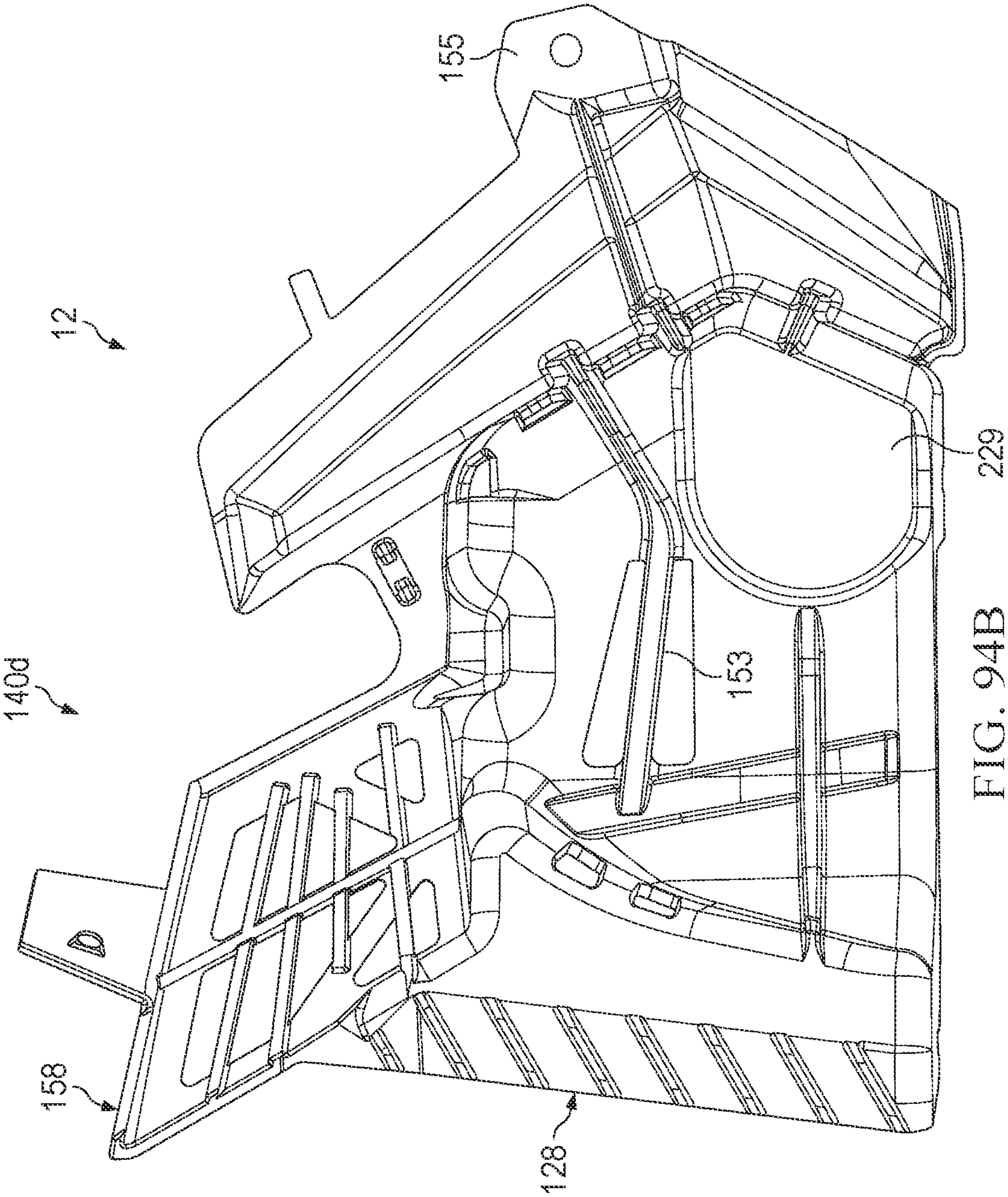

FIG. 94B illustrates a perspective view of an inboard side of the left toe stop of FIG. 94A that may be part of the running board assembly 120B of FIG. 10, according to some embodiments.

Figure 95A:
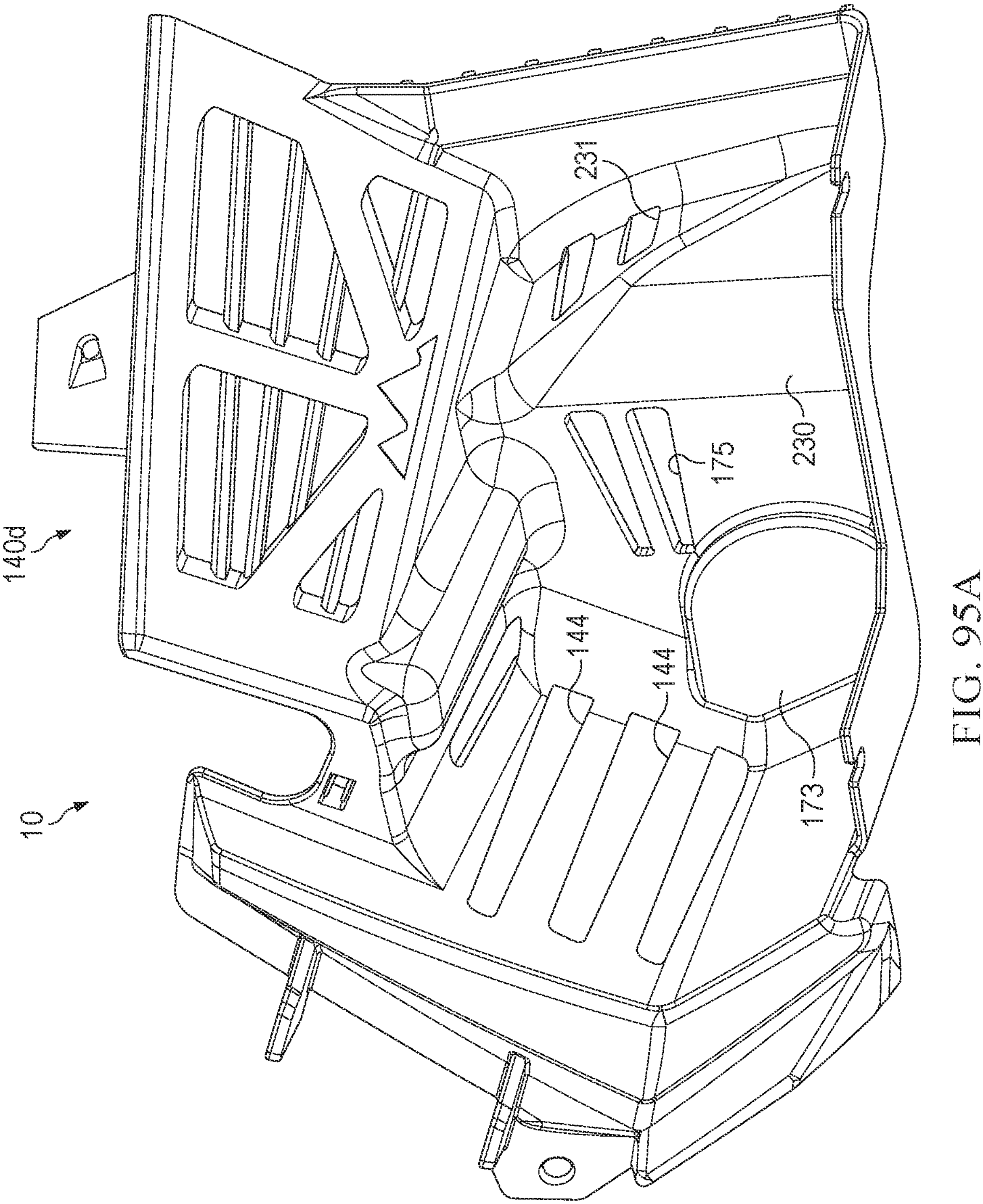

FIG. 95A illustrates an isometric view of the outboard side of the left side toe stop of FIGS. 94A and 94B, according to some embodiments.

Figure 95B:
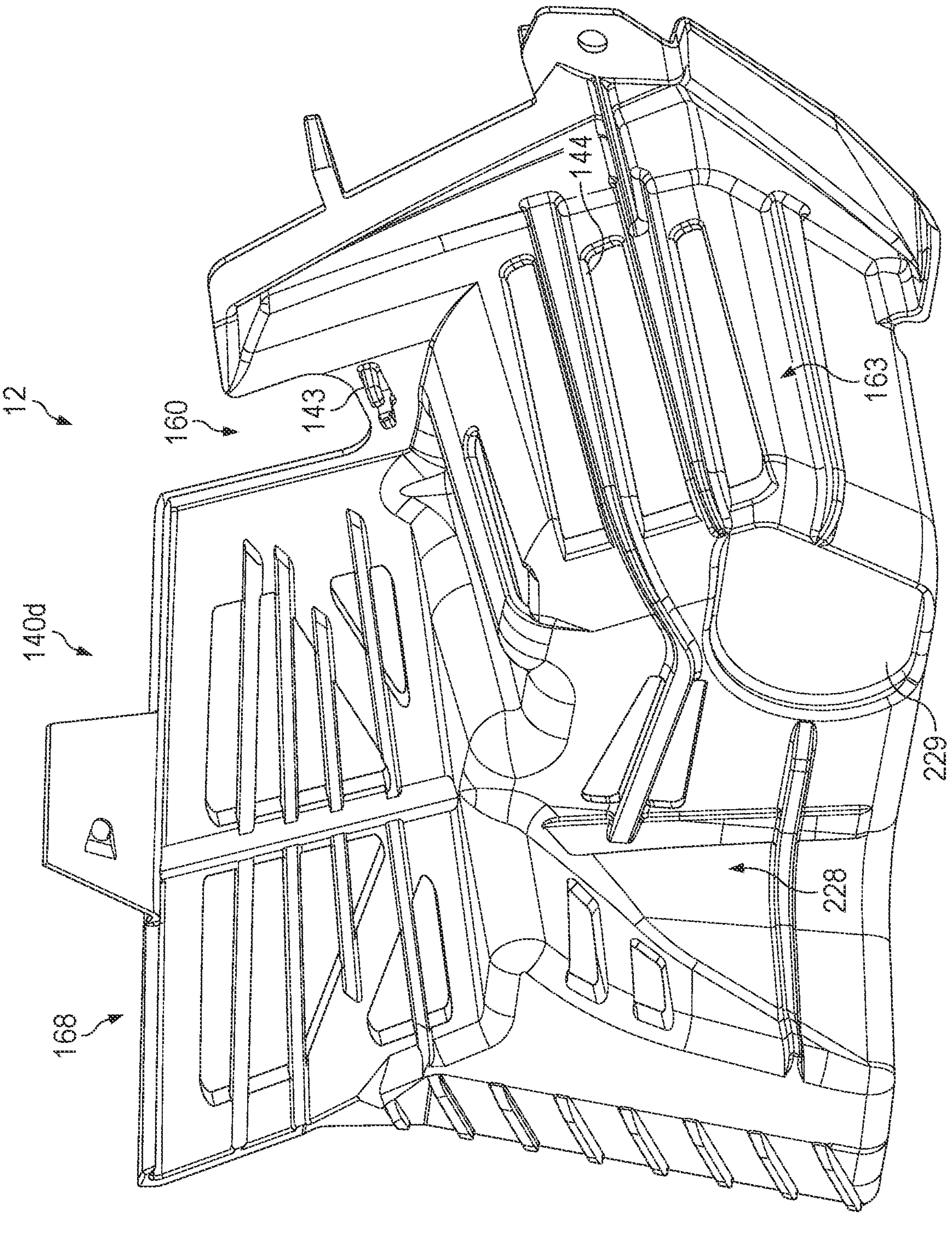

FIG. 95B illustrates an isometric view of the inboard side of the left side toe stop of FIGS. 94A and 94B, according to some embodiments.

Figure 96A:
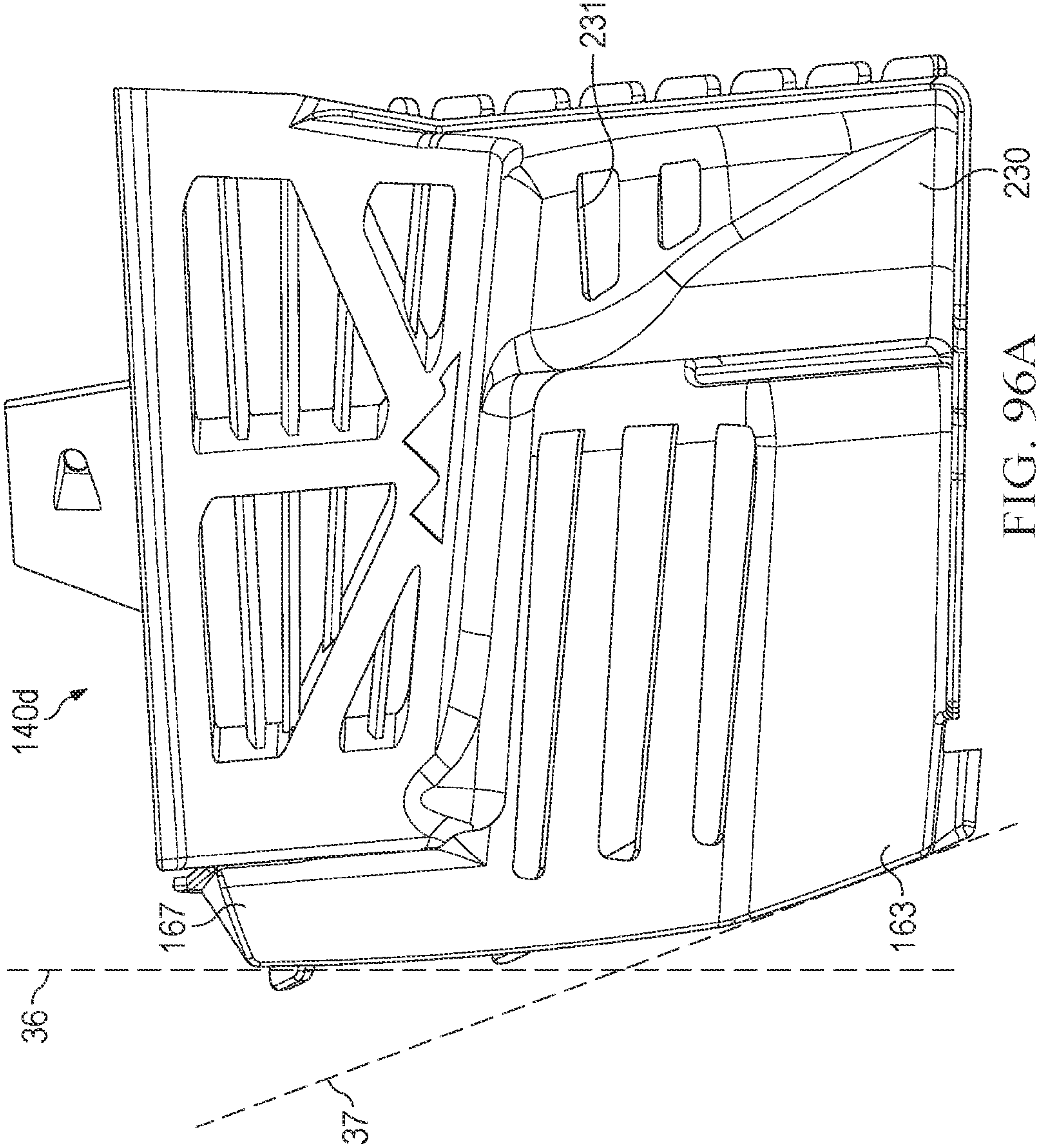

FIG. 96A illustrates a rear view of the rearward facing side of the toe stop of FIGS. 94A and 94B, according to some embodiments.

Figure 96B:
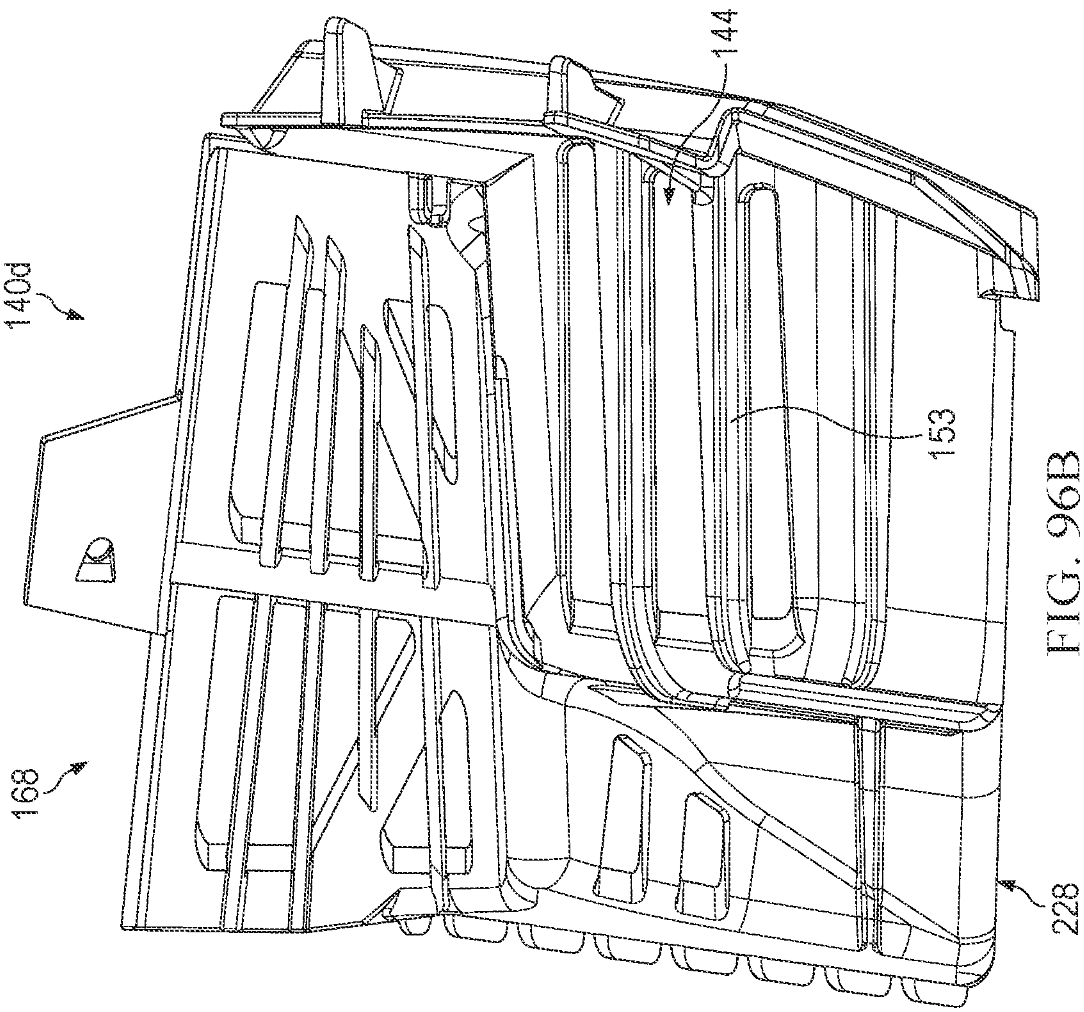

FIG. 96B illustrates a front view of the forward facing side of the toe stop of FIGS. 94A and 94B, according to some embodiments.

Figure 97A:
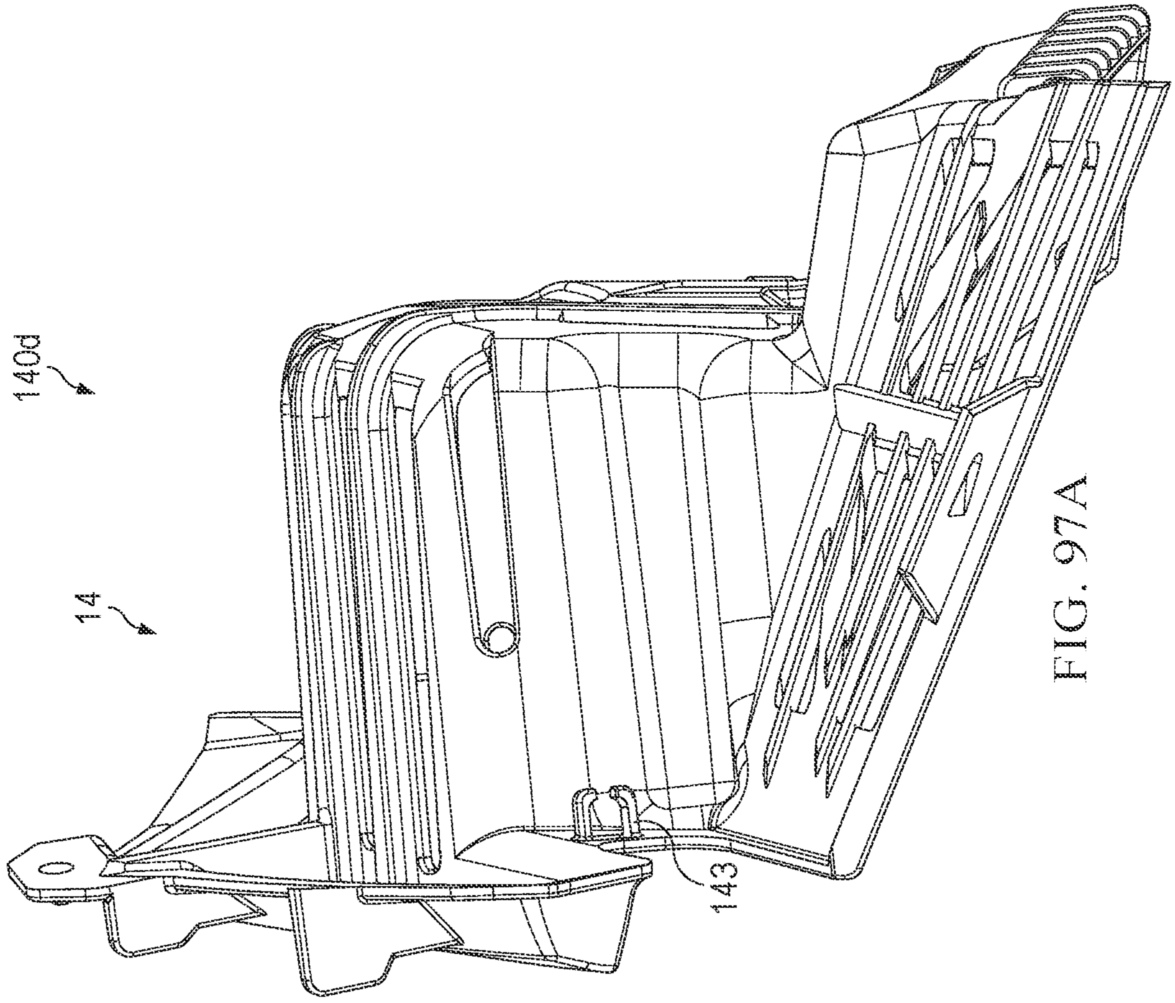

FIG. 97A illustrates a top view of the toe stop of FIGS. 94A and 94B, according to some embodiments.

Figure 97B:
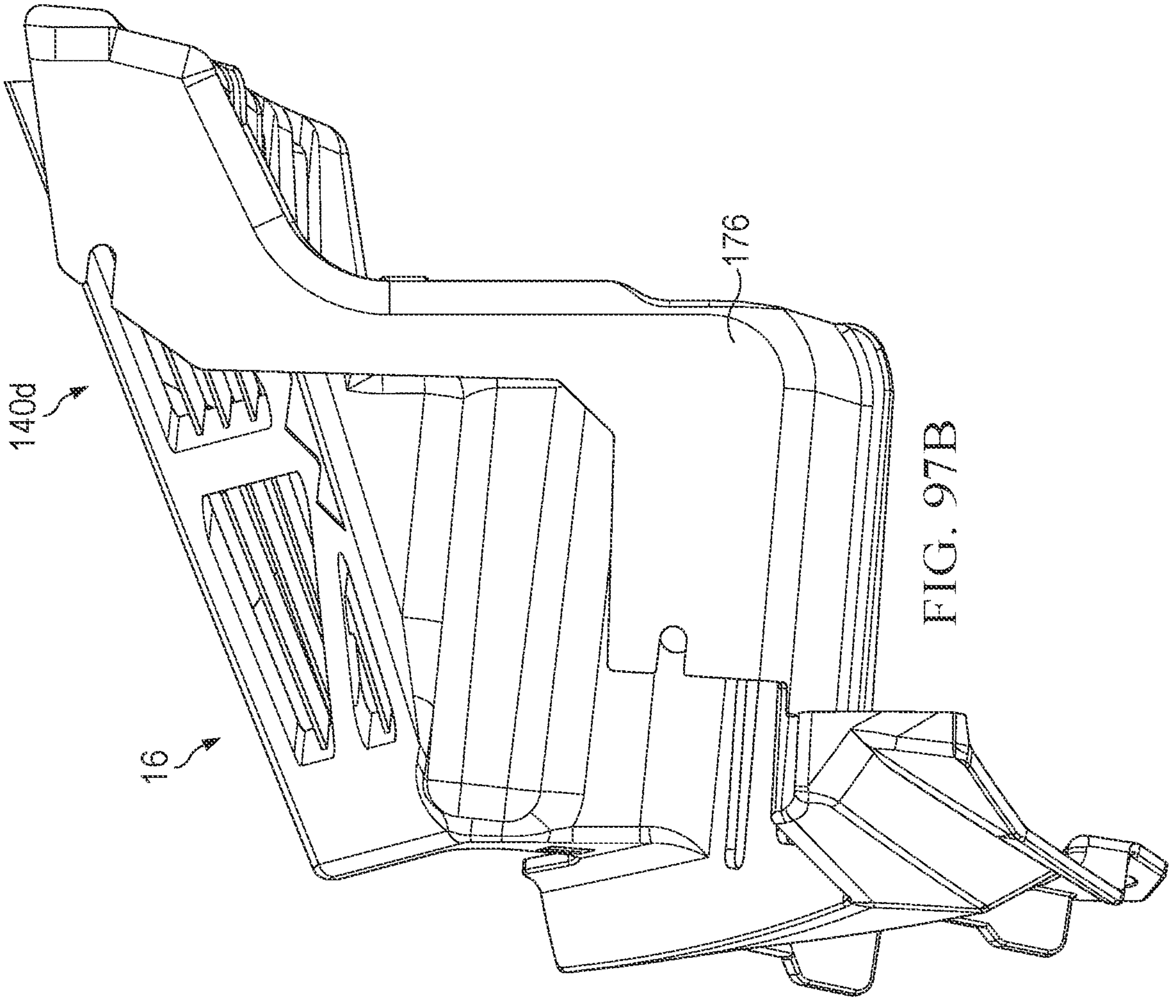

FIG. 97B illustrates a bottom view of the toe stop of FIGS. 94A and 94B, according to some embodiments.

Figure 98A:
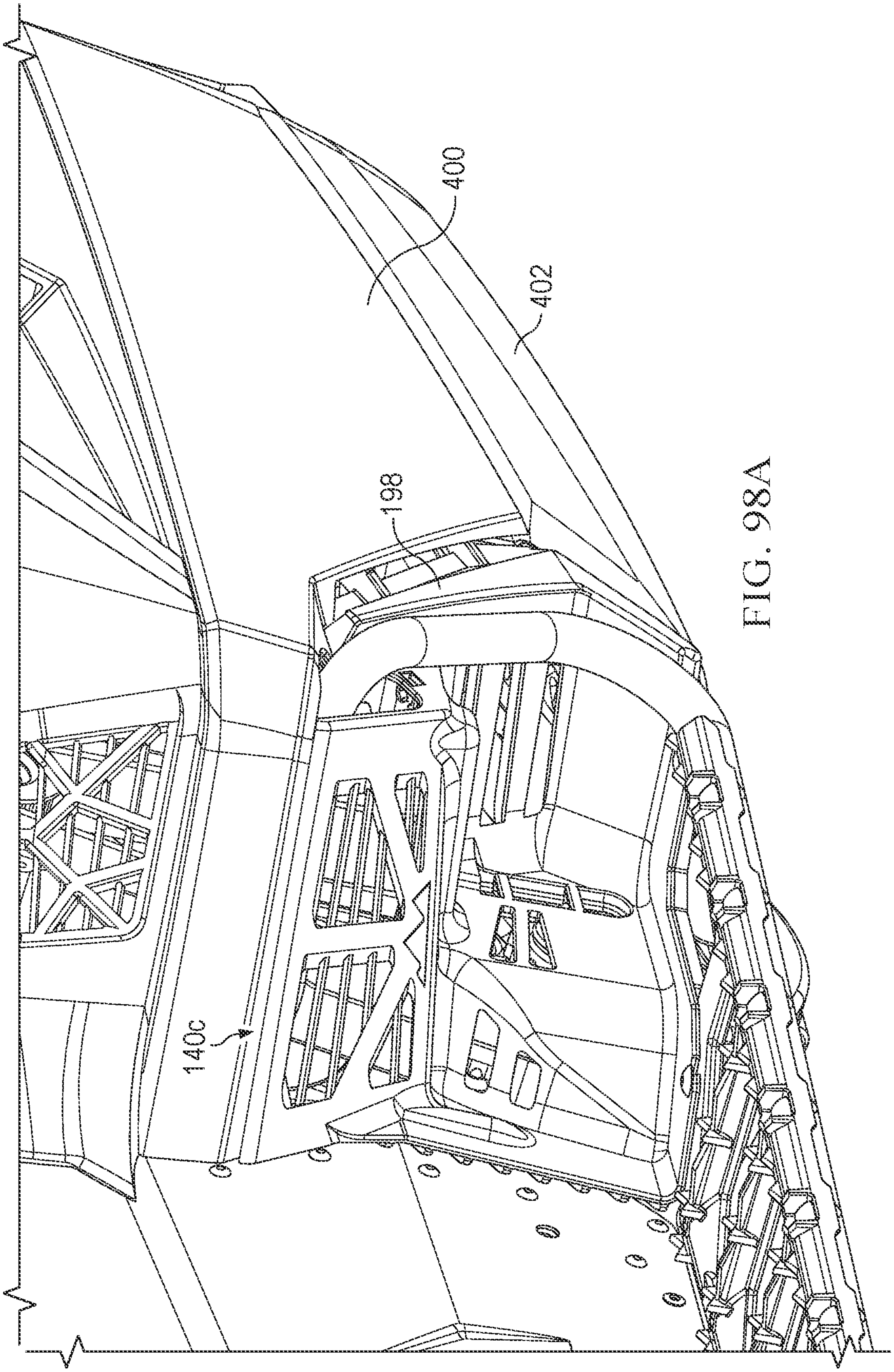

FIG. 98A illustrates an isometric view of the right side toe stop of FIGS. 90A and 90B installed as part of the running board assembly 120B, according to some embodiments.

Figure 98B:
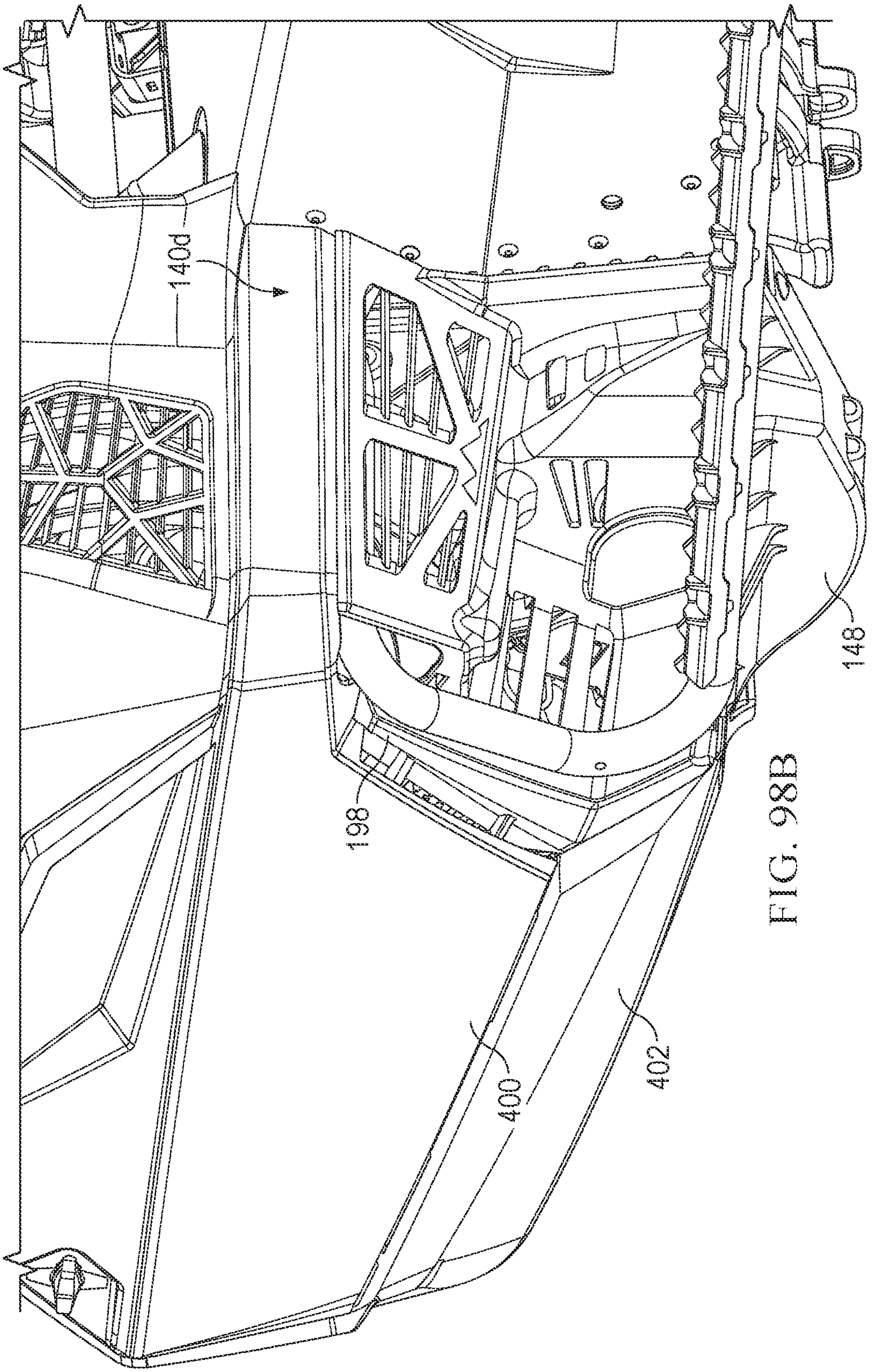

FIG. 98B illustrates an isometric view of the left side toe stop of FIGS. 94A and 94B installed as part of the running board assembly 120B, according to some embodiments.

Figure 99A:
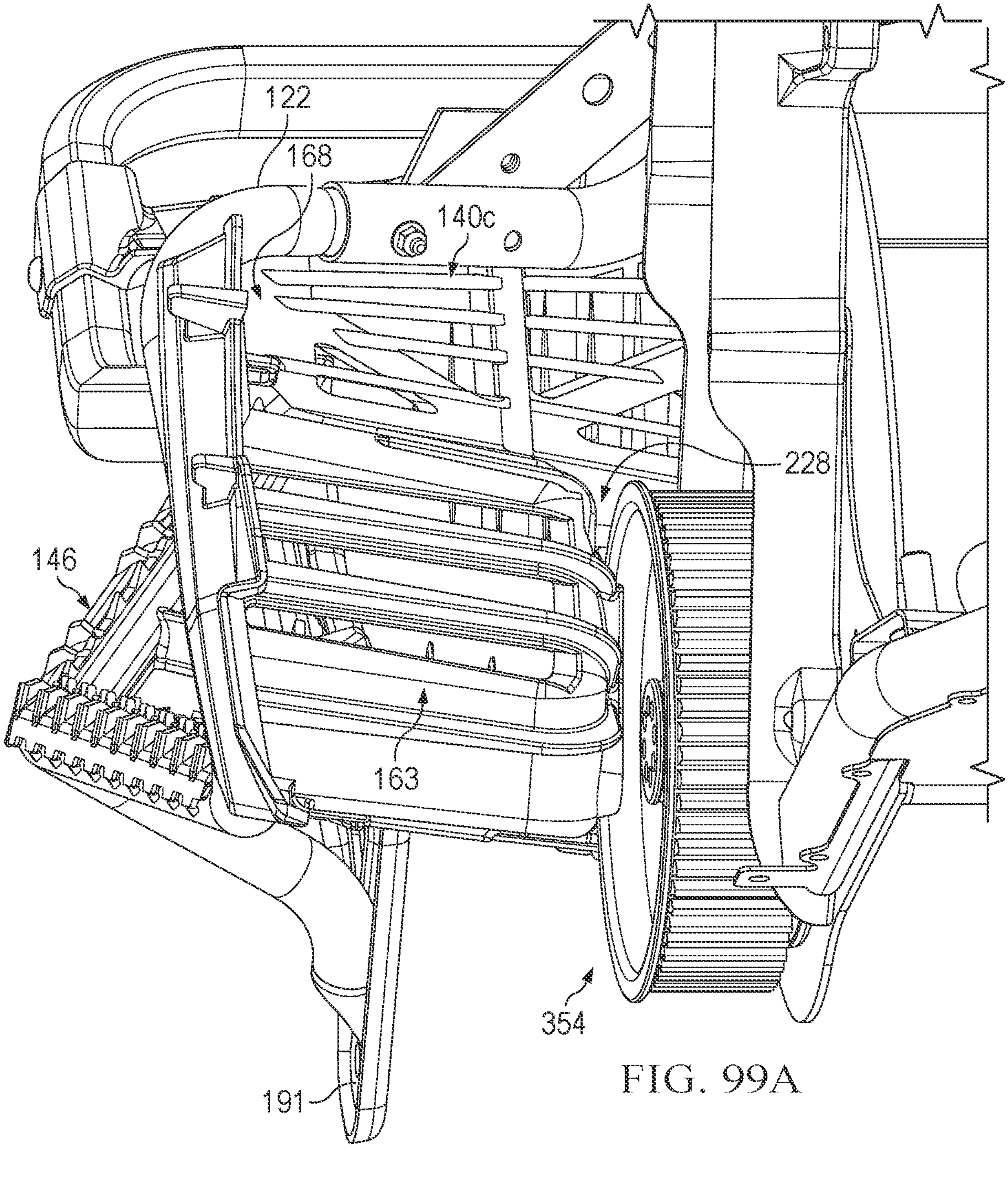

FIG. 99A illustrates a front view of the forward facing surface of the right side toe stop of FIGS. 90A and 90B installed as part of the running board assembly 120B, according to some embodiments.

Figure 99B:
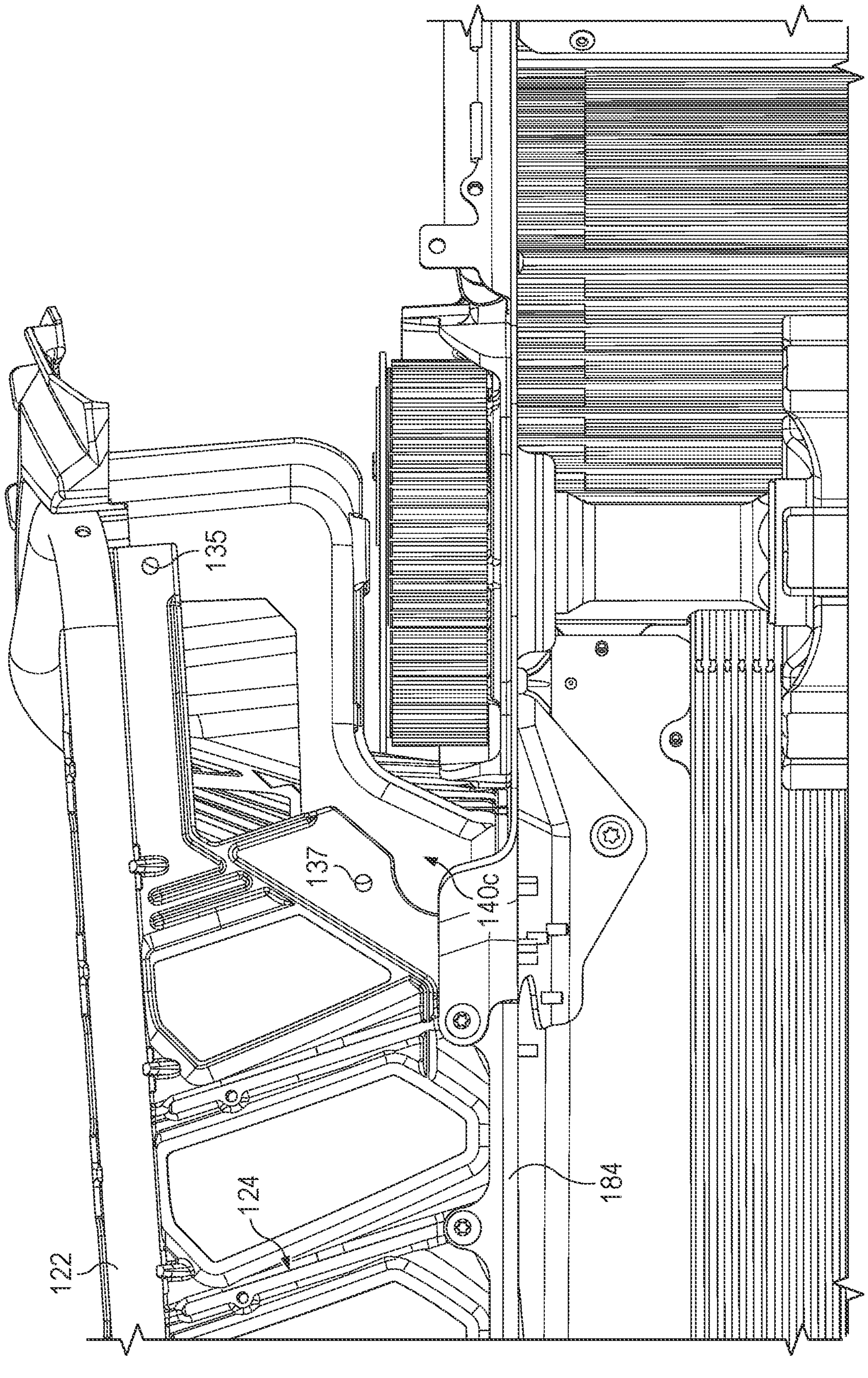

FIG. 99B illustrates a bottom view of the right side toe stop of FIGS. 90A and 90B installed as part of the running board assembly 120B, according to some embodiments.

Figure 100A:
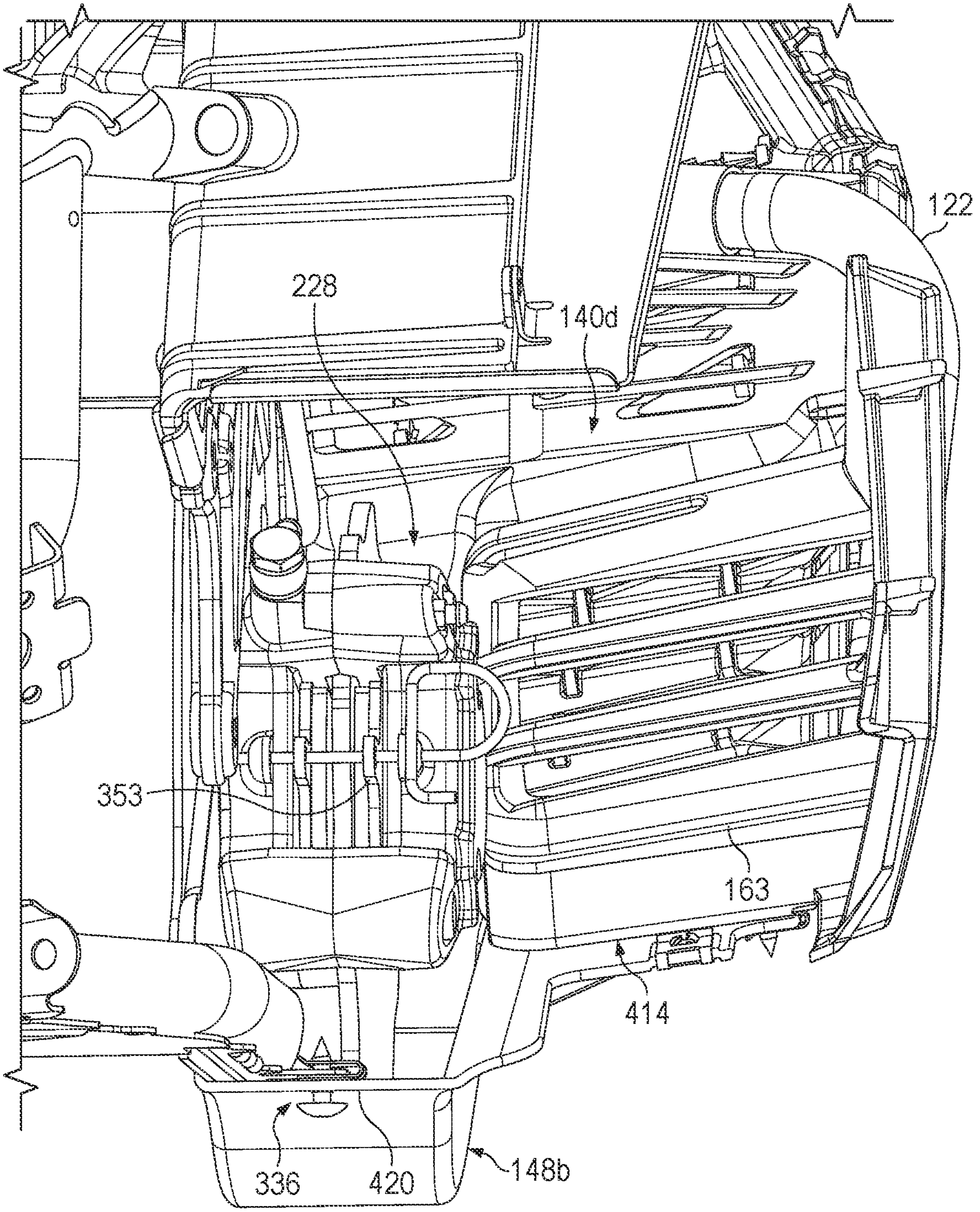

FIG. 100A illustrates a front view of the left side toe stop of FIGS. 94A and 94B installed as part of the running board assembly 120B, according to some embodiments.

Figure 100B:
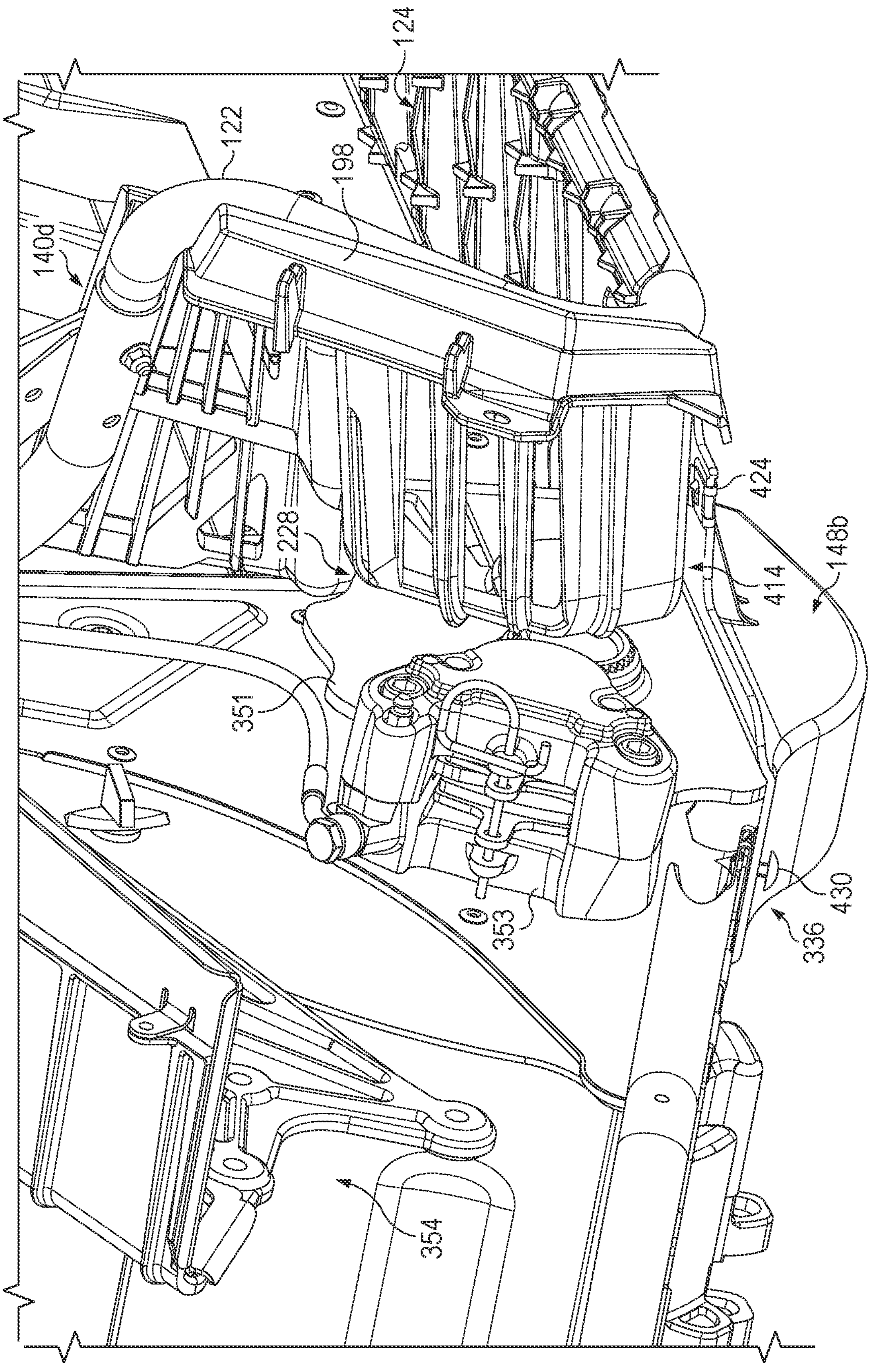

FIG. 100B illustrates an isometric view of the left side toe stop of FIGS. 94A and 94B installed as part of the running board assembly 120B, according to some embodiments.

Figure 101:
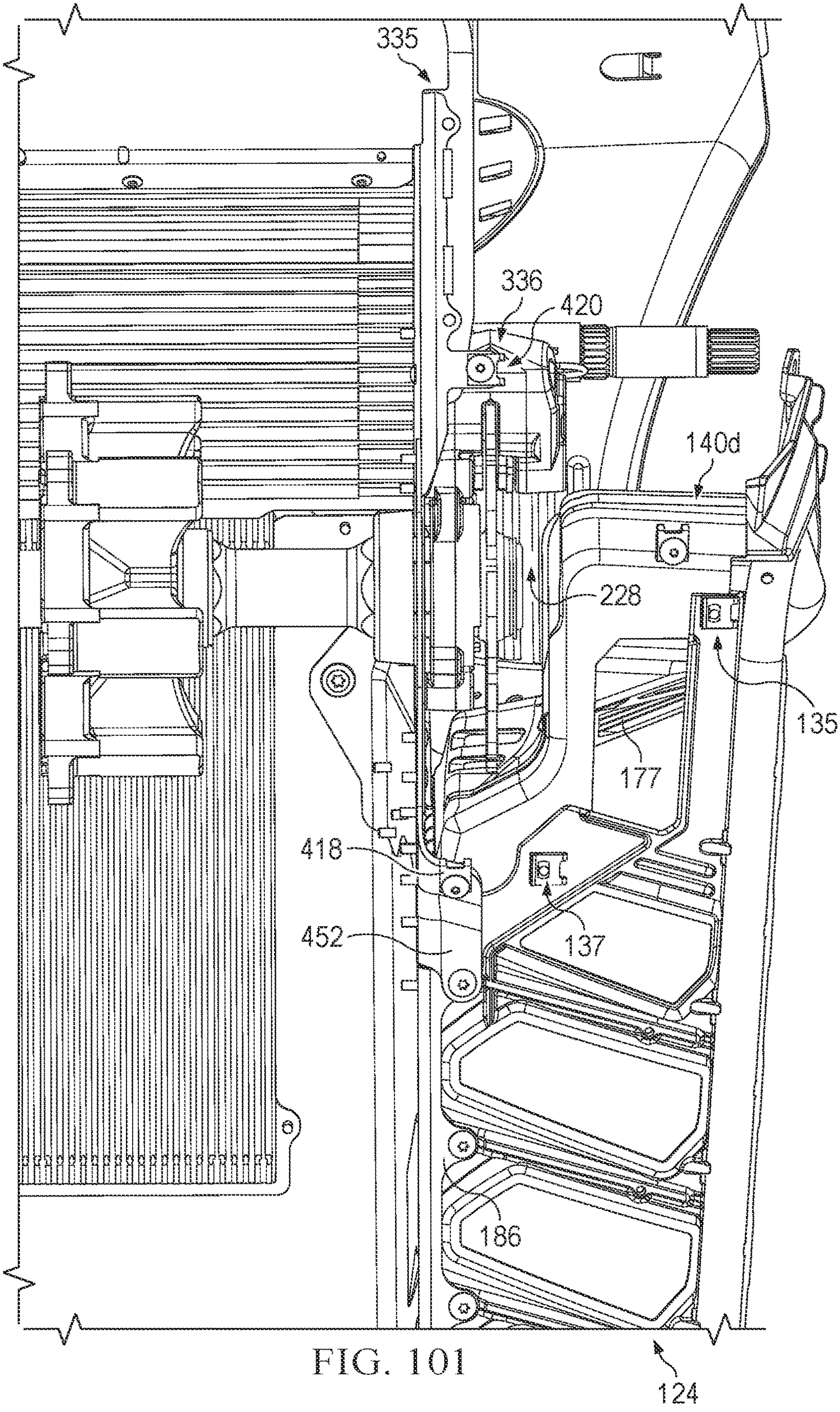

FIG. 101 illustrates a bottom isometric view of the left side toe stop of FIGS. 94A and 94B installed as part of the running board assembly 120B, according to some embodiments.

Figure 102:
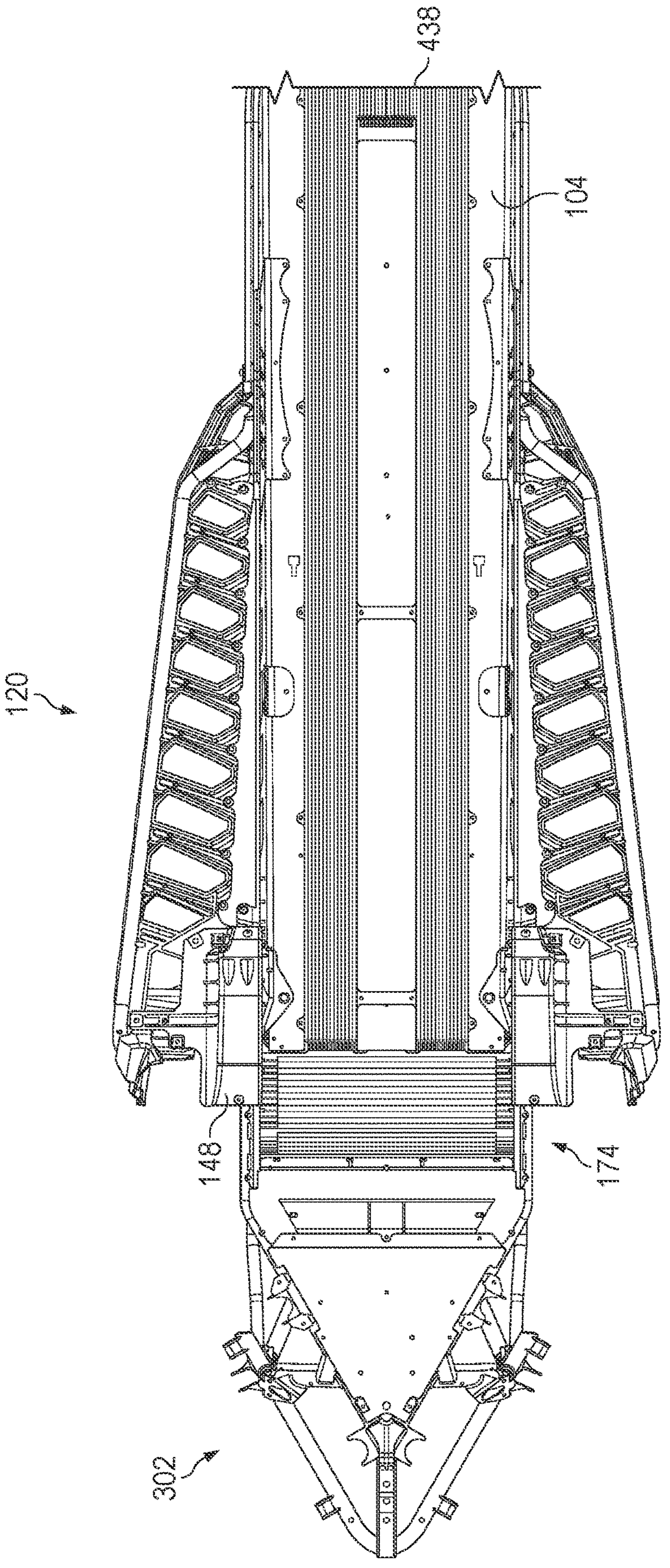

FIG. 102 illustrates a bottom view of components of a chassis, a running board assembly, and a heat exchanger assembly, according to some embodiments.

Figure 103:
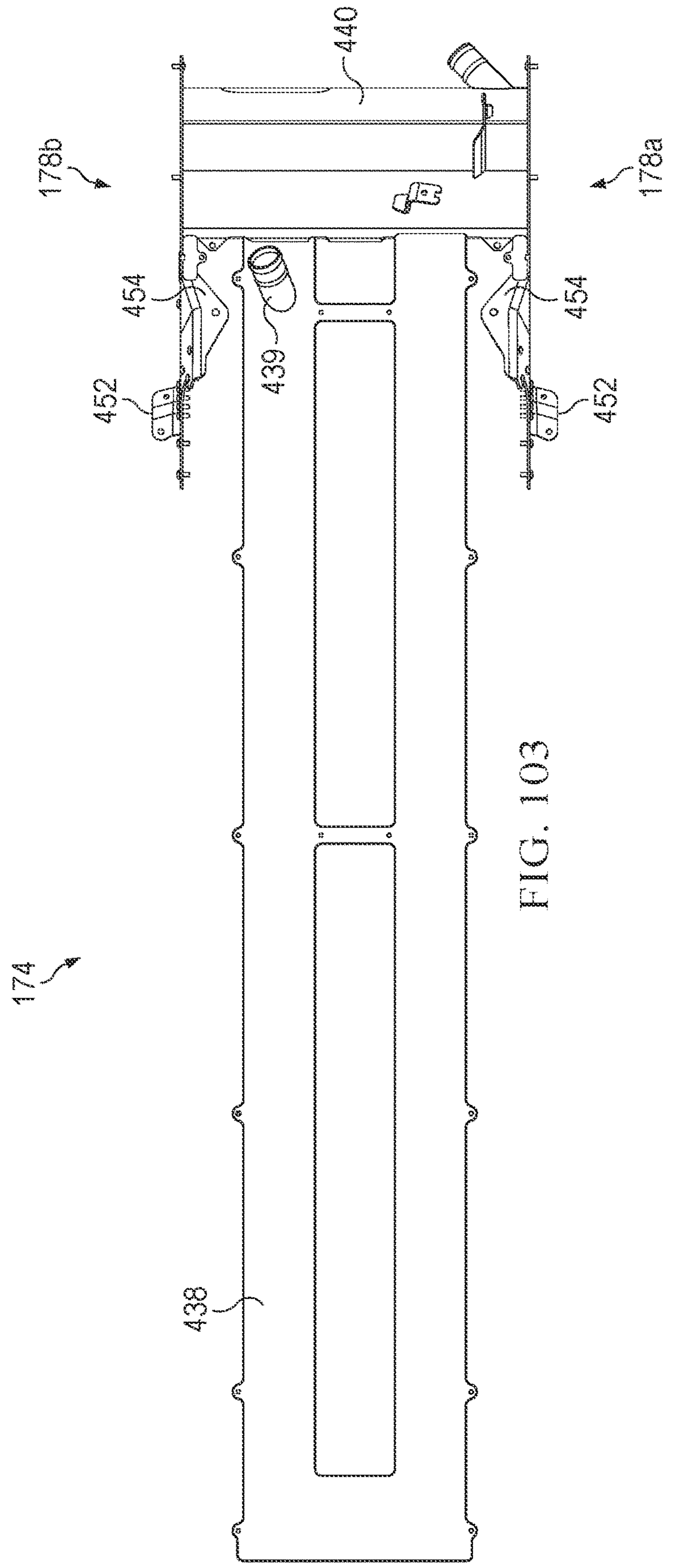

FIG. 103 illustrates a top view of a heat exchanger assembly, according to some embodiments.

Figure 104:
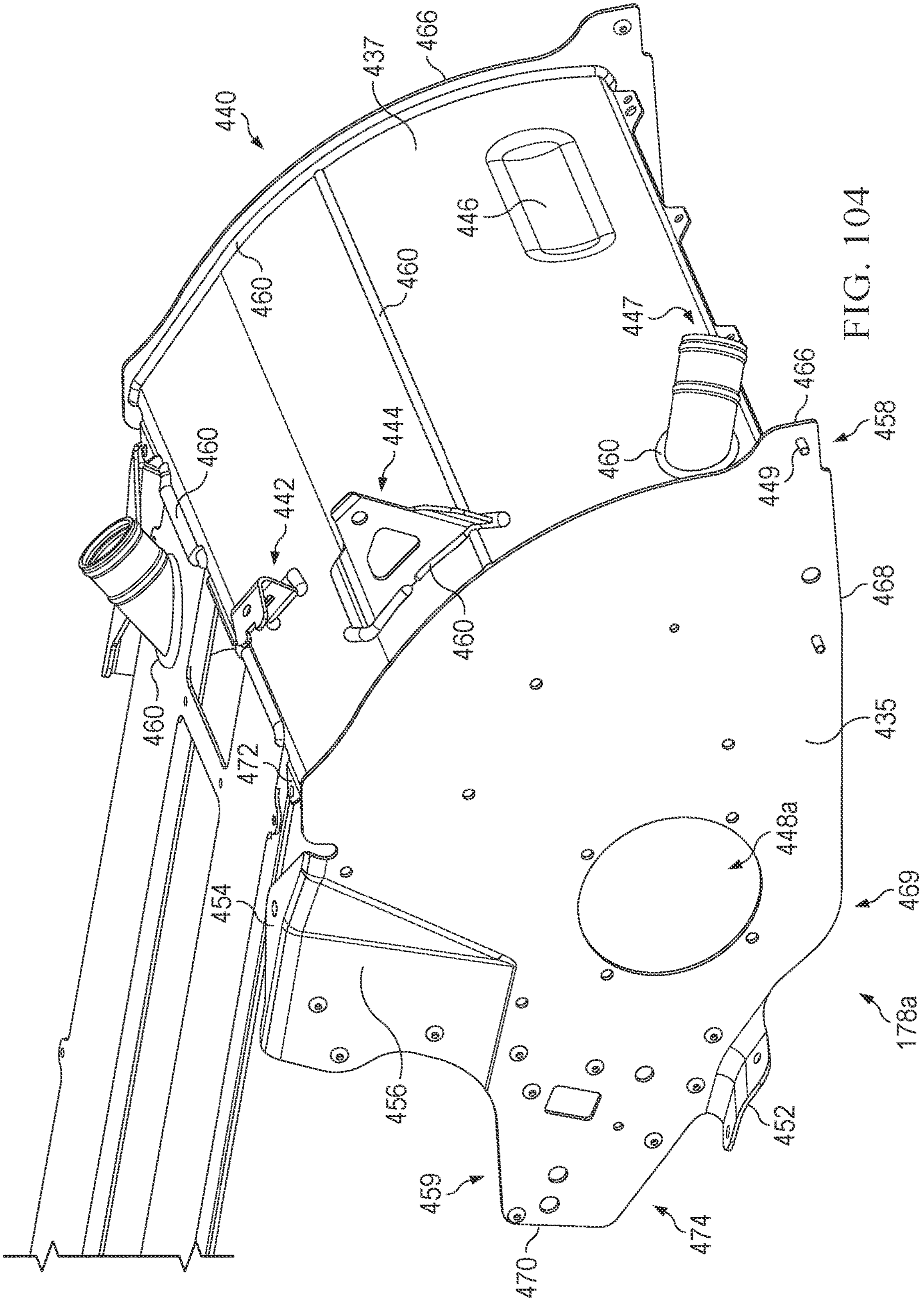

FIG. 104 illustrates a perspective view of the first side of the heat exchanger assembly, according to some embodiments.

Figure 105:
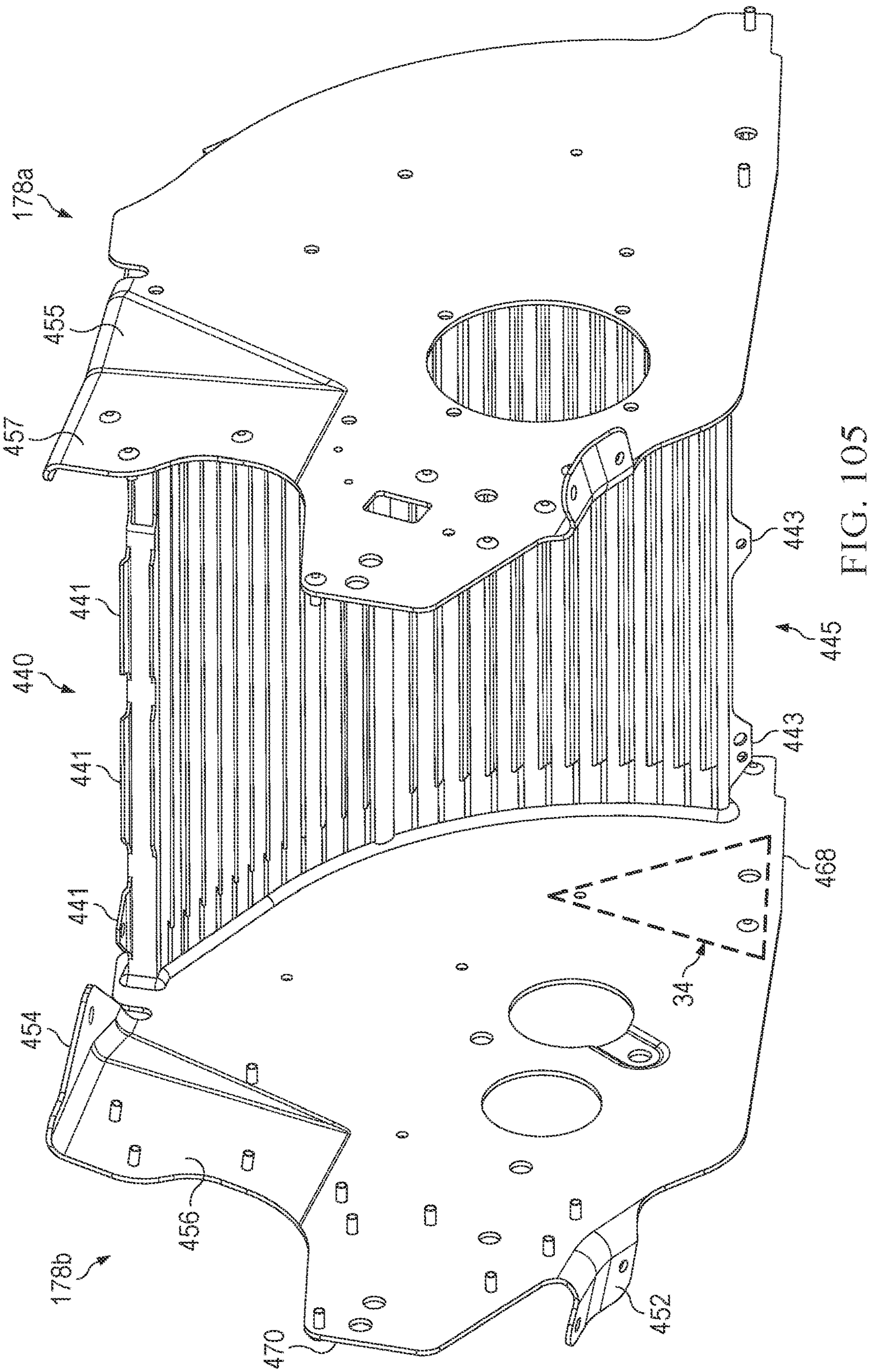

FIG. 105 is a rearward side view of part of the heat exchanger assembly, according to some embodiments.

Figure 106:
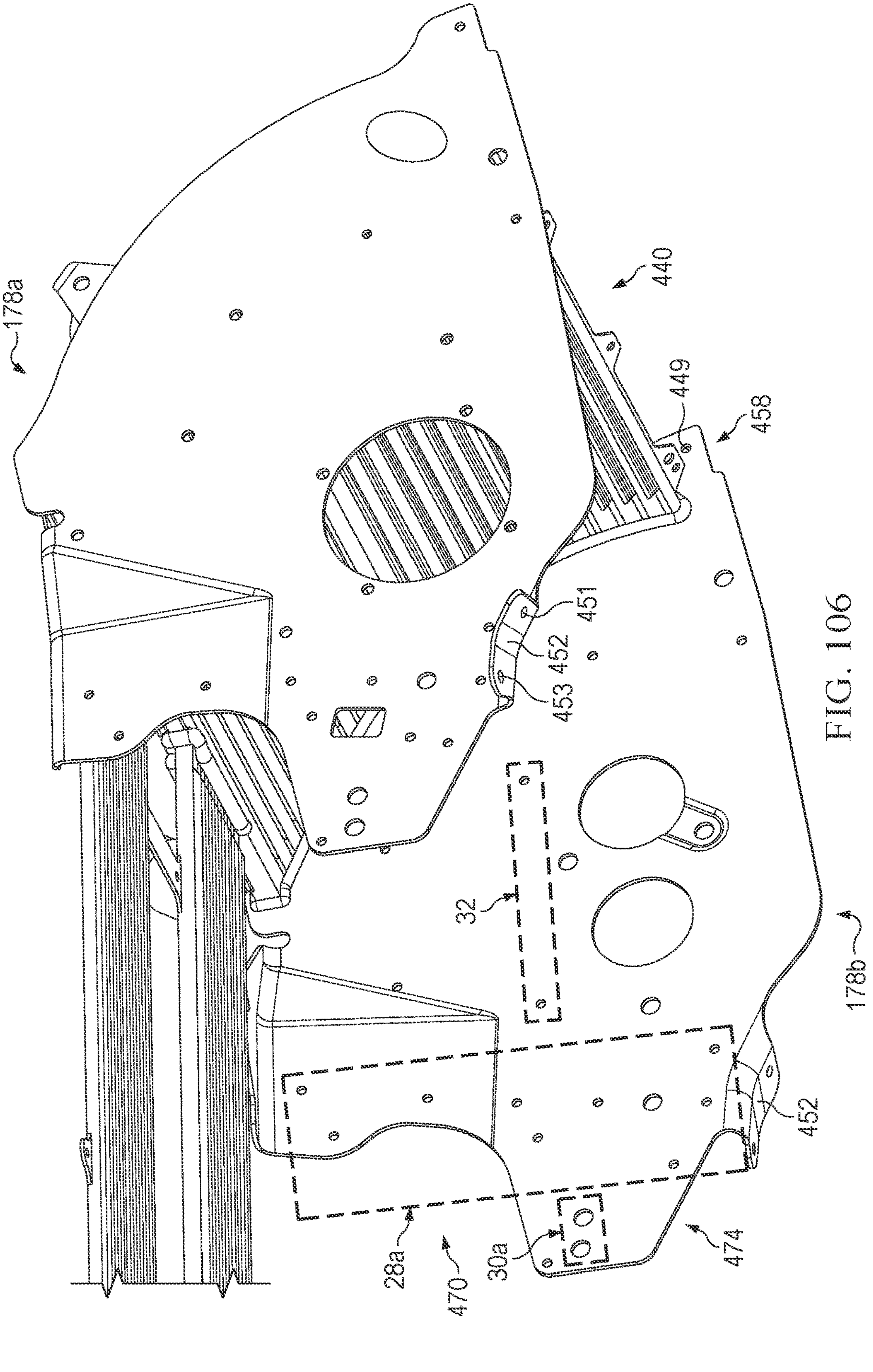

FIG. 106 illustrates a rearward side view of the heat exchanger assembly of FIG. 104, according to some embodiments.

Figure 107:
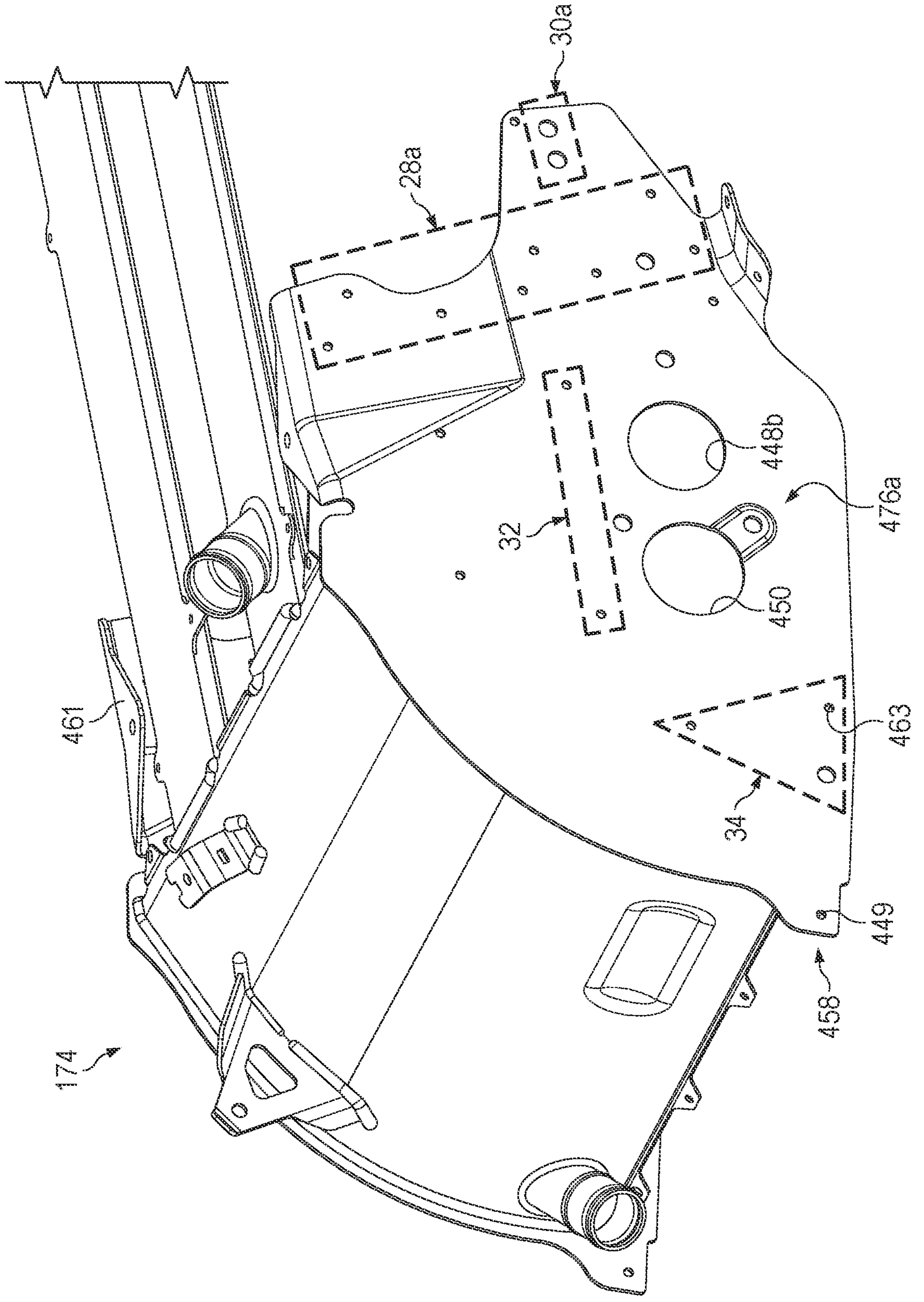

FIG. 107 illustrates a perspective view of the second side of the heat exchanger assembly of FIG. 104, according to some embodiments.

Figure 108:
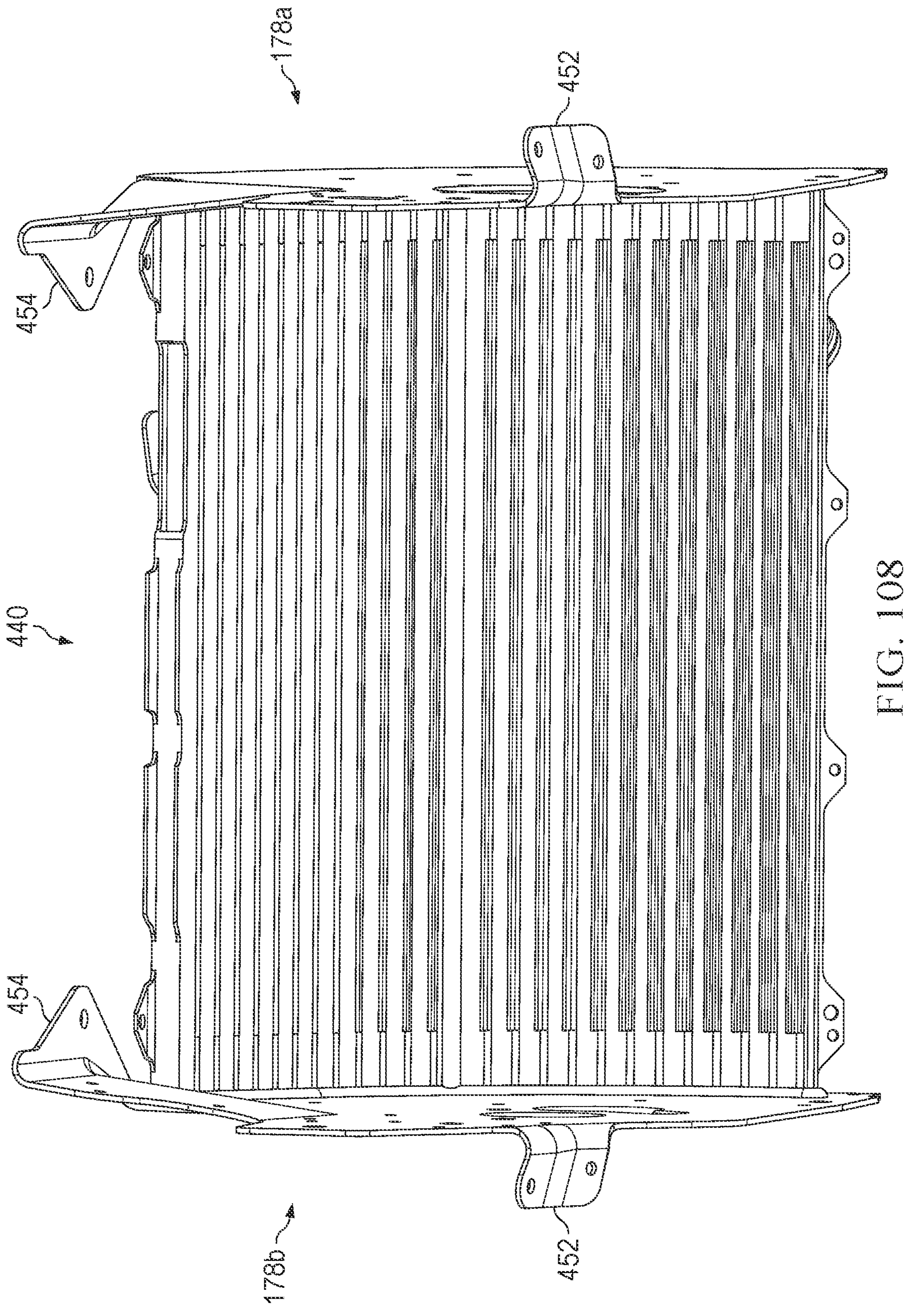

FIG. 108 is a rear view of the part of the heat exchanger assembly of FIG. 105, according to some embodiments.

Figure 109:
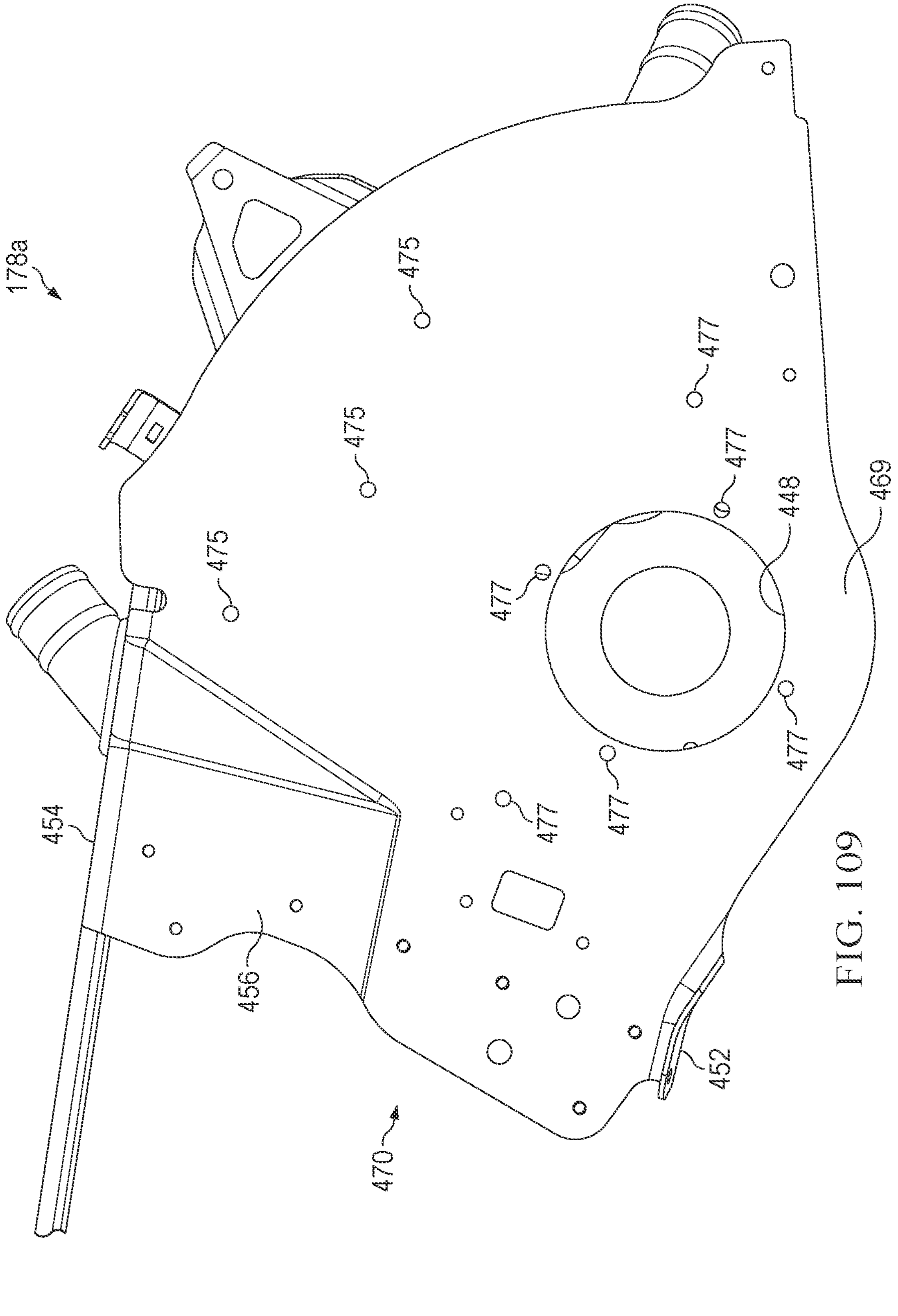

FIG. 109 is a side view of the first side of the heat exchanger assembly of FIG. 104, according to some embodiments.

Figure 110:
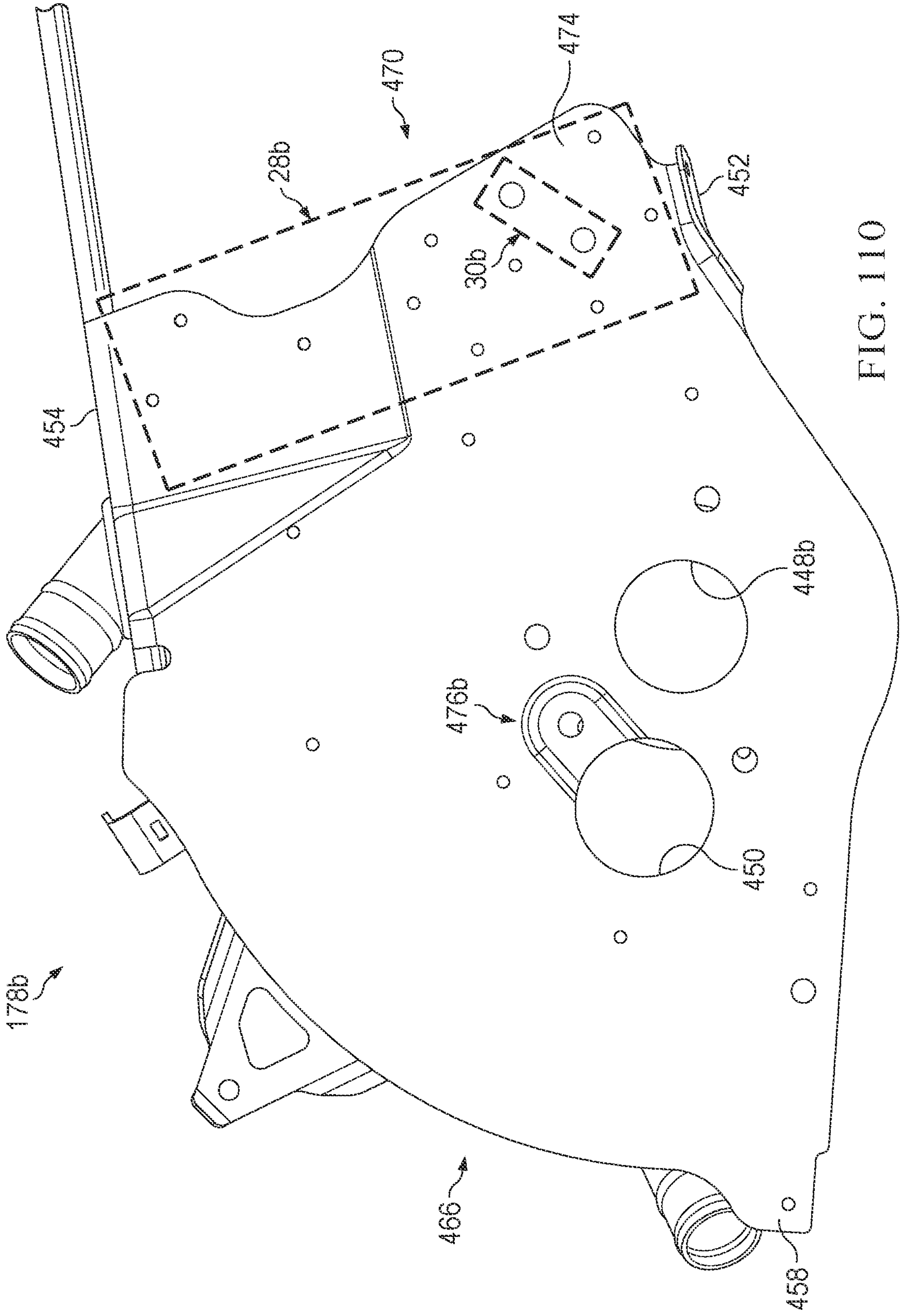

FIG. 110 is a side view of the second side of the heat exchanger assembly of FIG. 104, according to some embodiments.

Figure 111:
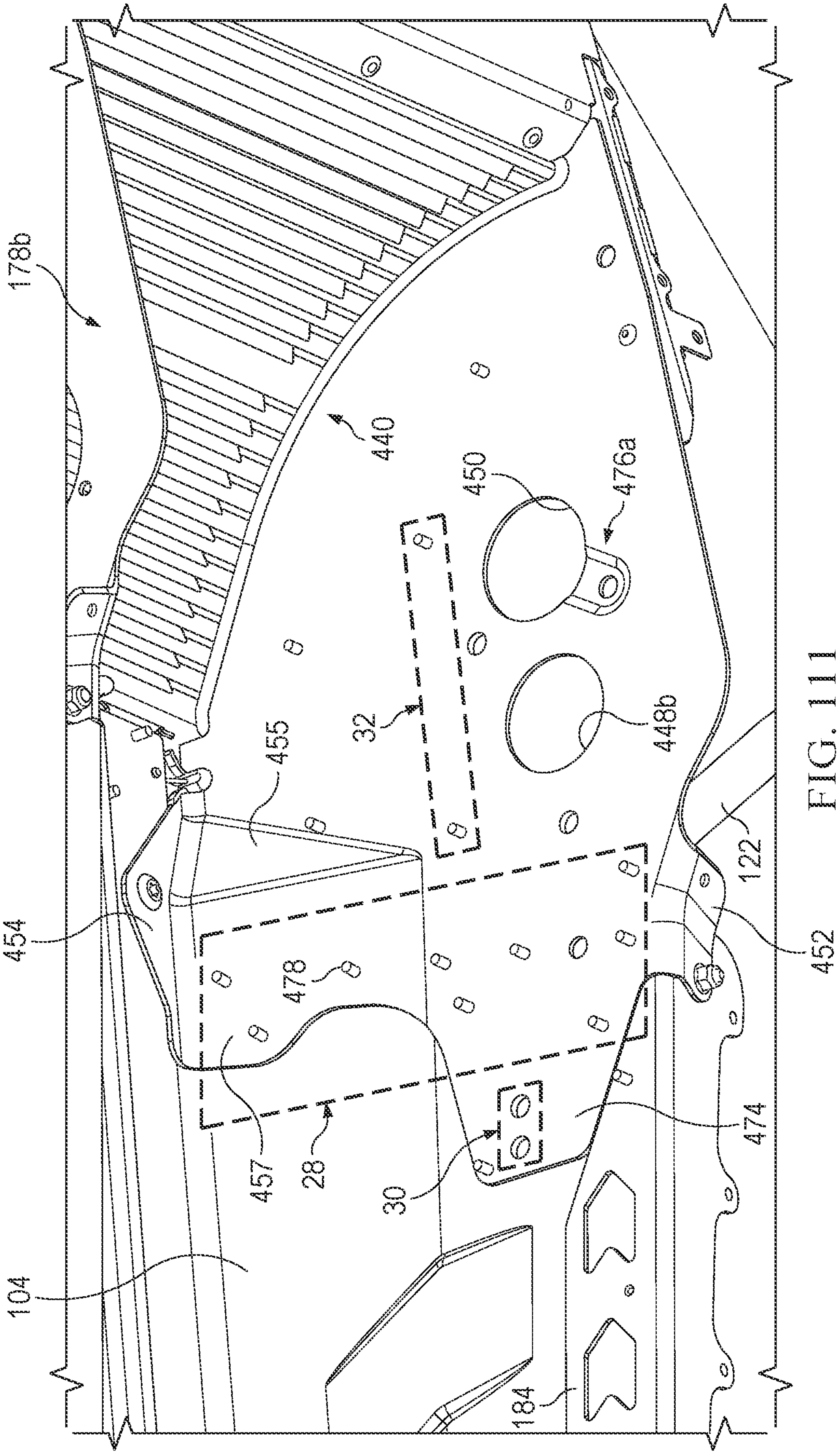

FIG. 111 illustrates an inboard surface of the heat exchanger end cap of the second side of the heat exchanger assembly with the heat exchanger end cap joined to the body and the tunnel, according to some embodiments.

Figure 112:
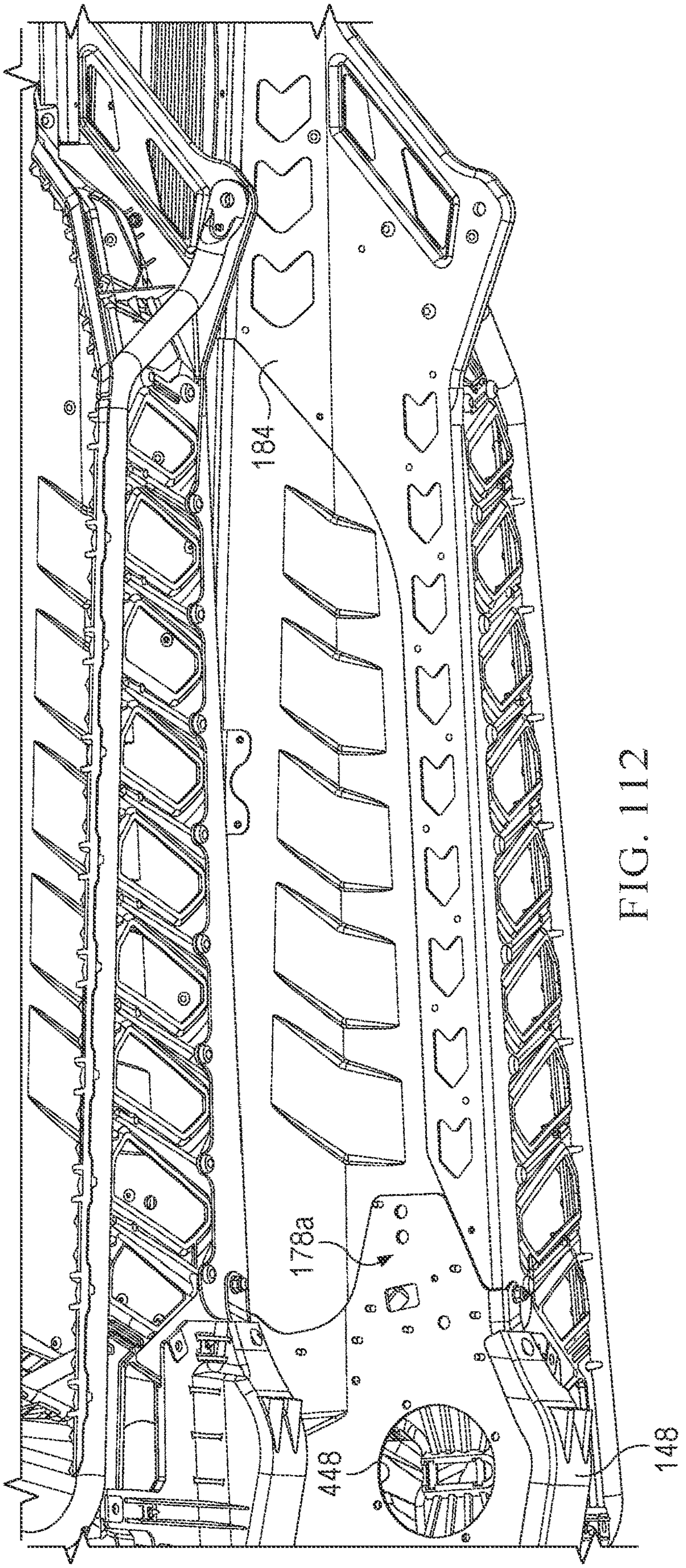

FIG. 112 illustrates an inboard surface of the heat exchanger end cap of the first side of the heat exchanger assembly with the heat exchanger end cap secured to the tunnel and a support, according to some embodiments.

Figure 113:
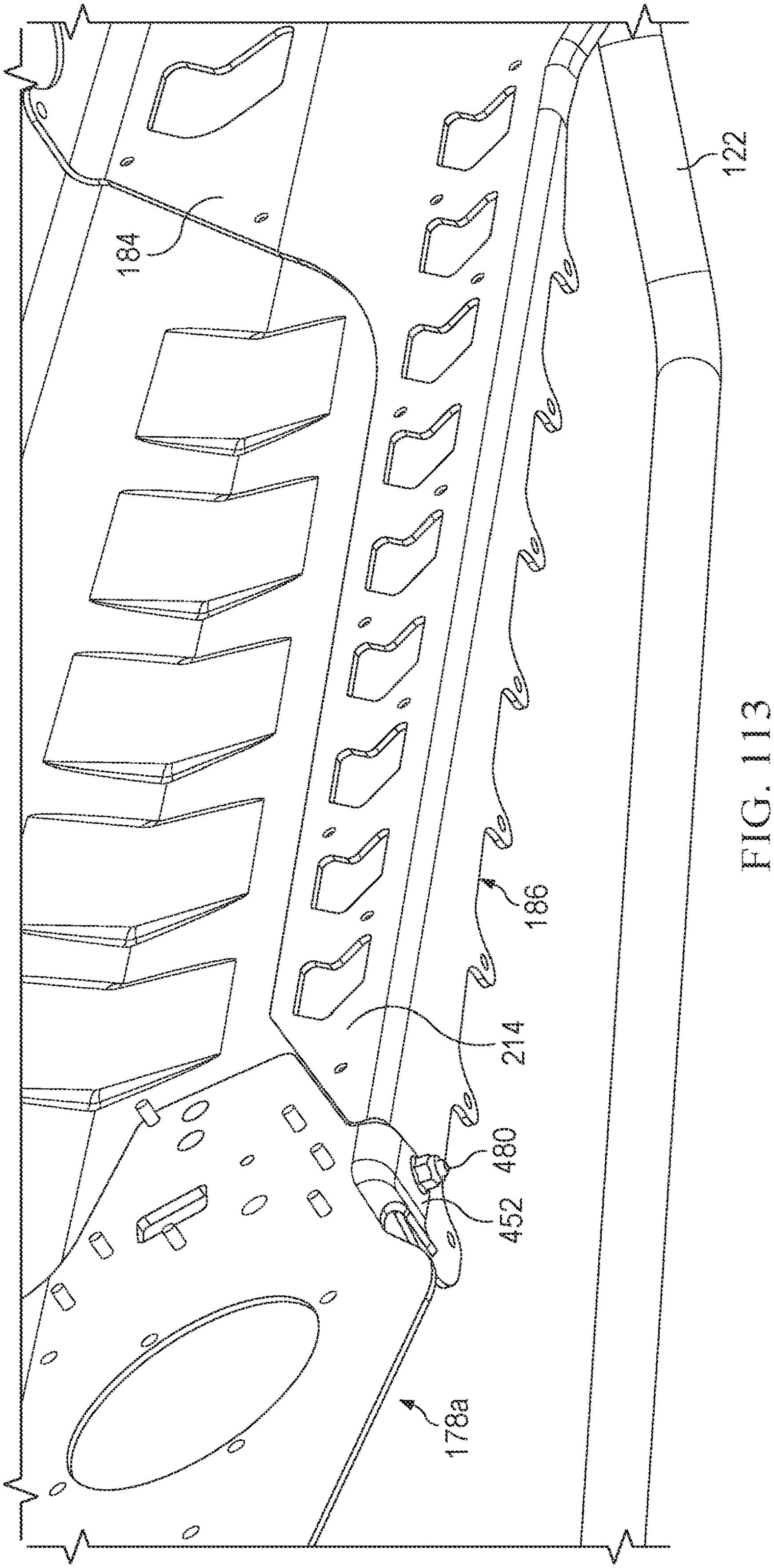

FIG. 113 illustrates another view of the inboard surface of the heat exchanger end cap of the first side of the heat exchanger assembly with the heat exchanger end cap secured to the tunnel and the support, according to some embodiments.

Figure 114:
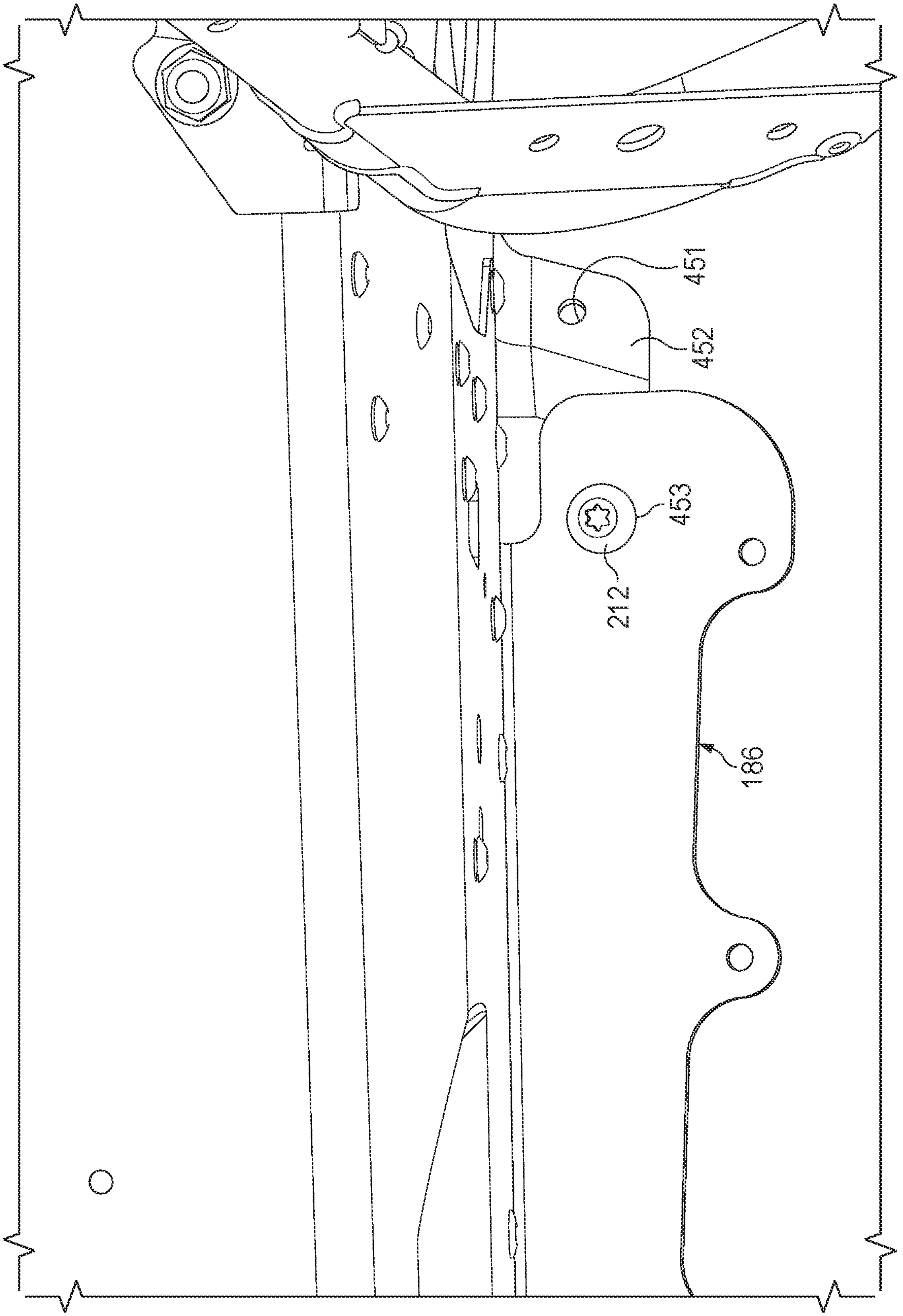

FIG. 114 illustrates an overhead view of the support secured to the heat exchanger end cap of the first side of the heat exchanger assembly, according to some embodiments.

Figure 115:
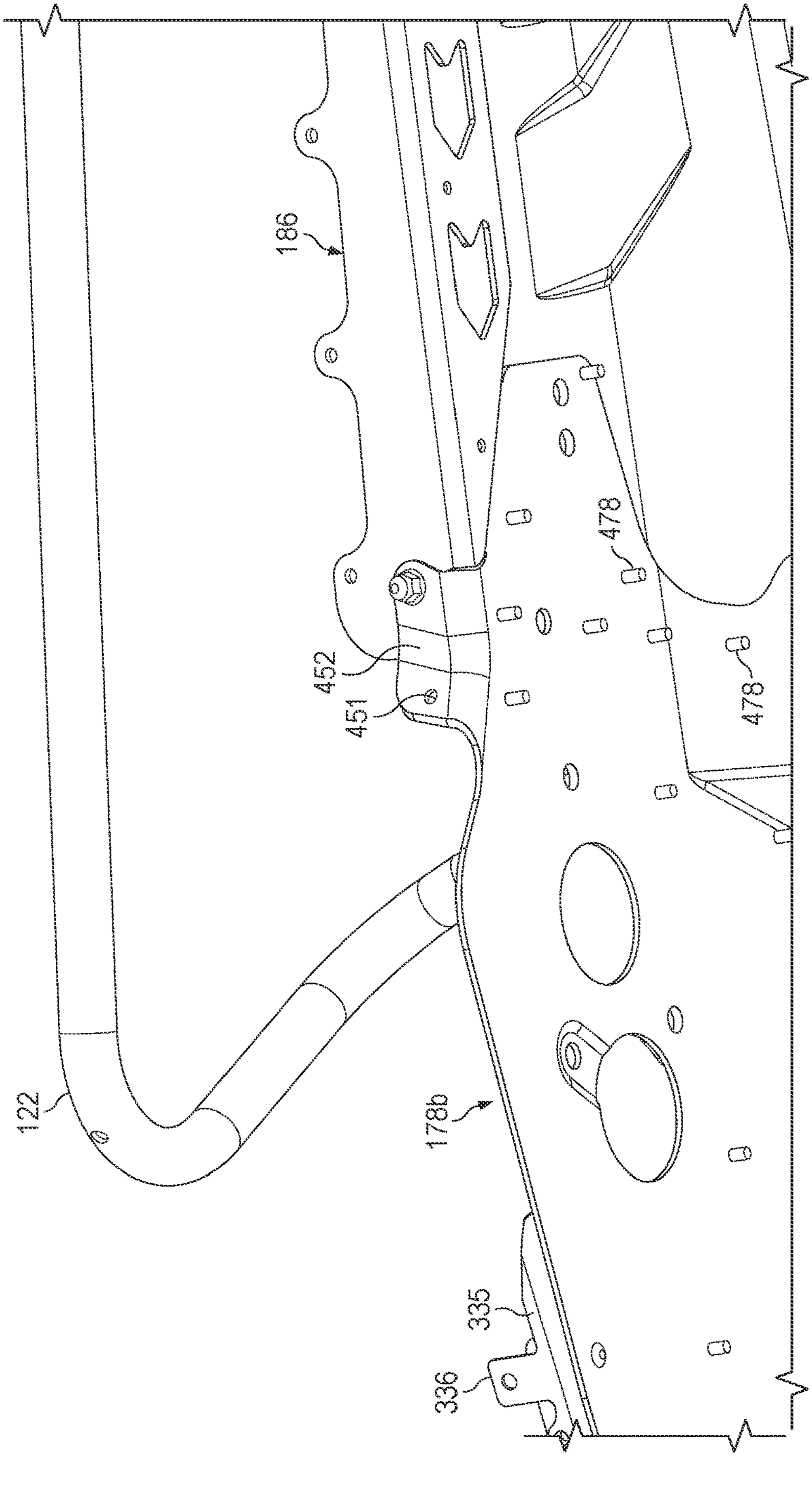

FIG. 115 illustrates a bottom view of the inboard surface of the heat exchanger end cap of the second side of the heat exchanger assembly with the heat exchanger end cap secured to the tunnel and the support, according to some embodiments.

Figure 116:
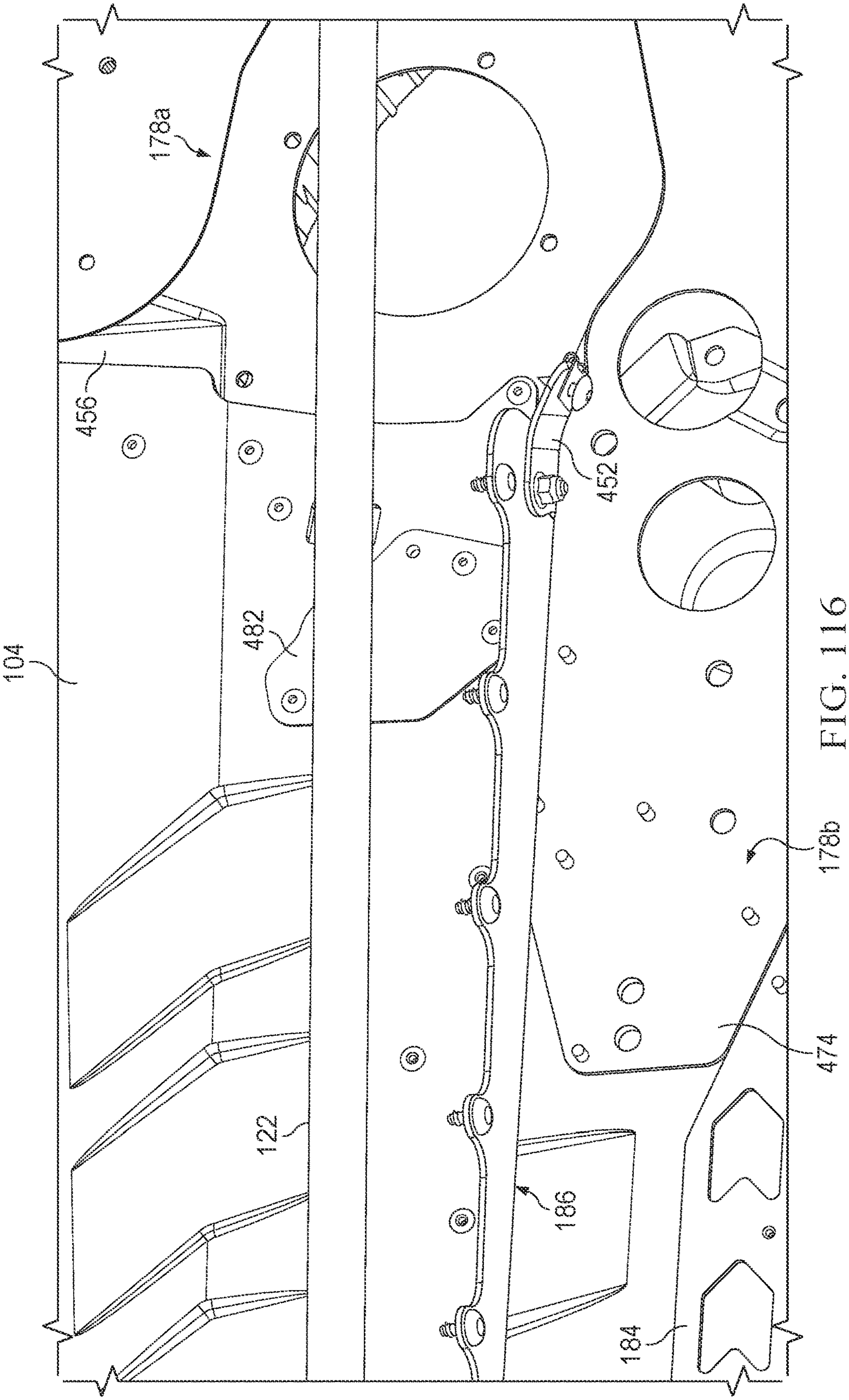

FIG. 116 is a lower side view of the heat exchanger end caps secured to the tunnel, according to some embodiments.

Figure 117:
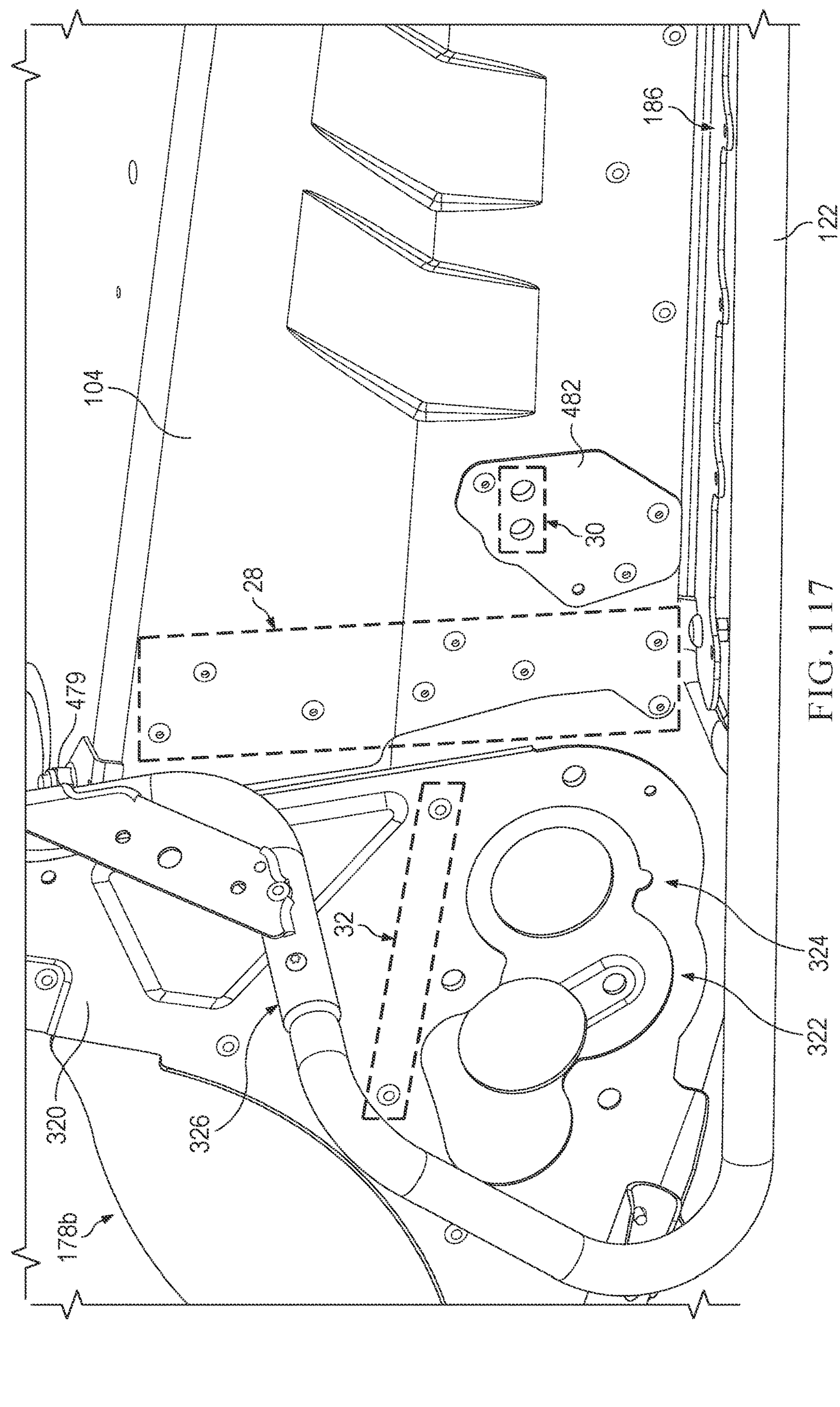

FIG. 117 is a perspective side view of the heat exchanger end cap of the second side of the heat exchanger assembly secured to the forward frame, the support, and the tunnel, according to some embodiments.

Figure 118:
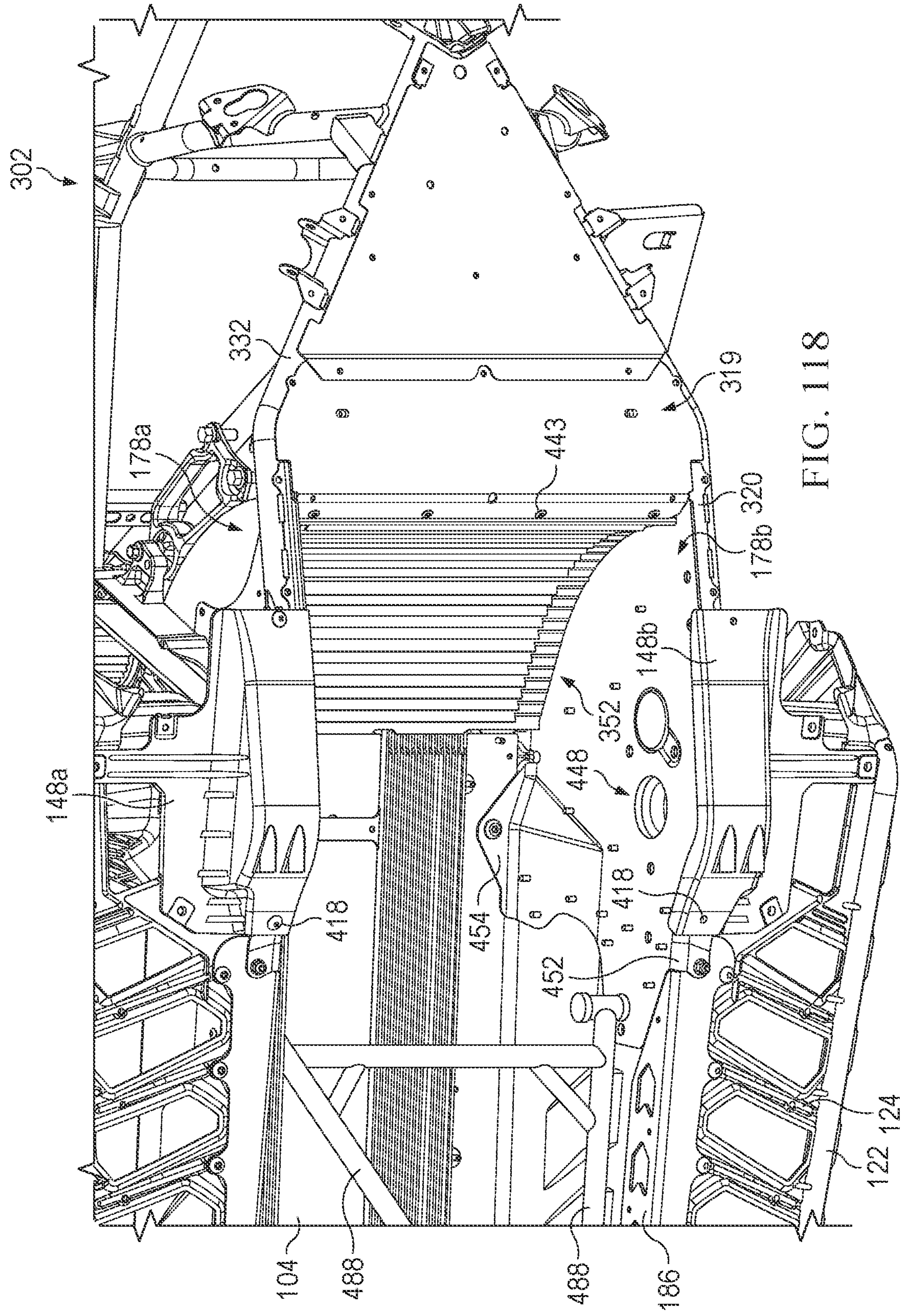

FIG. 118 is a lower view of the inside surface of the heat exchanger end cap of the second side of the heat exchanger assembly secured to the forward frame, the tunnel, the support, a suspension component, and a bottom-out protector, according to some embodiments.

Figure 119:
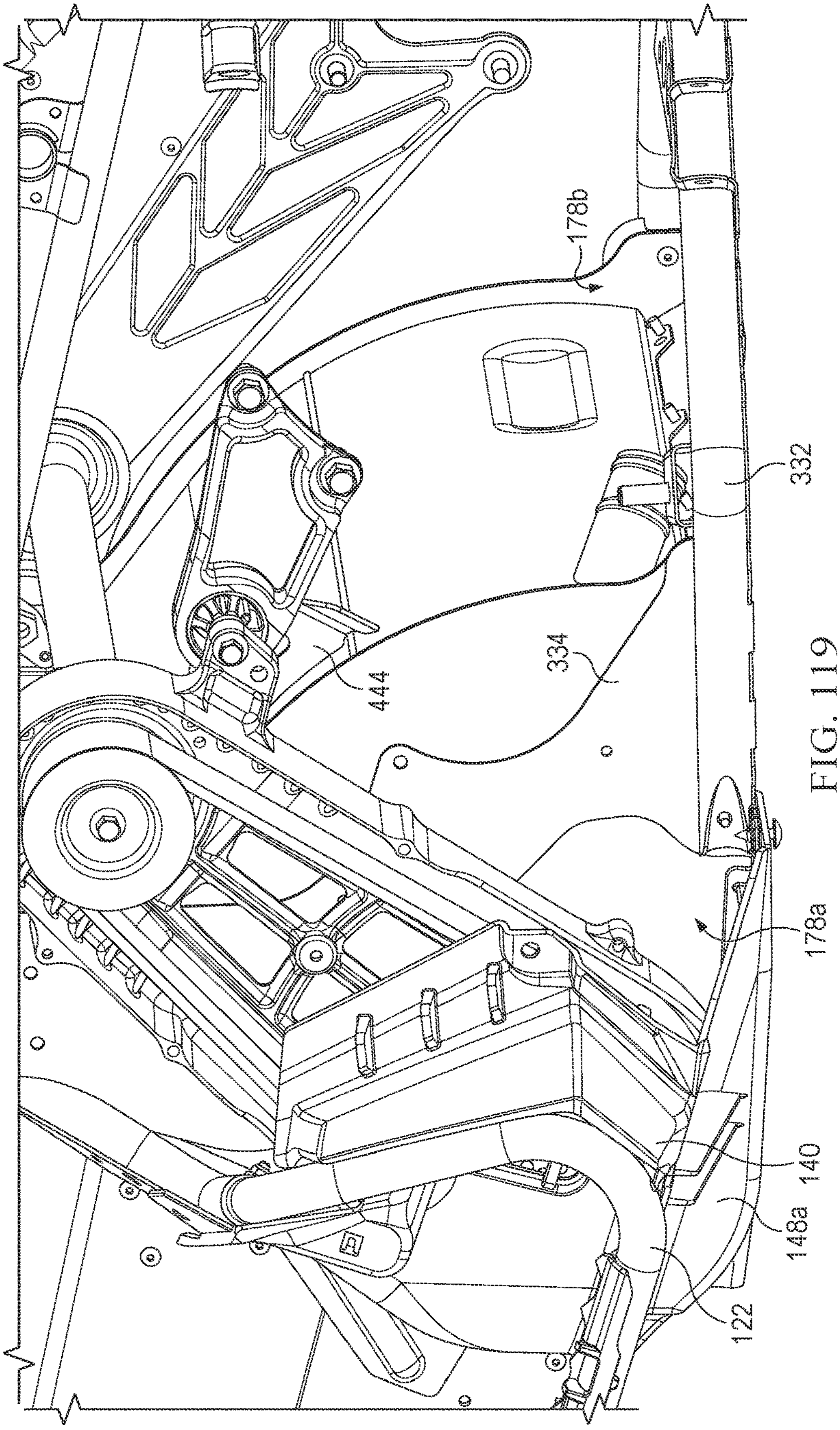

FIG. 119 is a perspective side view of the heat exchanger end cap of the first side of the heat exchanger assembly secured to the forward frame, the tunnel, a belt case housing, and a bottom-out protector, according to some embodiments.

Figure 120:
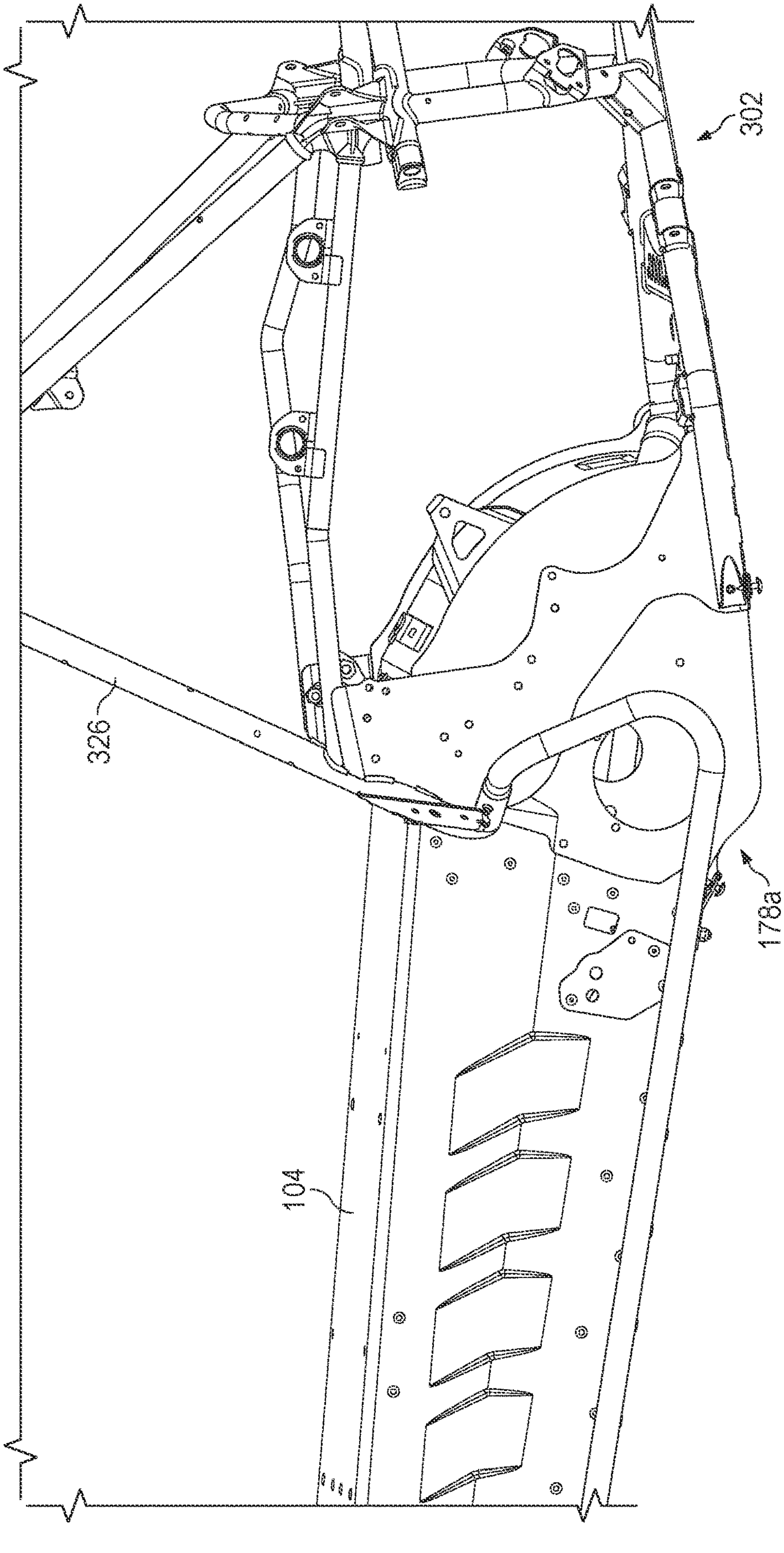

FIG. 120 is a side view of the heat exchanger end cap of the first side of the heat exchanger assembly secured to the forward frame and the tunnel, according to some embodiments.

Figure 121:
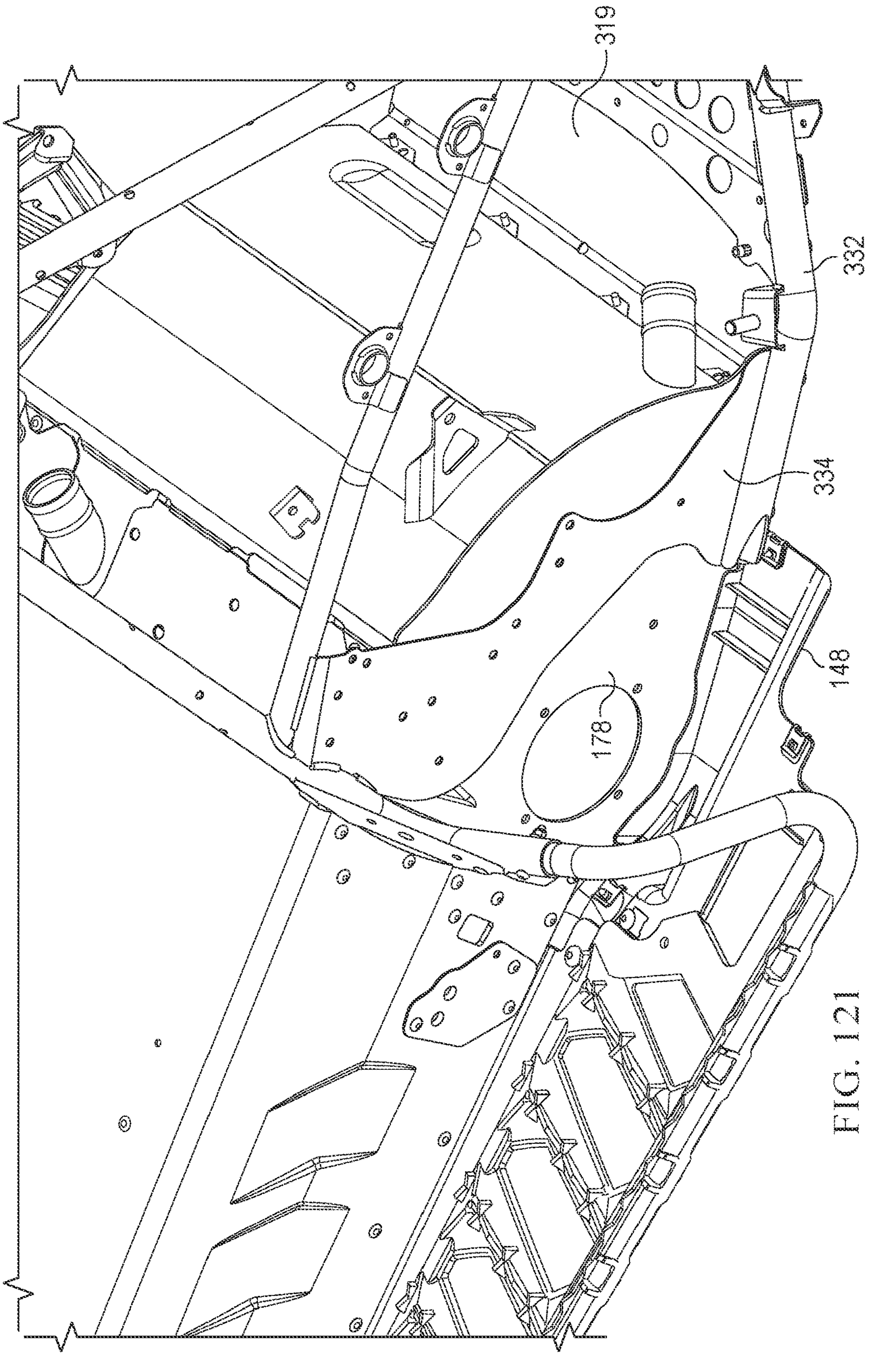

FIG. 121 is an upper side view of the heat exchanger end cap of FIG. 120 with a bottom portion of the heat exchanger end cap received within a portion of a bottom-out protector, according to some embodiments.

Figure 122:
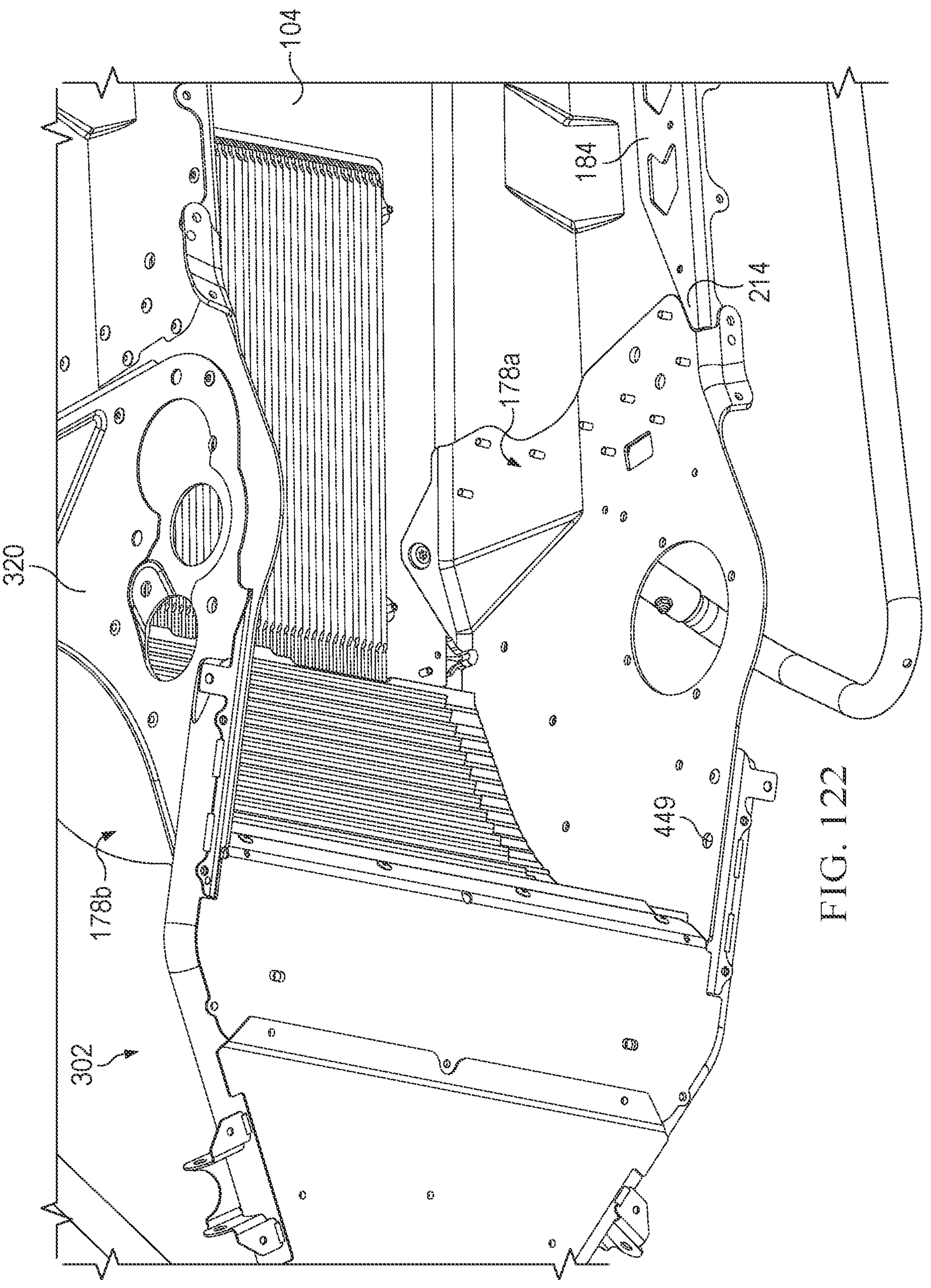

FIG. 122 is a lower view of the inside surface of the heat exchanger end cap of the first side of the heat exchanger assembly secured to the forward frame, the tunnel, and the foot support member, according to some embodiments.

Figure 123:
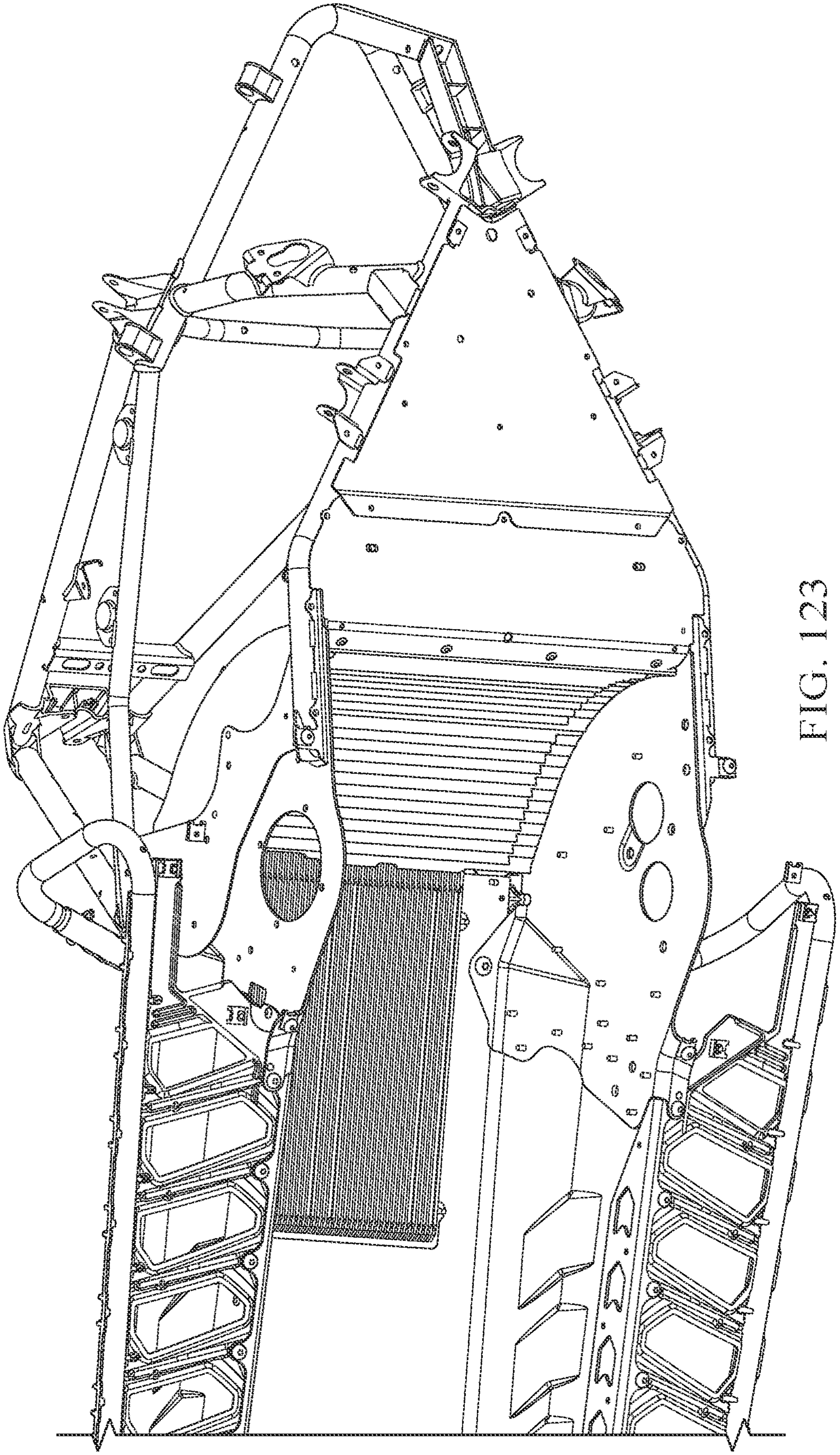

FIG. 123 is a lower view of the inside surface of the heat exchanger end cap of the second side of the heat exchanger assembly secured to the forward frame, the tunnel, and the support, according to some embodiments.

Figure 124:
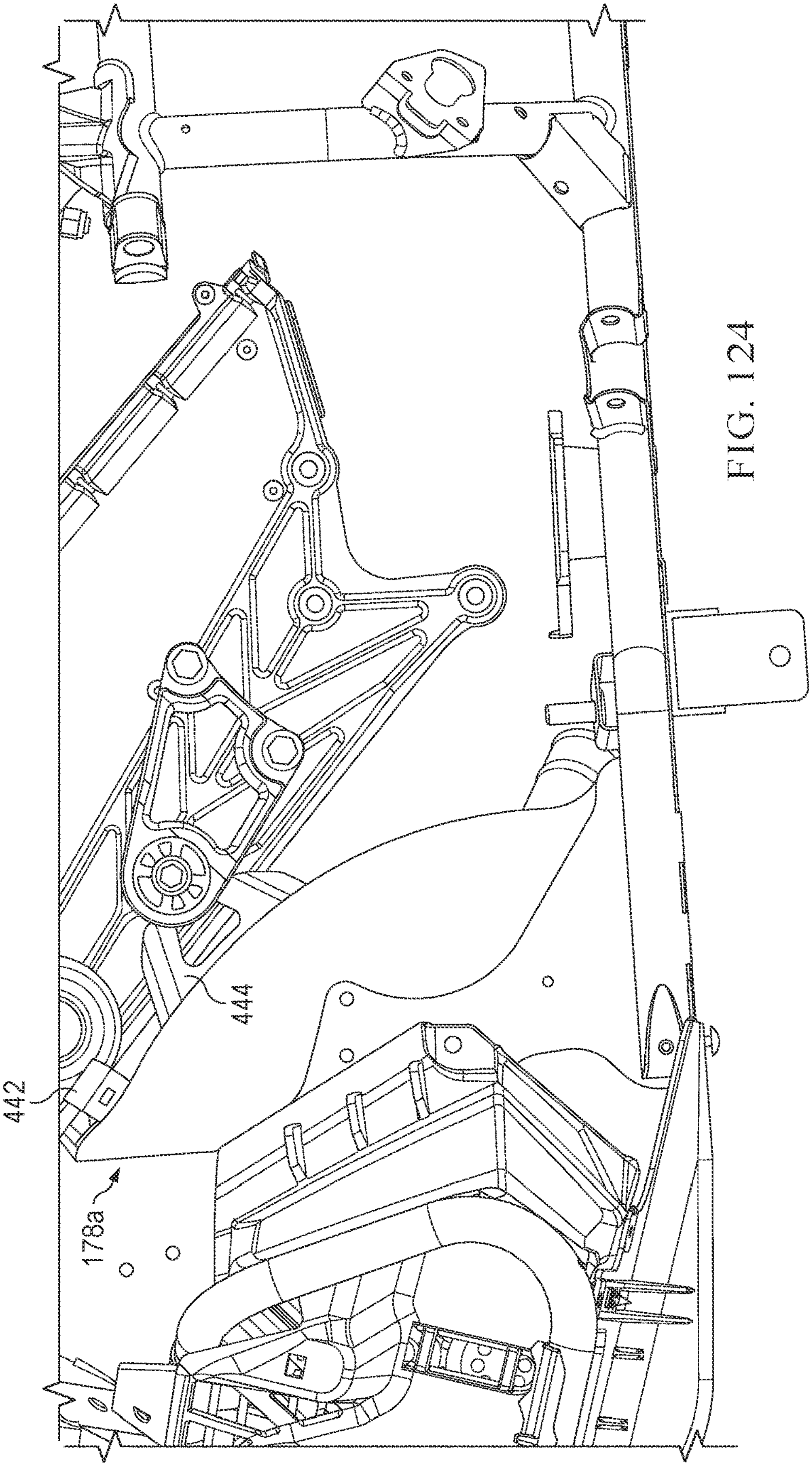

FIG. 124 is a side view of the first side of the heat exchanger assembly with one or more engine mounts extending therefrom, according to some embodiments.

Figure 125:
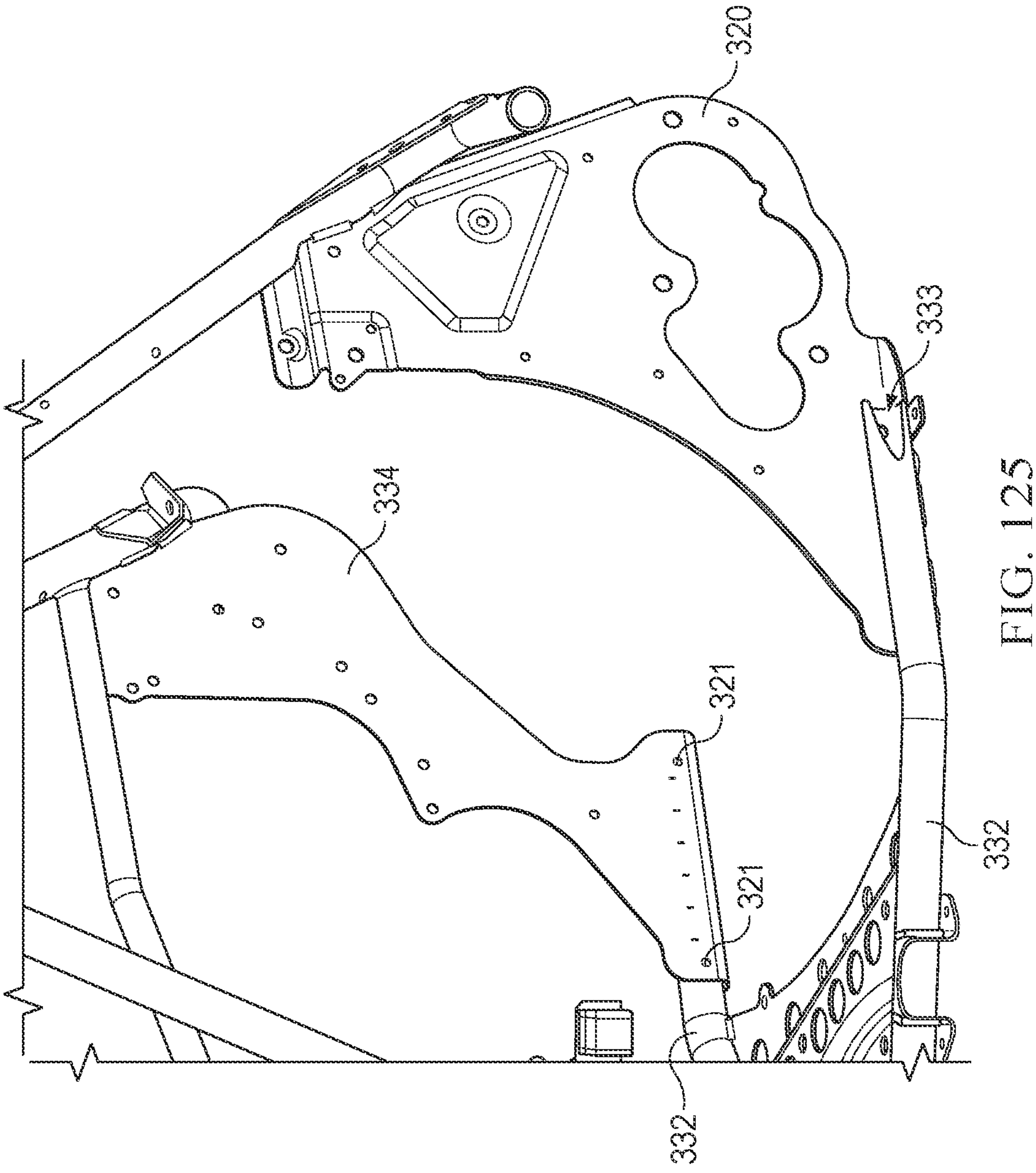

FIG. 125 is a partial view of the forward frame assembly, according to some embodiments.

Figure 126:
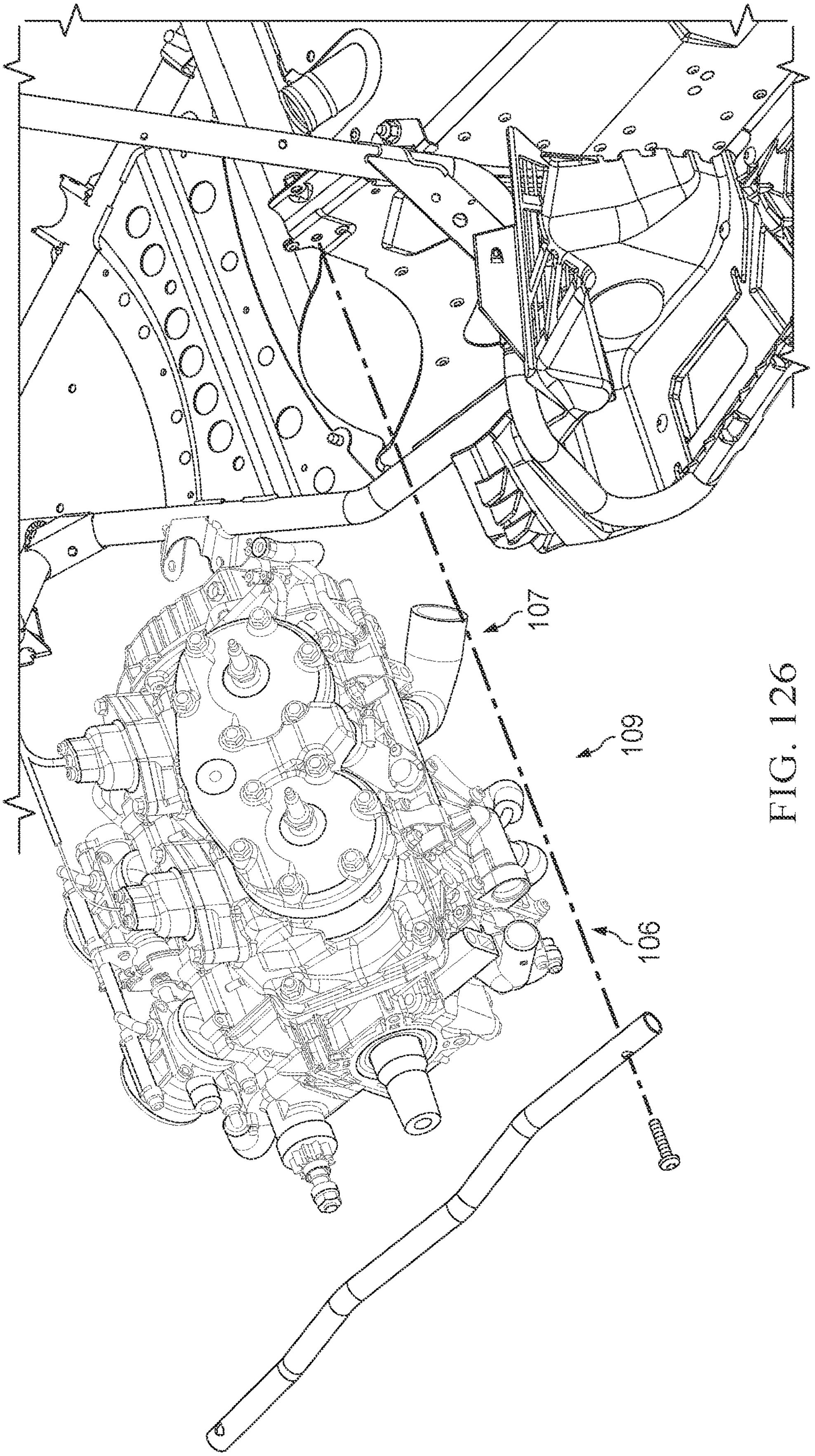

FIG. 126 illustrates an engine being inserted through an opening in the forward frame assembly to mount the engine thereon, according to some embodiments.

Figure 127:
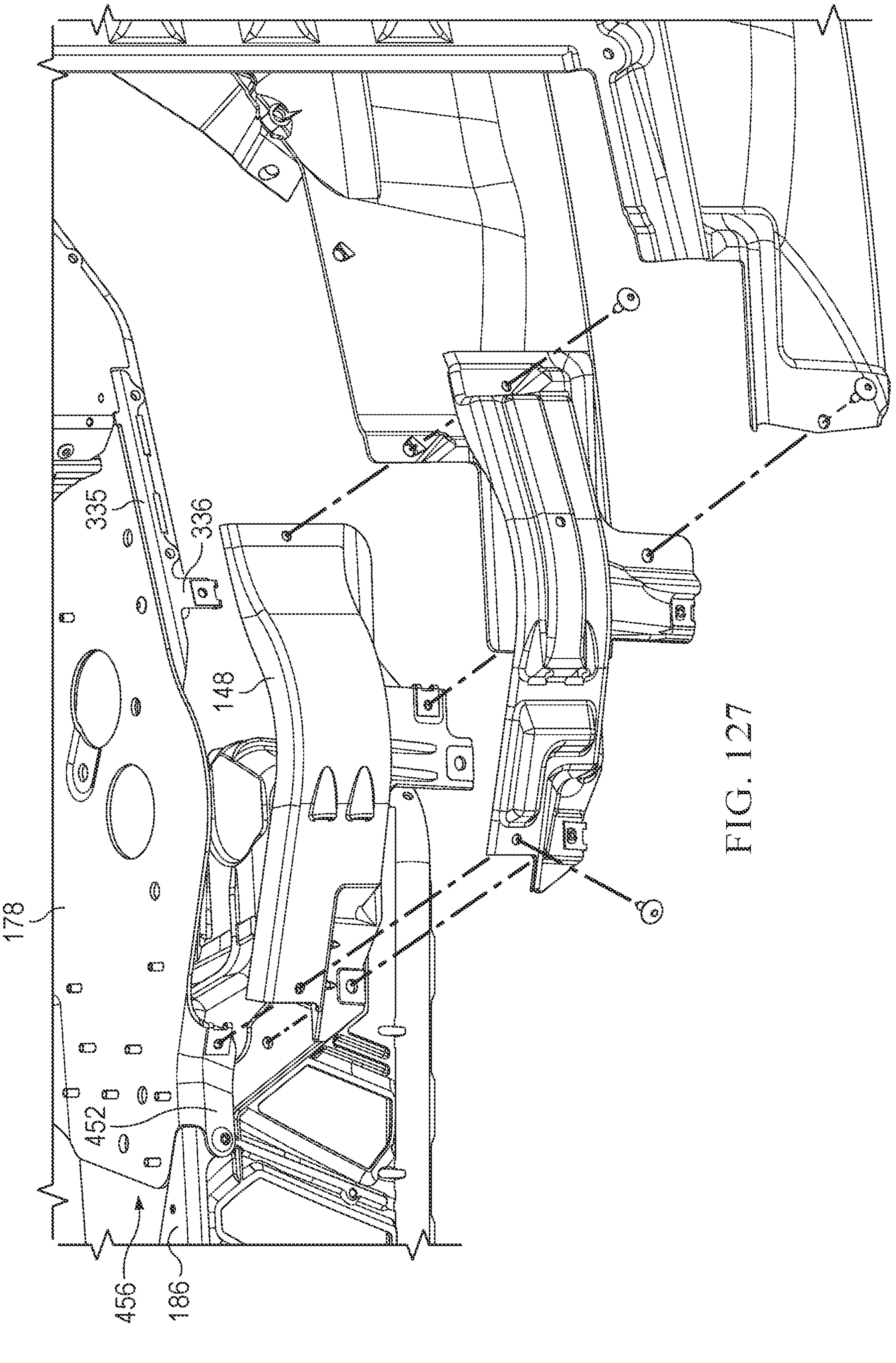

FIG. 127 illustrates is an underside view of a heat exchanger end cap secured to the forward frame, the tunnel, and the support member, according to some embodiments.

Figure 128:
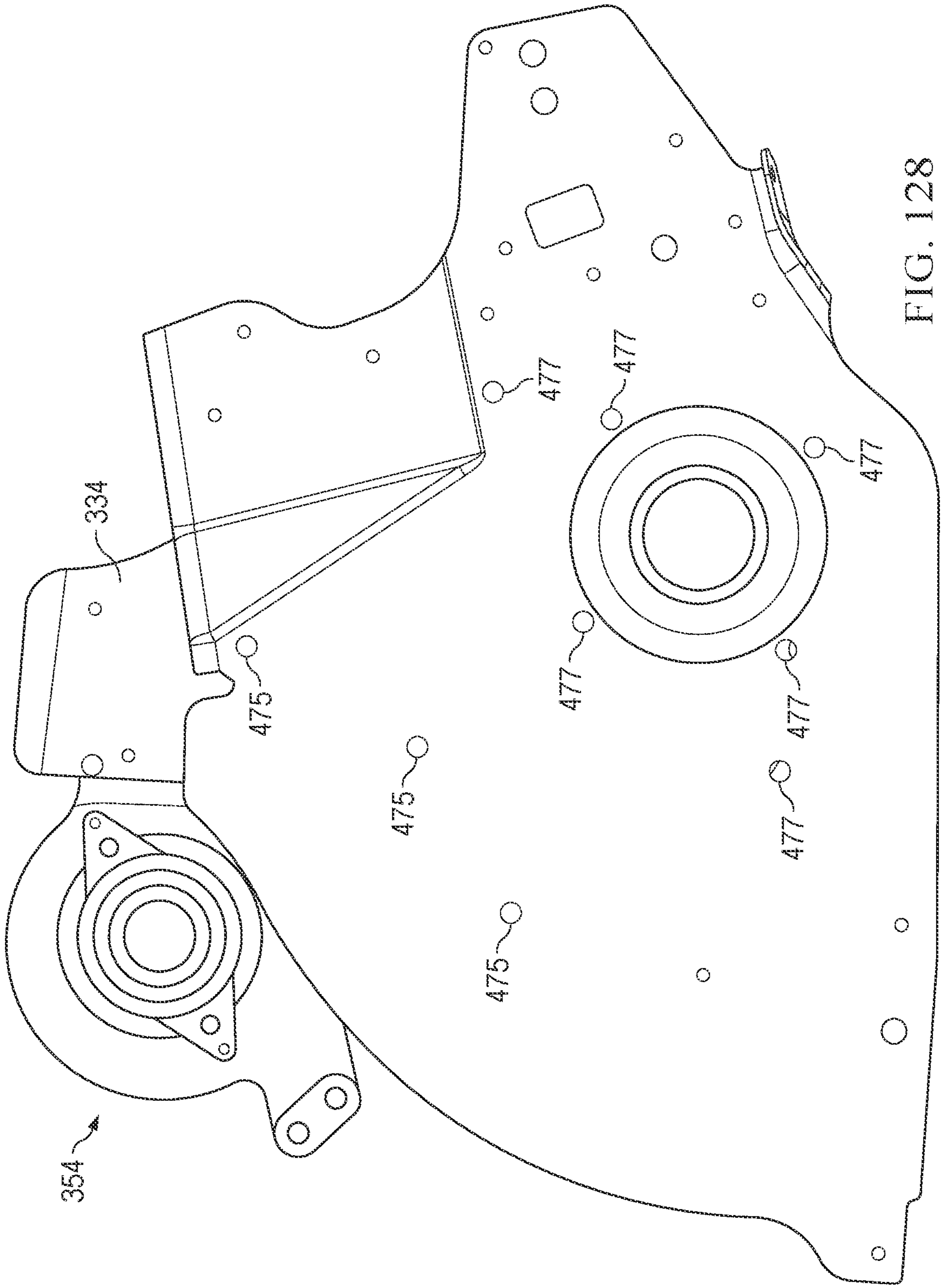

FIG. 128 illustrates a rear view of a heat exchanger end cap secured to a belt housing, according to some embodiments.

DETAILED DESCRIPTION

Embodiments of the present disclosure describe a composite running board that can be removably secured to a snowmobile 100. The snowmobile 100 is generally shown in FIGS. 1-10 and may include a chassis 102, a tunnel 104, a motor or engine 106 (hereinafter referred to as "the engine 106") attached to the chassis 102 and disposed within an engine bay 108, a drive track 110 disposed within the tunnel 104, and a drivetrain 112 configured to provide motive power from the engine 106 to the drive track 110. The snowmobile 100 further includes skis 114 operably connected to handlebars 116 that are used to turn the snowmobile 100 and a seat 118 for the snowmobile driver/passenger. The composite running board may be positioned along the sides of the snowmobile 100. Embodiments also include a toe stop assembly.

Figure 8:
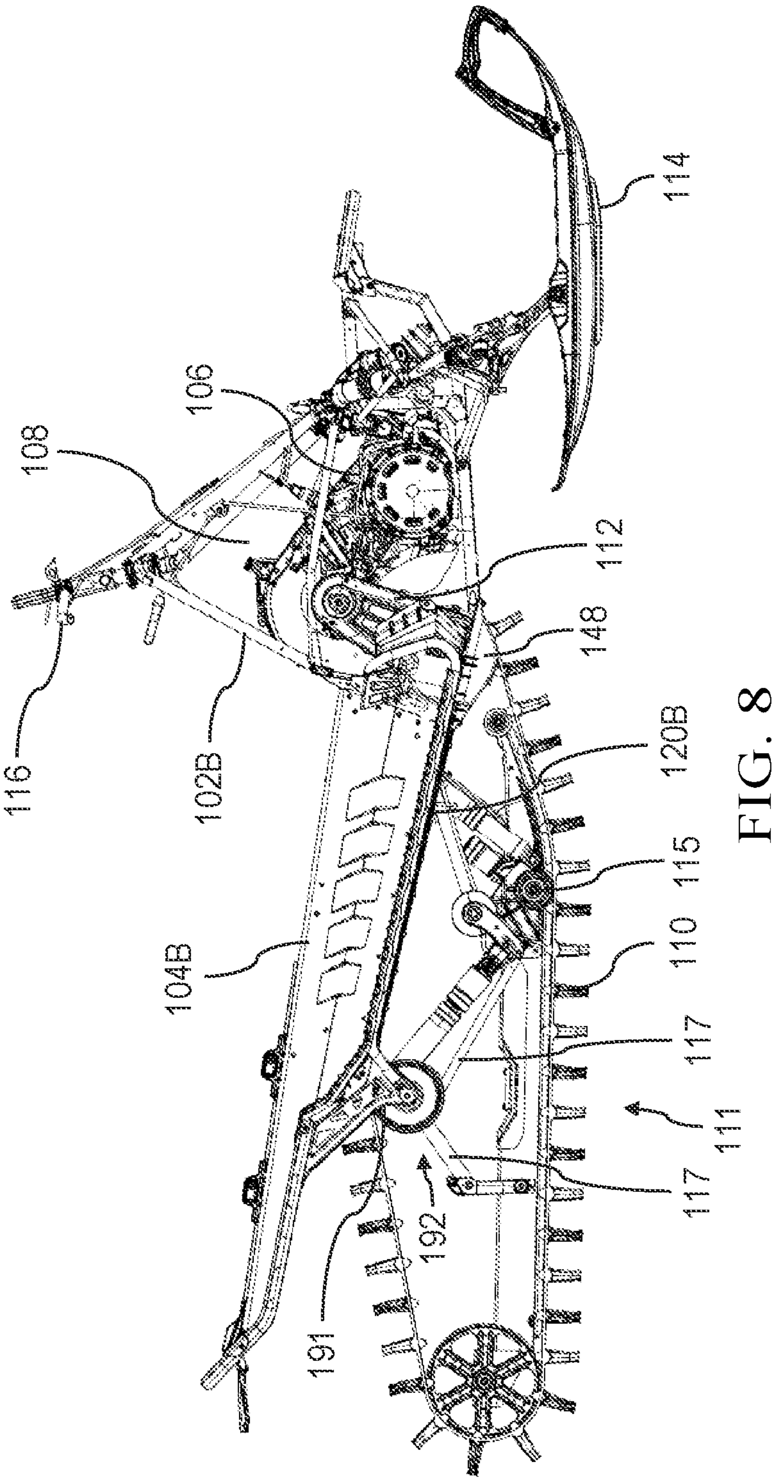
FIG. 8 illustrates a right side view of a snowmobile with portions of the engine cover removed, according to some embodiments.
Figure 9:
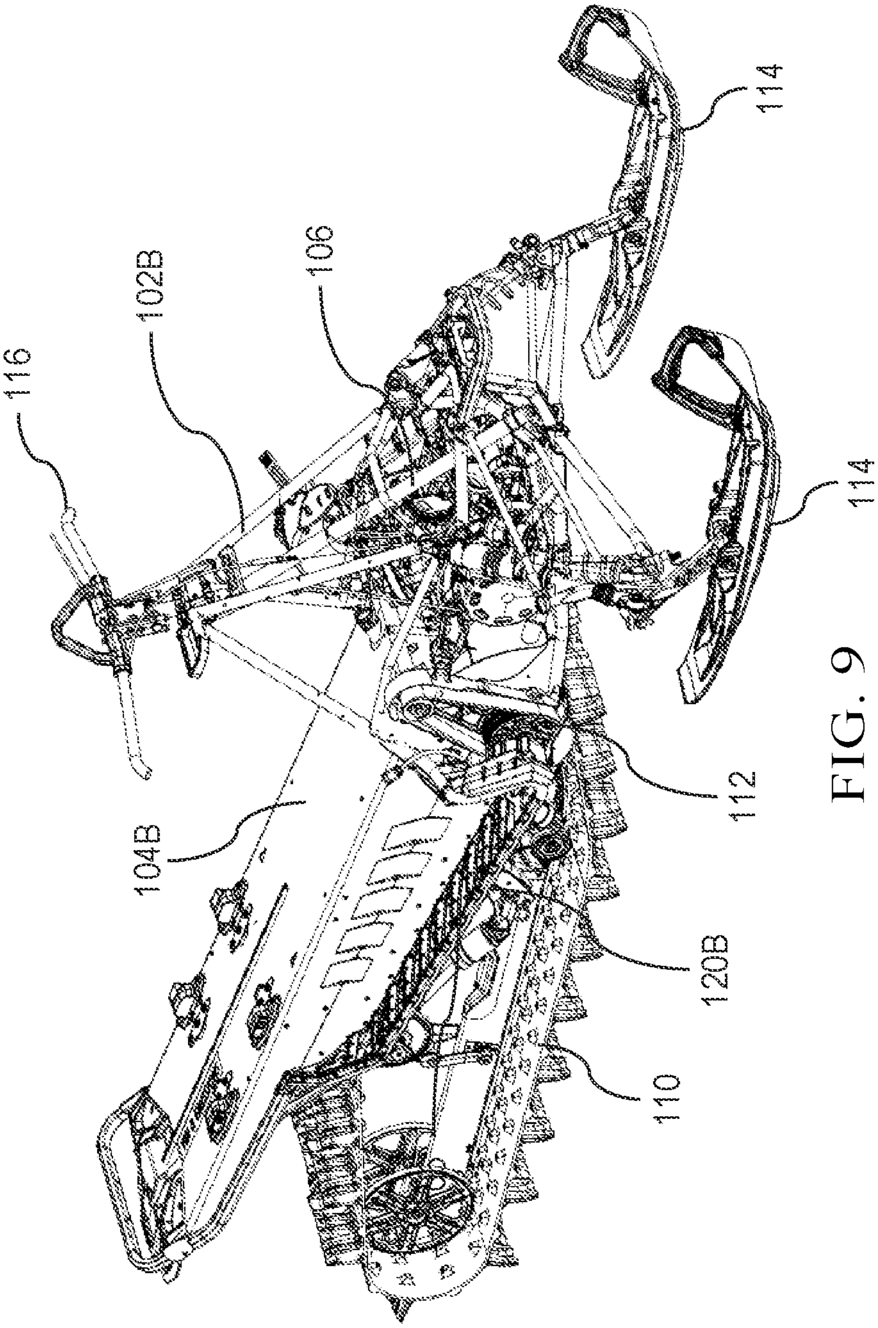
FIG. 9 illustrates a right side perspective view of a snowmobile with portions of the engine cover removed, according to some embodiments.
Figure 11:
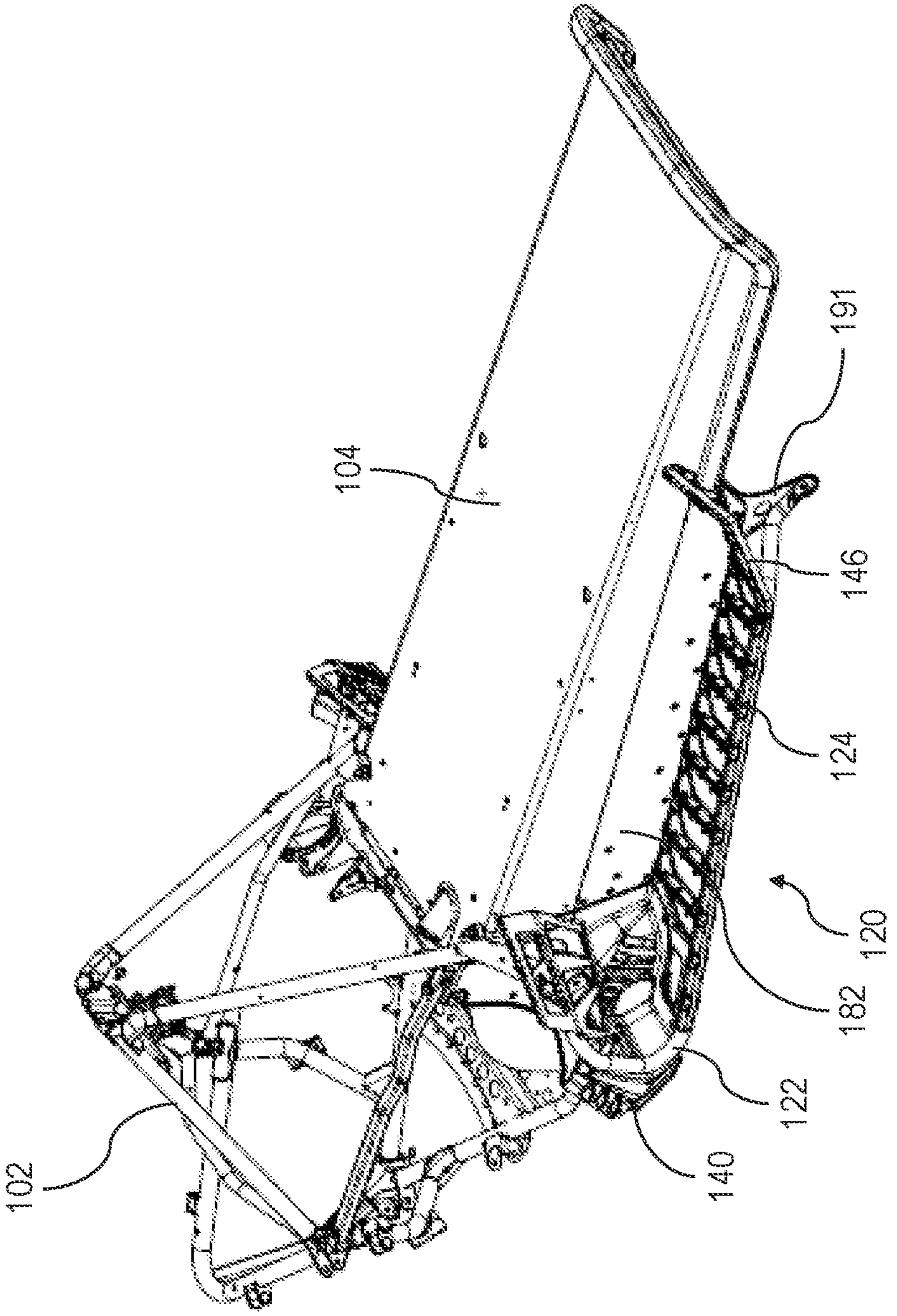
FIG. 11 illustrates a perspective top view of the snowmobile chassis having the running board assembly attached to the tunnel, according to some embodiments.
Figure 28:
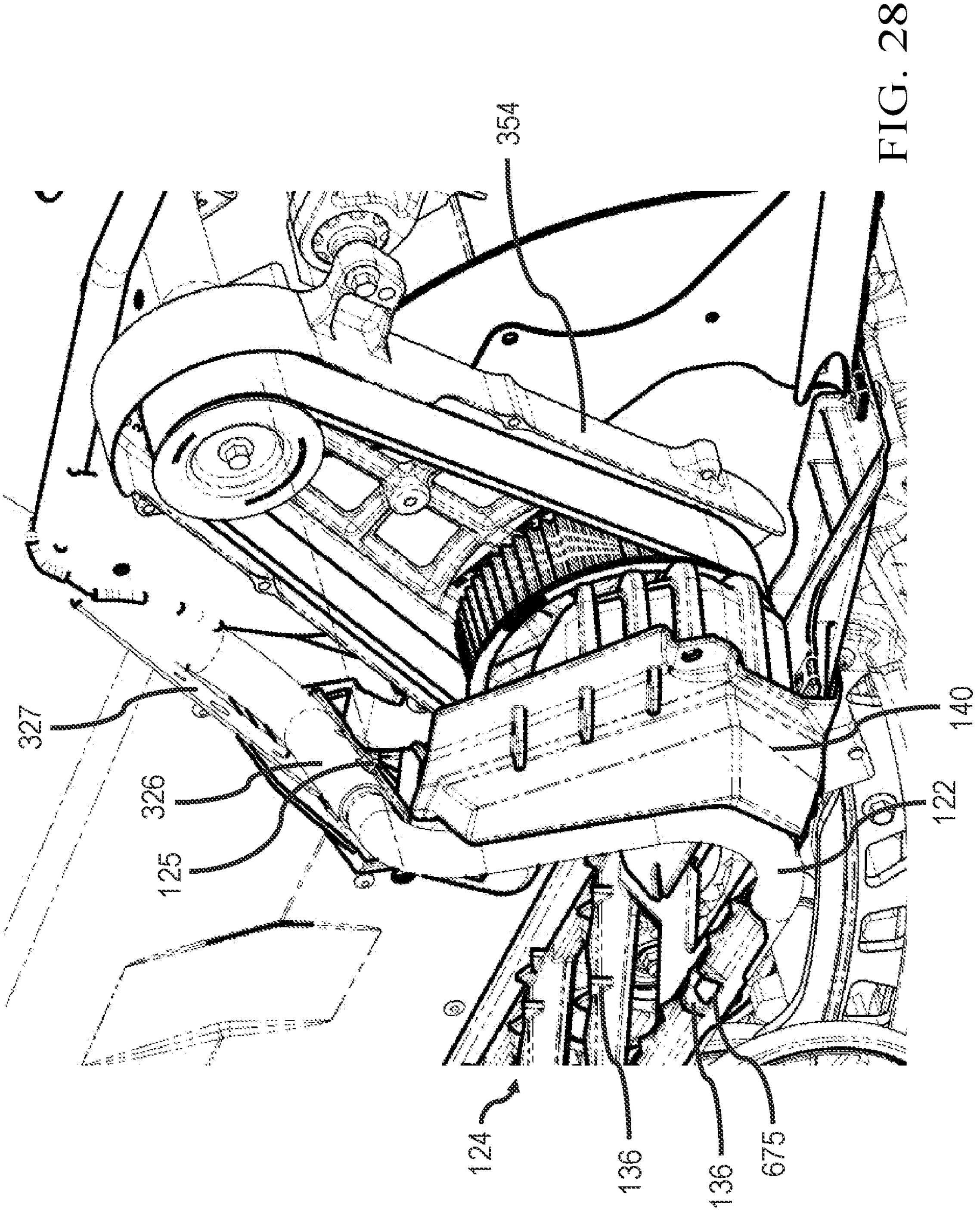
FIG. 28 illustrates a front perspective view of the front toe stop, the foot support member, and the support member of the running board assembly, according to some embodiments.
Figure 29:
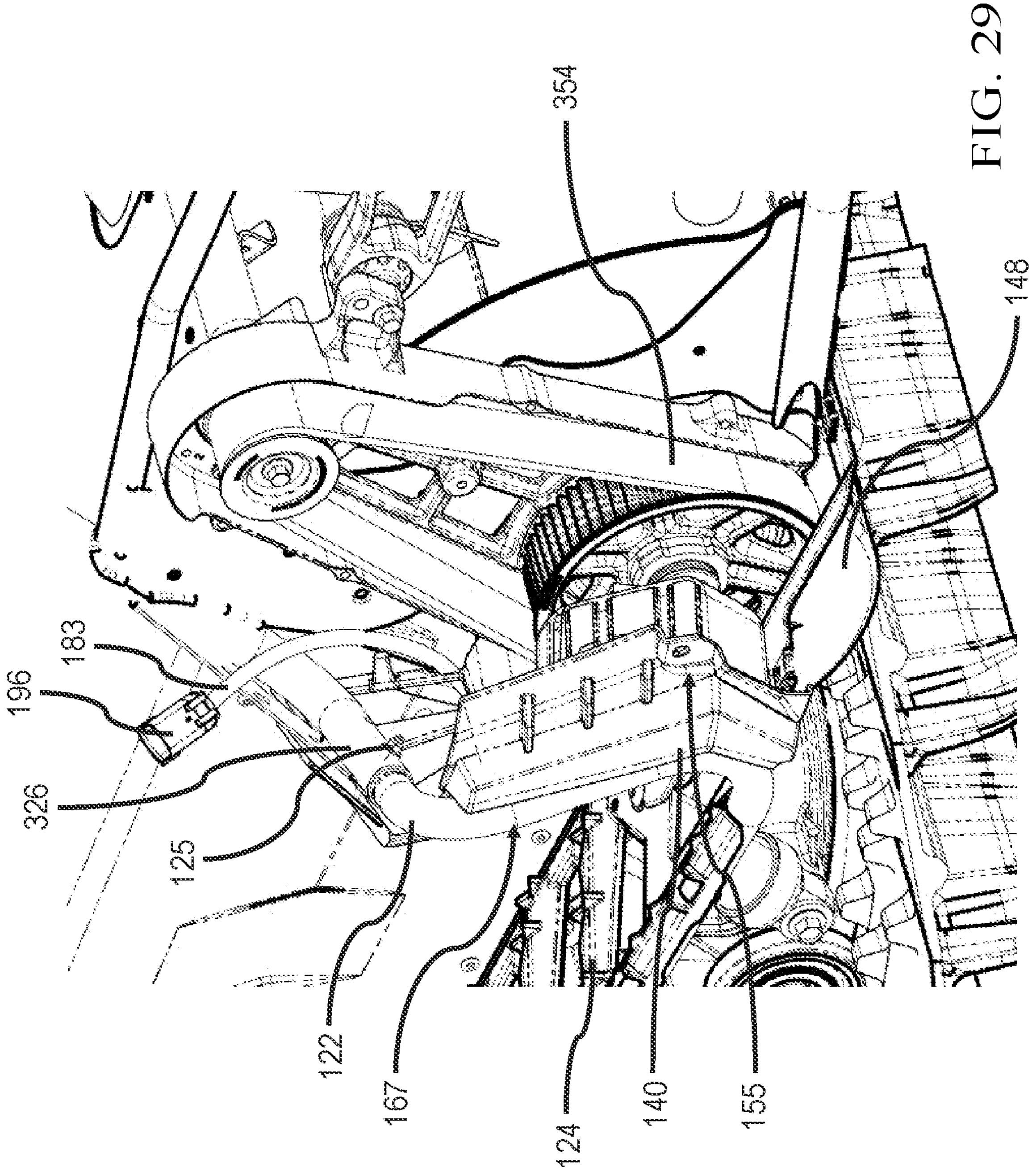
FIG. 29 illustrates an alternative front perspective view of the front toe stop, the foot support member, and the support member of the running board assembly, according to some embodiments.
Figure 41A:
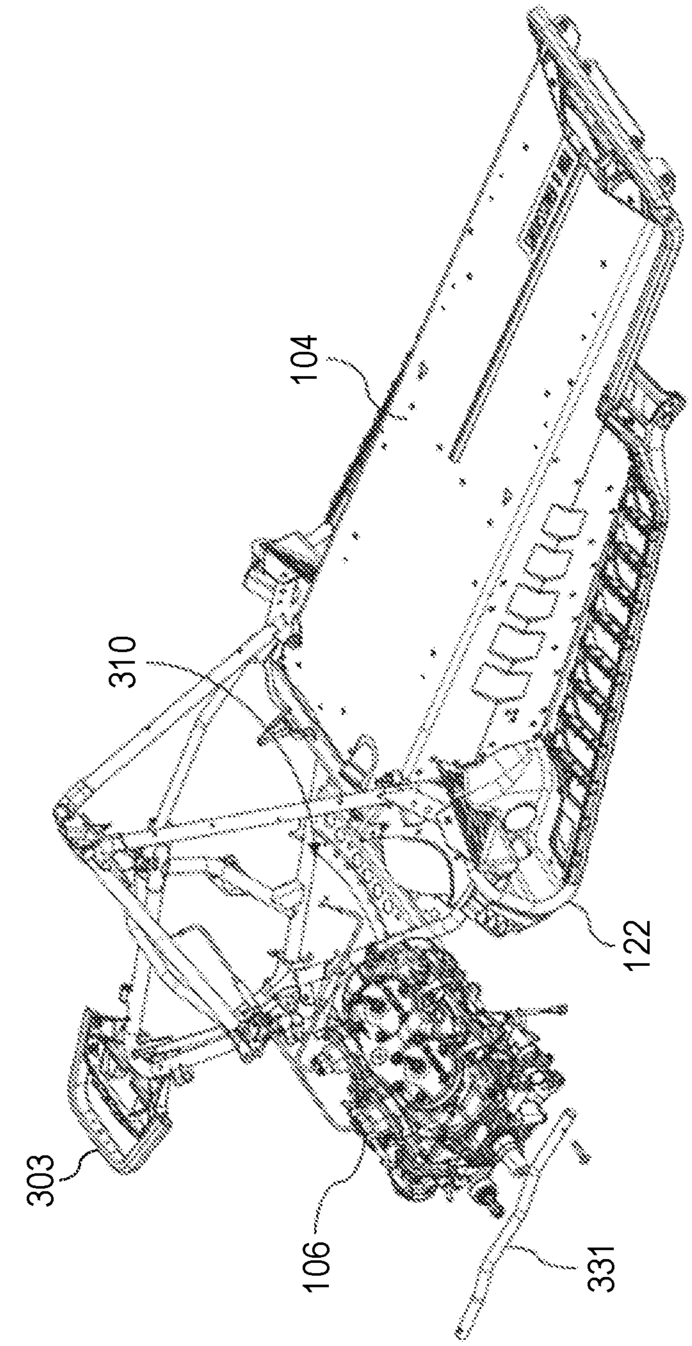
FIG. 41A illustrates an exploded view of a snowmobile subassembly, according to some embodiments.
Figure 41B:
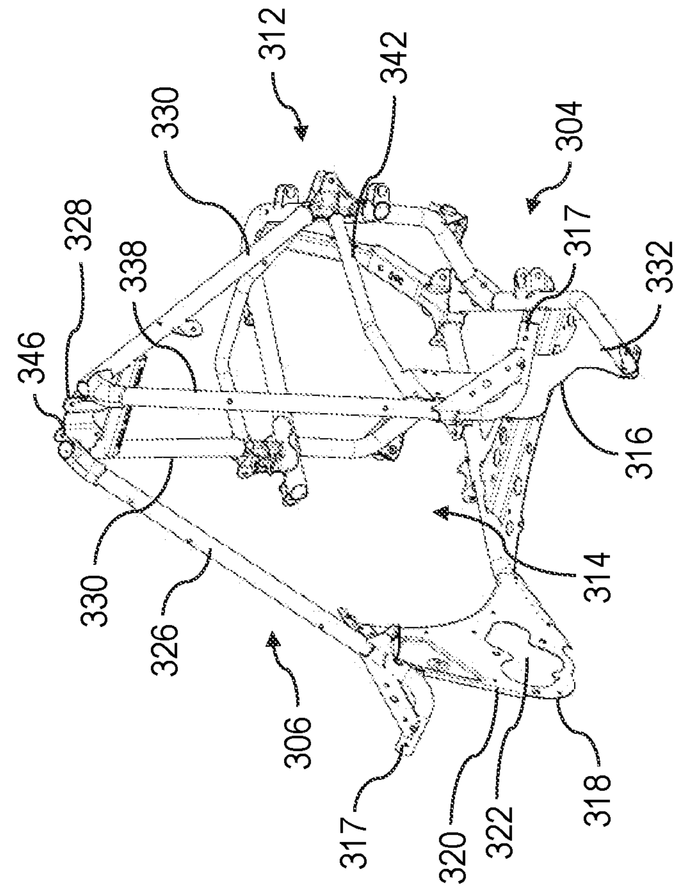
FIG. 41B illustrates left front perspective view of a snowmobile frame, according to some embodiments.
Figure 41C:
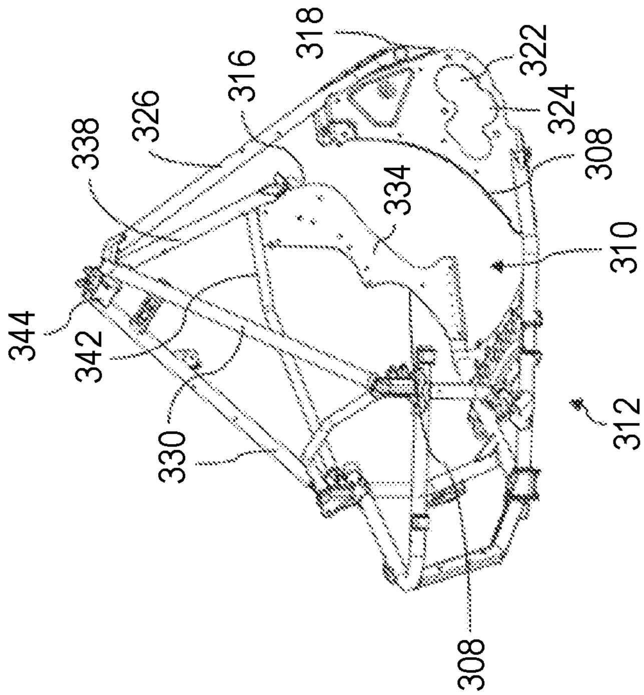
FIG. 41C illustrates right rear perspective view of the snowmobile frame, according to some embodiments.

As shown in FIGS. 11-26B, a running board assembly 120 may include a support member 122 and a running board or foot support member 124 (hereinafter referred to as "the foot support member 124"). The support member 122 may be a tube, may be hollow, and may be comprised of a metal, a metal alloy, a polymeric material, or a fiber reinforced polymer composite. In this example, the rearward end of the support member 122 is removably attached to the tunnel 104, or to a running board support bracket 184 that is secured to an interior surface of a side panel 182 of the tunnel 104 by a first plurality of screws or threaded fasteners 126. As shown in FIGS. 8 and 11, the rearward end of the support member 122 may extend downwardly from an outboard side 127 of the foot support member 124 and inward to where it is removably attached to a rearward portion 191 of support bracket 184 that extends below the adjacent portion of the tunnel side panel 182. The rearward portion 191 may also provide a common mounting point for a rear suspension component 192 positioned in or below the tunnel 104. In a non-limiting example, a fastener 123 may be inserted through an aperture 194 in the support member 122 and an aperture 193 in the rearward portion 191 to secure the support member 122 to an outward facing surface of the rearward portion 191, and into an aperture in the rear suspension component 192 to secure the rear suspension component 192 to an inward facing surface of the rearward portion 191. In an illustrative example, the rear suspension component 192 may be an upper horizontal member of a rear idler arm. An example of such an upper horizonal member is shown in U.S. Pat. No. 9,771,130, hereby incorporated by reference in its entirety. A forward end of the support member 122 may be removably secured to the snowmobile by, for example, inserting within a tubular rearward leg 326 of a forward frame 312 and securing the two tubes together with a removable fastener 125 as best shown in FIGS. 28 and 29. The forward end of the support member 122 extends outward, forward, and downward from the rearward leg 326 and transitions into a rearward extending portion that provides an outboard support platform for the foot support member 124. This provides a continuous tubular member that extends from a steering column mount component 328, shown in FIGS. 41B and 41C, located at the top of the forward frame 312 toward a rearward portion of the tunnel 104. One or more fasteners 123, 125 provide a removable attachment of the support member 122 to the snowmobile 100 in case the support member 122 needs to be removed or replaced. For example, removal of the fastener 123 allows the support member 122 to be decoupled from the rearward leg 326. It is to be understood that the forward and rearward ends of the support member 122 may be fastened to the tunnel 104, the running board support bracket 184, and/or forward frame 312 by removeable threaded fasteners, fir tree fasteners, clips, etc. The support member 122 may alternatively be formed integrally with the tunnel 104 and/or forward frame 312.

Figure 19:
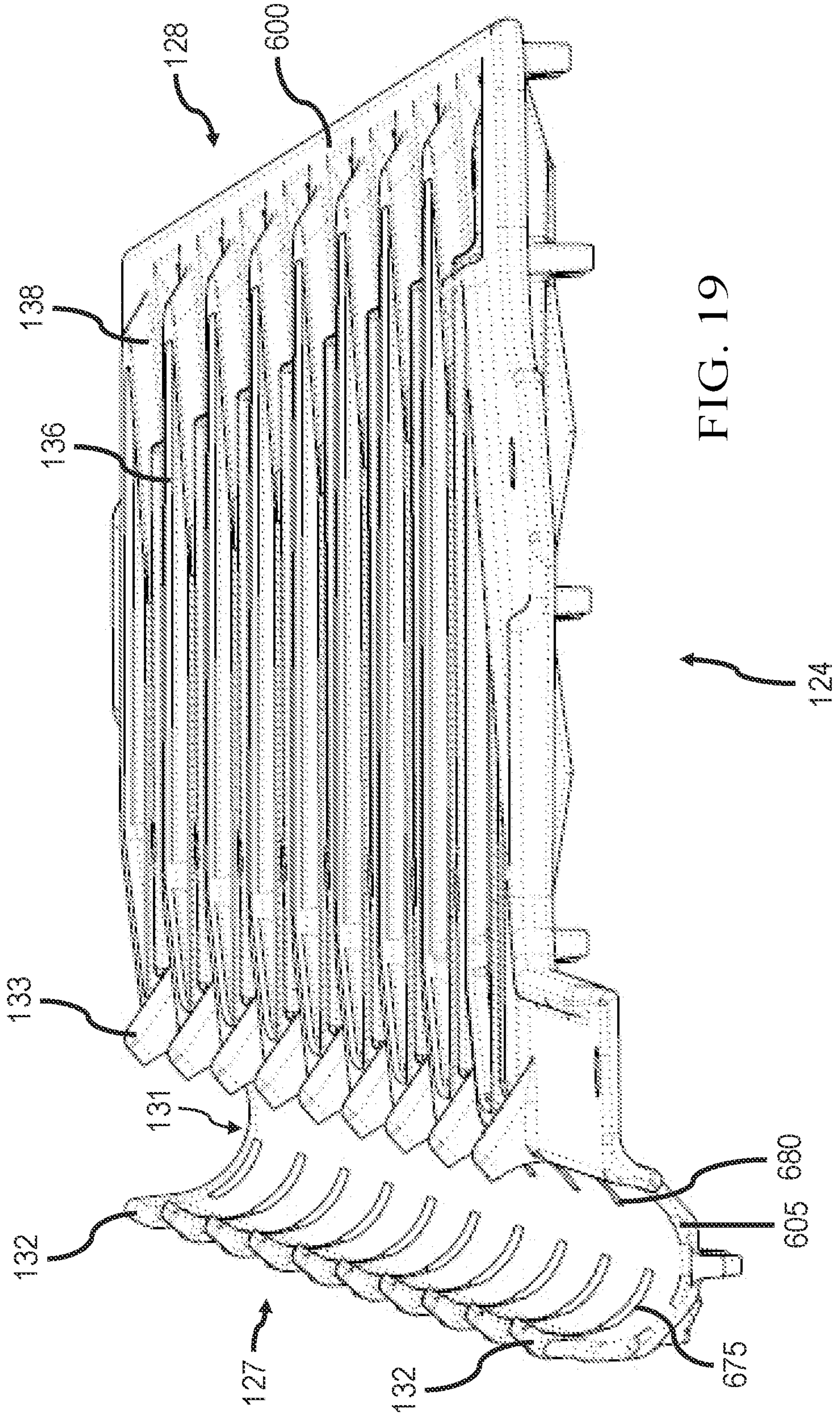
FIG. 19 illustrates a bottom view of a side view of a foot support member of the running board assembly, according to some embodiments.
Figure 20:
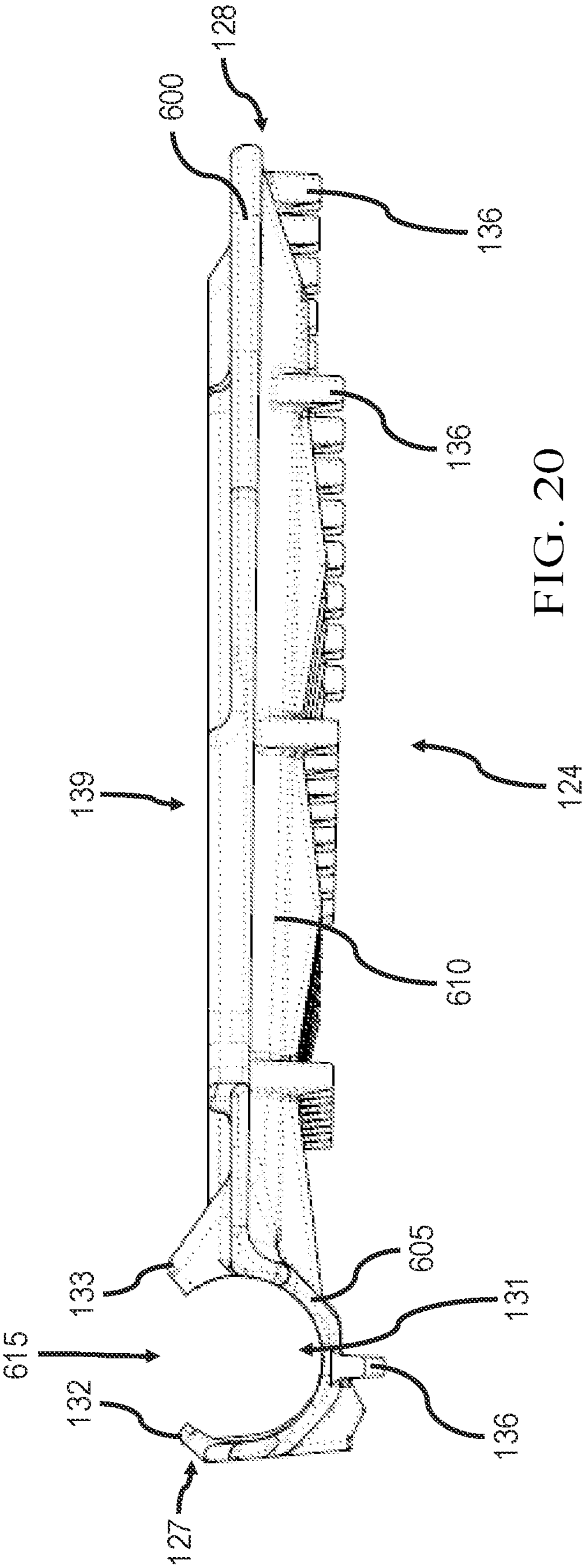
FIG. 20 illustrates a bottom view of the foot support member of the running board assembly, according to some embodiments.
Figure 21A:
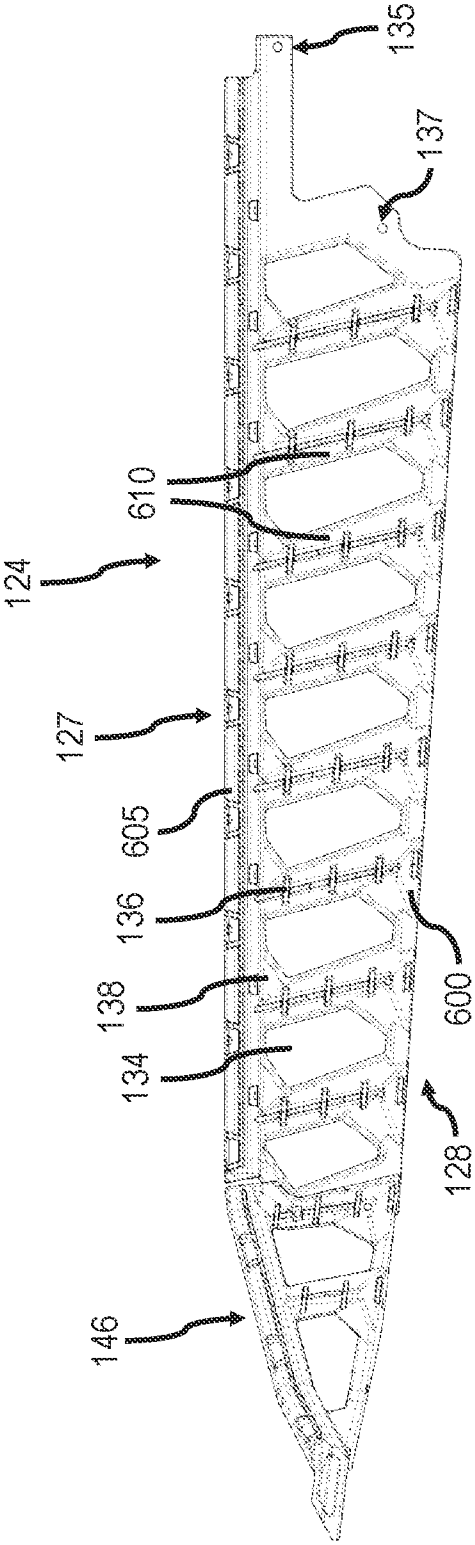
FIG. 21A illustrates a top view of the foot support member and a rear kick-up panel of the running board assembly, according to some embodiments.
Figure 21B:
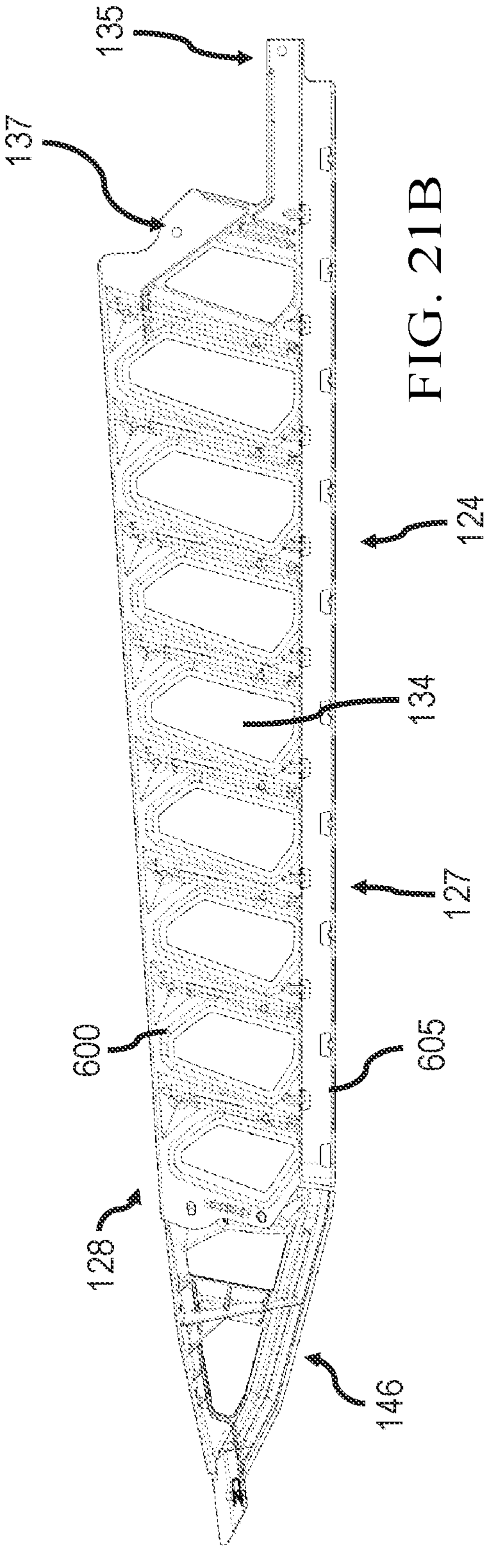
FIG. 21B illustrates a bottom view of the foot support member and the rear kick-up panel of the running board assembly, according to some embodiments.
Figure 22:
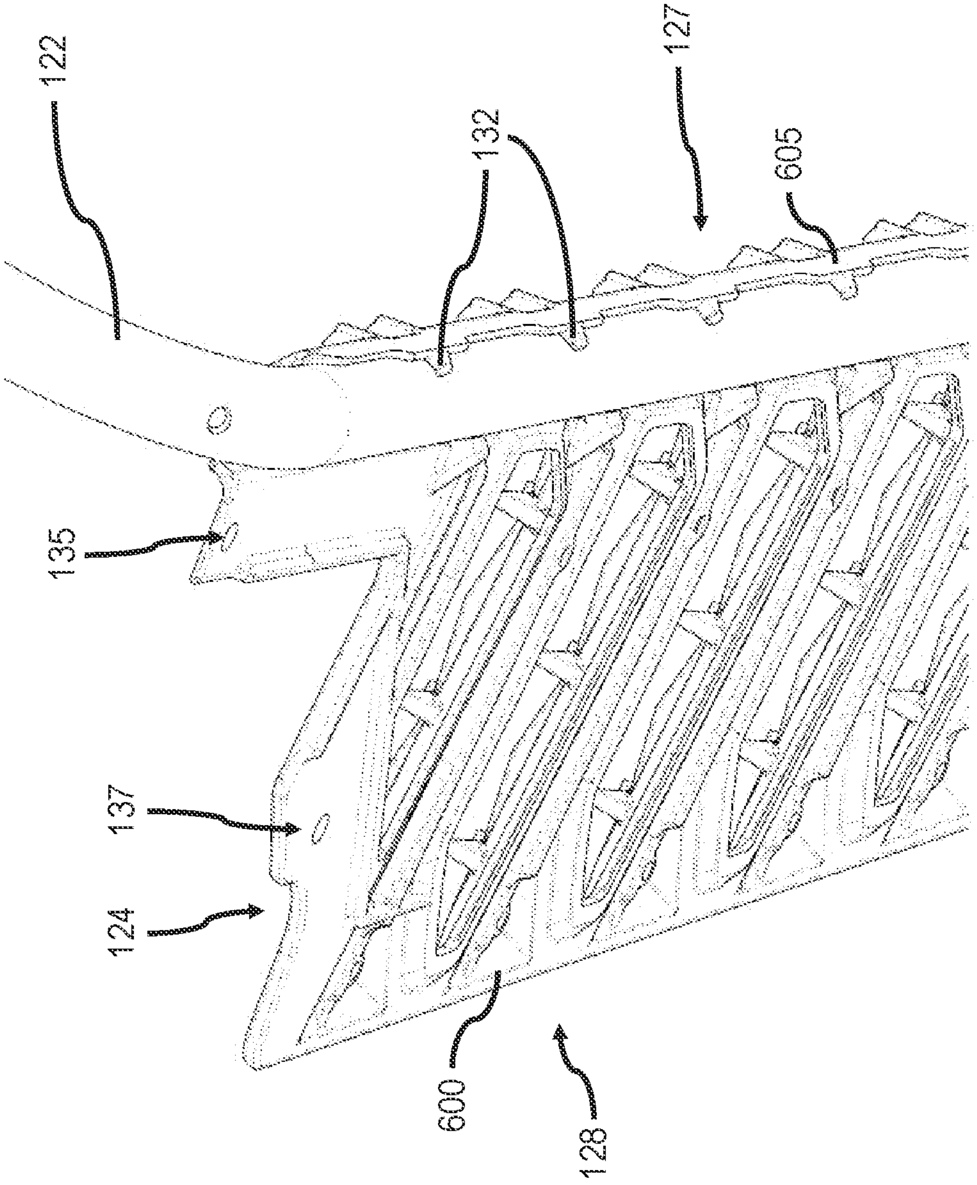
FIG. 22 illustrates a close-up bottom perspective view of the foot support member and support member of the running board assembly, according to some embodiments.
Figure 23B:
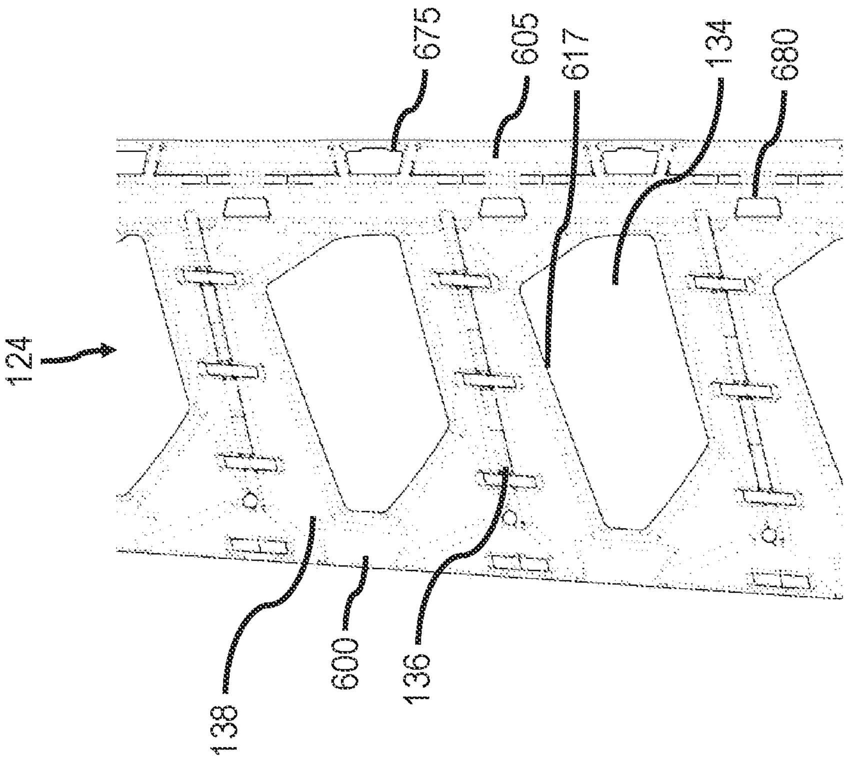
FIG. 23B illustrates a close-up top view of the foot support member and support member of the running board assembly, according to some embodiments.
Figure 23A:
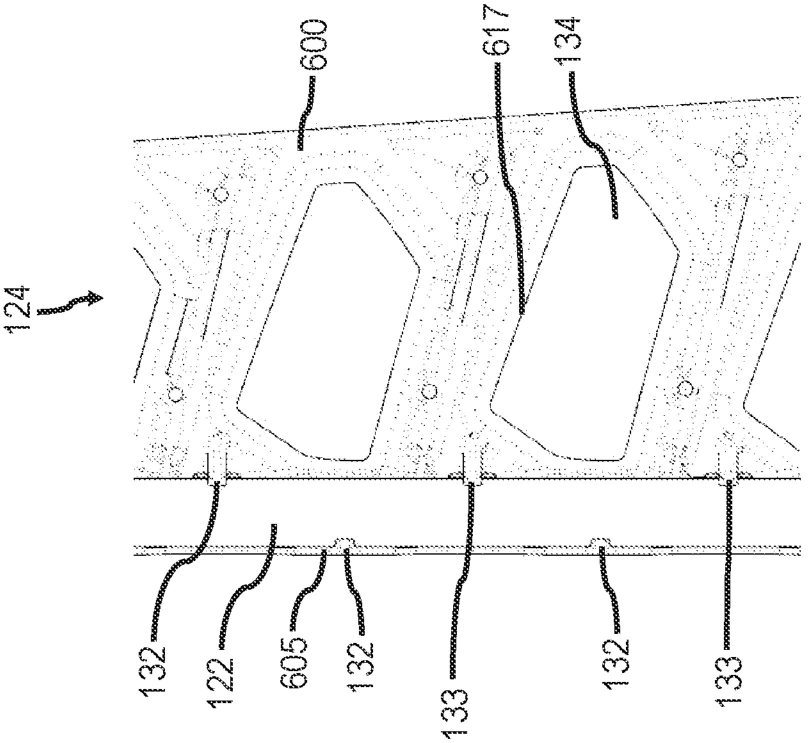
FIG. 23A illustrates a close-up bottom view of the foot support member and support member of the running board assembly, according to some embodiments.
Figure 24:
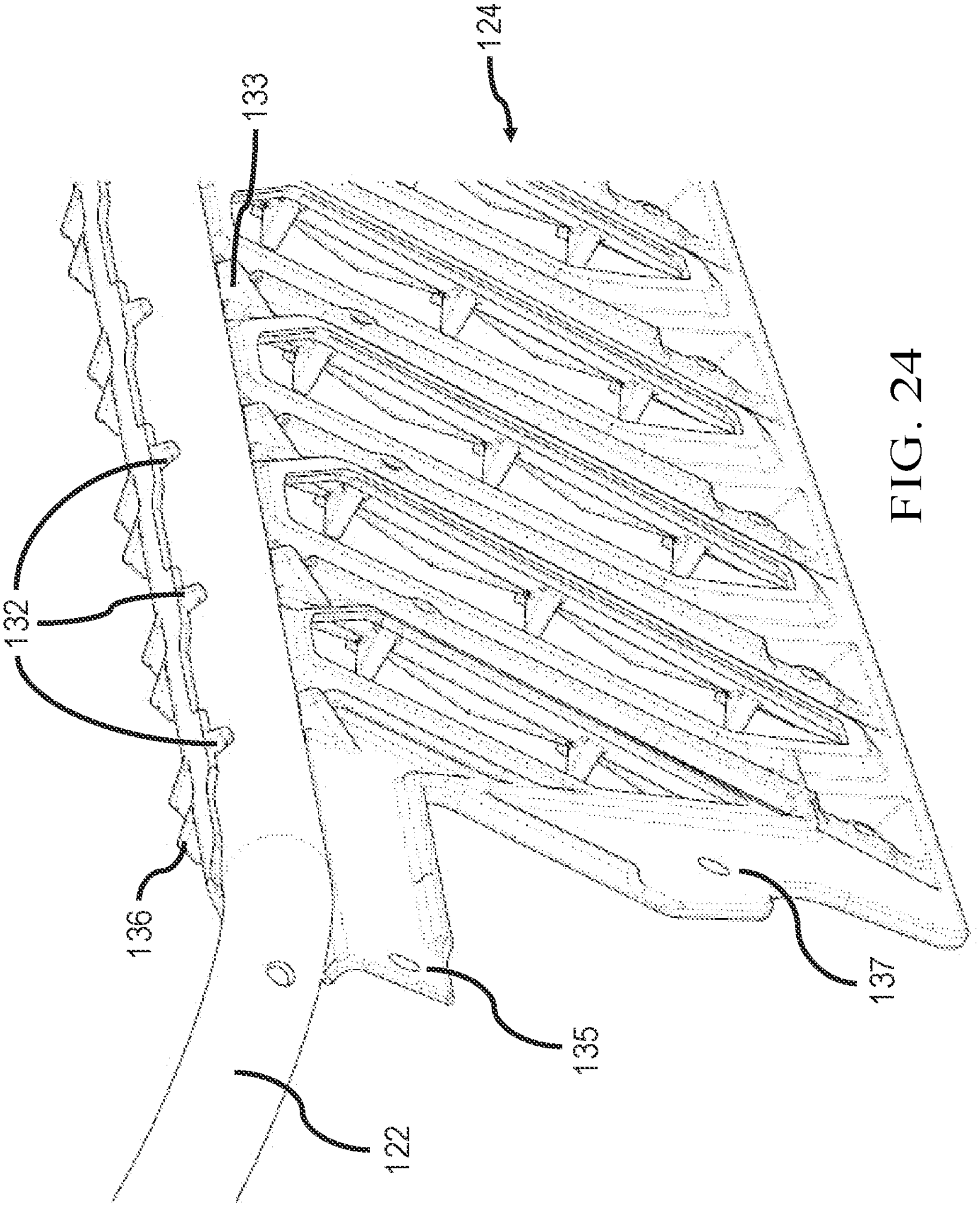
FIG. 24 illustrates another close-up bottom perspective view of the foot support member and support member of the running board assembly, according to some embodiments.
Figure 25B:
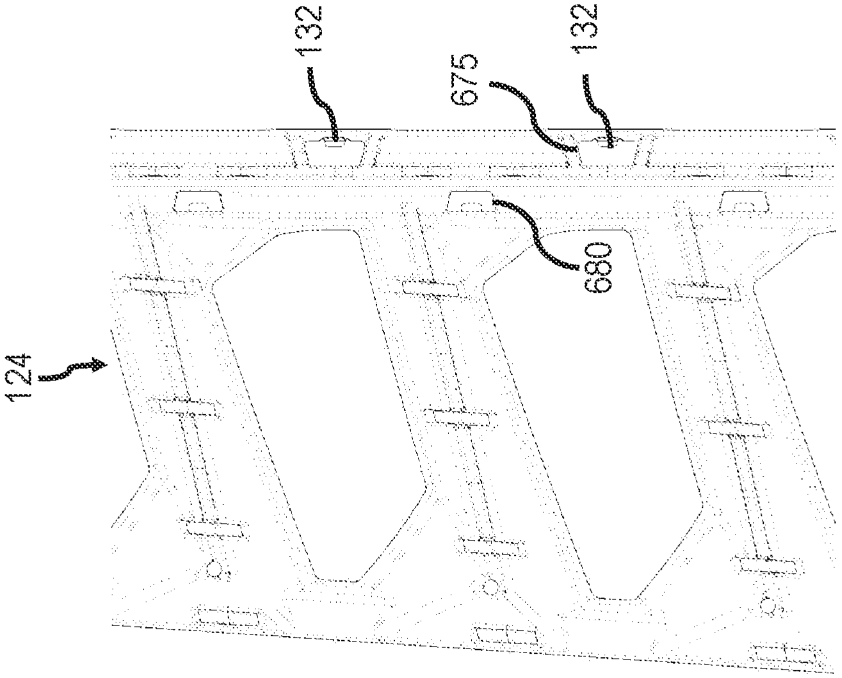
FIG. 25B illustrates a close-up top view of the foot support member of the running board assembly, according to some embodiments.
Figure 25A:
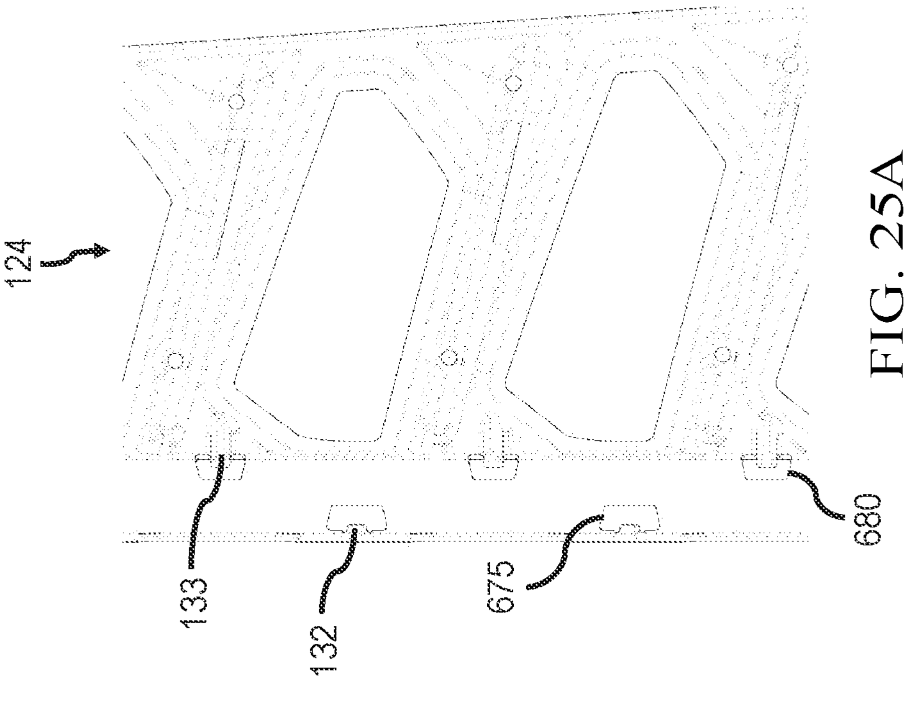
FIG. 25A illustrates a close-up bottom view of the foot support member of the running board assembly, according to some embodiments.

The foot support member 124 provides a support platform for the rider's feet while mounting and riding the snowmobile 100. A first rail 600 defines an inboard side 128 of the foot support member 124 that is attached to the tunnel 104 or a mounting surface 186 of the support bracket 184 by a second plurality of screws or threaded fasteners 130. As illustrated in FIGS. 19 and 20, a second rail 605 of the foot support member 124 defines a channel 131 extending along an outboard side 127 of the foot support member 124 that retains the foot support member 124 to the support member 122. The first rail 600 may be positioned a first distance apart from the second rail 605 at the forward end of the foot support member 124, and the first rail 600 may intersect or be positioned a second distance apart from the second rail 605 at a rearward end of the foot support member 124. The second rail 605 may be longer than the first rail 600. As used herein, inboard may refer to a location or direction closer to the longitudinal centerline of the snowmobile and outboard may refer to a location or direction further from the longitudinal centerline of the snowmobile. As best shown in FIGS. 16, 19, 25A and 25B, an interior surface of the channel 131 defines a downward facing opening 615 and has a generally semicircular cross section having a radius that is substantially equal to the radius of an outer surface of the support member 122. The downward facing opening 615 extends continuously along the length of the channel 131 to allow the support member 122 to be inserted into the channel 131 via the opening 615. The second rail 605 defines a plurality of retaining members including, but not limited to, flexible curved clips 132 extending from an outer side of the channel 131 toward the downward facing opening 615 of the channel 131. The retaining members may be integrally formed with the foot support member 124. A second set of retaining members may be provided, such as clips 133 that are positioned adjacent the cross members 610 and extend from the opposite side of the channel 131 toward the downward facing opening 615 of the channel 131. The clips 132 and 133 may have a radius substantially equal to that of the channel 131. The combination of the channel 131 and the clips 132, and optionally the clips 133, may have a cross section with a circular sector shape having a measurement greater than 1.02 $\pi$ radians and less than 1.5 $\pi$ radians so that the channel 131 and clips 132 (with or without the clips 133) wrap around at least 40% of a circumference of the support member 122, and optionally at least 50% of a circumference of the support member 122, and optionally between 51% and 75% of a circumference of the support member 122. The radius of this circular sector is substantially equal to the radius of an outer surface of the support member 122 and is sized so that the flexible clips 132 apply a compressive force to the support member 122 to removably secure the foot support member 124 to the support member 122. The clips 132 are offset from the clips 133 along the length of the channel 131. Offsetting the clips 132 and 133 along the length of the channel 131 makes it easier to insert and remove the support member 122 in the channel 131 and maintains the strength of the region of the foot support member 124 forming the channel 131. The outboard side 127 of the foot support member 124 may be retained to the support member 122 solely by the clips 132 and 133 or additional fasteners may be driven through the foot support member 124 and the support member 122 to provide additional retention of the foot support member 124 to the support member 122.

In some examples, the foot support member 124 is formed of a polymeric material. Illustrative polymeric materials may include polyamide, e.g., NYLON 6/6 OR NYLON 12. In other non-limiting examples, such a polymeric material includes polyetheretherketone (PEEK), polypropylene (PP), polyphthalamide (PPA) and/or polybutylene terephthalate (PBT). In some examples, the foot support member 124 may be formed of a composite of a polymer and other materials. For example, the foot support member 124 may comprise a composite including one or more of the above-described polymers and one or more types of fibers including, but not limited to, glass and/or carbon fibers, e.g., 30 wt % glass filled polyamide. In a non-limiting example, the fiber % by weight of the composite material may range from 20 wt % to 60 wt %, and may optionally be in the range of 20 wt % to 40 wt %, or optionally in the range of 25 wt % to 35 wt %. These materials have the advantages of being tough enough to withstand impacts experienced on the trail while also being flexible enough to form the flexible clips 132 and 133 so that the flexible clips 132 and 133 may be integrally formed with the foot support member 124. In addition, these polymeric composite materials have a low thermal conductivity (i.e., less than 1 W/m-° K). This low thermal conductivity provides the benefit of reducing conductive heat loss through a rider's boot from contact with the foot support member 124.

The support member 122 and the foot support member 124 are removably attached to the tunnel 104 or to the support bracket 184 that is secured to a side panel 182 of the tunnel 104. The foot support member 124 is removably secured to the support member 122, thereby allowing these components to be separately repaired or replaced if damaged.

Figure 1:
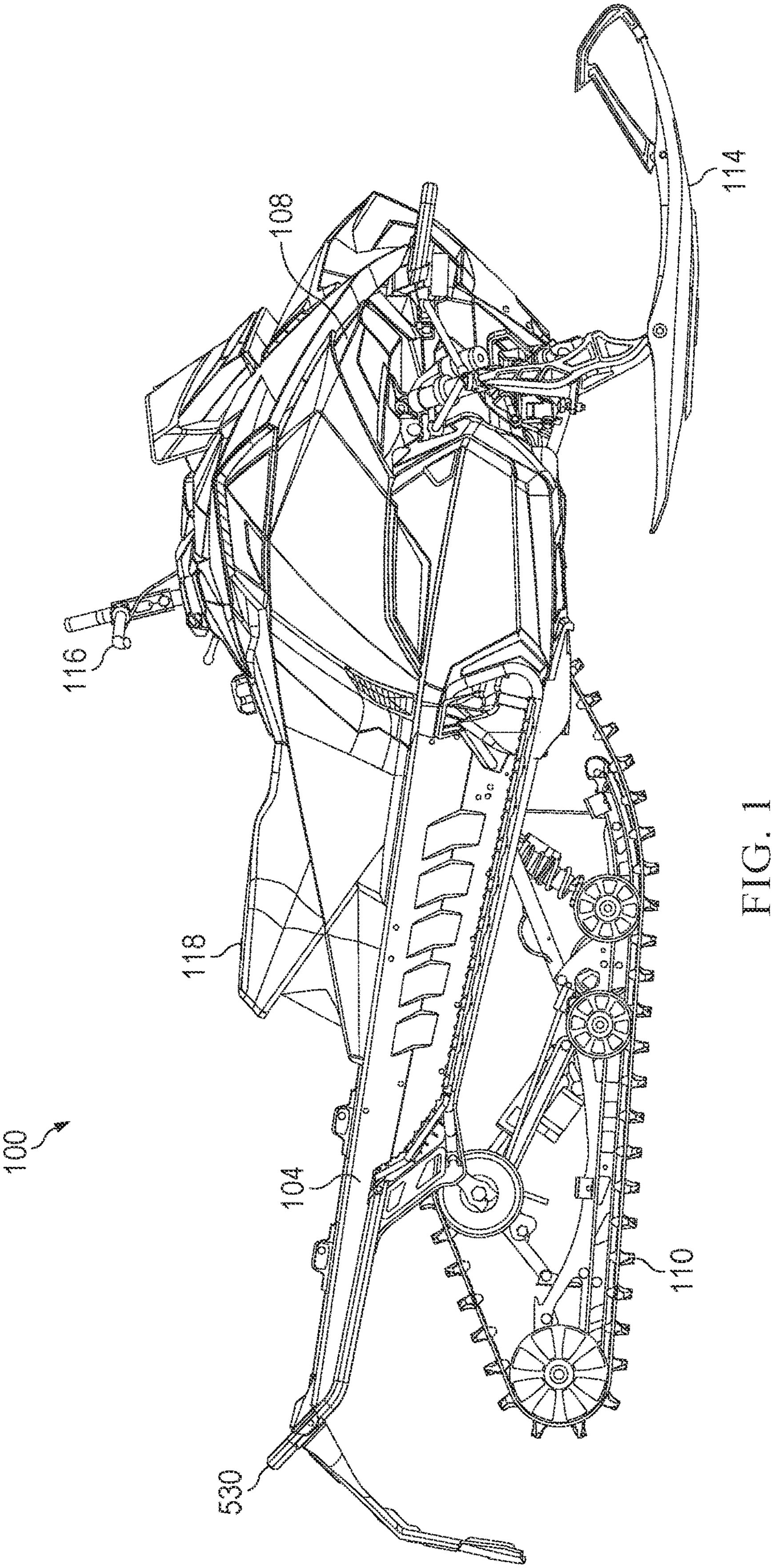
FIG. 1 illustrates a side view of a snowmobile, according to some embodiments.
Figure 2:
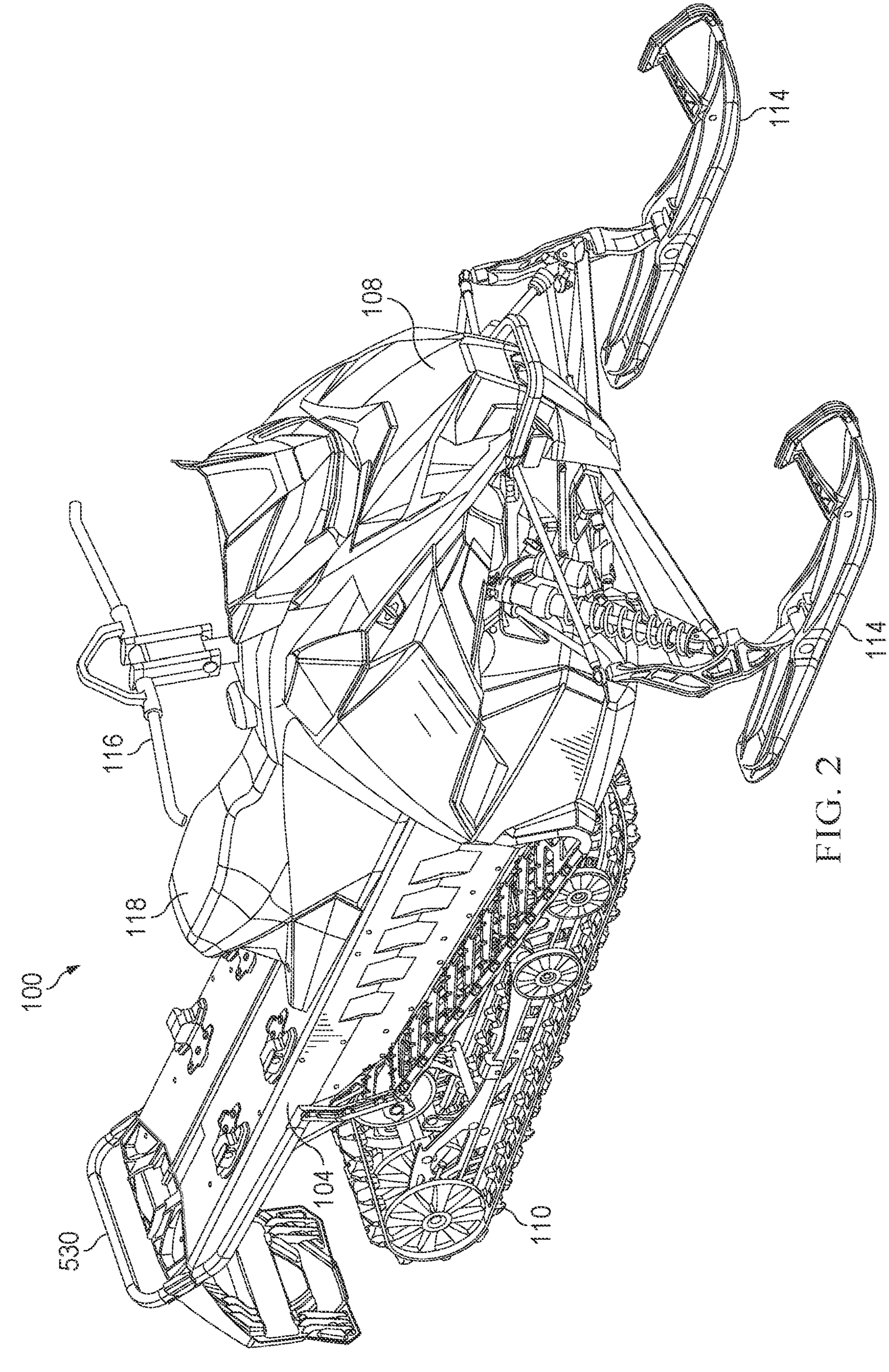
FIG. 2 illustrates a perspective of a snowmobile, according to some embodiments.
Figure 3:
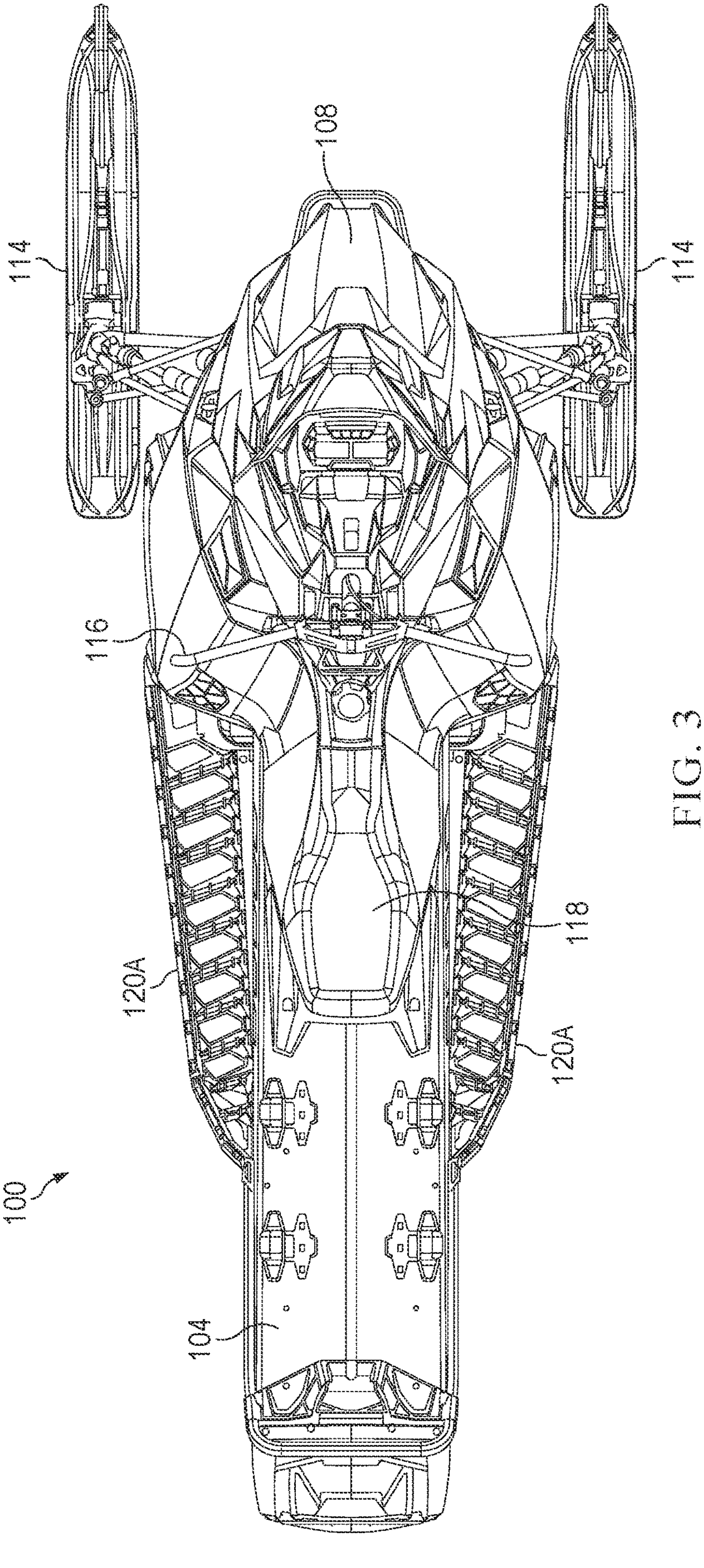
FIG. 3 illustrates a top view of a snowmobile, according to some embodiments.
Figure 4:
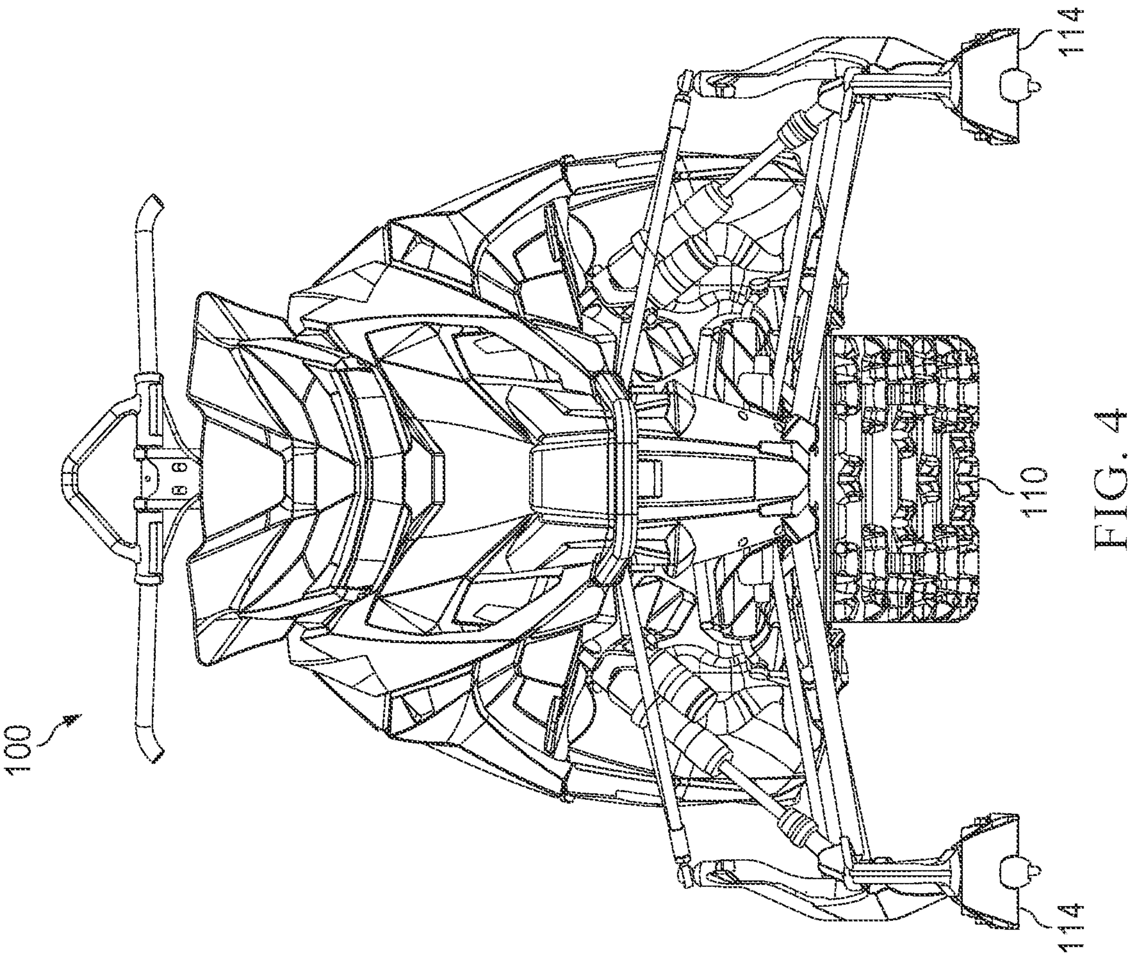
FIG. 4 illustrates a front view of a snowmobile, according to some embodiments.
Figure 5:
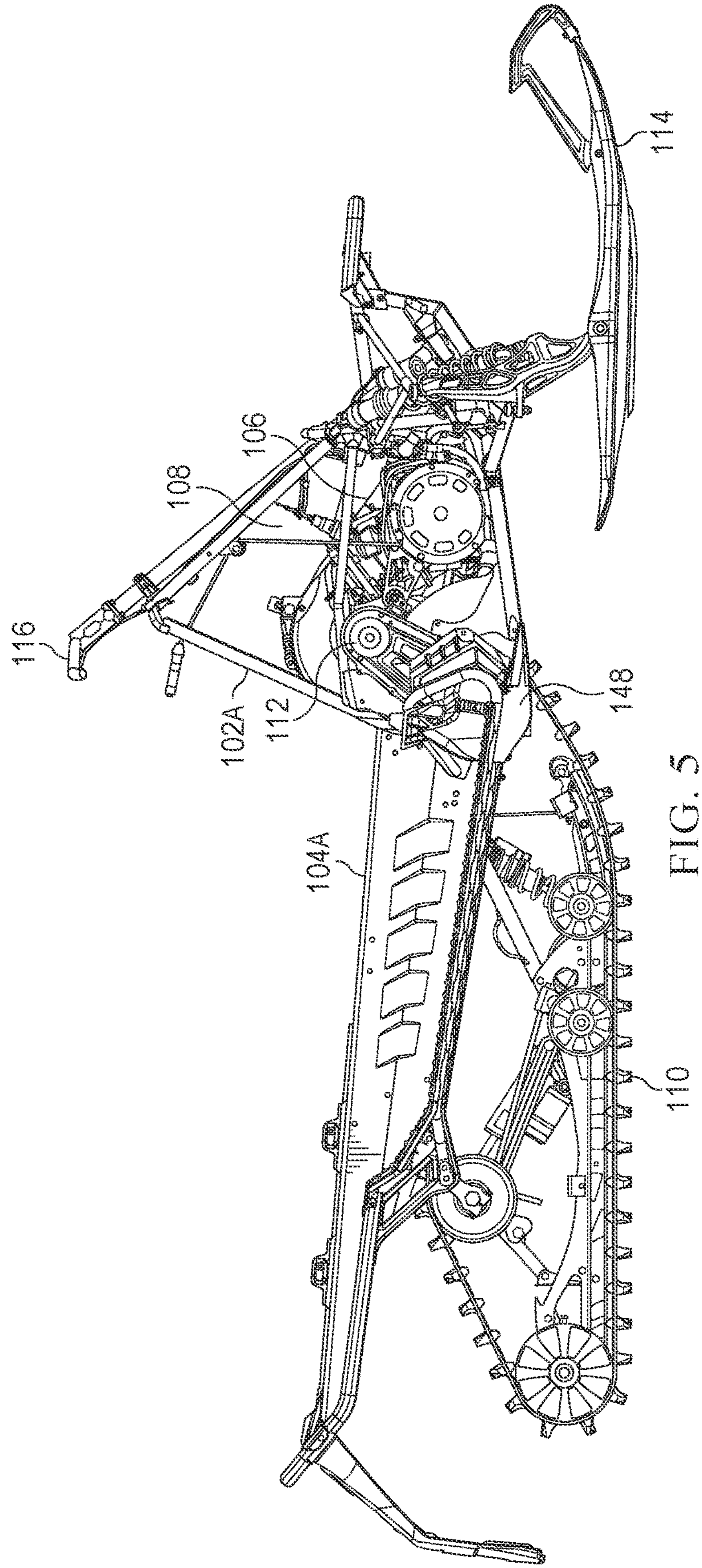
FIG. 5 illustrates a right side view of a snowmobile with portions of the engine cover removed, according to some embodiments.
Figure 6:
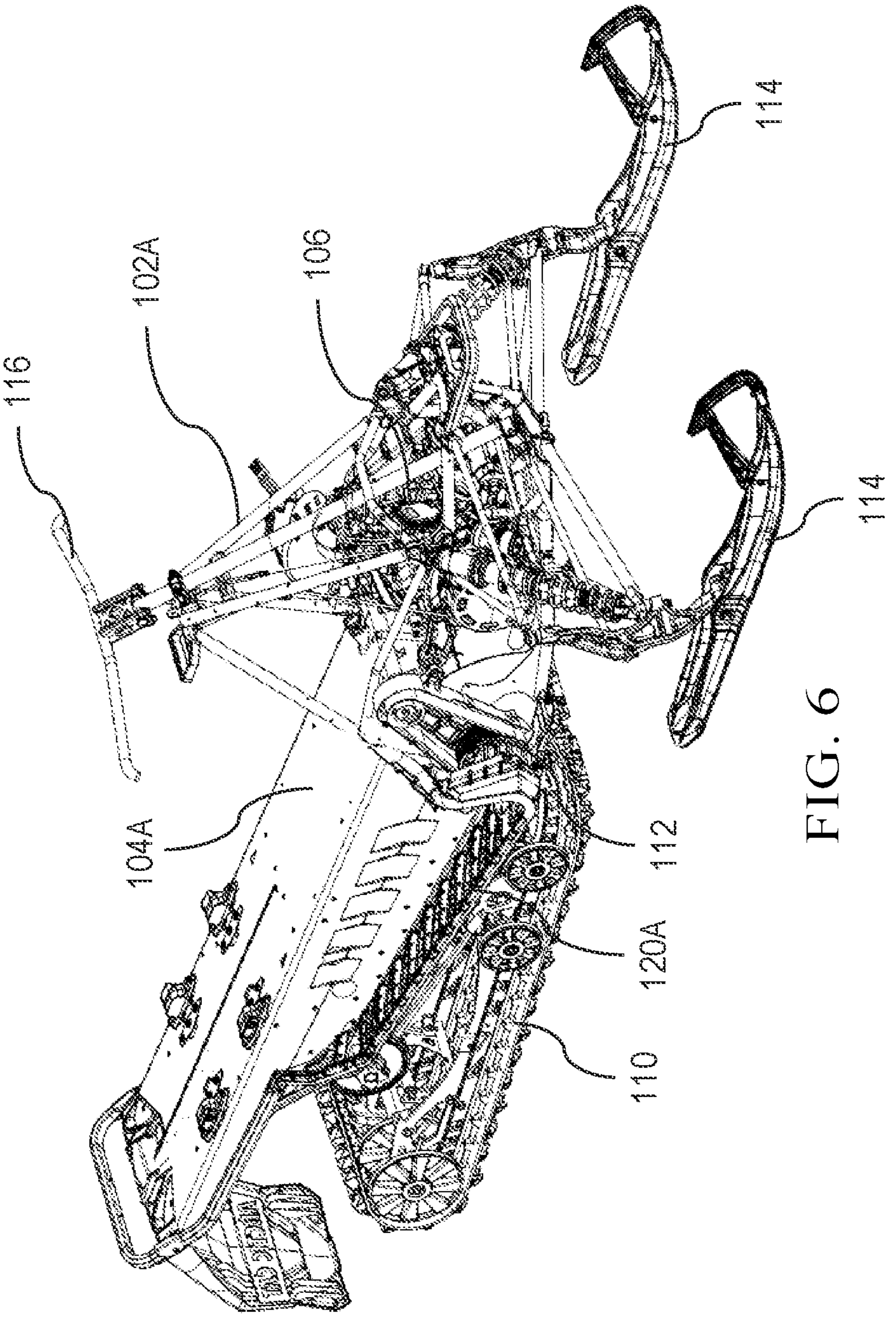
FIG. 6 illustrates a right side perspective view of a snowmobile with portions of the engine cover removed, according to some embodiments.
Figure 16:
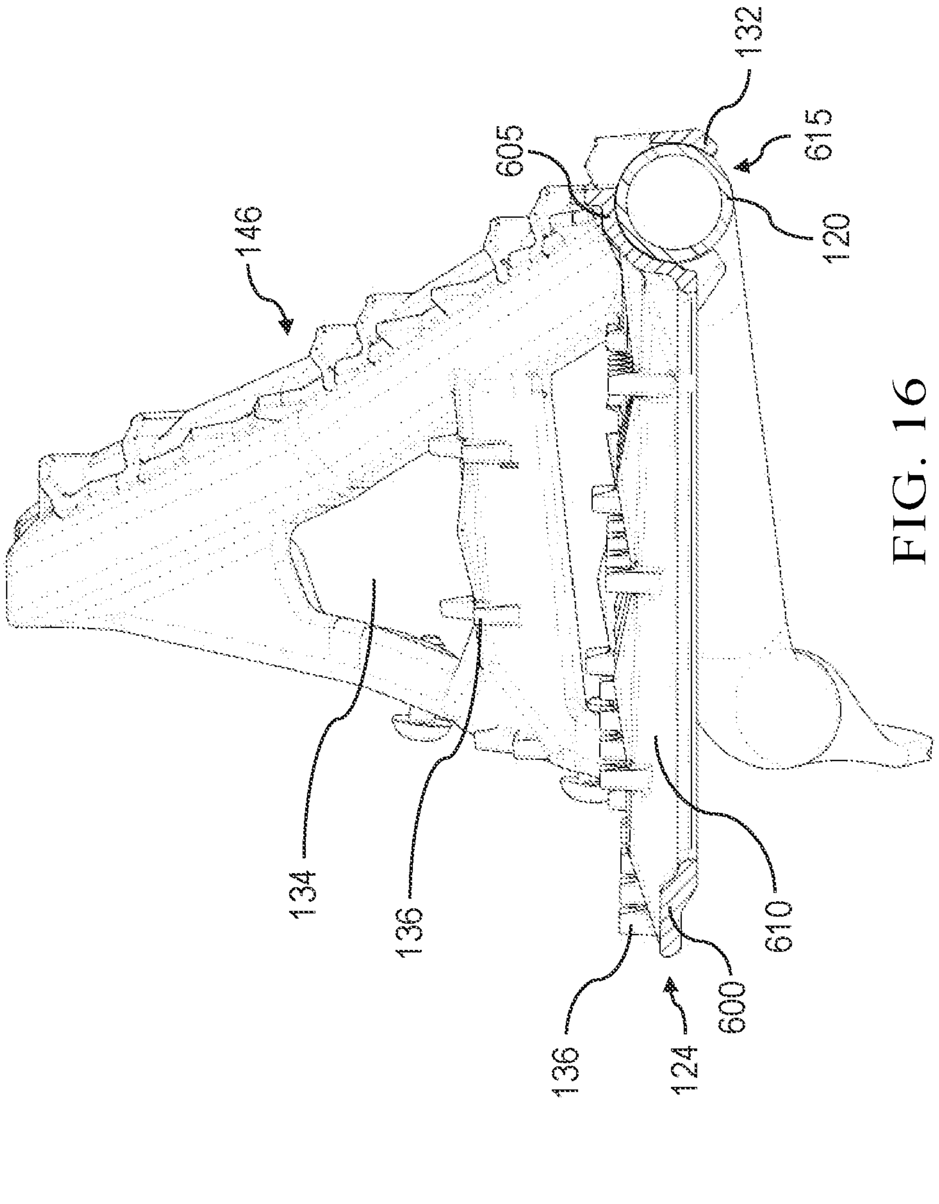
FIG. 16 illustrate a cross section view of the running board assembly from line 16-16 in FIG. 15B, according to some embodiments.
Figure 17A:
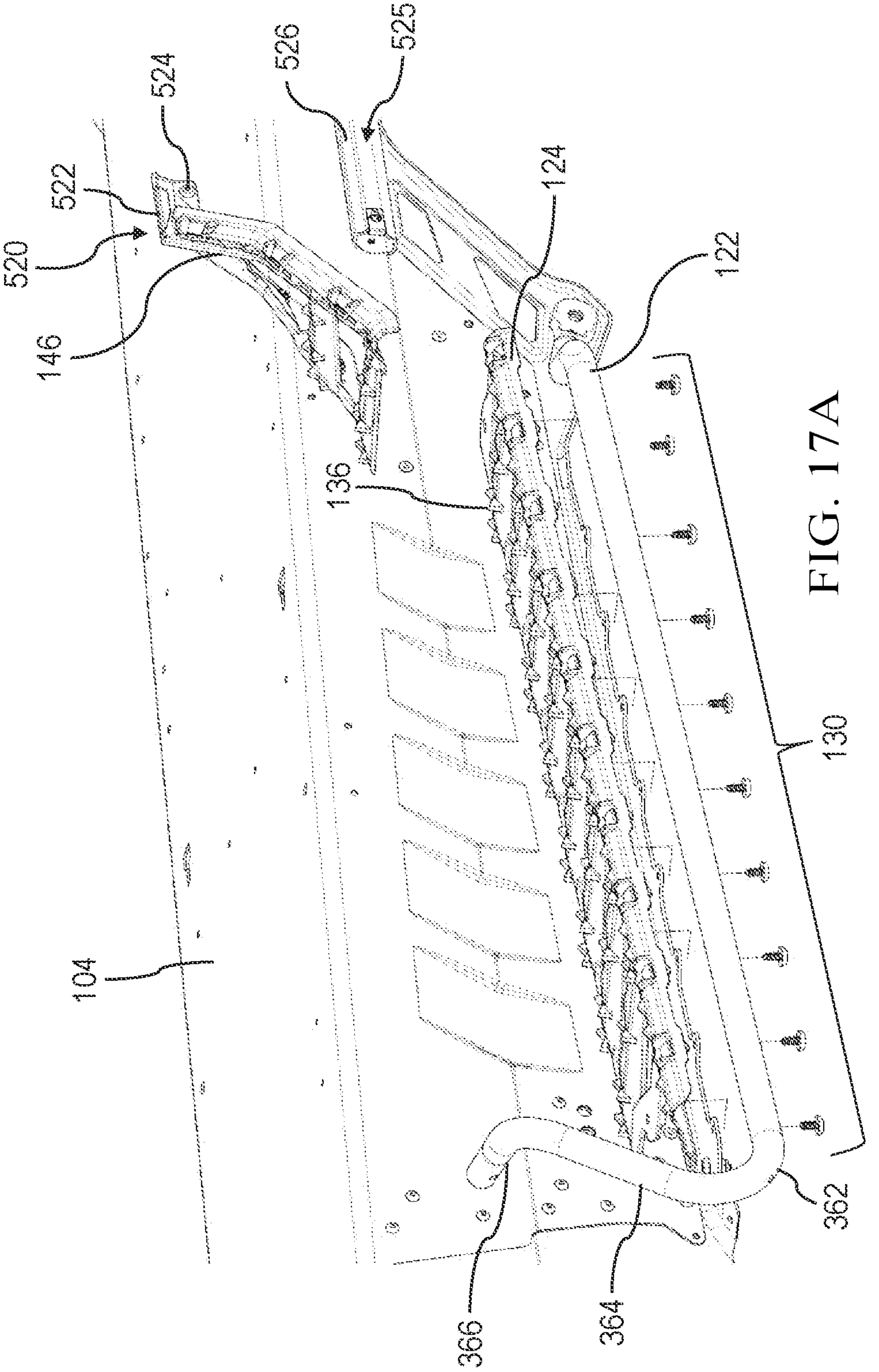
FIG. 17A illustrates an exploded side view of the running board assembly attached to the tunnel, according to some embodiments.
Figure 17B:
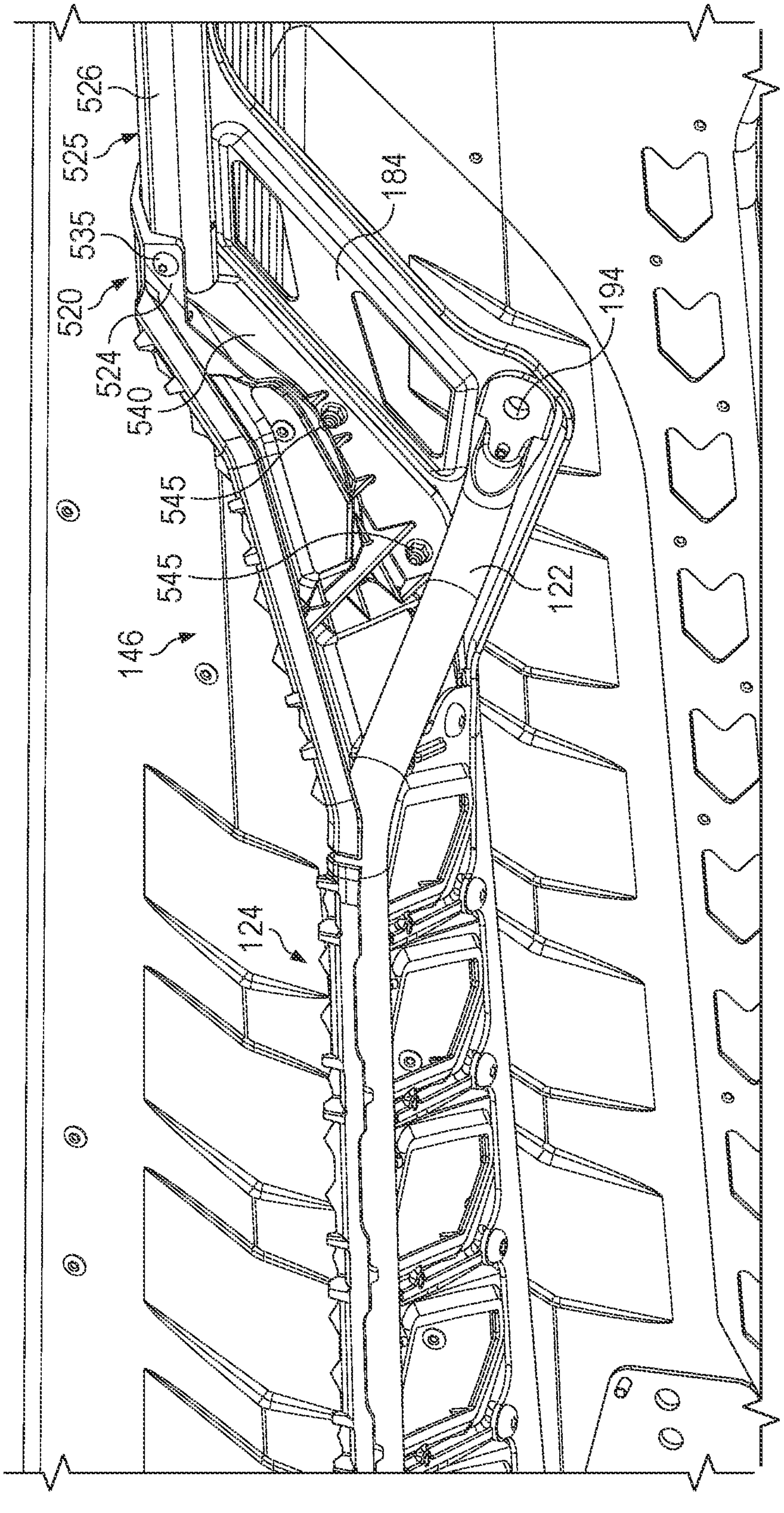
FIG. 17B illustrates an isometric side view of the rear kick up assembly, according to some embodiments.
Figure 18:
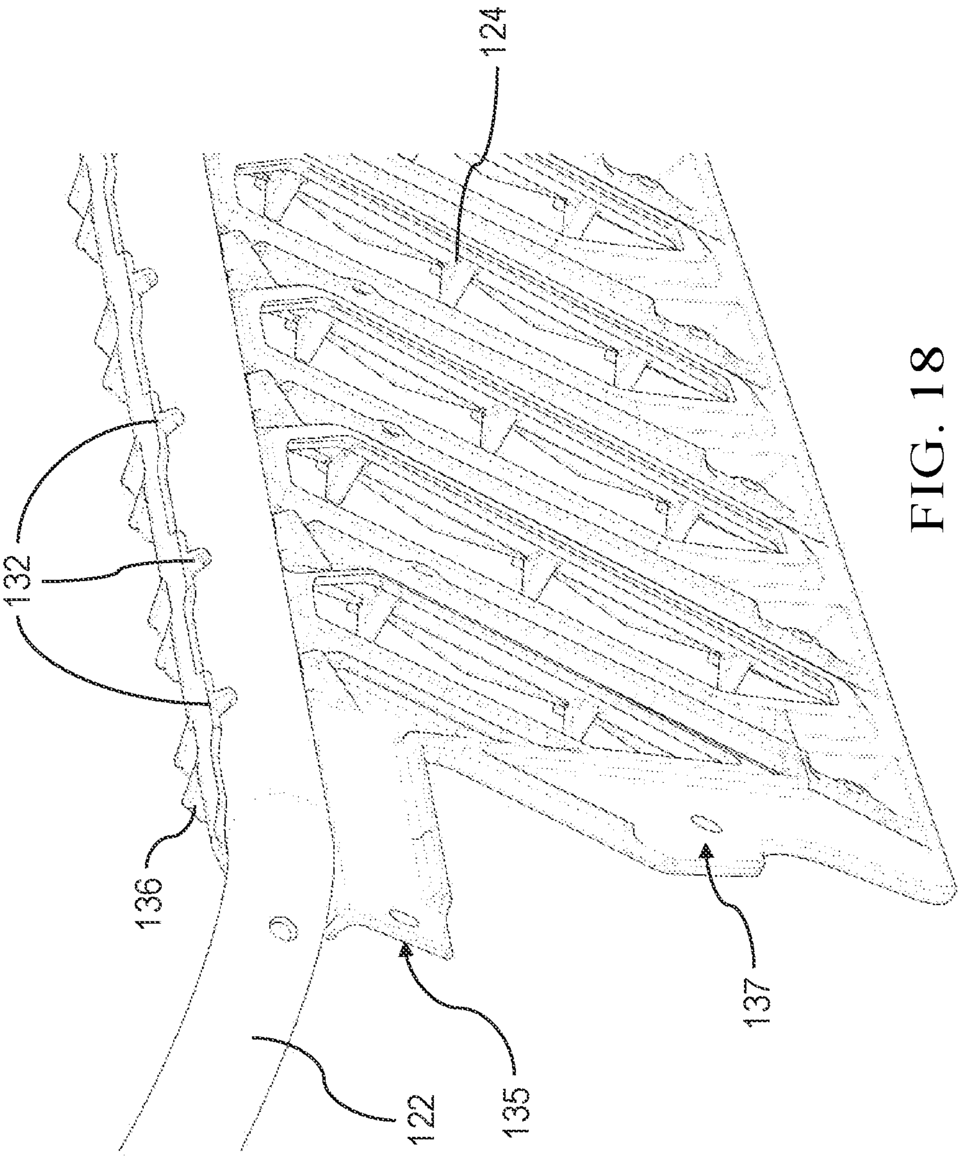
FIG. 18 illustrates a close up bottom view of the running board assembly, according to some embodiments.

As shown in FIGS. 15A, 21A-21B, and 23A-23B, the foot support member 124 includes a first rail 600, a second rail 605 that at least partially defines the channel 131, and plurality of cross members 610 extending between the first rail and the second rail. The cross members 610 partially define a plurality of apertures 134 extending from the first rail 600 to the second rail 605. These apertures 134 are configured to shed snow or other debris through the cross members 610 of the foot support member 124 as well as reduce the weight of the snowmobile and reduce the material needed to form the foot support member 124. The foot support member 124 also defines a plurality of ridges 136 that extending from a top surface 138 of the cross members and optionally along the first rail 600. At least some of the ridges 136 are located intermediate at least some of the apertures 134. The ridges 136 are configured to enhance traction of a rider's boot with the running boards. As shown in FIGS. 17A-B, the ridges 136 may be notched or serrated to further enhance traction. As best shown in FIG. 16, the inclusion of a series of ridges 136 inboard of the cross members 610 along the first rail 600 provides additional surface area for boot traction when at least a portion of the forward end of the foot support member 124 is positioned further outboard from the tunnel 104 in a first configuration as shown in FIG. 3 than a second configuration as shown in FIG. 10. Accordingly, the same foot support member 124 can be used on different snowmobile configurations or models. The series of ridges 136 positioned along the first rail 600 may have a base or a crown that is positioned lower than a corresponding base or crown of the ridges 136 on the cross members 610, and the base or crown of ridges 136 positioned along the second rail 605 be positioned higher than the corresponding base or crown of the ridges 136 on the cross members 610.

Figure 26:
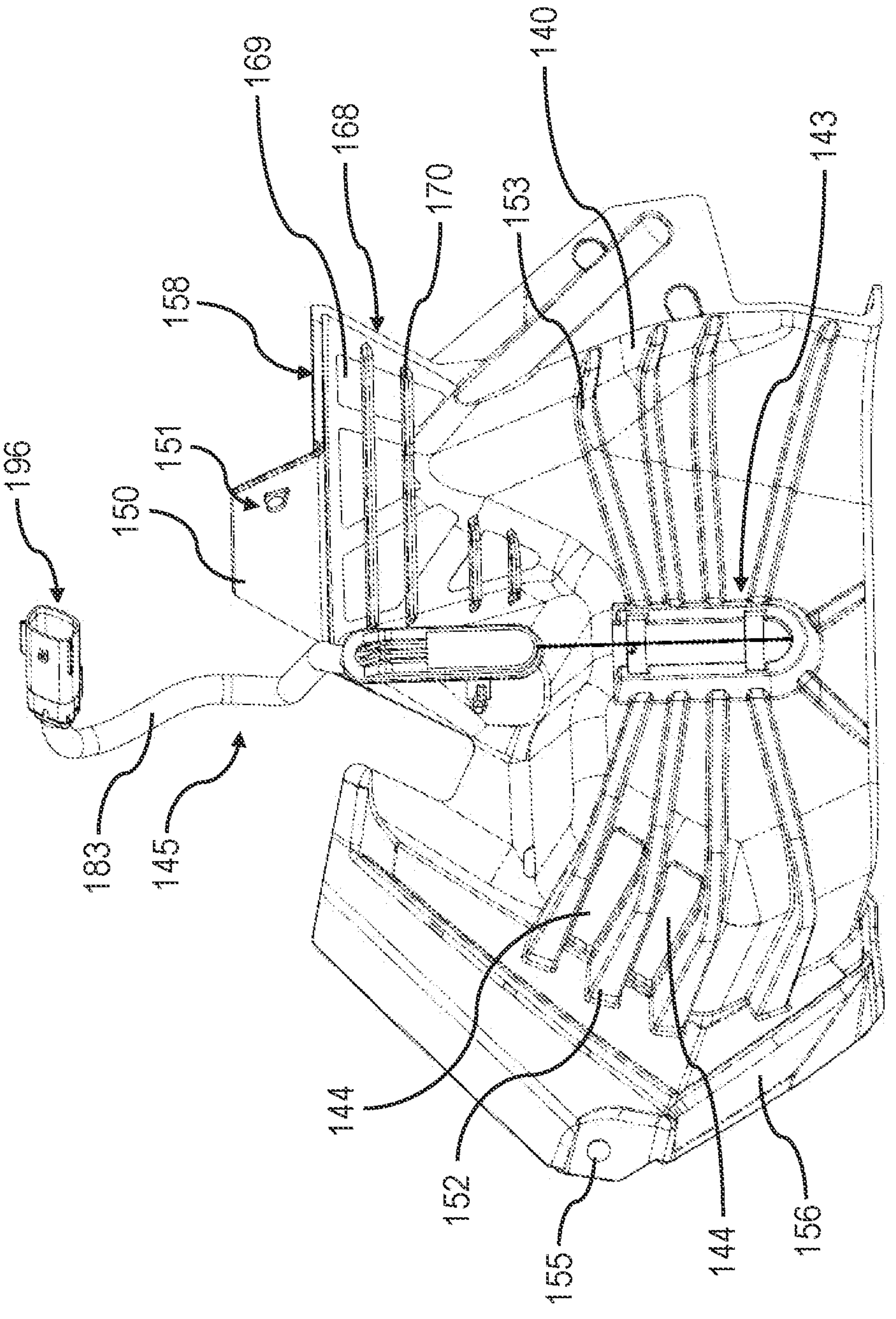
FIG. 26 illustrates an end view of a front toe stop of the running board assembly, according to some embodiments.

As illustrated in FIG. 26-31, the running board assembly further includes cupped front toe stops 140 that are attached to the foot support member 124 and the tunnel 104 by screws or threaded fasteners 142. These front toe stops 140 are configured to receive the toe of the rider's boots and locate the rider's feet. The front toe stops 140 are located at the front end of the running board assembly 120 and may be at least partially disposed within or positioned adjacent to a front cowl or body panel 400 of the snowmobile forming the engine bay 108. As best shown in FIG. 26, the front toe stops 140 define a plurality of openings 144 that are in fluid communication with the engine bay 108 and are configured to exhaust air warmed by the engine 106 from inside the engine bay 108. These openings 144 provide the dual benefit of reducing the heat inside the engine bay 108 and also keeping the rider's boots warm, thereby keeping the rider's feet warm. The front toe stops 140 may also include retaining features such as channels, flexible clips, or other features to retain the front toe stops 140 to the support member 122. The support member 122 may define a substantially U-shaped configuration along the outboard side 127 of the foot support member 124 with an open end facing rearwardly to accommodate the transition between the toe stops 140 and the foot support member 124. The front toe stops 140 may also be formed with a polymeric composite material, optionally the same material used to form the foot support member 124.

Figure 33:
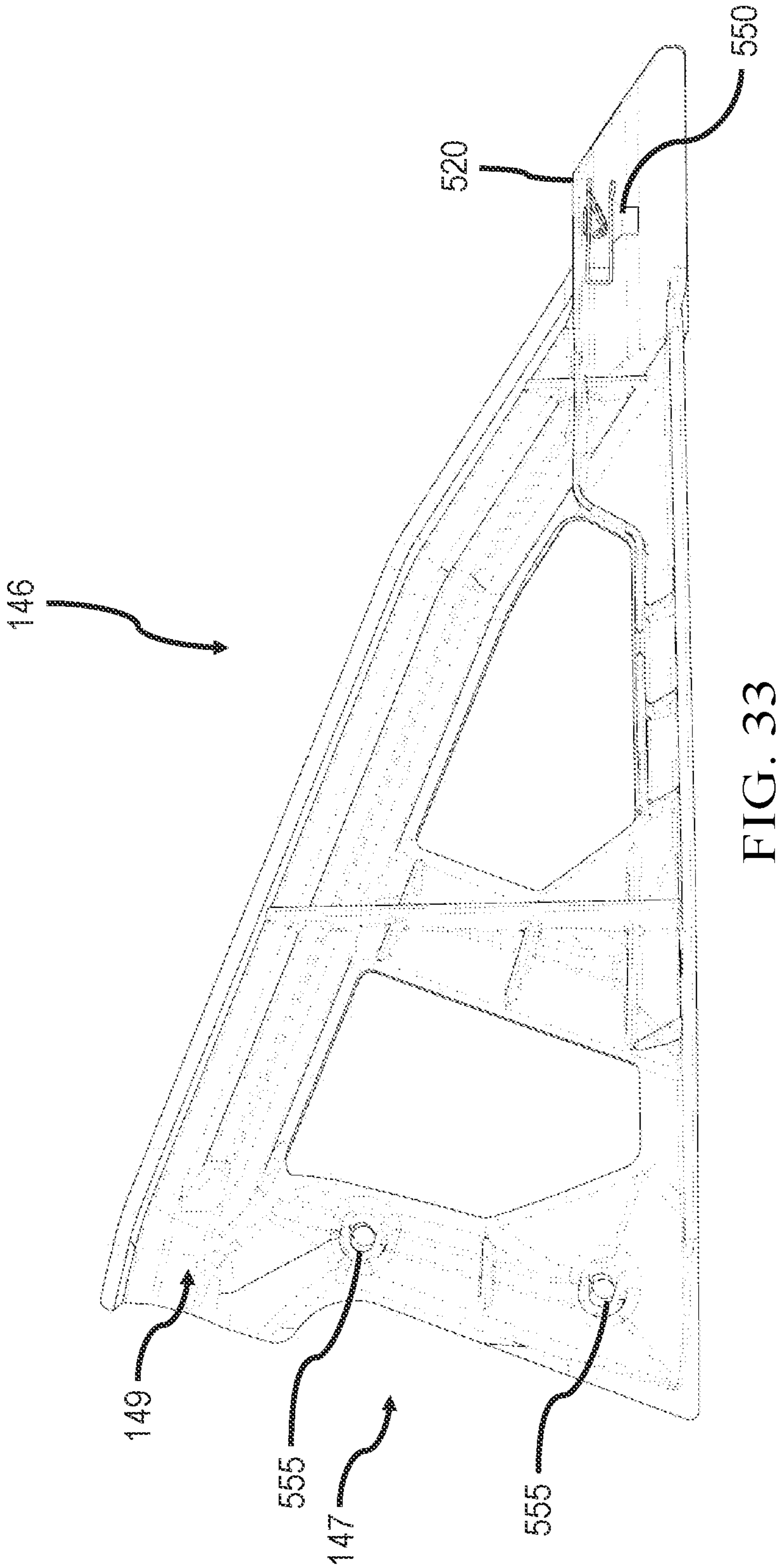
FIG. 33 illustrates a bottom view of the rear kick-up panel of the running board assembly, according to some embodiments.
Figure 34B:
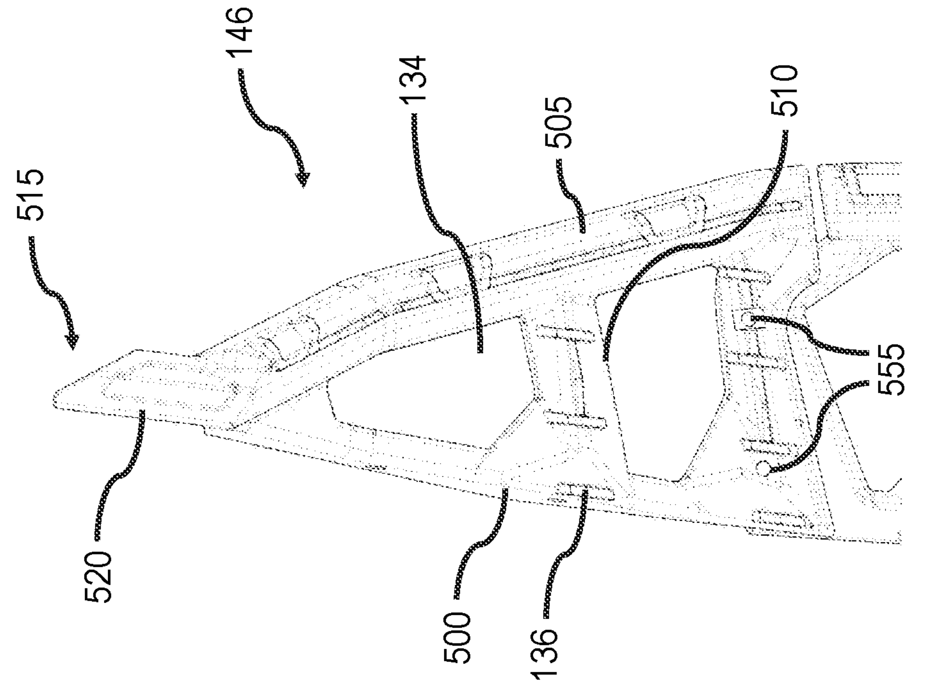
FIG. 34B illustrates a top view of the foot support member and the rear kick-up panel of the running board assembly, according to some embodiments.
Figure 34A:
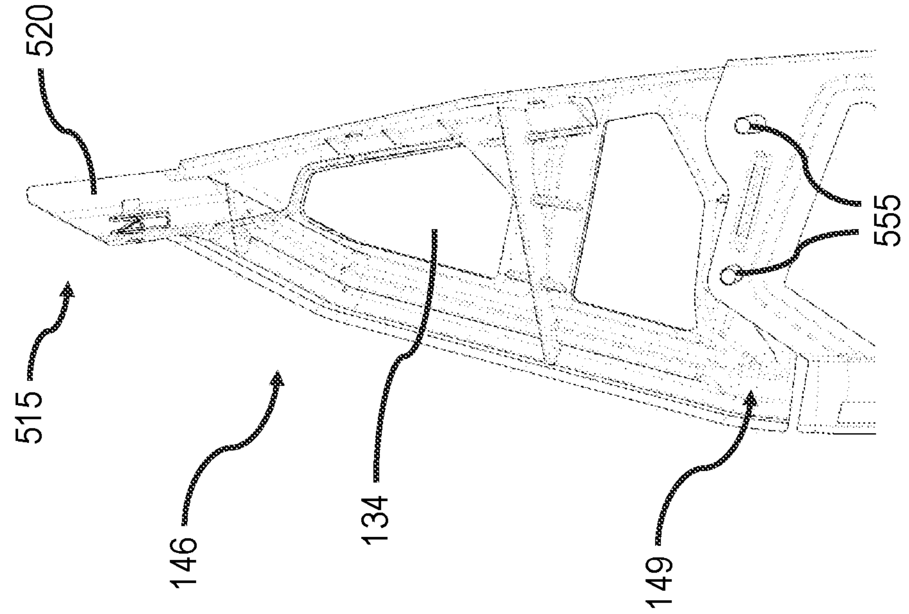
FIG. 34A illustrates a bottom view of the foot support member and the rear kick-up panel of the running board assembly, according to some embodiments.
Figure 35B:
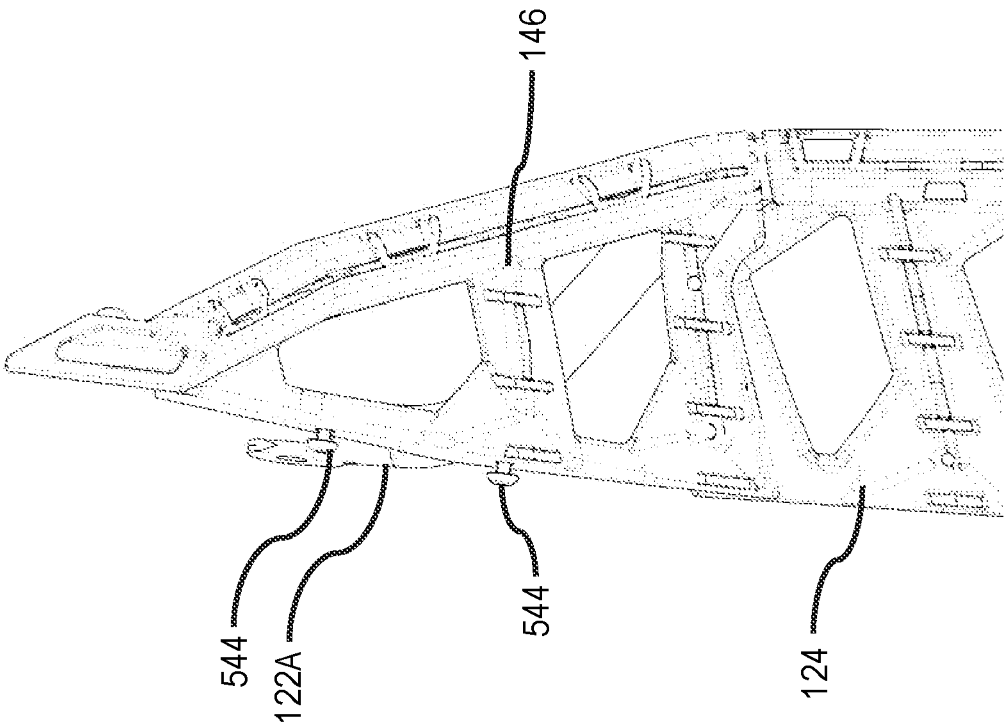
FIG. 35B illustrates a top view of the foot support member, the support member, and the rear kick-up panel of the running board assembly, according to some embodiments.
Figure 35A:
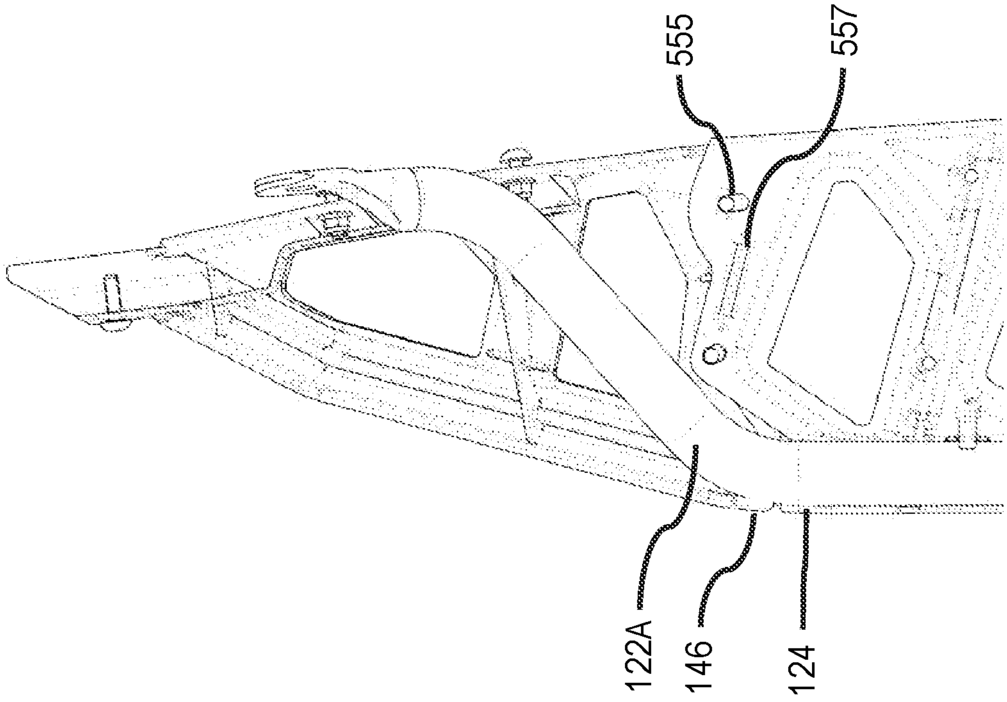
FIG. 35A illustrates a bottom view of the foot support member, the support member, and the rear kick-up panel of the running board assembly, according to some embodiments.
Figure 35C:
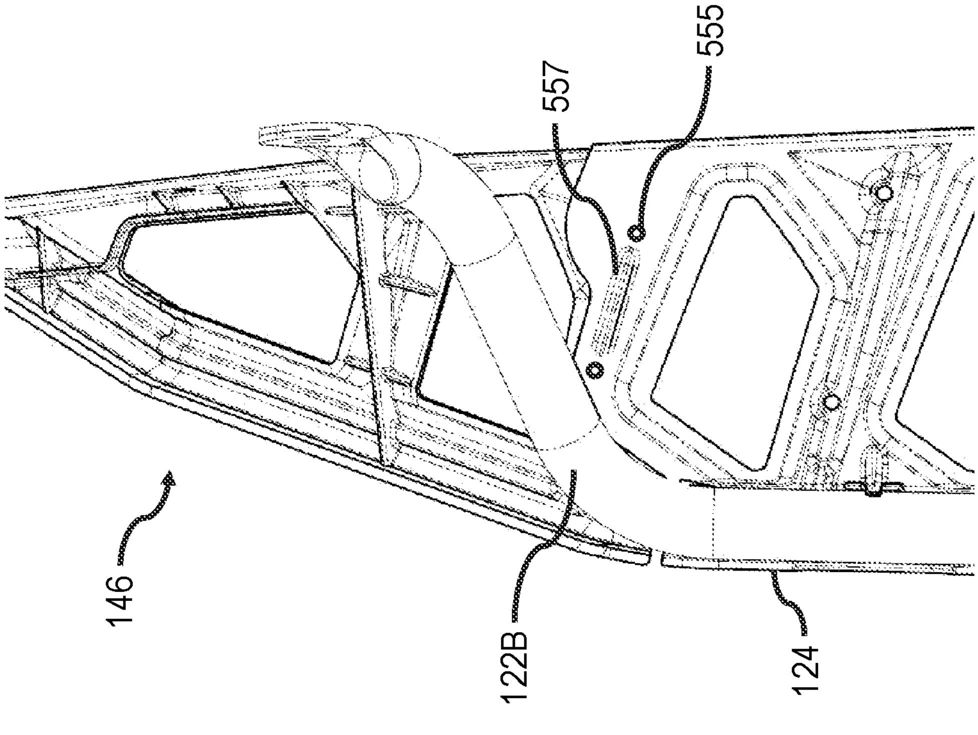
FIG. 35C illustrates a bottom view of a foot support member in a second position associated with the second snowmobile of FIG. 8, according to some embodiments.
Figure 36:
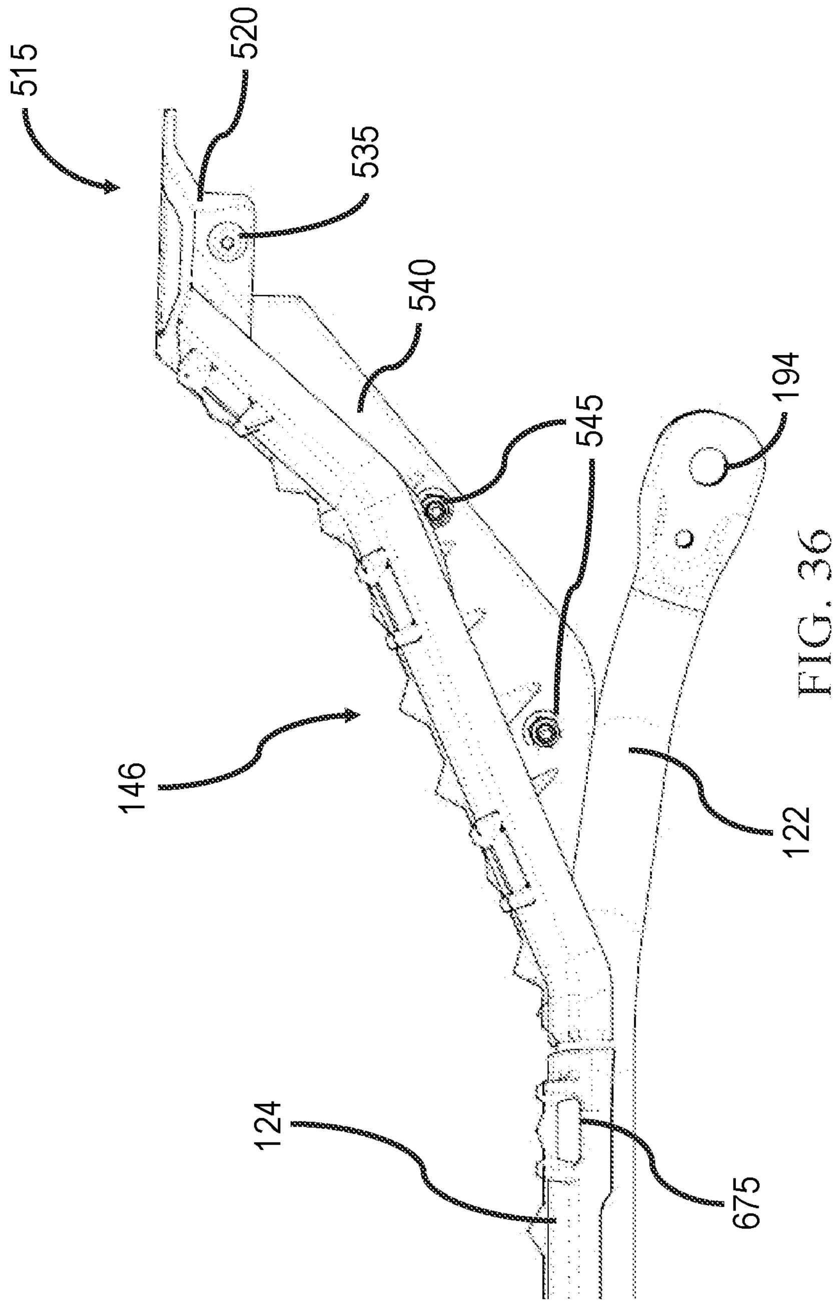
FIG. 36 illustrates a side view of the foot support member, the support member, and the rear kick-up panel of the running board assembly, according to some embodiments.

As illustrated in FIGS. 32-37, the running board assembly may include a rear kick-up panel 146 that is supported by the support member 122 on the forward outboard end of the rear kick-up panel 146, and is removably secured to the rearward end of the foot support member 124 on the forward end rear kick-up panel, and the tunnel 104. The rear kick-up panel 146 includes a first rail 500, a second rail 505, and one or more cross members 510 extending between the first rail 500 and the second rail 505. The forward end 147 of the rear kick-up panel 146 may overlap a rearward end of the foot support member 124, and one or more removable fasteners or alignment pins 555 may be provided to maintain positioning of the foot support member 124 and the rear kick-up panels 146. As shown in FIGS. 33 and 36, the second rail 505 defines a channel 149 at the forward end 147 that is positioned adjacent the foot support member 124 and is shaped to receive a portion of the support member 122 therein. The first rail 500 and the second rail 505 extend from the forward end 147 and converge at a rearward end 515 to define a member 520 extending therefrom. As shown in FIGS. 17A-B, the member 520 is inserted in a hollow member 525 extending from the rear bumper 530. A threaded fastener 535 may be inserted through coaxially aligned apertures on the member 520 and the hollow member 525 to removably secure the kick-up panel 146 to the rear bumper 530 with, for example, a clip nut 550 positioned on an underside of the member 520. The member 520 is optionally removably secured to the side panel 182. In an illustrative example as shown in FIGS. 35A and 35C, the foot support member 124 may define one or more slots 557 that are alignable with the apertures 555 in the rear kick-up panel 146. As shown in FIG. 36, a flange 540 extends downward from the first rail 500 and is positioned adjacent the side panel 182 of the tunnel 104, and is removably secured thereto with threaded fasteners 544 inserted from the inner surface of the side panel 182, that optionally also extend through the body 185 of the support bracket 184, and outward through the flange 540 and secured with nuts 545. The rear kick-up panels 146 may also comprise a polymeric composite material, optionally the same material used to form the foot support member 124. The rear kick-up panels 146 may also define apertures 134 and ridges 136 similar to those of the foot support member 124 as best shown in FIGS. 34A and 34B.

Figure 13:
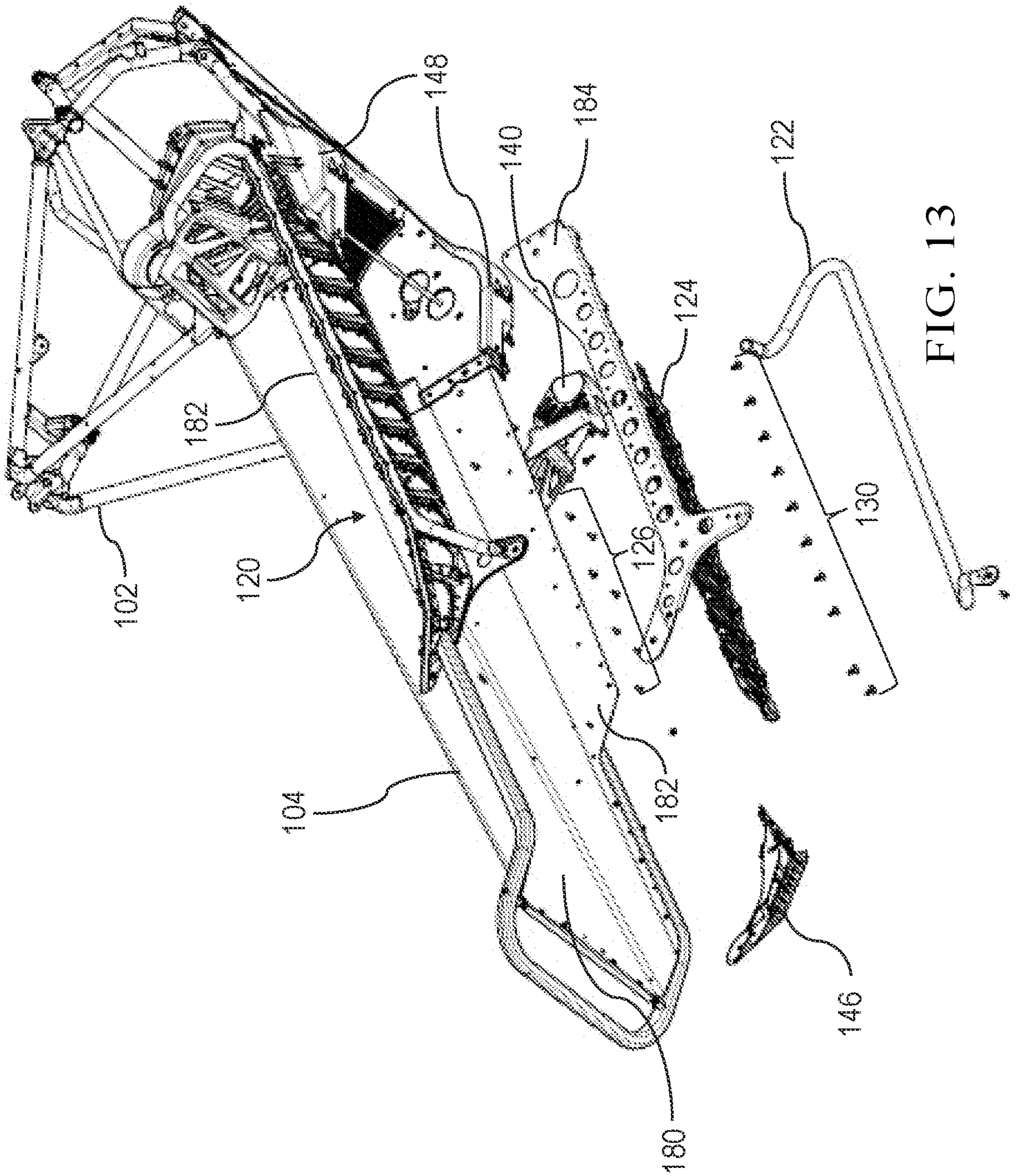
FIG. 13 illustrates an exploded bottom view of the running board assembly of FIG. 11, according to some embodiments.
Figure 14:
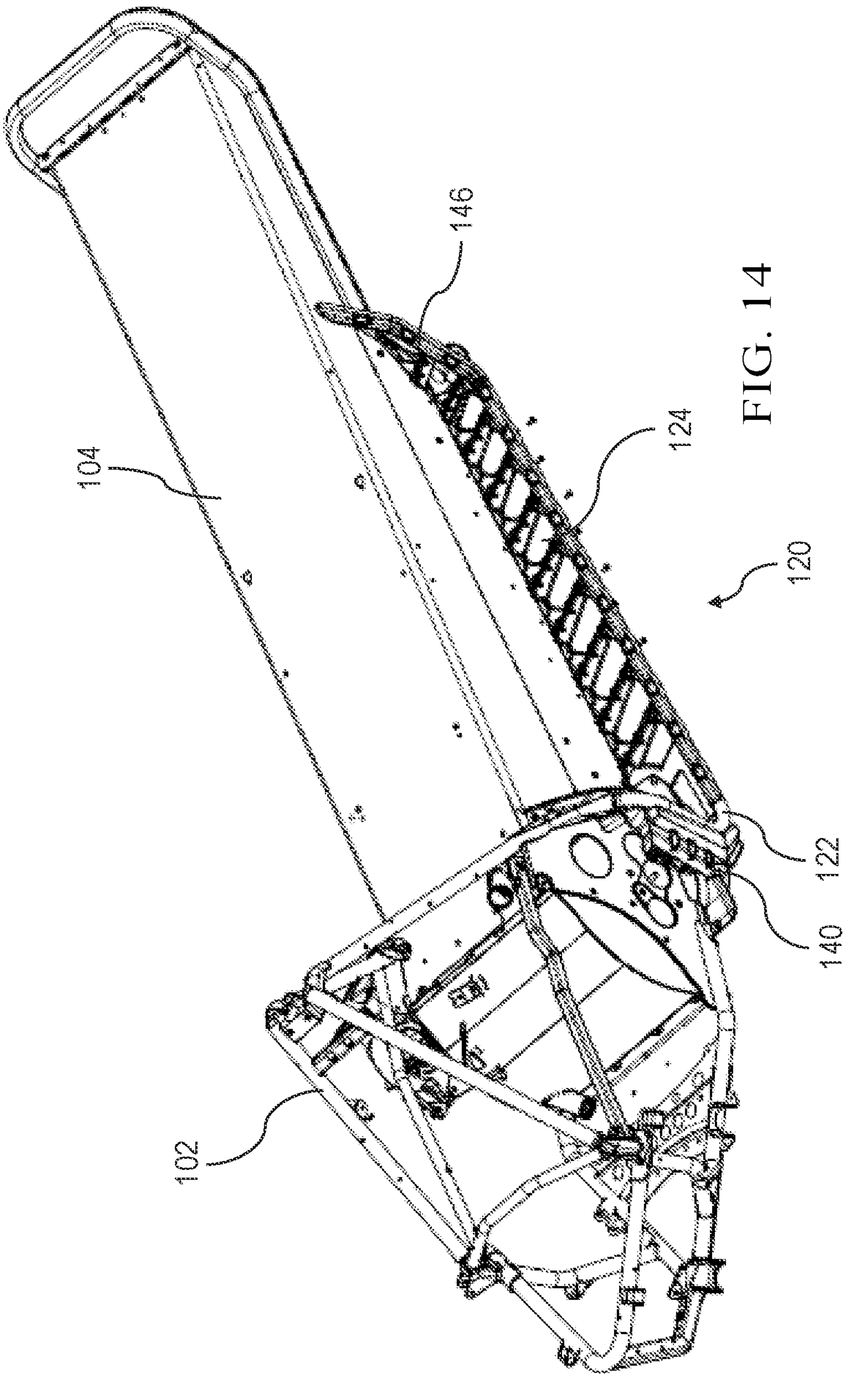
FIG. 14 illustrates an alternative perspective top view of the snowmobile chassis having the running board assembly attached to the tunnel, according to some embodiments.
Figure 15A:
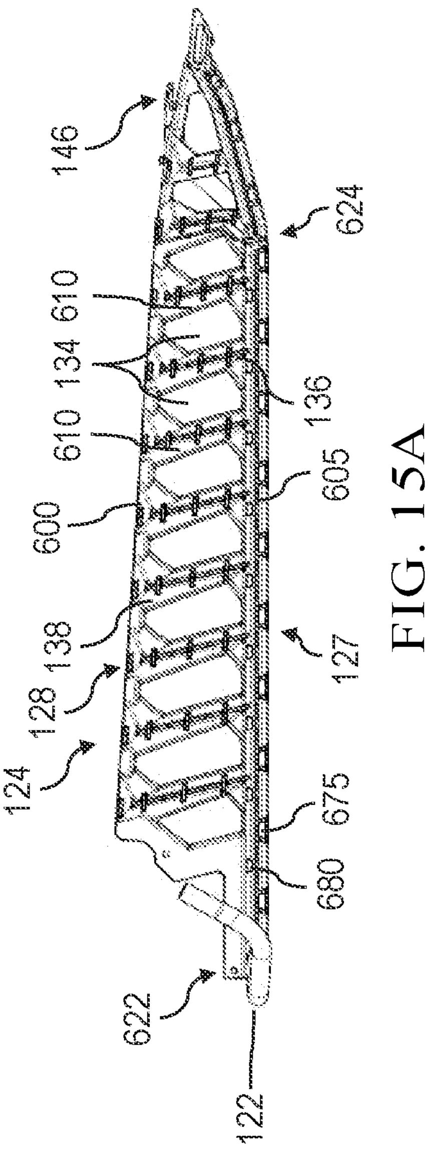
FIG. 15A illustrates an isolated top view of the running board assembly, according to some embodiments.
Figure 15B:
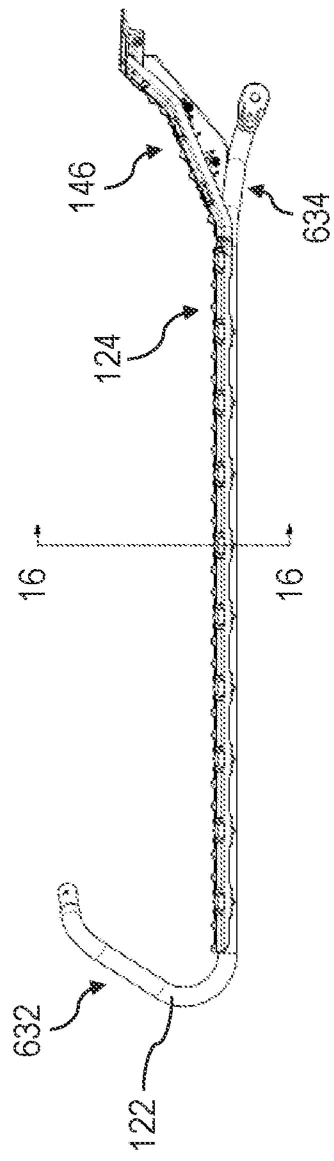
FIG. 15B illustrates an isolated side view of the running board assembly, according to some embodiments.
Figure 15C:
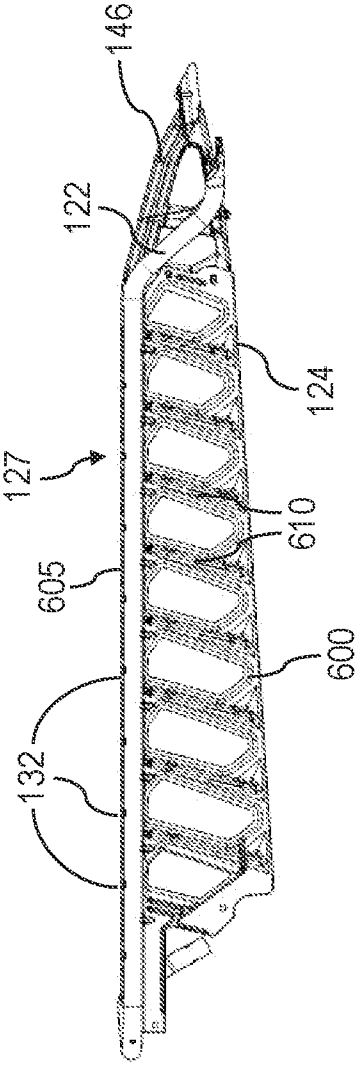
FIG. 15C illustrates an isolated bottom view of the running board assembly, according to some embodiments.
Figure 27A:
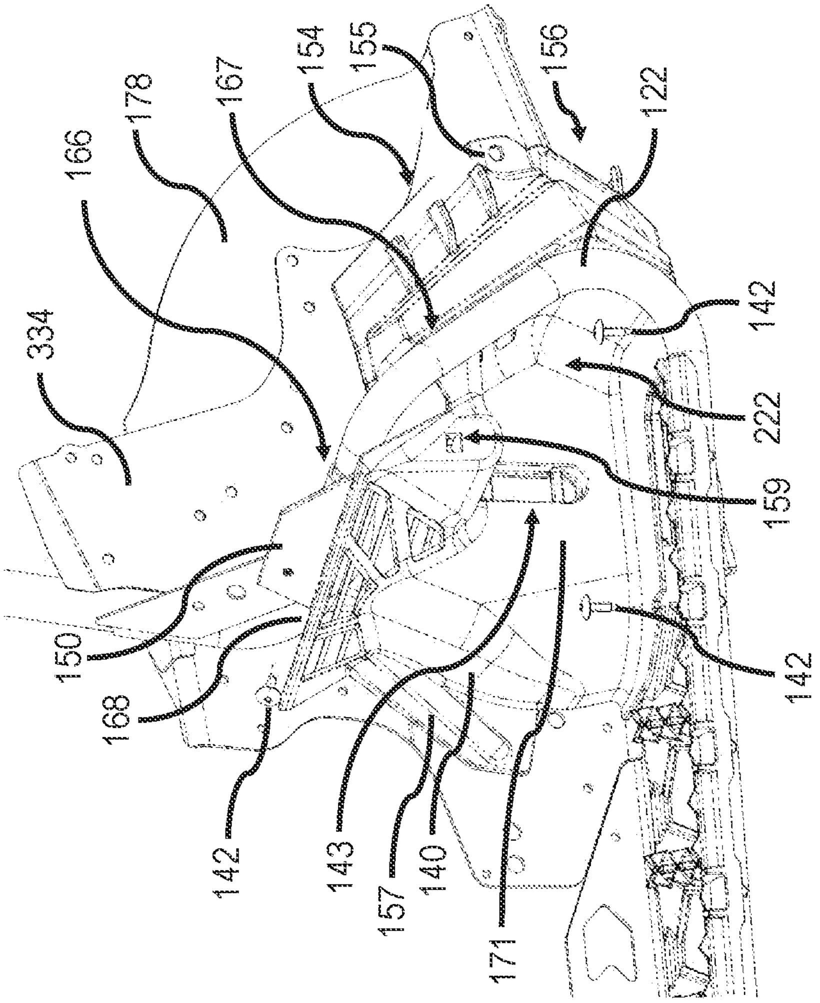
FIG. 27A illustrates a top perspective view of the front toe stop, the foot support member, and the support member of the running board assembly, according to some embodiments.
Figure 27B:
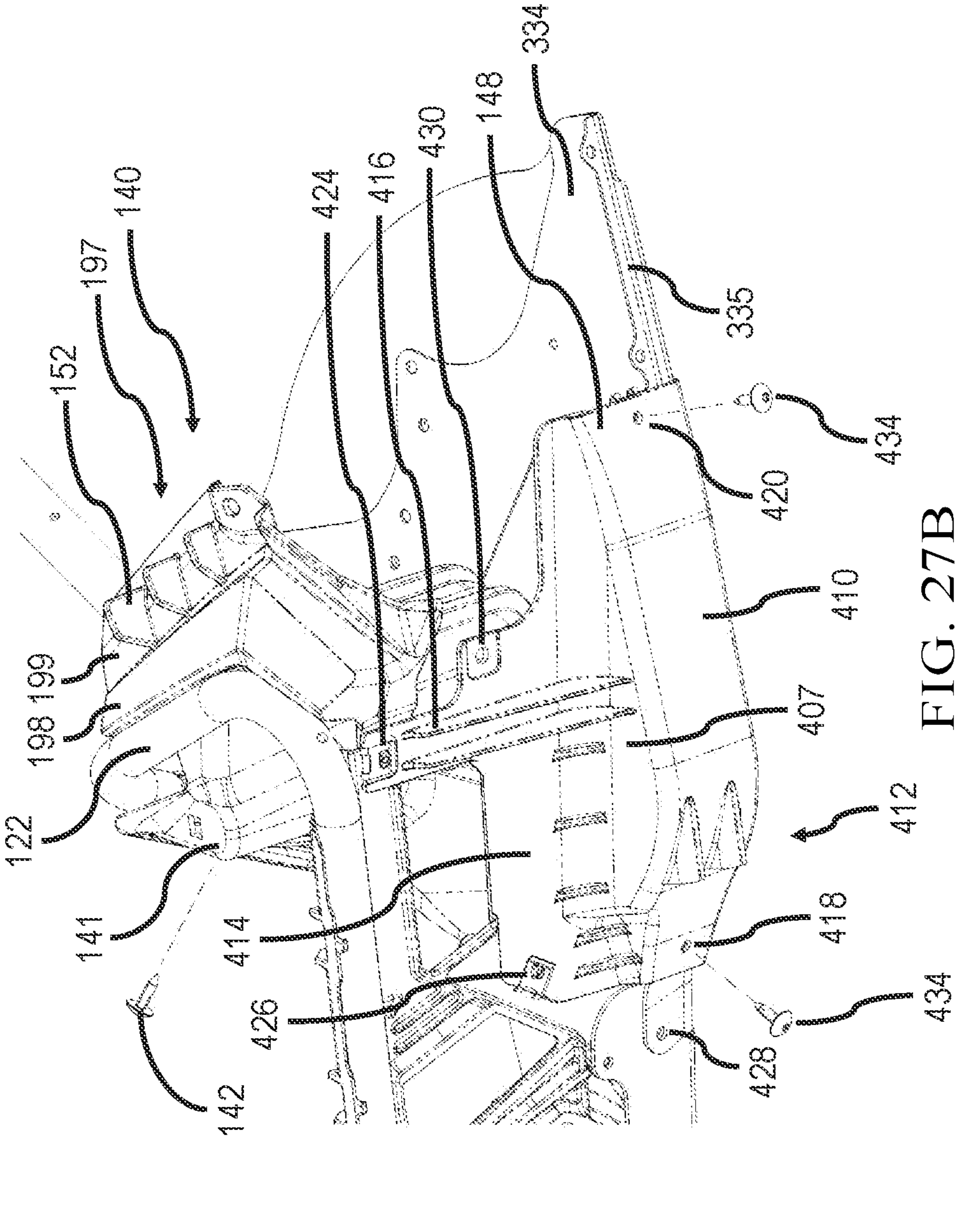
FIG. 27B illustrates a bottom perspective view of the front toe stop, the foot support member, and the support member of the running board assembly, according to some embodiments.
Figure 30:
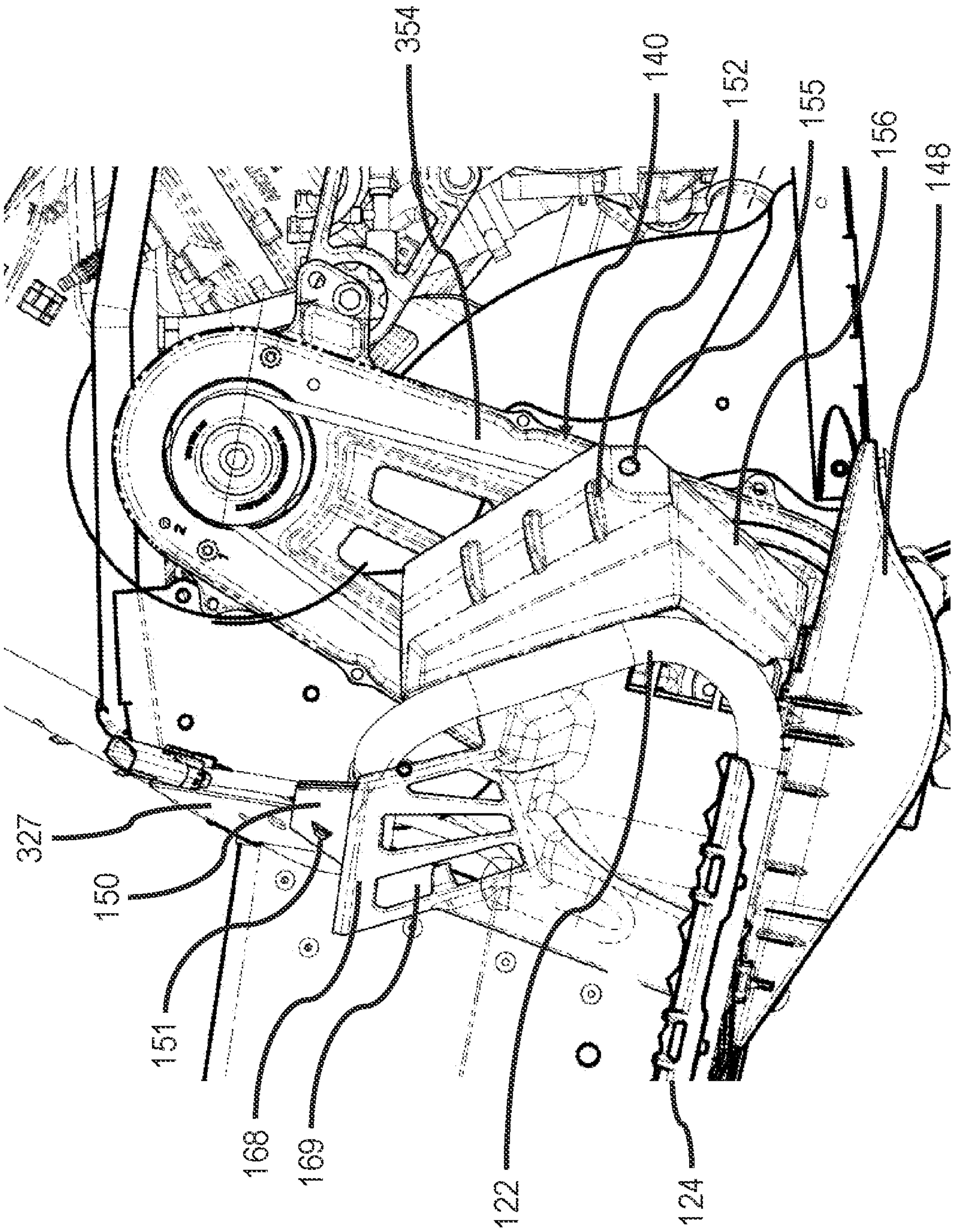
FIG. 30 illustrates a side view of the front toe stop, the foot support member, and the support member of the running board assembly, according to some embodiments.
Figure 31:
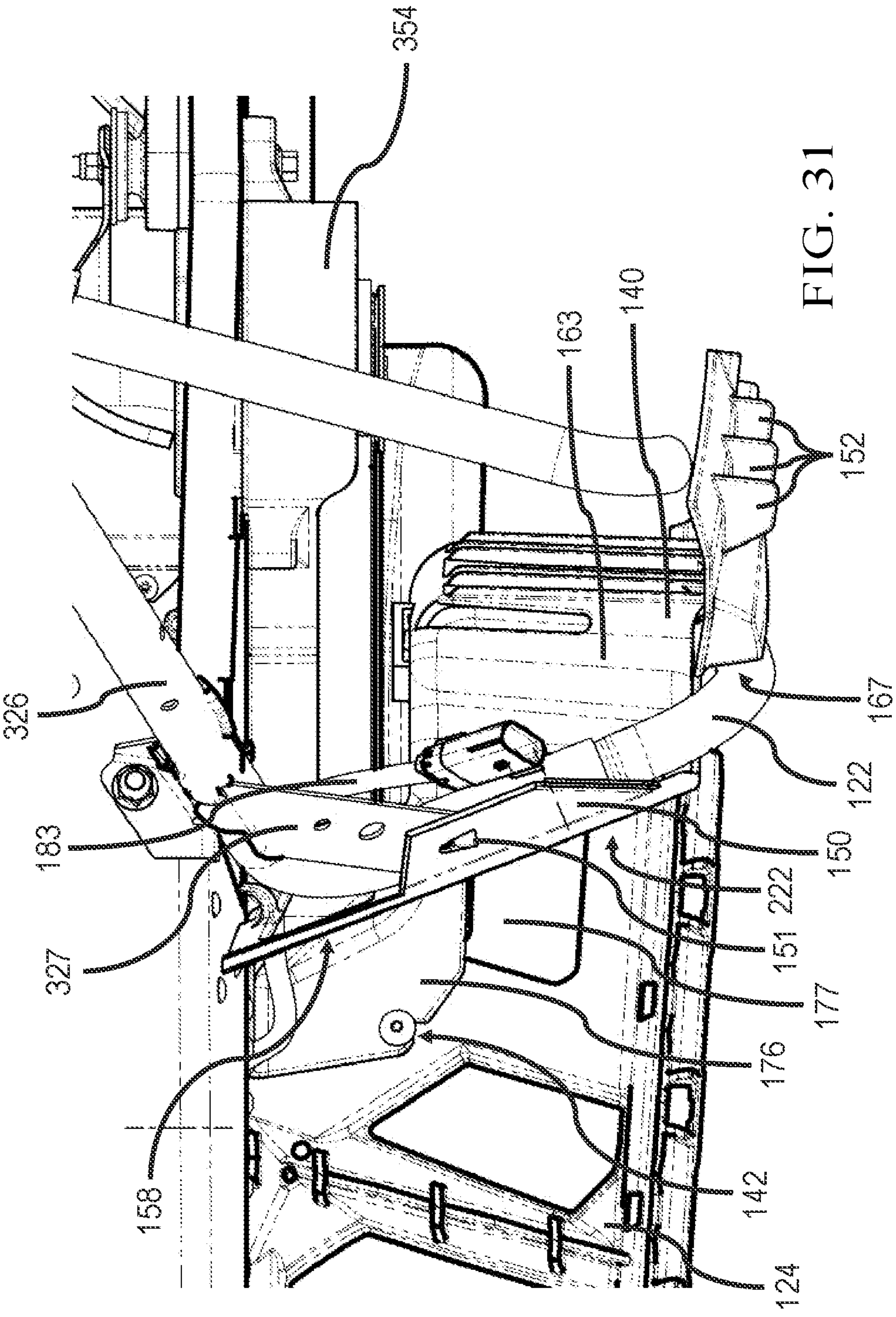
FIG. 31 illustrates a bottom view of the front toe stop, the foot support member, and the support member of the running board assembly, according to some embodiments.
Figure 32:
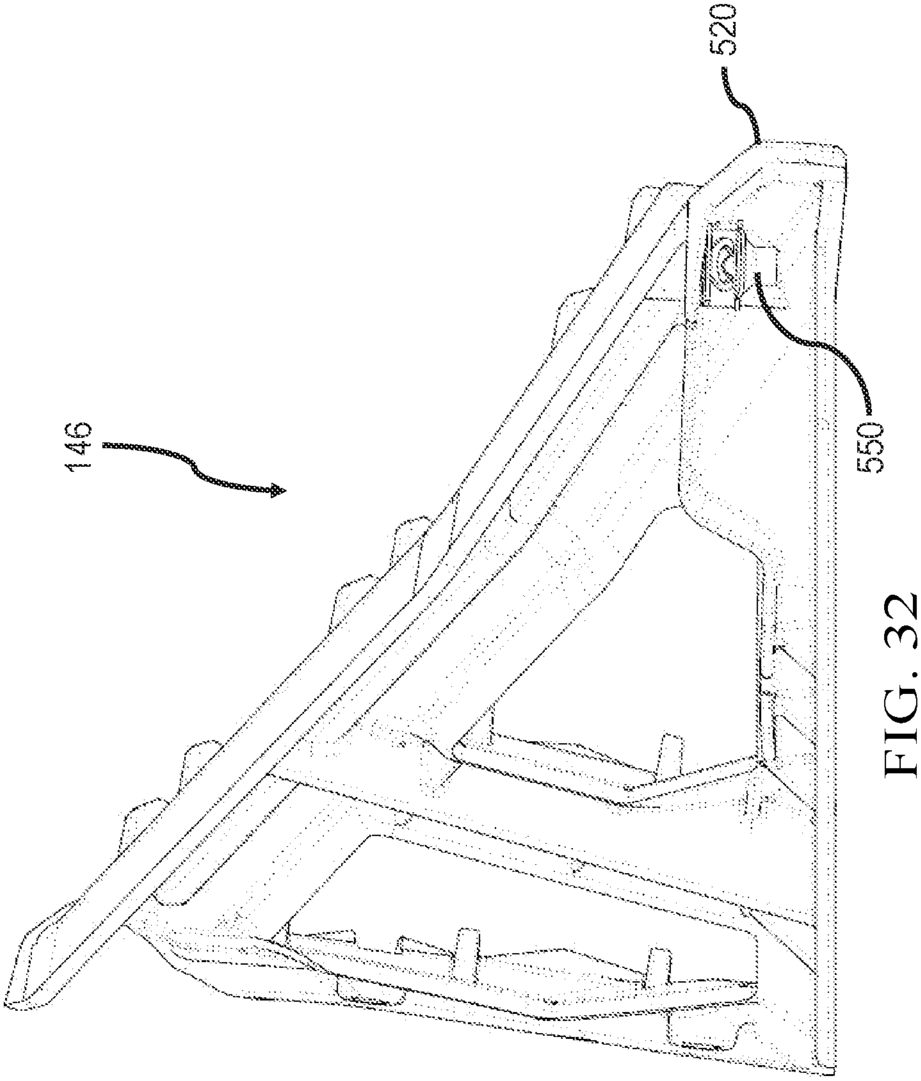
FIG. 32 illustrates a side view of the rear kick-up panel of the running board assembly, according to some embodiments.

The snowmobile 100 further includes bottom-out protectors 148, best shown in FIGS. 13, 27B, and 30, that project from the chassis 102 and are configured to absorb some impact forces to they are not transmitted directly to the chassis 102. The bottom-out protectors 148 are positioned on the chassis 102 in a location lower than the tunnel 104 and the foot support member 124, outboard of the tunnel 104, and inboard of the support member 122 of the running board assembly. The bottom-out protectors 148 are shock absorbers that are configured to strike a ground based obstacle before it can connect another part of the chassis 102. The bottom-out protectors 148 are formed from a resilient material, such as, for example, an unfilled thermoplastic olefin material.

Figure 37A:
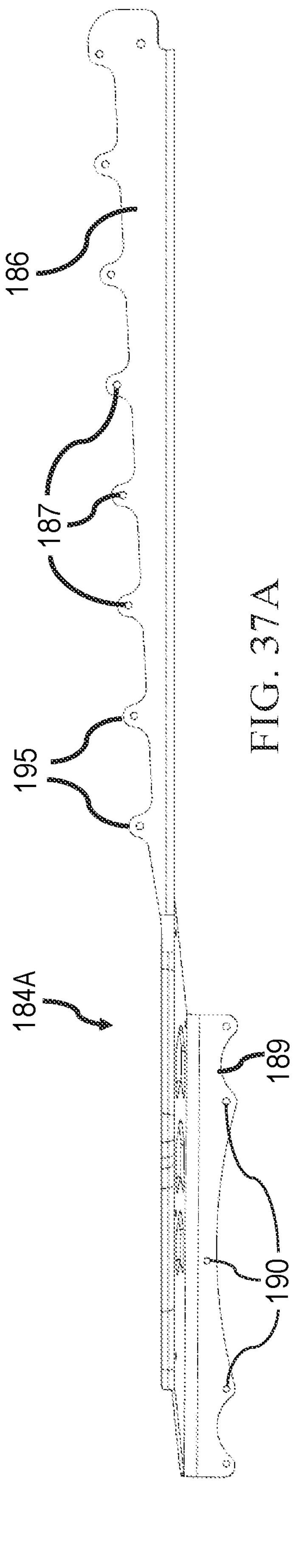
FIG. 37A illustrates a top view of a tunnel support bracket for the running board assembly, according to some embodiments.
Figure 37B:
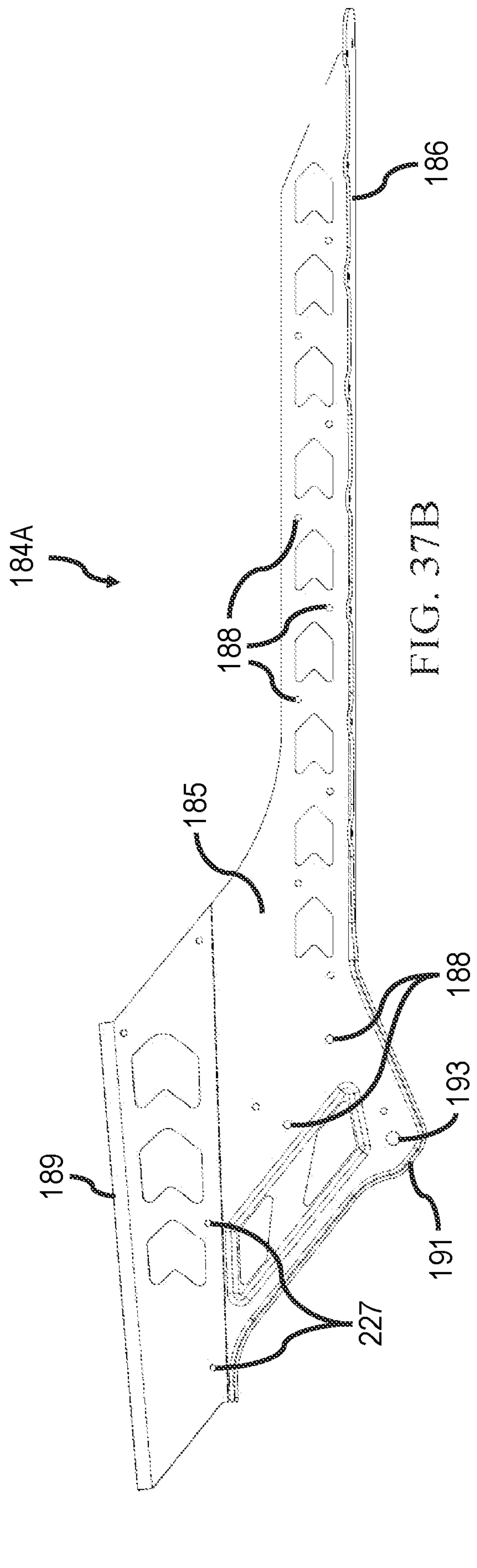
FIG. 37B illustrates a side view of a tunnel support bracket for the running board assembly, according to some embodiments.
Figure 37C:
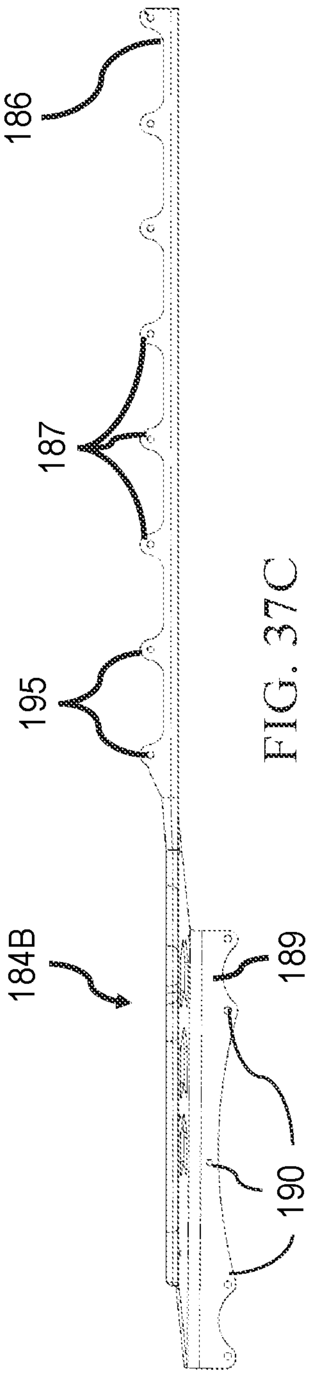
FIG. 37C illustrates a top view of a support bracket for the running board assembly associated with the second snowmobile of FIG. 8, according to some embodiments.
Figure 37D:
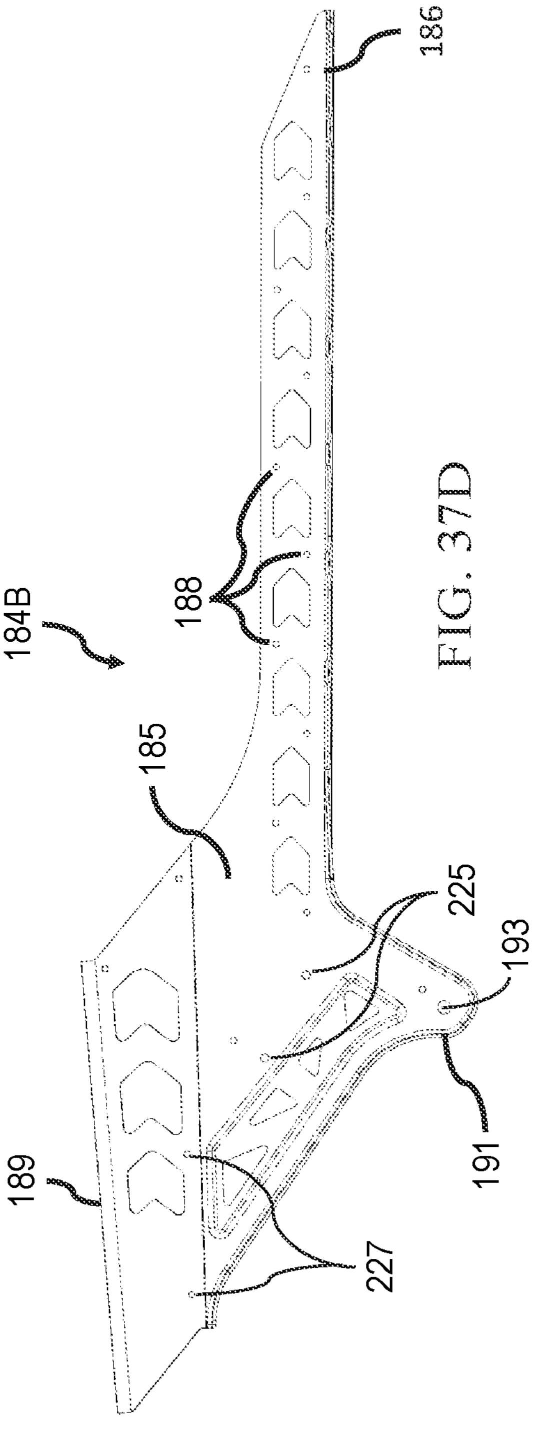
FIG. 37D illustrates a side view of the support bracket of FIG. 37C, according to some embodiments.
Figure 38:
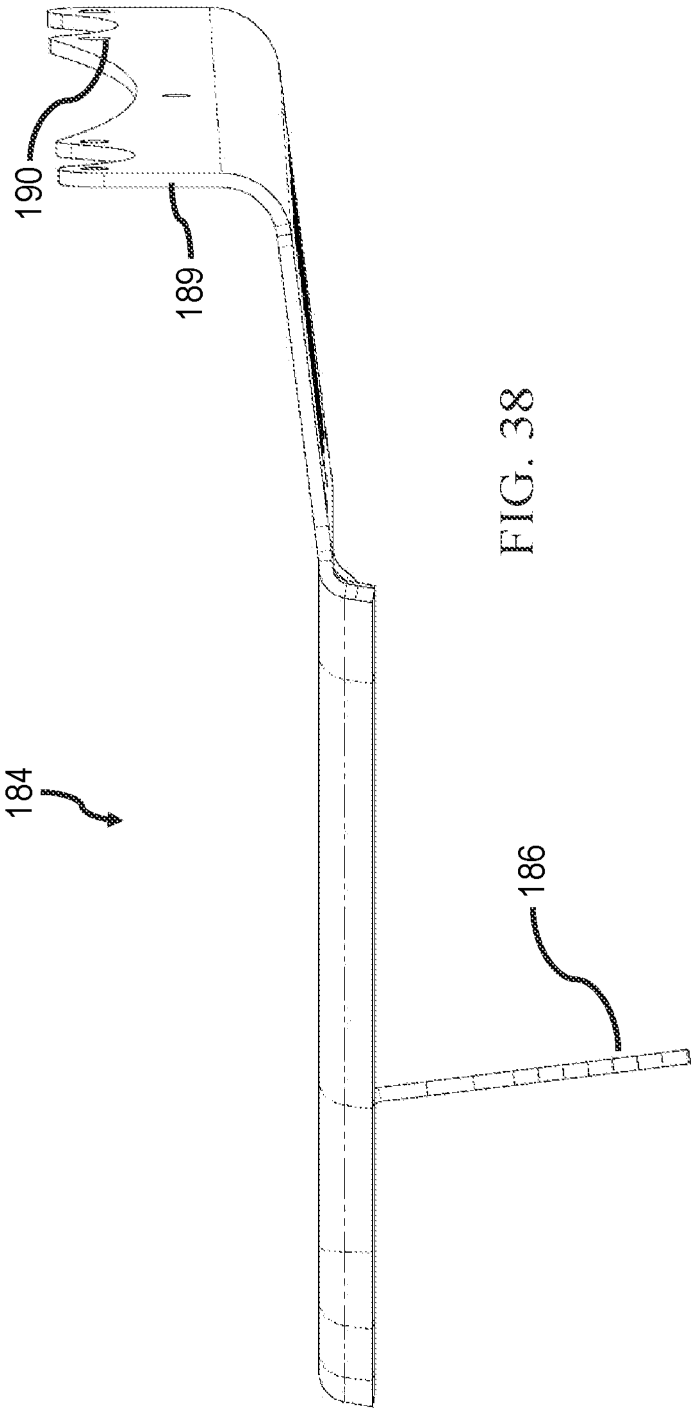
FIG. 38 illustrates an end view of a tunnel support bracket for the support member of the running board assembly, according to some embodiments.
Figure 40A:
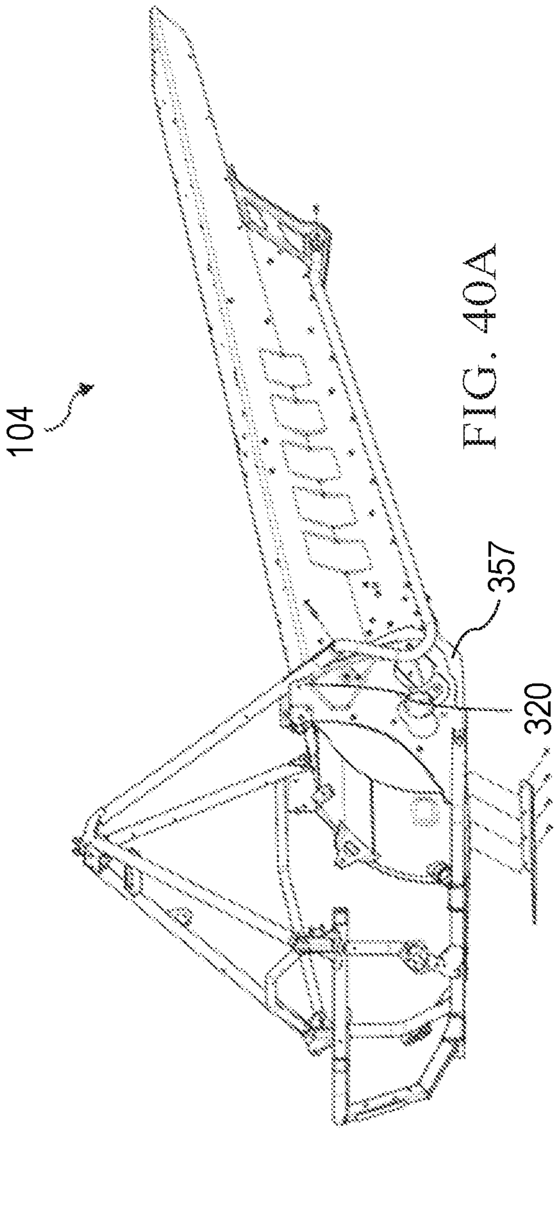
FIG. 40A illustrates a perspective view of a snowmobile subassembly, according to some embodiments.
Figure 40B:
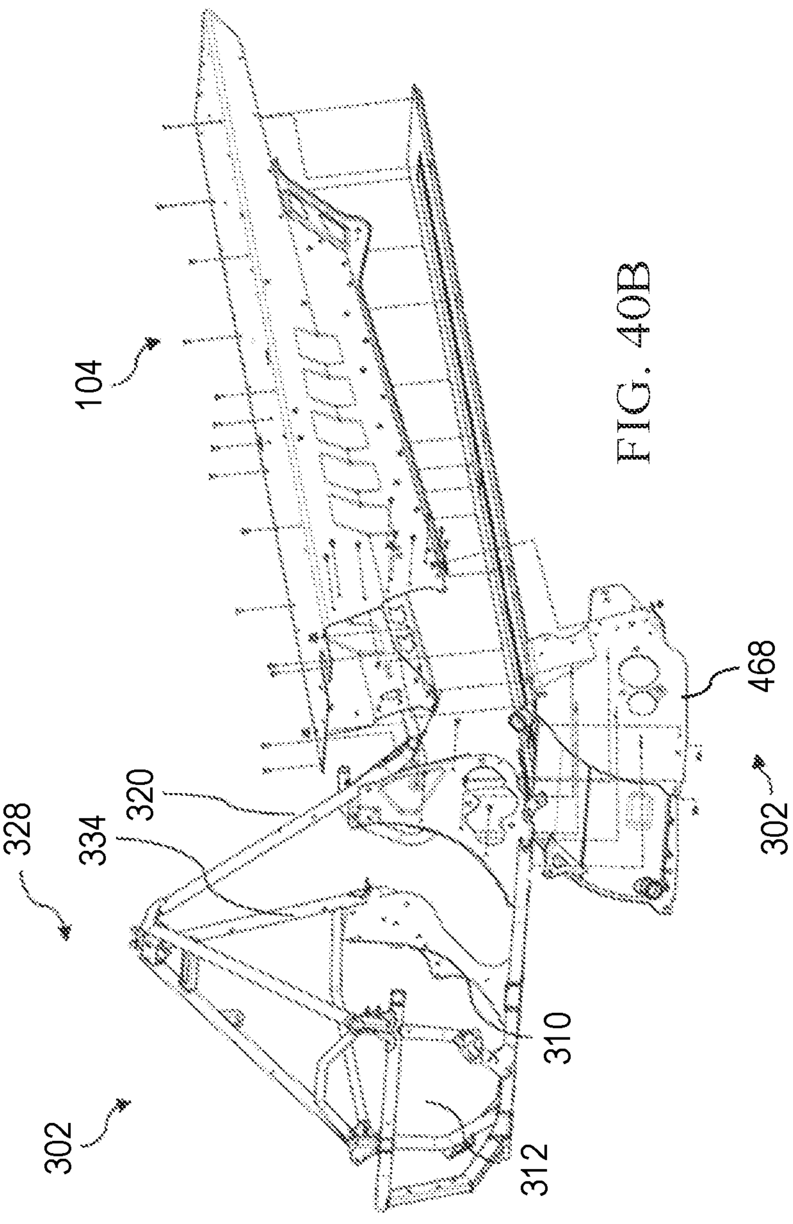
FIG. 40B illustrates an exploded view of a snowmobile subassembly, according to some embodiments.
Figure 40C:
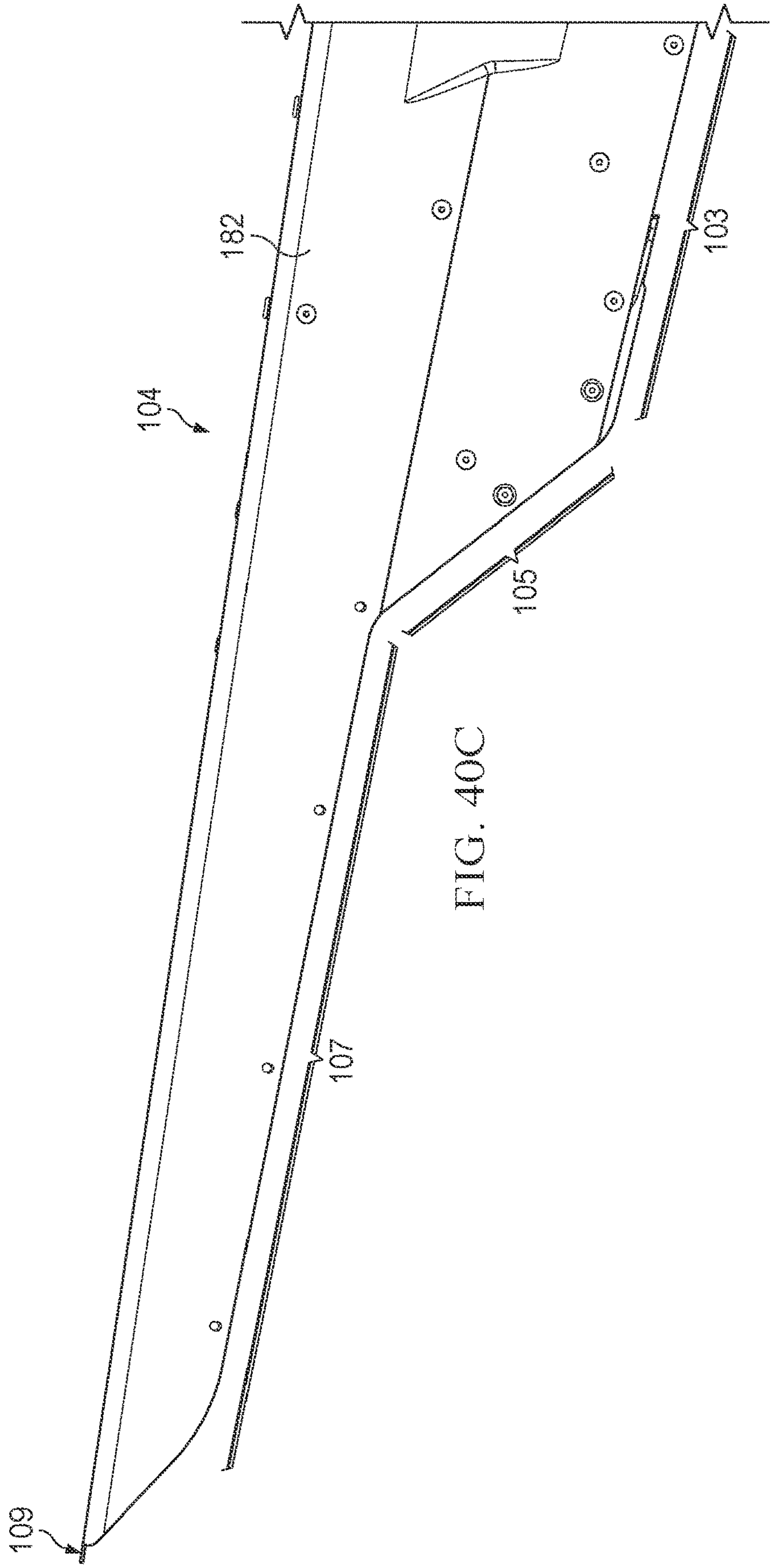
FIG. 40C illustrates a side view of the tunnel of FIG. 40A with the support bracket and support tube removed for viewing purposes, according to some embodiments.
Figure 43:
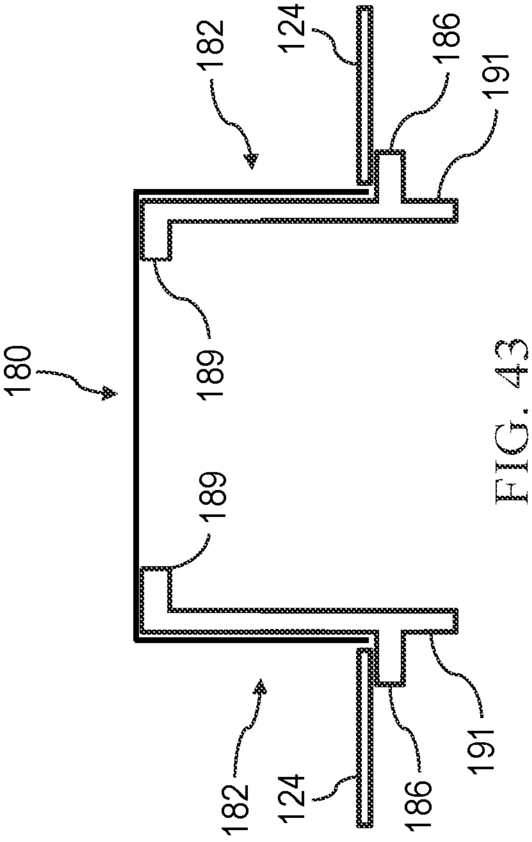
FIG. 43 illustrates a rear view of the snowmobile frame, according to some embodiments.

As shown in FIGS. 37A and 37B, the support bracket 184 is provided with a body 185 that includes a plurality of apertures 188 for receiving the fasteners 126 to secure the running board support bracket 184 to an interior surface of the side panel 182. As shown in FIGS. 37A and 43, the running board support includes an upper flange 189 that is positionable along the underside of the center plate 180 and extends toward a centerline of the tunnel 104. The upper flange 189 is provided with a plurality of apertures 190 for receiving fasteners therethrough to secure the upper flange 189 to the underside of the center plate 180. As shown in FIG. 40C, the tunnel 104 comprises a lower end, the lower end including a first length 103, a transition length 105, and a second length 107 extending to a rear end 109 (i.e., a second end) of the tunnel 104.

The tunnel 104 of the snowmobile may also include a center plate 180 and a first and second side panel 182. The first side panel 182 includes a first end that is connected to the center plate 180 and a second end extending away from the center plate 180. The second side panel 182 also includes a first end that is connected to the center plate 180 and a second end that extends from the center plate 180. As shown in FIG. 43, a first running board support bracket 184 is secured to an interior surface of the first side panel 182, and a second running board support bracket 184 is secured to an interior surface of the second side panel 182. Each running board support 184 includes a mounting surface 186 extending underneath the second ends of the side panels 182 and outboard from the side panel 182 that the support brackets 184 are removably secured to. The mounting surface 186 may be provided with one or more projections 195 extending outward, and the apertures 187 may be provided on the projections 195. The apertures 187 for receiving the fasteners 130 for securing the support brackets 184 to the mounting surface 186 may each be positioned at the distance from the longitudinal centerline of the tunnel 104. Optionally, one or more of the apertures 187 may be positioned at a greater distance from the longitudinal centerline of the tunnel 104 than the other apertures 187.

Figure 44:
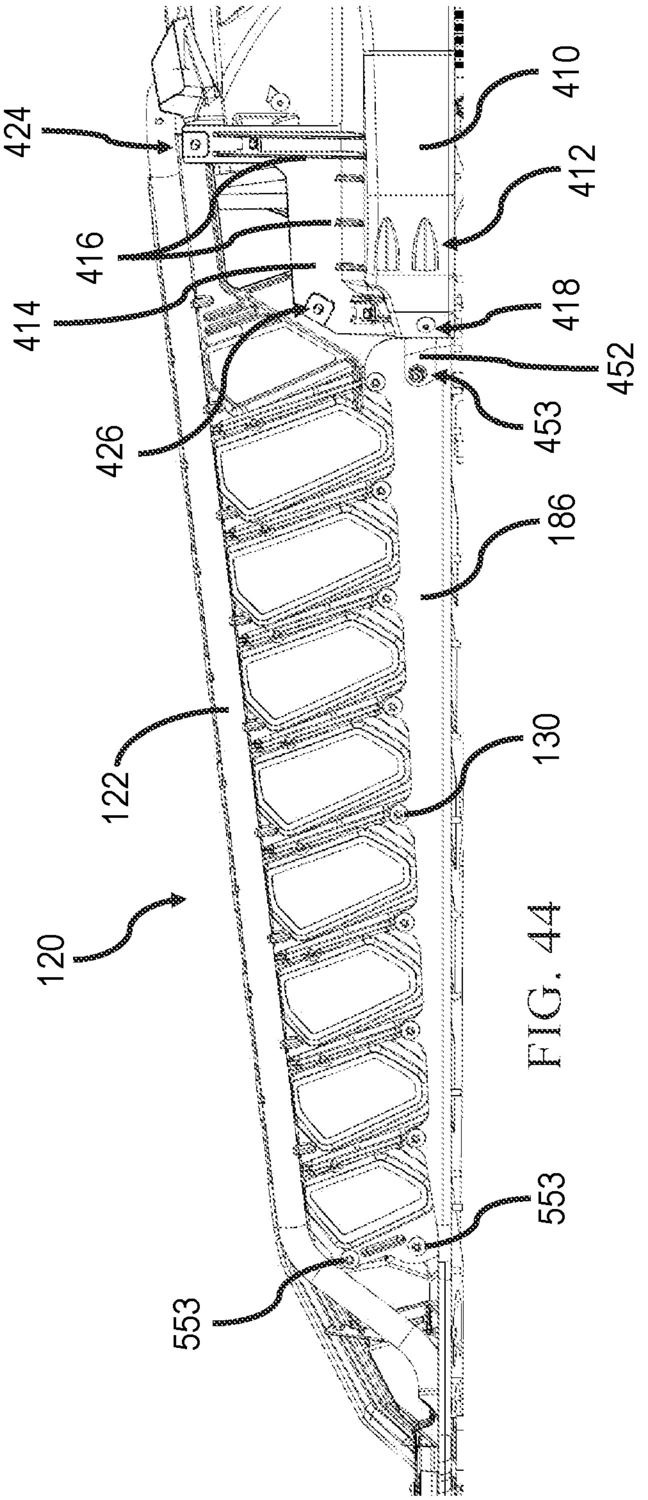
FIG. 44 illustrates a bottom view of the foot support member, the support member, and the rear kick-up panel of the running board assembly installed on the snowmobile, according to some embodiments.
Figure 45:
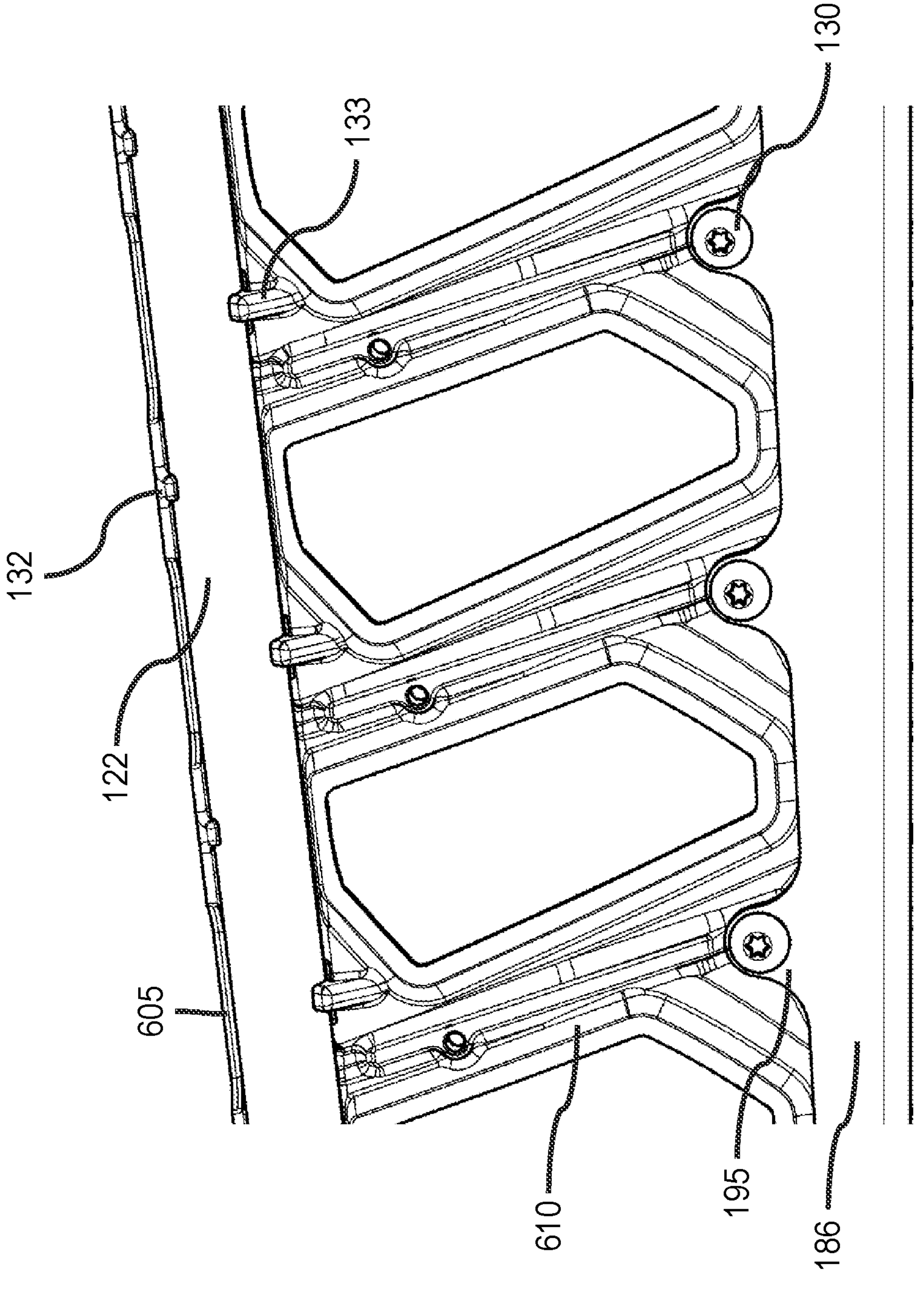
FIG. 45 illustrates a close-up bottom view of the foot support member and the support member, according to some embodiments.

As shown in FIGS. 44 and 45, the fasteners 130 used to secure the foot support member 124 may be inserted through the apertures 187 in the support bracket 184 and threaded into the foot support member 124. The fasteners may be inserted into the first rail 600, the cross member 610, or an area positioned at the intersection of the first rail 600 and the cross member 610.

Figure 7:
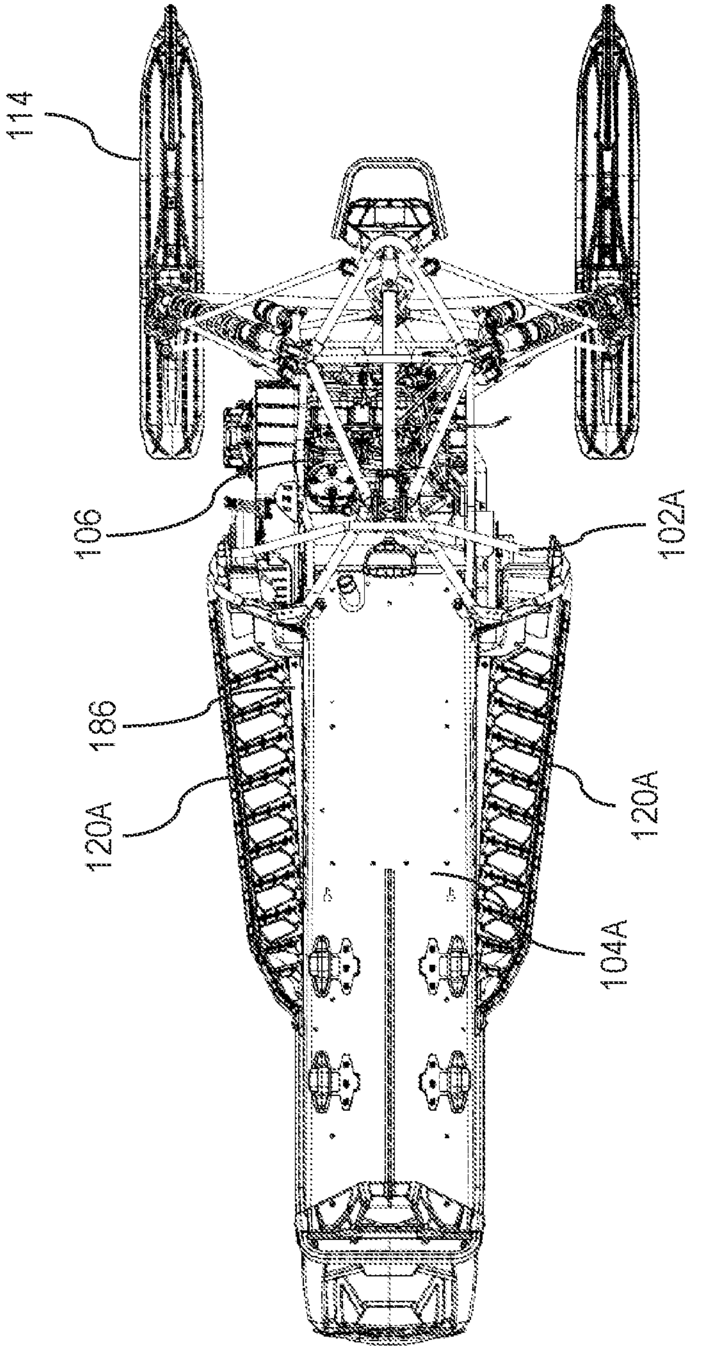
FIG. 7 illustrates a top view of a snowmobile with portions of the engine cover removed, according to some embodiments.
Figure 12:
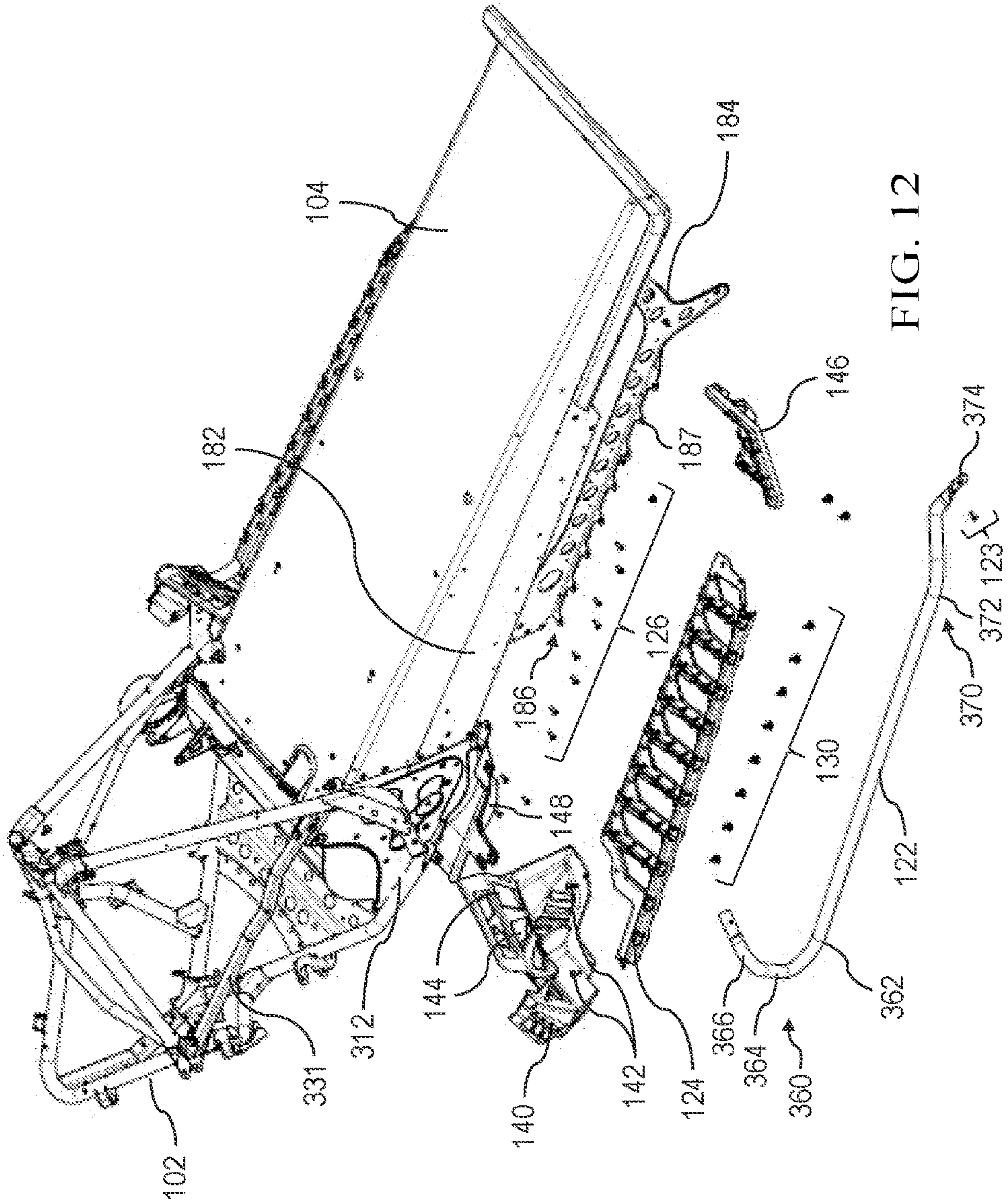
FIG. 12 illustrates an exploded top view of the running board assembly of FIG. 11, according to some embodiments.

In a non-limiting example, the foot support member 124 may be positioned in different configurations with respect to one or both of the chassis 102 and tunnel 104 by modifying one or both of the support member 122 and the running board support bracket 184. As shown in FIG. 37A, the support bracket 184 is provided with a series of the apertures 187 for receiving fasteners 130 for removably securing the foot support member 124 thereto. In a first configuration as shown in FIGS. 7 and 37A, the apertures 187 on the mounting surface 186 are positioned along a line that extends progressively outward from the body 185 of the running board support 184 and the adjacent side panel 182. In a second configuration as shown in FIGS. 10 and 12, the apertures 187 on the mounting surface 186 may be positioned the same distance from the body 185 of the support bracket 184, so that the apertures 187 are positioned along a line parallel to the adjacent side panel 182. The distance that the forward end of the support member 122 extends outward from the rearward leg 326 and the sides of the snowmobile 100 can be increased or decreased to accommodate the differences between the first and second configurations. Accordingly, the same foot support member 124 can be applied to different snowmobile configurations or models without modification of the foot support member 124.

In a non-limiting example, the support bracket 184 may be used to provide targeted reinforcement of the tunnel 104, thereby allowing the tunnel 104 to be made of a thinner and lighter gauge of sheet metal or a fiber reinforced polymer. In a non-limiting example, the first side panel 182 comprises a sheet metal or metal alloy that has a first thickness and the first support bracket 184 comprises a sheet metal or metal alloy that has a second thickness that is greater than the first thickness. In addition to, or alternatively, the tunnel 104 may be comprised of a first material, e.g., aluminum or an aluminum alloy, and the first support bracket 184 may be comprised of a second material, such as steel, that is different than the first material and has a higher value of Young's modulus.

The second rail 605 may define a plurality of openings 675 from the top surface 138 to the channel 131 that extend along an outboard side of the second rail 605 and face outwardly from the tunnel 104. Optionally, the second rail 605 may define a second plurality of openings 680 from the top surface 138 to the channel 131 that extend along an outboard side of the second rail 605 and face inwardly toward the tunnel 104. The openings 680 may be offset from the openings 675 along the length of the channel 131. One or more ridges 136 may at least partially define the outer perimeter of the openings 675, and optionally the outer perimeter of the openings 680. The clips 132 may be positioned along the second rail 605 below the openings 675 and extend downward and inward toward the downward facing opening 615. The clips 133 may be positioned along the second rail 605 below the openings 680 and extend downward from the bottom surface 139 of the foot support member 124 and outward towards the downward facing opening 615. The clips 133 may be at least partially positioned along a leading edge 617 of the cross members 610 and extend outward therefrom toward the downward facing opening 615.

While the running board and running board assembly presented herein is employed on a snowmobile, different embodiments of the running board and running board assembly may be applied to other types of vehicles, such as a snow bike or a personal off-road vehicle.

Figure 39:
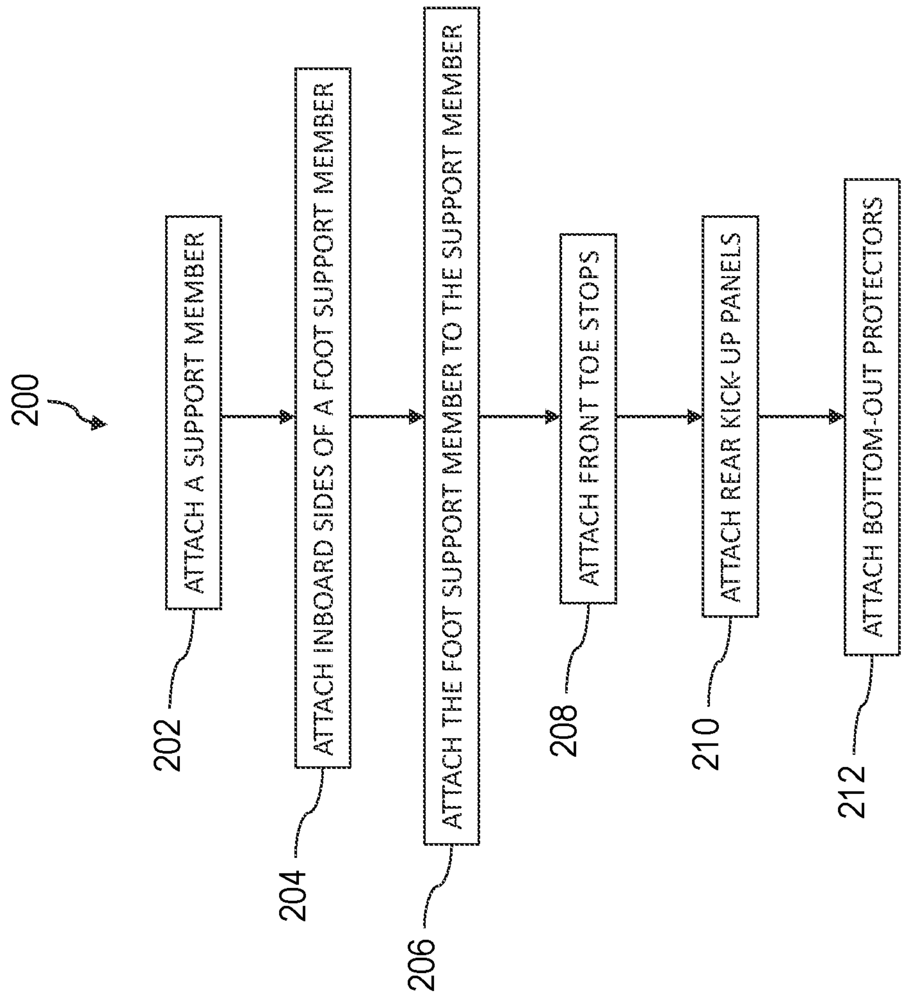
FIG. 39 is a flowchart for a method of assembling a snowmobile, according to some embodiments.

FIG. 39 shows a method 200 of assembling a snowmobile that includes a chassis 102, an engine 106 attached to the chassis and disposed within an engine bay 108, a drive track 110, a drivetrain 112 operatively interconnecting the engine with the drive track 110 and configured to deliver propulsive power to the drive track 110, a tunnel 104 attached to the chassis 102, and a running board assembly 120 attached to the tunnel 104. The method 200 includes the following steps:

STEP 202, ATTACH A SUPPORT MEMBER TO THE TUNNEL, includes attaching a support member 122 to the tunnel 104 using a first plurality of threaded fasteners such that the support member 122 is located outboard of the tunnel 104;

STEP 204, ATTACH INBOARD SIDES OF A FOOT SUPPORT MEMBER TO THE TUNNEL, includes attaching inboard sides 128 of a foot support member 124 to the tunnel 104 using a second plurality of threaded fasteners 130;

STEP 206, RETAIN OUTBOARD SIDES OF THE FOOT SUPPORT MEMBER TO THE SUPPORT MEMBER, includes retaining outboard sides 127 of the foot support member 124 to the support member 122 using a plurality of flexible clips 132 that are integrally formed with the foot support member 124 and are defined on an outboard edge of the foot support member 124. Each of the flexible clips 132 wraps around at least 51% and at most 75% of a circumference of the support member 122. The flexible clips 132 are sized to apply a compressive force to the support member 122;

STEP 208, ATTACH FRONT TOE STOPS TO THE FOOT SUPPORT MEMBER AND THE TUNNEL, includes attaching front toe stops 140 to the foot support member 124 and the tunnel 104 and arranging a plurality of openings 144 in the front toe stops 140 such that they are fluid communication with the engine bay 108 and configured to exhaust air warmed by the engine 106 from inside the engine bay 108;

STEP 210, ATTACH REAR KICK-UP PANELS TO THE FOOT SUPPORT MEMBER AND THE TUNNEL, includes attaching rear kick-up panels 146 to the foot support member 124 and the tunnel 104; and STEP 212, ATTACH BOTTOM-OUT PROTECTORS TO THE CHASSIS, includes attaching bottom-out protectors 148 formed from an unfilled thermoplastic olefin material to the chassis 102. The bottom-out protectors 148 may be formed of an unfilled thermoplastic olefin material or a thermoplastic polyurethane material. The bottom-out protectors 148 are located outboard of the tunnel 104 and inboard of the support member 122 to which the plurality of flexible clips 132 defined on the outboard edge of the foot support member 124 are attached, wherein the bottom-out protectors 148 are positioned on the chassis 102 in a location that is lower, i.e., closer to the ground, than the tunnel 104 and the foot support member 124.

As illustrated in a non-limiting example of FIGS. 40A-42D, the snowmobile 100 may include a forward frame assembly 302 including a plurality of tube members. The forward frame assembly 302 may be assembled prior to securing to one or both the tunnel 104 and heat exchanger assembly 174. The forward frame assembly 302 may define a front, a rear, and a longitudinal centerline. The forward frame assembly 302 may include a first side 304 extending substantially along the longitudinal centerline and a second side 306 extending substantially along the longitudinal centerline and spaced apart from the first side 304. Each of the first side 304 and the second side 306 includes an inner perimeter 308 defining a side opening 310. The first side 304 and the second side 306 are positioned to define a rear opening 314 therebetween at the rear of the forward frame assembly 302 for receiving the heat exchanger assembly 174, tunnel 104, or both therein.

According to one or more aspects of the present disclosure, a forward frame assembly 302 for a snowmobile 100 is provided including a forward frame 312 including a front, a rear, and a longitudinal centerline extending from front to rear. The forward frame 312 includes a first side 304 extending along the longitudinal centerline, a second side 306 extending along the longitudinal centerline and spaced apart from the first side 304. Each of the first side 304 and the second side 306 includes an inner perimeter 308 defining a side opening 310. The first side 304 and the second side 306 define a rear opening 314 therebetween at the rear of the forward frame 312 for receiving a heat exchanger assembly 174 or tunnel 104 therein.

Optionally, the first side 304 defines an outer perimeter 318, the second side 306 defines an outer perimeter 318, and a track drive shaft 352 extends across the forward frame assembly 302. The track drive shaft 352 is positioned rearward of the outer perimeter 318 of the first side 304 and forward of the outer perimeter 318 of the second side 306.

Optionally, the track drive shaft 352 is positioned rearward of the inner perimeter 308 of the first side 304 and rearward of the inner perimeter 308 of the second side 306.

Optionally, the second side 306 includes a metal plate or sheet 320 (hereinafter referred to as "the metal sheet 320") defining an aperture 322 for receiving the track drive shaft 352 therethrough when the metal sheet 320 is positioned to overlap a heat exchanger end cap 178 of the heat exchanger assembly 174 or a side of the tunnel 104.

Optionally, the metal sheet 320 of the second side 306 defines a first aperture 324 therein for receiving the track drive shaft 352 in a first position or a second position that is different than the first position.

Optionally, the second side 306 includes a rearward leg 326 extending upward and forward from the metal sheet 320 to a steering column mount component 328, a forward leg 330 extending upward and rearward to the steering column mount component 328, and a horizontal member 332 substantially extending along the longitudinal centerline from the forward leg 330 to the rearward leg 326. An upper end of the metal sheet 320 is shaped to support a rearward end of the horizontal member 332 and is removably secured thereto, and the rearward end of the horizontal member 332 is vertically positioned higher than the front end of the tunnel 104.

Optionally, the first side 304 includes a metal plate or sheet 334 (hereinafter referred to as "the metal sheet 334") defining an aperture for securing a belt housing assembly 354 thereto when the metal sheet 334 is positioned to overlap the heat exchanger end cap 178 of the heat exchanger assembly 174 or a side of the tunnel 104.

Optionally, the metal sheet 334 of the first side 304 defines a first aperture therein for securing the belt housing assembly 354 in a first position or a second position that is different than the first position.

Optionally, the first side 304 includes a rearward leg 326 extending upward and forward from the metal sheet 334 to a steering column mount component 328, a forward leg 330 extending upward and rearward to the steering column mount component 328, and a horizontal member 342 substantially extending along the longitudinal centerline from the forward leg 330 to the rearward leg 326, and a rearward end of the horizontal member 342 is vertically positioned higher than the front of the tunnel 104.

Optionally, a jack shaft extends across the forward frame 312 and is positioned beneath the horizontal member 342 of the first side 304.

Optionally, a steering column mount component 328 extends between the first side 304 and the second side 306. The first side 304 and the second side 306 each includes a leg 326, 338 extending upward and forward from the rear of the forward frame 312 to the steering column mount component 328.

Optionally, the steering column mount component 328 includes a first side including a first steering mount 344, and a second side that includes a second steering mount 346, wherein the second side is positioned rearward of the first side along the longitudinal centerline.

Optionally, the first steering mount 344 is positioned forward along the longitudinal centerline of the forward frame assembly 302, the heat exchanger assembly 174, and the tunnel 104.

Optionally, the first side 304 includes a rearward tube 338. The rearward tube 338 include a first end extending upward and forward from the metal sheet 316 to a steering column mount component 328, and a second end extending outward from the first side 304. A running board support 348 is provided that includes a tube with a first end that is mated with the second end of the first side rearward tube 338 and a second end secured to a rearward portion of the tunnel 104 or support bracket 184. The rearward tube 338 of the first side 304 and the tube of the running board support 348 define a continuous tubular length extending from the steering column mount component 328 to a rearward portion of the tunnel 104 or a side rail.

According to one or more aspects of the present disclosure, a method of assembling a snowmobile 100 is provided including providing a preassembled forward frame 312 including a front and rear, the forward frame 312 including a first side 304 and a second side 306. The first and second sides 304, 306 are spaced apart from each other to define a rear opening 314 at the rear of the forward frame 312. At least a portion of a heat exchanger assembly 174, a tunnel 104, or both are positioned in the rear opening 314 between the first side 304 and the second side 306. The preassembled forward frame 312 is then secured to the heat exchanger assembly 174, the tunnel 104, or both.

Optionally, each of the first side 304 and the second side 306 includes an inner perimeter 308 defining a side opening 310.

Optionally, the method includes inserting an engine 106 through the side opening 310 of the second side 306 and securing the engine 106 to the forward frame 312.

According to one or more aspects of the present disclosure, a method of assembling two different snowmobiles with a common forward frame on a common assembly line is provided including providing a common forward frame, providing a first rear body component or a second rear body component, securing either the first body component or the second body component to the forward frame, and securing a track drive shaft 352 in a first position with respect to the forward frame when the first body component is secured to the forward frame or securing a track drive shaft 352 in a second position with respect to the forward frame when the second body component is secured to the forward frame, wherein the first position is different than the second position. This provides the benefit of reducing the manufacturing footprint for the assembly and reducing manufacturing costs.

Optionally, the method includes securing a belt housing assembly to the forward frame, the belt drive housing defining a track drive shaft opening, wherein the track drive shaft opening is located at a first position with respect to the forward frame when the forward frame is secured to the first rear body component, and wherein the track drive shaft opening is located at a second position with respect to the forward frame when the forward frame is secured to the second rear body component, wherein the first position is different than the second position.

Optionally, the first body component is a tunnel, a heat exchanger assembly component, or both. Optionally, the first body component is running board. Optionally, the second body component is a tunnel, a heat exchanger assembly, or both. Optionally the second body component is a running board.

According to one or more aspects of the present disclosure, a method of assembling two types of snowmobiles with different drive track requirements is provided including providing a common forward frame, providing a first body component with a first drive track requirement and a second body component with a second drive track requirement that is different than the first drive track requirement, wherein at least a first engine mount is provided on one or more of the forward frame, the first body component, and the second body component, positioning either the first body component or the second body component adjacent the forward frame, and securing a belt housing assembly 354 to the first engine mount, the belt housing assembly 354 defining a track drive opening, wherein the track drive opening is located at a first position with respect to the first engine mount when the forward frame is secured to the first body component, and wherein the track drive opening is located at a second position with respect to the first engine mount when the forward frame is secured to the second body component, wherein the first position is different than the second position.

Optionally, the first body component is a tunnel, a heat exchanger assembly, or both. Optionally the first body component is a running board. Optionally, the second body component is a tunnel, a heat exchanger assembly, or both. Optionally the second body component is a running board.

According to one or more aspects of the present disclosure, a method of assembling two types of snowmobiles with different drive track requirements is provided including providing a common forward frame including a front and rear, the forward frame including a first side, and a second side spaced apart from the first side to define a rear opening at the rear of the forward frame. The method includes providing a first body component with a first drive track shaft position and a second body component with a second drive track shaft position that is different than the first drive track position. The method includes positioning either the first body component or the second body component in the rear opening between the first side and the second side, providing a belt drive housing that defines a track drive shaft opening, securing the belt housing assembly to the first side of the forward frame, wherein the track drive shaft opening is located at a first position with respect to the first side when the forward frame is secured to the first body component, and wherein the track drive shaft opening is located at a second position with respect to the first side when the forward frame is secured to the second body component, wherein the first position is different than the second position.

Optionally, each of the first side and the second side includes an inner perimeter defining a side opening.

Optionally, the belt housing assembly is secured to the first side for both body components with a jackshaft axis extending through the side openings of the first side and the second side, and a track shaft axis positioned outside of an outer perimeter of the first side and inside of an outer perimeter of the second side.

Optionally, the method includes inserting an engine through the side opening of the second side and securing the engine to the preassembled frame at a position between the first and second sides.

According to one or more aspects of the present disclosure, a front frame assembly 302 for a snowmobile 100 is provided including a forward frame 312 including a front, a rear, and a longitudinal centerline. The forward frame 312 includes a first side 304 extending along the longitudinal centerline and a second side 306 extending along the longitudinal centerline and spaced apart from the first side 304. Each of the first side 304 and the second side 306 includes an inner perimeter 308 defining a side opening 310. The first side 304 and the second side 306 define a rear opening 314 at the rear of the forward frame 312 therebetween for receiving a heat exchanger assembly 174, a tunnel 104, or both therein.

Optionally, the first side 304 defines an outer perimeter 318, and the second side 306 defines an outer perimeter 318. A track drive shaft 352 extends across the forward frame 312 and is positioned rearward of the outer perimeter 318 of the first side 304 and forward of the outer perimeter 318 of the second side 306.

Optionally, the first side 304 defines an inner perimeter 308, the second side 306 defines an inner perimeter 308, and the track drive shaft 352 is positioned rearward of the inner perimeter 308 of the first side 304 and rearward of the inner perimeter 308 of the second side 306.

Optionally, the second side 306 includes a plate or metal sheet, hereinafter referred to as metal sheet 320, defining an aperture 322 for receiving the track drive shaft 352 therethrough when the metal sheet 320 is positioned to overlap an end cap 178 of the heat exchanger assembly 174, a side of the tunnel 104, or both.

Optionally, the metal sheet 320 of the second side 306 defines a first aperture 324 therein for receiving the track drive shaft 352 in a first position or a second position that is different than the first position.

Optionally, the second side 306 includes a support tube or rearward leg, hereinafter referred to as rearward leg 326, extending upward and forward from the metal sheet 320 to a steering column mount component 328, a support tube or forward leg, hereinafter referred to as forward leg 330, extending upward and rearward to the steering column mount component 328, and a horizontal member 332 substantially extending along the longitudinal centerline from the forward leg 330 to the rearward leg 326. An upper end of the metal sheet 320 is shaped to support a rearward end of the horizontal member 332 and is removably secured thereto, and the rearward end of the horizontal member 332 is vertically positioned higher than a forward end of the tunnel 104.

Optionally, the first side 304 includes a metal sheet or plate, hereinafter referred to as metal sheet 334, defining an aperture for securing a belt housing assembly 354 thereto when the metal sheet 320 is positioned to overlap an end cap 178 of the heat exchanger assembly 174, a side of the tunnel 104, or both.

Optionally, the metal sheet 334 of the first side 304 defines a first aperture therein for securing the belt housing assembly 354 in a first position, and a second aperture therein for securing the belt housing assembly 354 in a second position that is different than the first position.

Optionally. the first side 304 includes a rearward leg 326 extending upward and forward from the metal sheet 334 to a steering column mount component 328, a forward leg 330 extending upward and rearward to the steering column mount component 328, and a horizontal member 342 substantially extending along the longitudinal centerline from the forward leg 330 to the rearward leg 326, and a rearward end of the horizontal member 342 is vertically positioned higher than a forward end of the tunnel 104.

Optionally, a jack shaft extends across the forward frame 312 and is positioned beneath the horizontal member 342 of the first side 304.

Optionally, a steering column mount component 328 extends between the first side 304 and the second side 306, wherein the first side 304 and the second side 306 each includes a leg extending upward and forward from the rear of the forward frame to the steering column mount component.

Optionally, the steering column mount component 328 includes a first side including a first steering mount, and a second side that includes a second steering mount, wherein the second side is positioned rearward of the first side along the longitudinal centerline.

Optionally, the first steering mount is positioned forward along the longitudinal centerline of the heat exchanger and the tunnel.

Optionally, the first side 304 includes a rearward tube 338 including a first end extending upward and forward from the metal sheet 334 to a steering column mount component 328, and a second end extending outward from the first side 304, and further including a running board support 348 including a tube with a first end that is mated with the second end of the first side tube and a second end secured to a rearward portion of the tunnel 104 or running board support bracket 184, wherein the rearward tube 338 of the first side and the tube of the running board support 348 define a continuous tubular length extending from the steering column mount component 328 to the rearward portion of the tunnel 104.

In an embodiment, a method of assembling two different types of snowmobiles with a common forward frame 312 is provided that includes providing a common forward frame 312 including a longitudinal centerline and a running board mounting point 317 positioned outboard of the longitudinal centerline, providing a first running board assembly including a support member 122/348; providing a second running board assembly including at least one component that is different than at least one component of the first running board assembly, the second running board assembly including a support member 122/348, and securing the forward mount of either the first running board assembly or the second running board assembly to the running board mounting point 317, wherein the first running board assembly is located at a first position with respect to the longitudinal centerline of the forward frame when secured to the running board mounting point, and wherein the second running board assembly is located at a second position with respect to the longitudinal centerline of the forward frame 312 when secured to the running board mounting point 317, wherein the first position is different than the second position.

Optionally, each running board assembly includes a foot support member 124, a support member 122/348, and a running board support bracket 184. Optionally, the foot support member 124 is a fiber reinforced polymer composite, and the support member 122/348 is a hollow tube.

Optionally, the running board mounting point 317 extends outward and forwardly from the forward frame 312. Optionally, the running board mounting point 317 is positioned below an upper surface of a portion of the tunnel 104 that is secured to the forward frame 312. Optionally, the support member 122/348 of the first running board assembly extends outward from the centerline of the vehicle farther than the support member 122/348 of the second running board assembly.

Optionally, the common forward frame 312 includes an A-arm mounting point, and the method may further comprise providing a first suspension assembly including a control arm and a spindle that includes a lower A-arm ball joint, providing a second suspension assembly that is different than the first suspension assembly, the second suspension assembly including a control arm and a spindle that includes a lower A-arm ball joint, and securing the A-arm of the first suspension assembly to the A-arm mounting point when the first running board assembly is secured to the mounting point 317 or the second suspension assembly to the A-arm mounting point when the second running board assembly is secured to the mounting point 317, wherein the first lower A-arm ball joint is positioned at a different position with respect to the common forward frame 312 than the second lower A-arm ball joint when the respective suspension assembly is secured to the common forward frame 312.

Optionally, the support member 122/348 of the first running board assembly extends outward from the centerline of the vehicle farther than the support member 122/348 of the second running board assembly, and the lower A-arm ball joint of the first suspension assembly is positioned outward from the centerline of the vehicle a greater distance than the lower A-arm ball joint of the second suspension assembly.

Optionally, wherein the support member 122/348 of the first running board assembly extends outward from the centerline of the vehicle farther than the support member 122/348 of the second running board assembly, and the lower A-arm ball joint of the first suspension assembly is positioned farther forward with respect to the common forward frame 312 than the lower A-arm ball joint of the second suspension assembly.

Optionally, wherein the support member 122/348 of the first running board assembly extends outward from the centerline of the vehicle farther than the support member 122/348 of the second running board assembly, and the lower A-arm ball joint of the first suspension assembly is positioned along the centerline of the common forward frame 312 farther forward from the mounting point 317 than the lower A-arm ball joint of the second suspension assembly.

Figure 46:
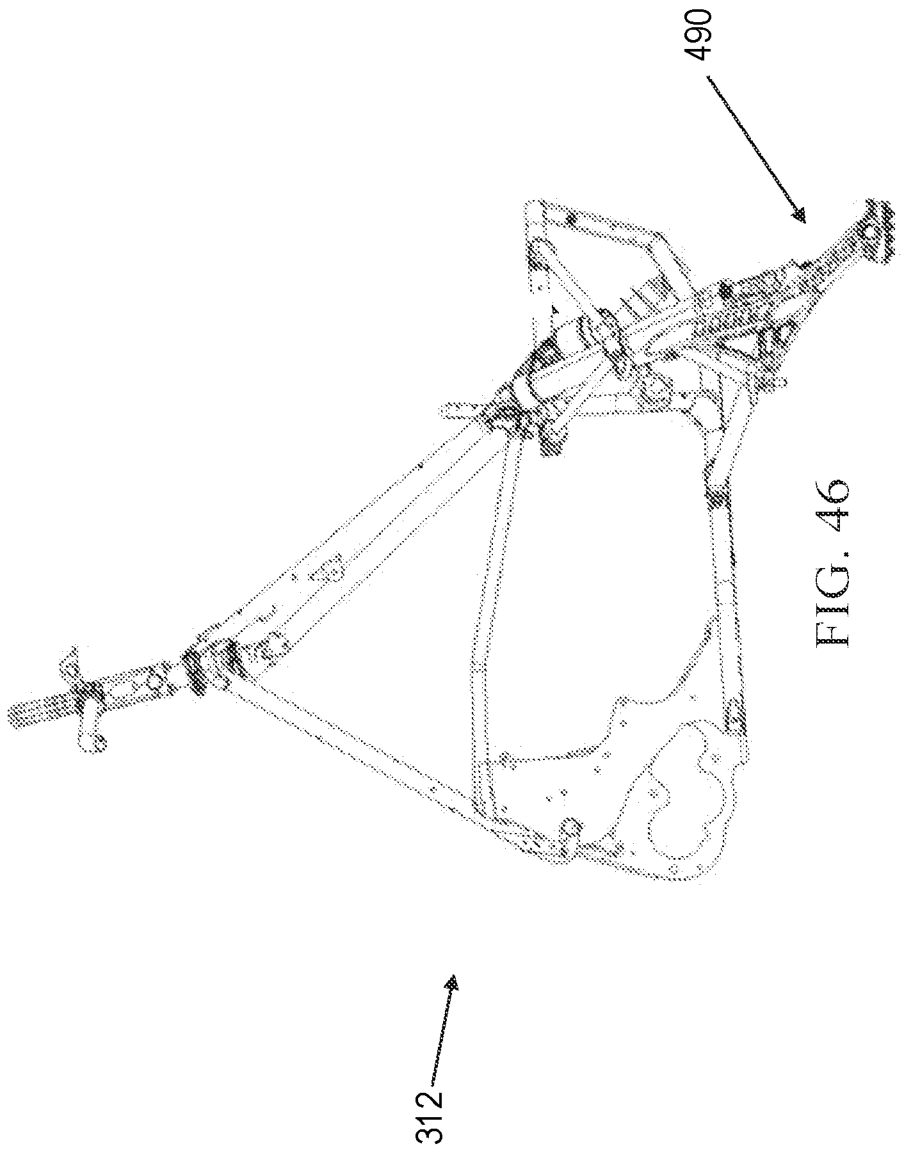
FIG. 46 illustrates a side view of a forward frame assembly with suspension components, according to some embodiments.
Figure 47:
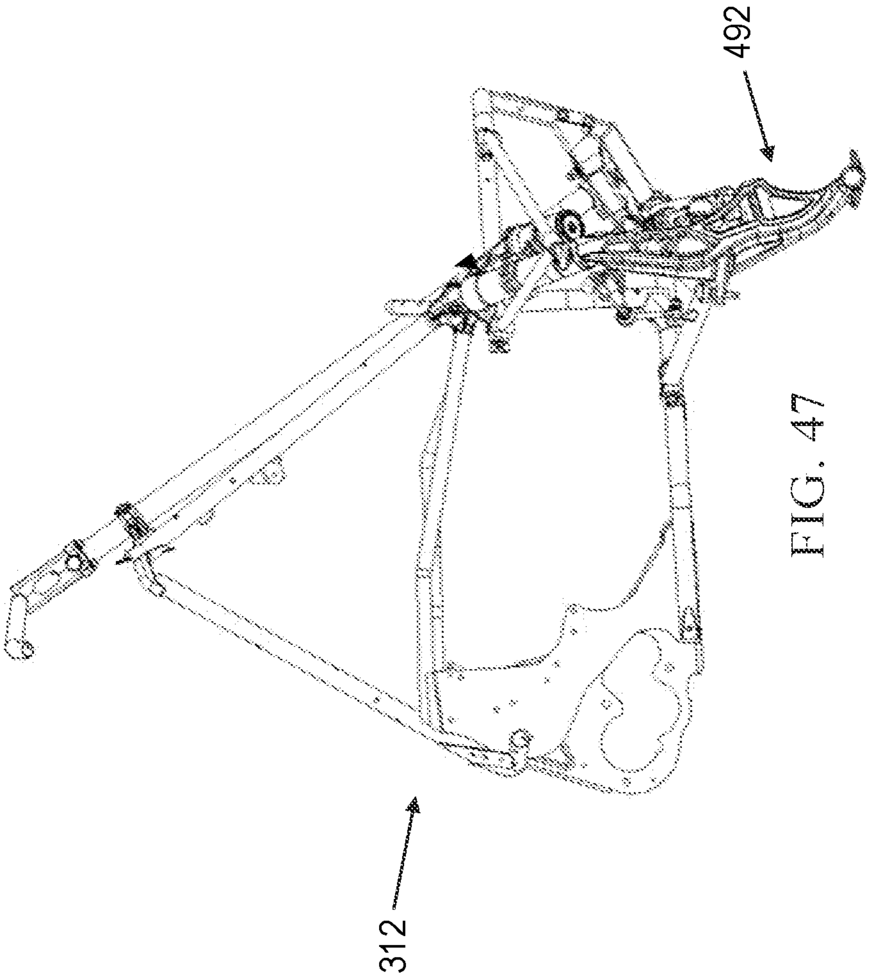
FIG. 47 illustrates a side view of a forward frame assembly with suspension components, according to some embodiments.
Figure 48:
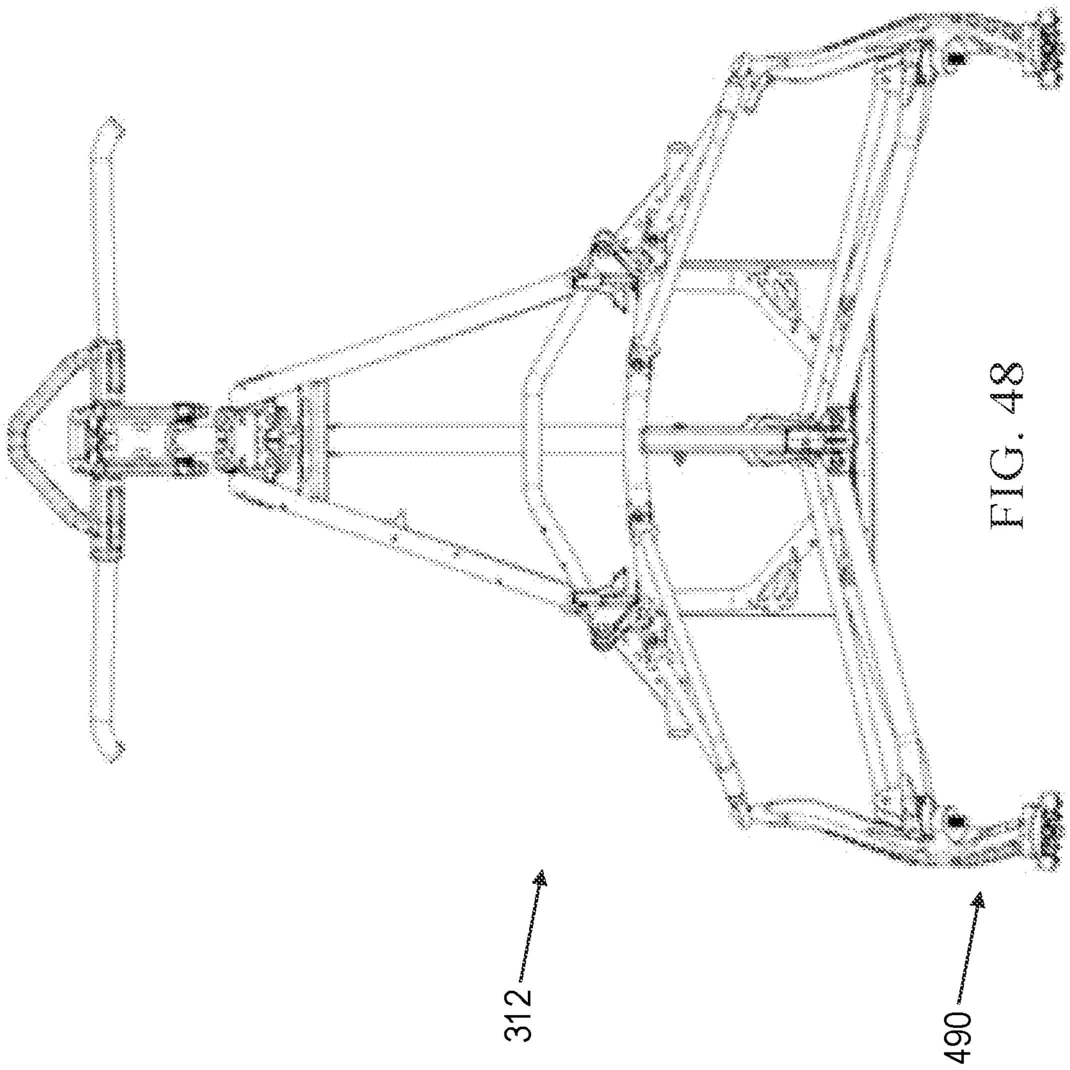
FIG. 48 illustrates a front view of a forward frame assembly with suspension components, according to some embodiments.
Figure 49:
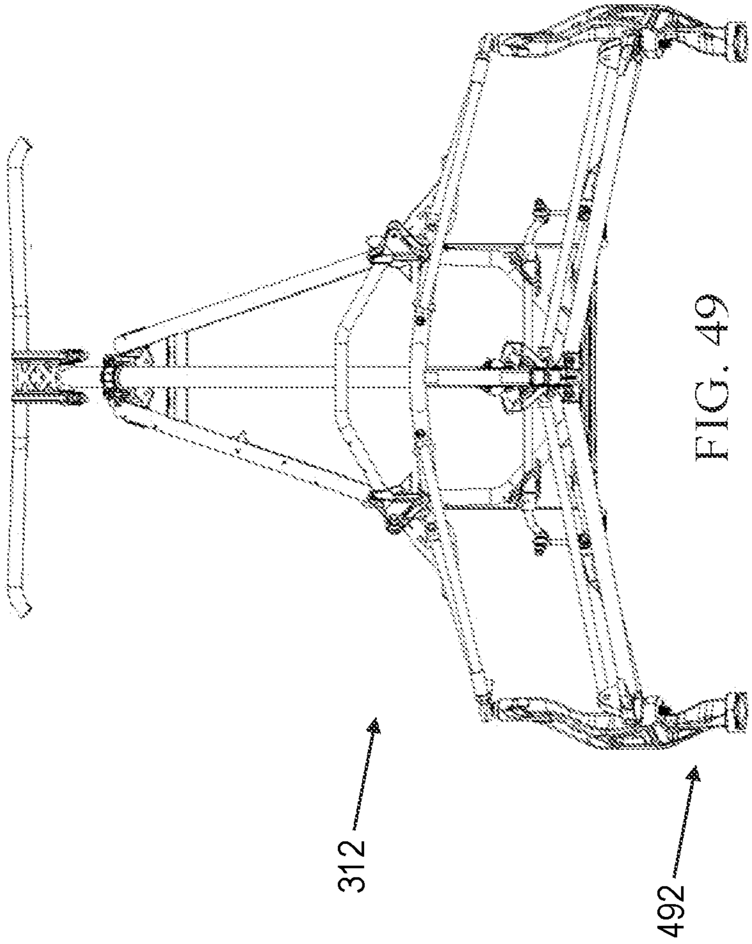
FIG. 49 illustrates a front view of a forward frame assembly with suspension components, according to some embodiments.
Figure 53:
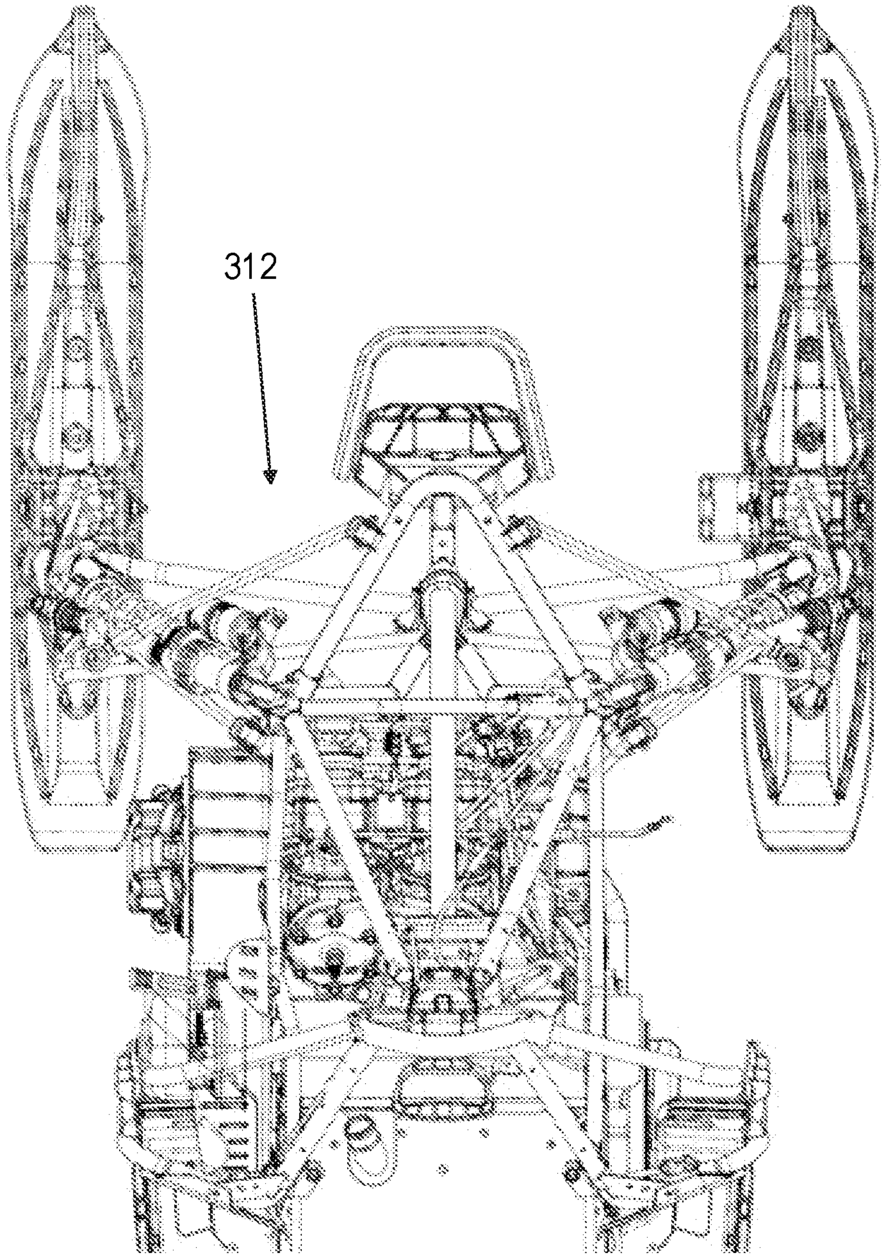
FIG. 53 illustrates a top-down view of forward frame, suspension, and engine components, according to some embodiments.
Figure 54:
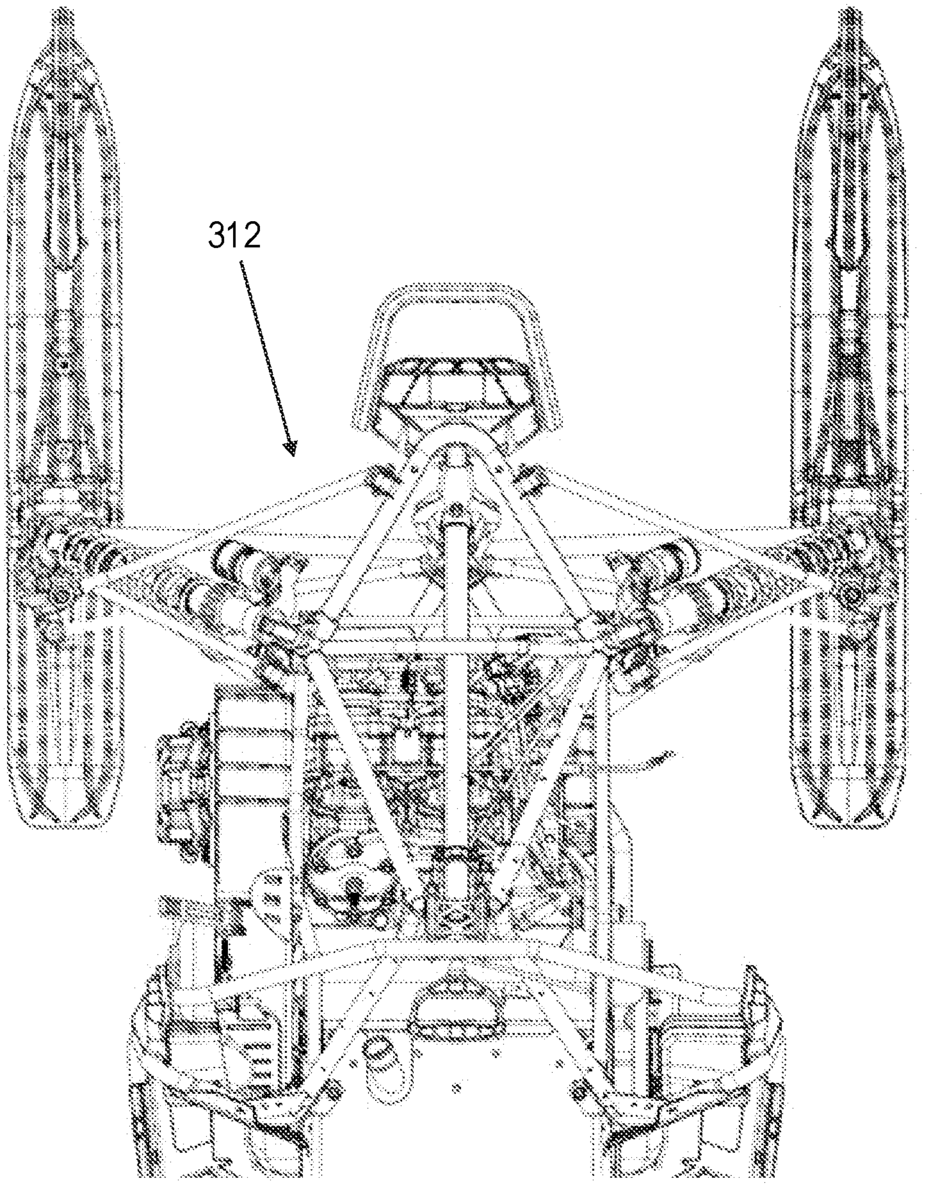
FIG. 54 illustrates a top-down view of forward frame, suspension, and engine components, according to some embodiments.

In a non-limiting example, different snowmobile models may be assembled using a common forward frame assembly by changing one or more of a spindle, a suspension component such as a control or A-arm, and a steering assembly between models. FIGS. 46 and 47 illustrates a side view of a common forward frame assembly 312 with different suspension components including mountain terrain spindles 490 and high performance spindles 492, according to some embodiments. FIGS. 48 and 49 show a front view of the two different models utilizing the common forward frame assembly. As shown in FIGS. 49 and 54, the model with the high performance spindle 492 may have a wider width or stance than the model shown in FIGS. 48 and 53 with the mountain terrain spindles 490. This difference in width may be configured by providing different control arms for the different models (that extend different distances from the vehicle longitudinal centerline). The location of the spindles 490/492 (and/or at least a portion of the attached skis) may be positioned at different locations along the longitudinal centerline of the vehicle. As shown in FIG. 53, the model may position the mountain terrain spindle 490 and/or the rearward end of the ski attached to the spindle 490 farther forward along the longitudinal centerline (and farther forward with respect to the forward frame) than the model with the high performance spindle 492 and/or the rearward portion of the ski attached to the spindle 492 (those being positioned further rearward along the longitudinal centerline and further rearward with respect to the forward frame). The height of the two different models may be the same, or different. It is also to be understood that the steering assembly may be the same or different for the different models, and may extend forward (FIG. 47) or rearward (FIG. 48) of a steering column bracket (shown in FIGS. 56A, B, C) positioned at the upper portion of the forward frame.

Figure 50A:
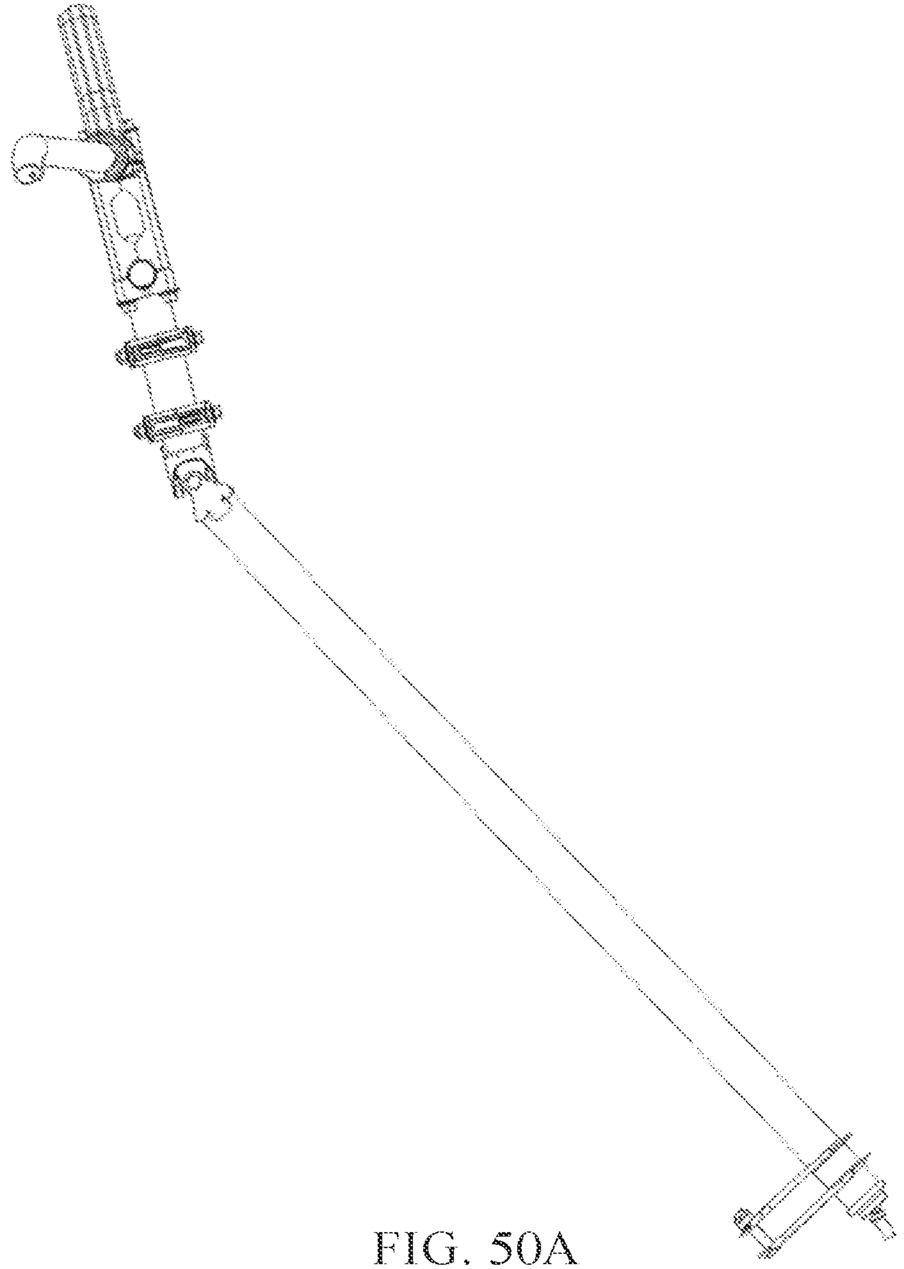
FIG. 50A illustrates a side view of a steering column assembly, according to some embodiments.
Figure 50B:
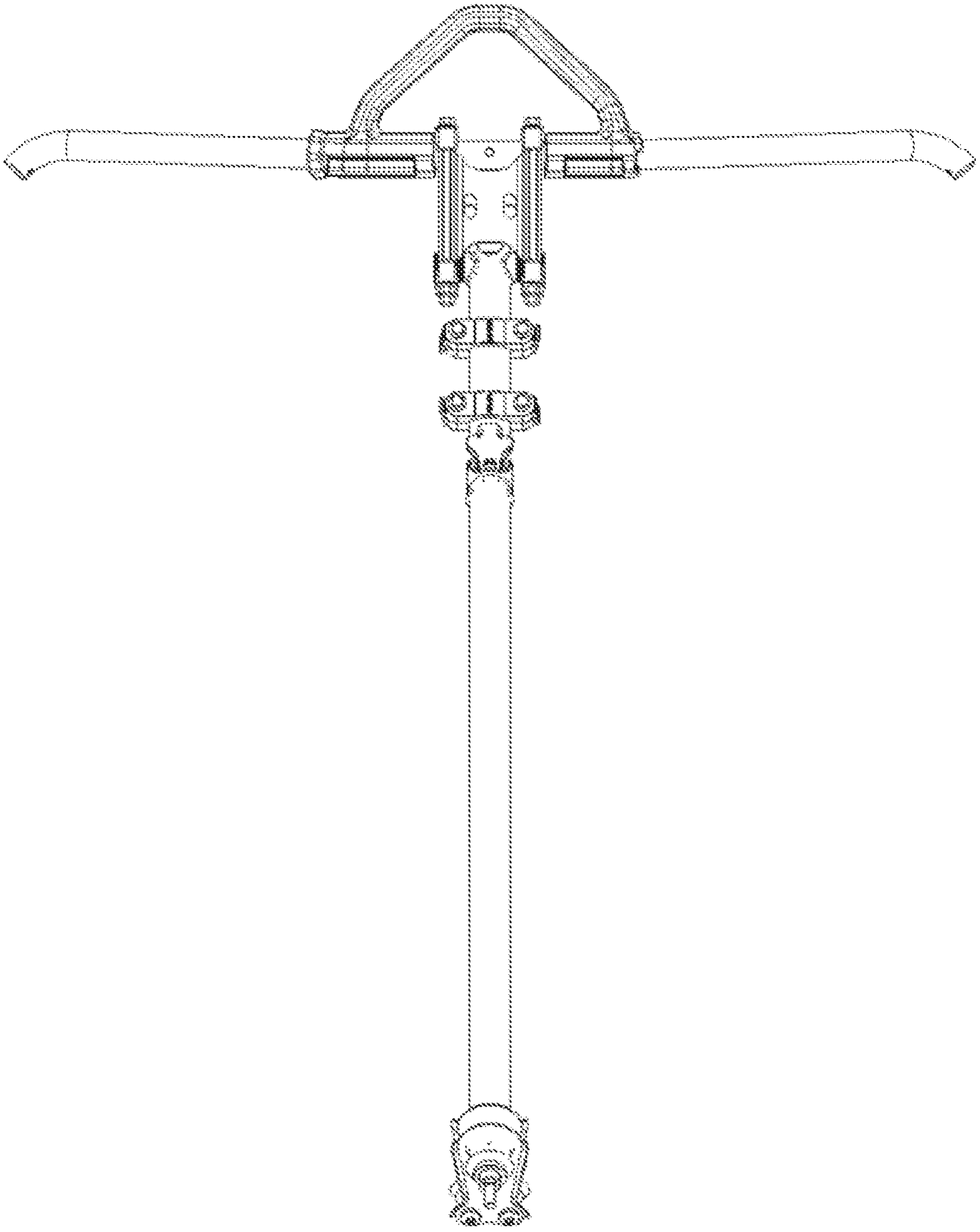
FIG. 50B illustrates a front view of a steering column assembly, according to some embodiments.
Figure 51A:
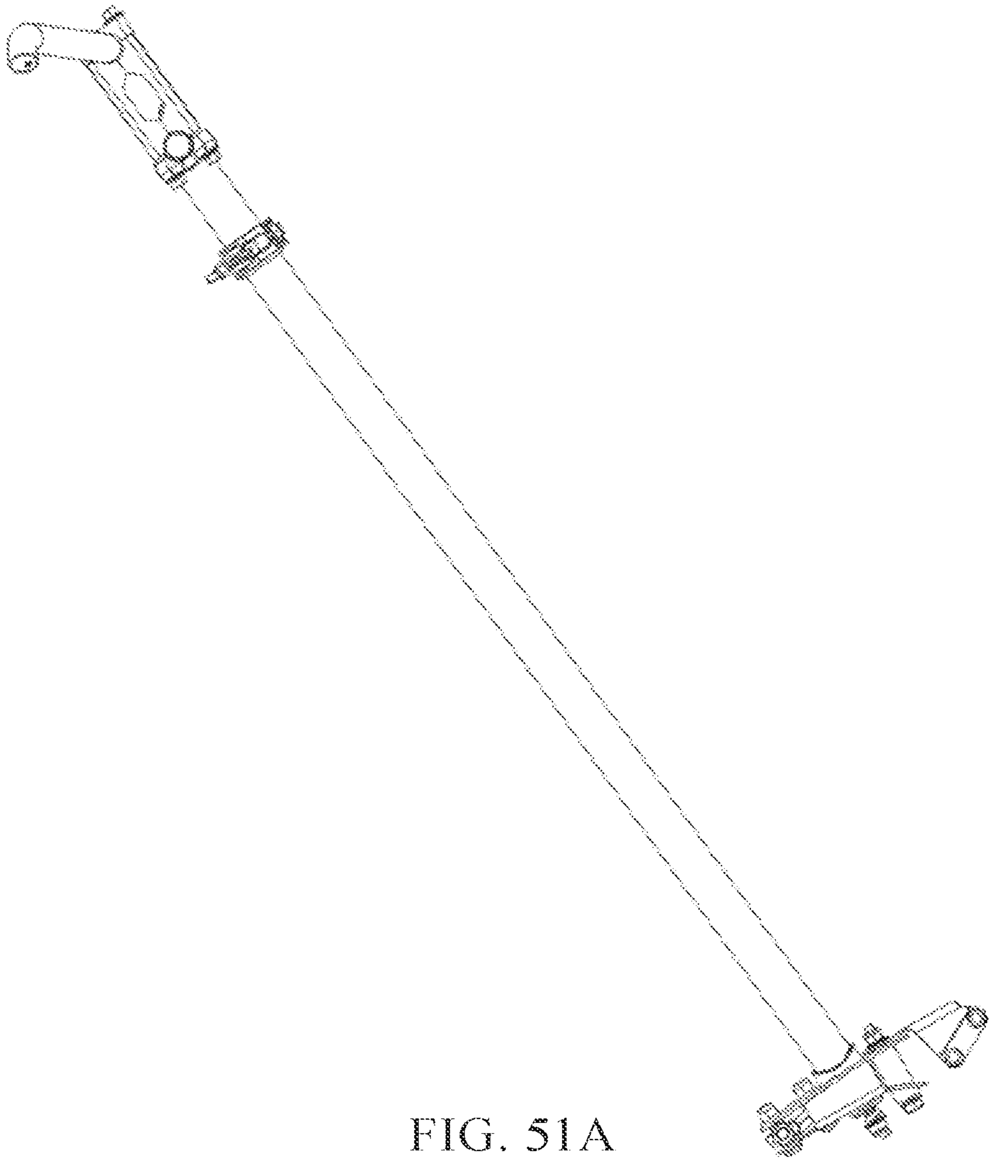
FIG. 51A illustrates a side view of a steering column assembly, according to some embodiments.
Figure 51B:
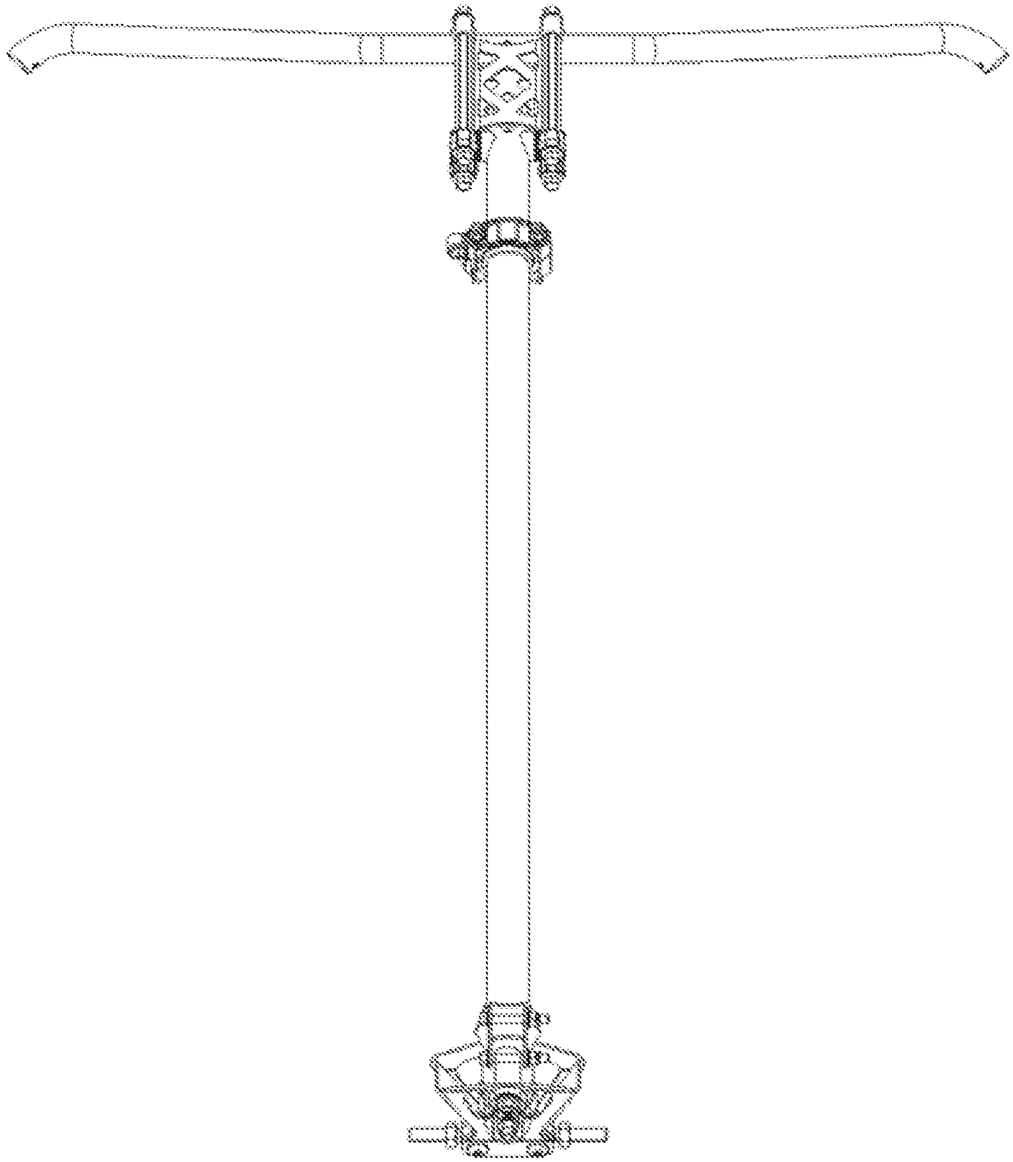
FIG. 51B illustrates a front view of a steering column assembly, according to some embodiments.
Figure 52A:
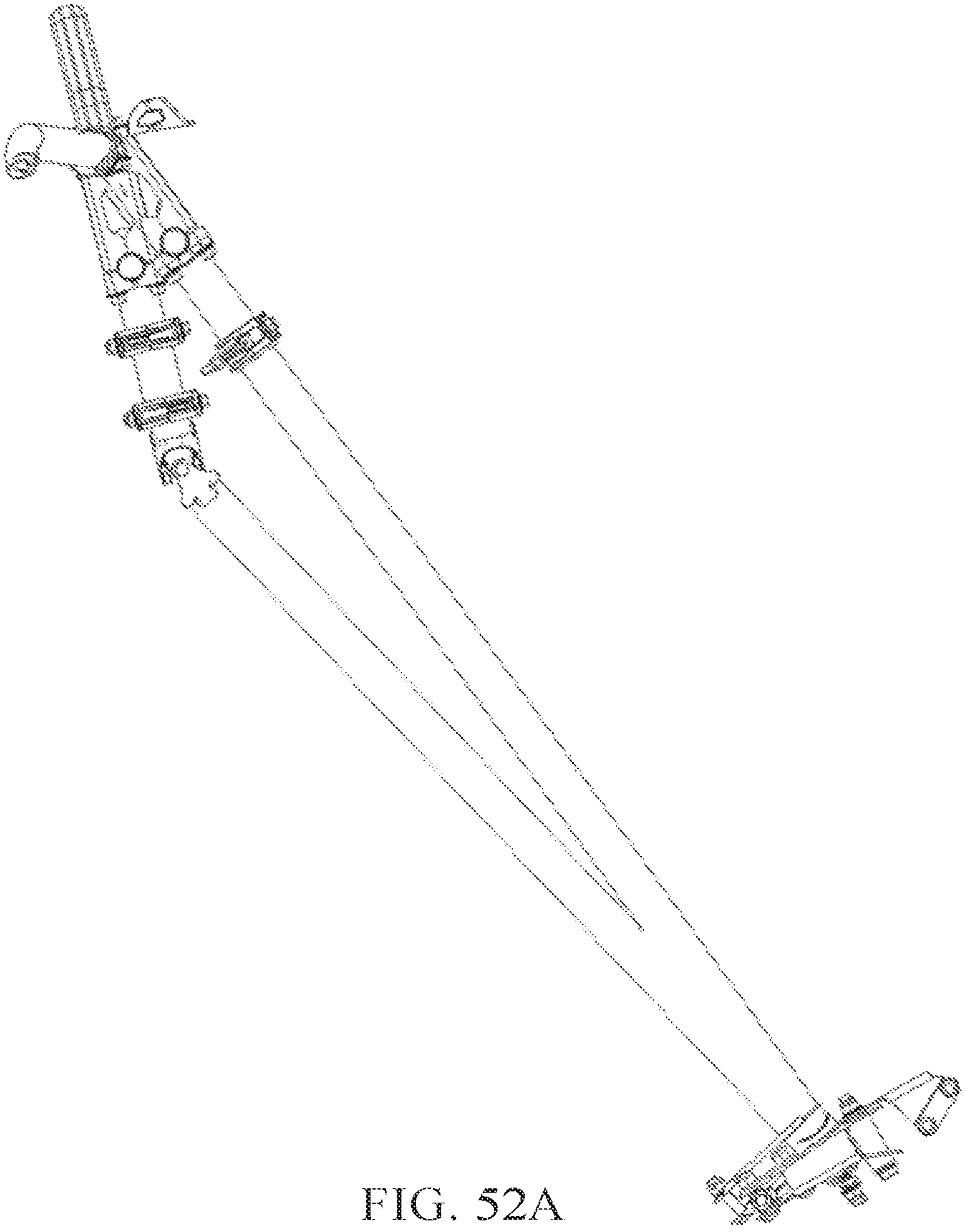
FIG. 52A illustrates a side view of a steering column assembly, according to some embodiments.
Figure 52B:
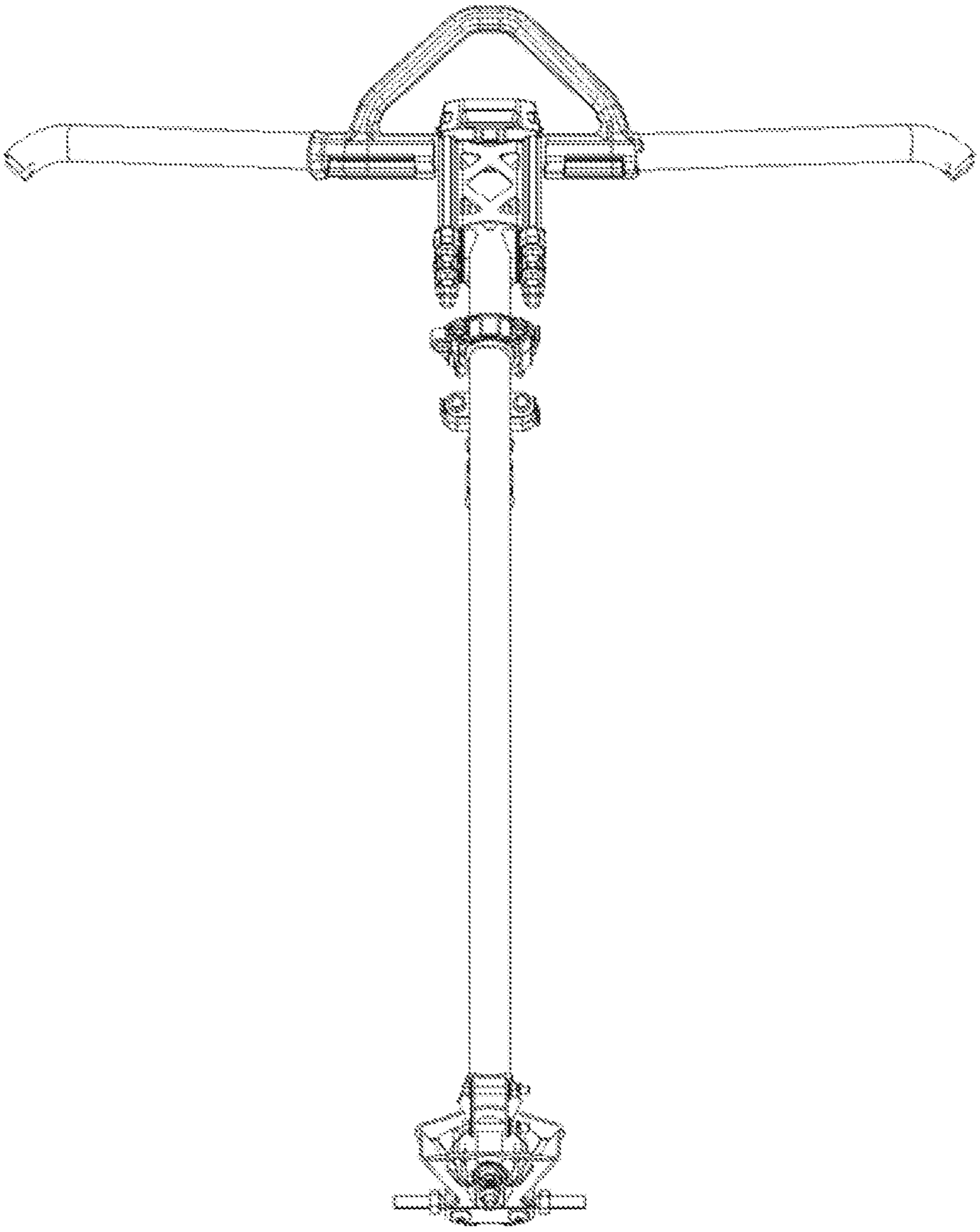
FIG. 52B illustrates a front view of a steering column assembly, according to some embodiments.

FIGS. 50A-B illustrate side and front views of a steering column assembly us in the assembly of FIGS. 46 and 48, according to some embodiments. FIGS. 51A-B illustrate side and front views of the steering column assembly used in the assembly of FIGS. 47 and 49, according to some embodiments. FIGS. 52A-B illustrate side and front views of the different steering column assemblies for comparison of the location of the different steering column assemblies when mounted to the forward frame, according to some embodiments. The steering column assembly can be configured for both mountain terrain configurations and high performance configurations.

FIGS. 53 and 54 illustrate a top-down view of forward frame, suspension, and engine components in a mountain terrain configuration and high performance configuration, according to some embodiments.

Figure 55:
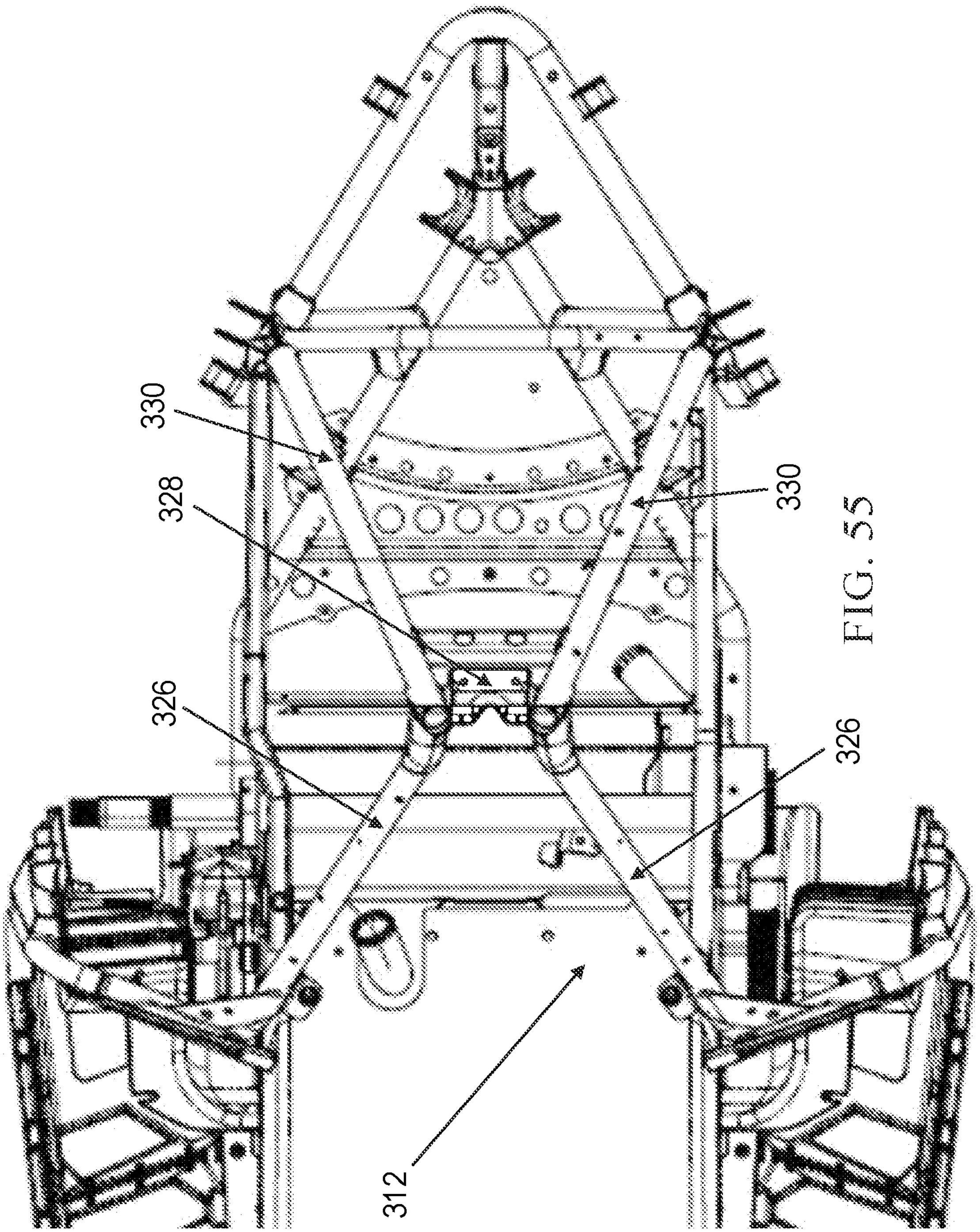
FIG. 55 illustrates a top-down view of a forward frame assembly with steering column bracket, according to some embodiments.
Figure 56B:
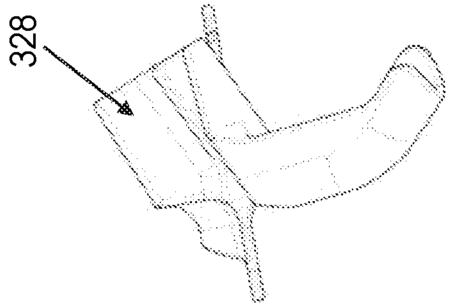
FIG. 56B illustrates a perspective view of a steering column bracket, according to some embodiment.
Figure 56C:
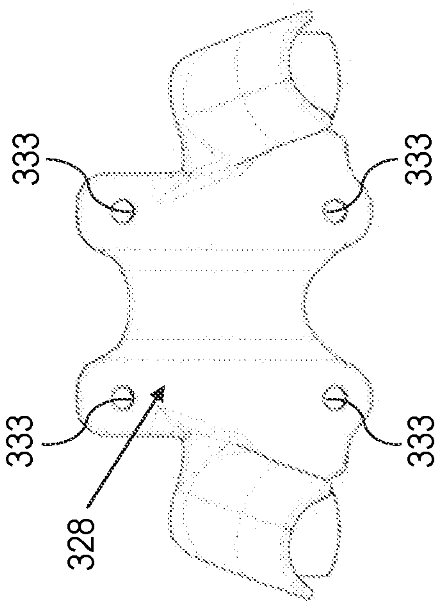
FIG. 56C illustrates a perspective view of a steering column bracket, according to some embodiment
Figure 56A:
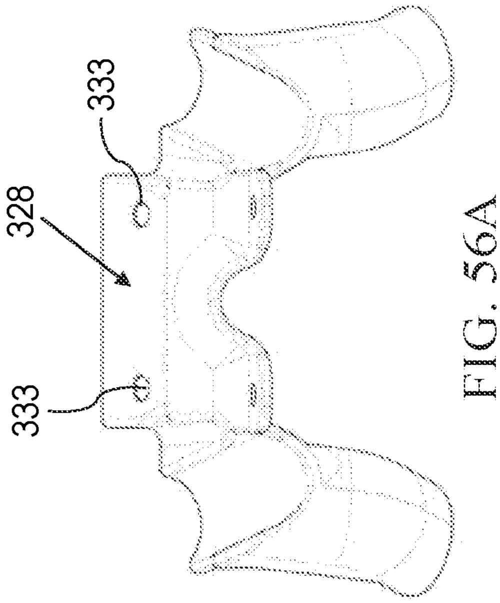
FIG. 56A illustrates a perspective view of a steering column bracket, according to some embodiments.

FIG. 55 illustrates a top-down view of a forward frame assembly with steering column bracket, according to some embodiments; and FIGS. 56A-C illustrate perspective views of a steering column bracket, according to some embodiments.

Figure 57:
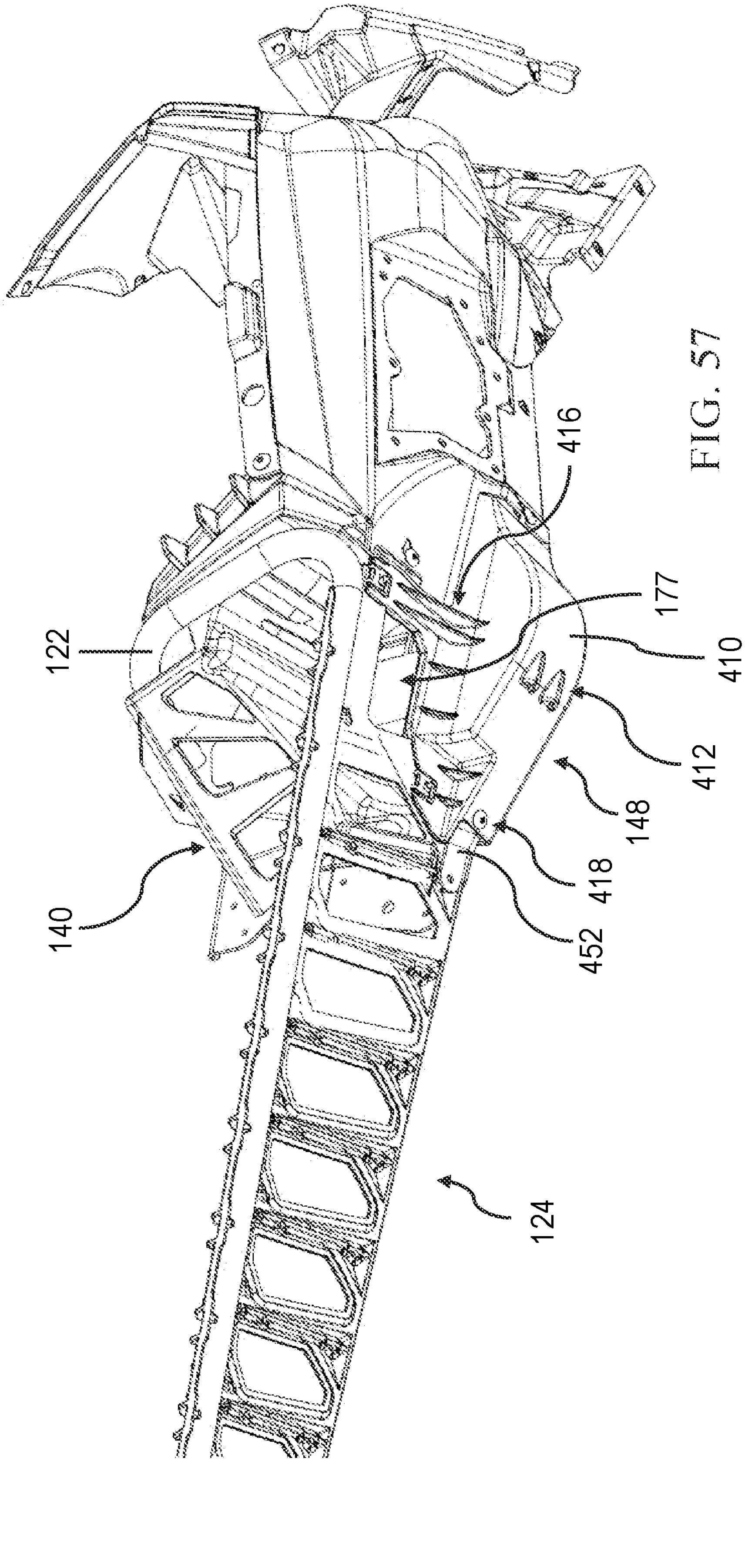
FIG. 57 illustrates a bottom perspective view of a toe stop, bottom out protector, and running board components, according to some embodiments.

FIG. 57 is another view of the toe stop joined to the running board assembly.

Figure 58:
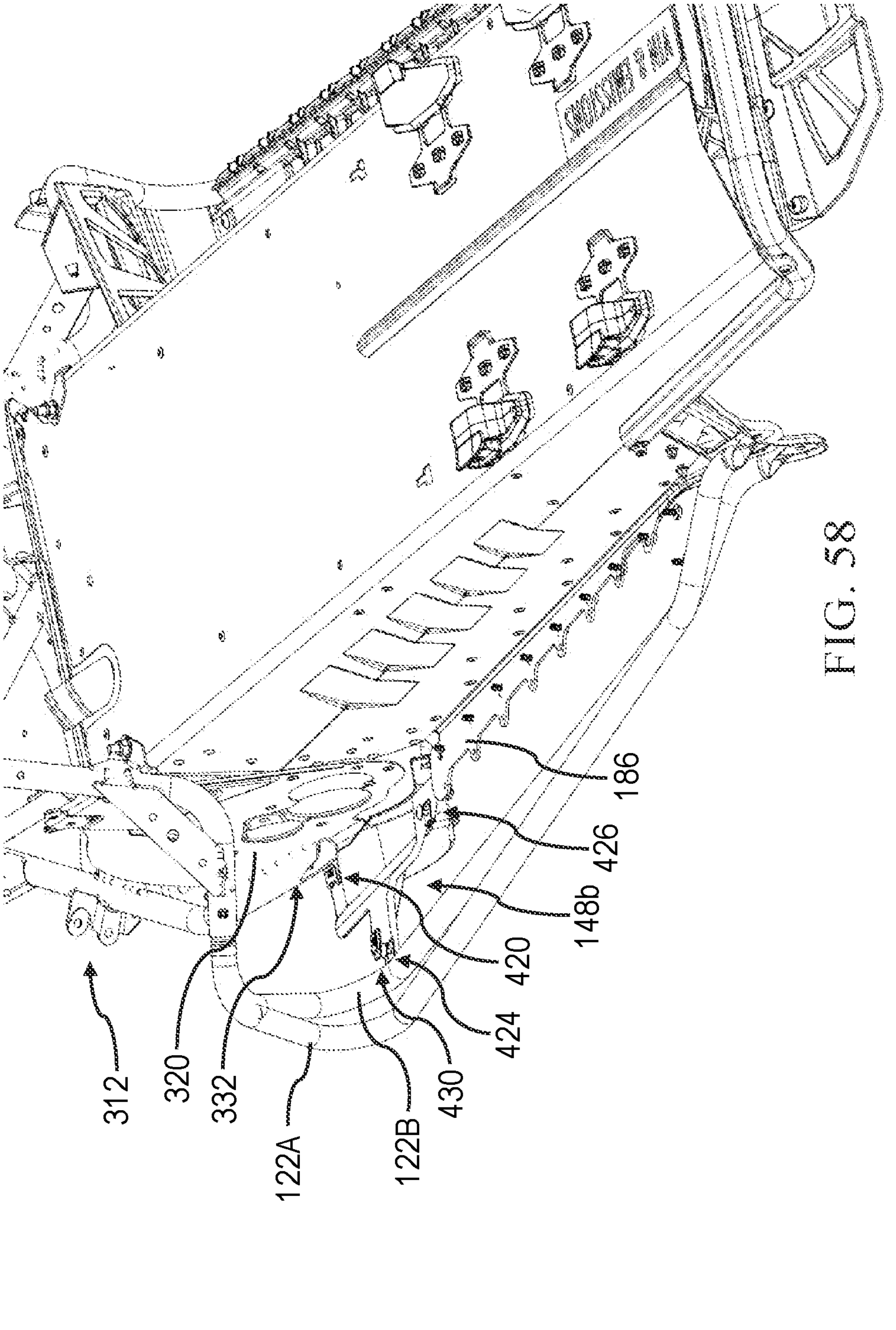
FIG. 58 illustrates a perspective view of a forward frame assembly and a bottom-out protector, according to some embodiments.
Figure 59:
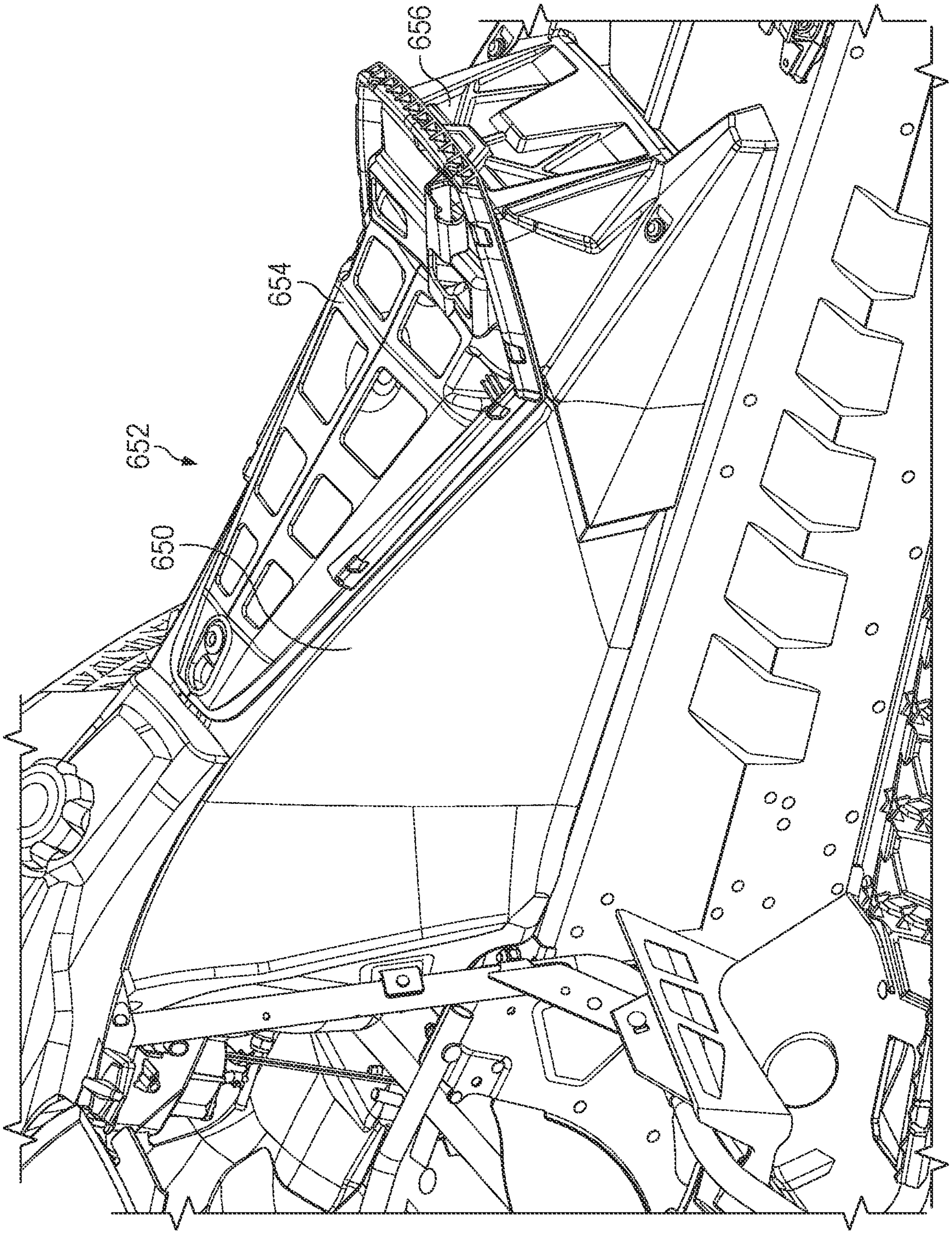
FIG. 59 illustrates an isometric view of a fuel tank and seat assembly, according to some embodiments.
Figure 60:
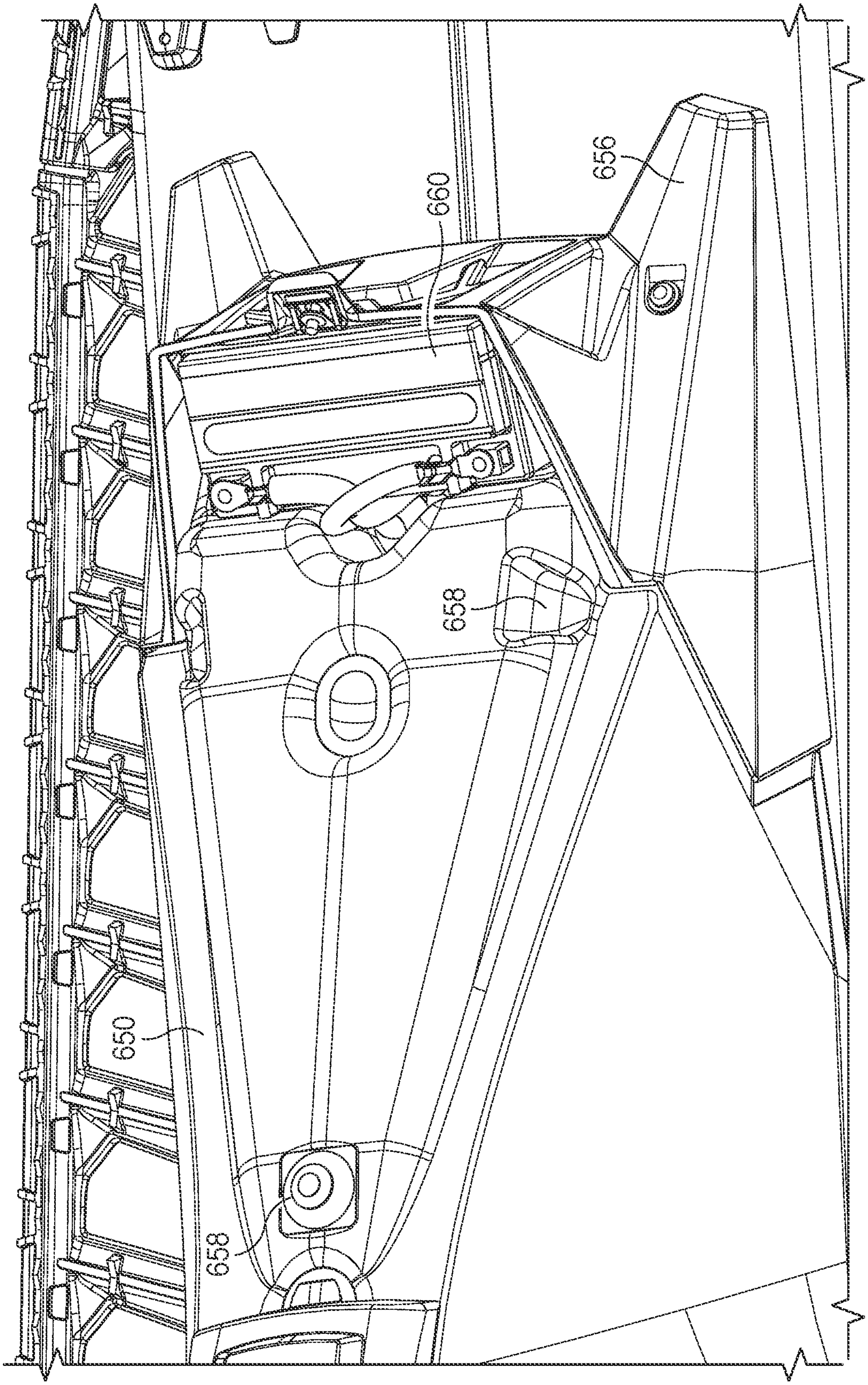
FIG. 60 illustrates an isometric view of a fuel tank, a battery, and a seat assembly, according to some embodiments.
Figure 61:
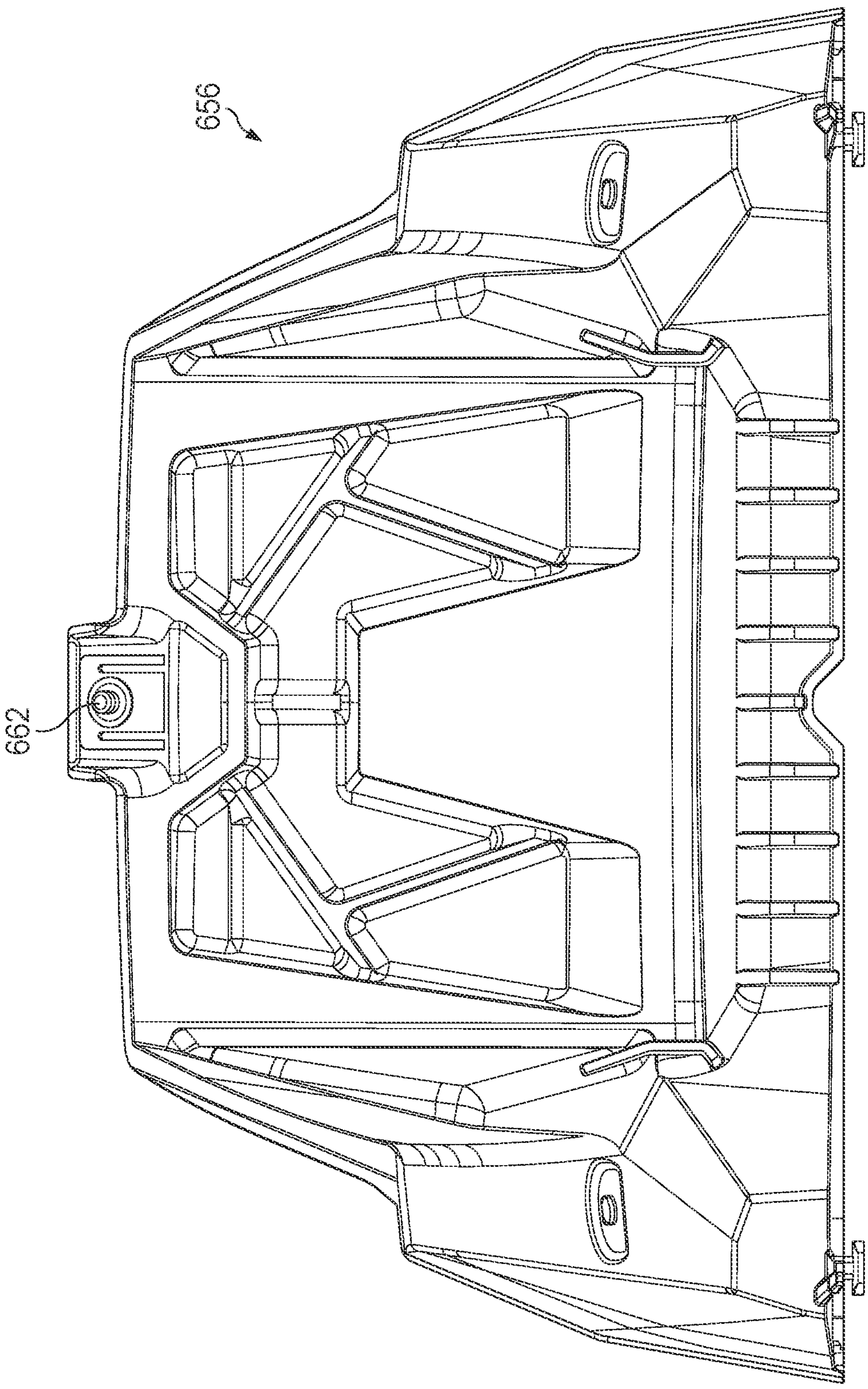
FIG. 61 illustrates a rear view of a rear panel seat assembly, according to some embodiments.
Figure 62:
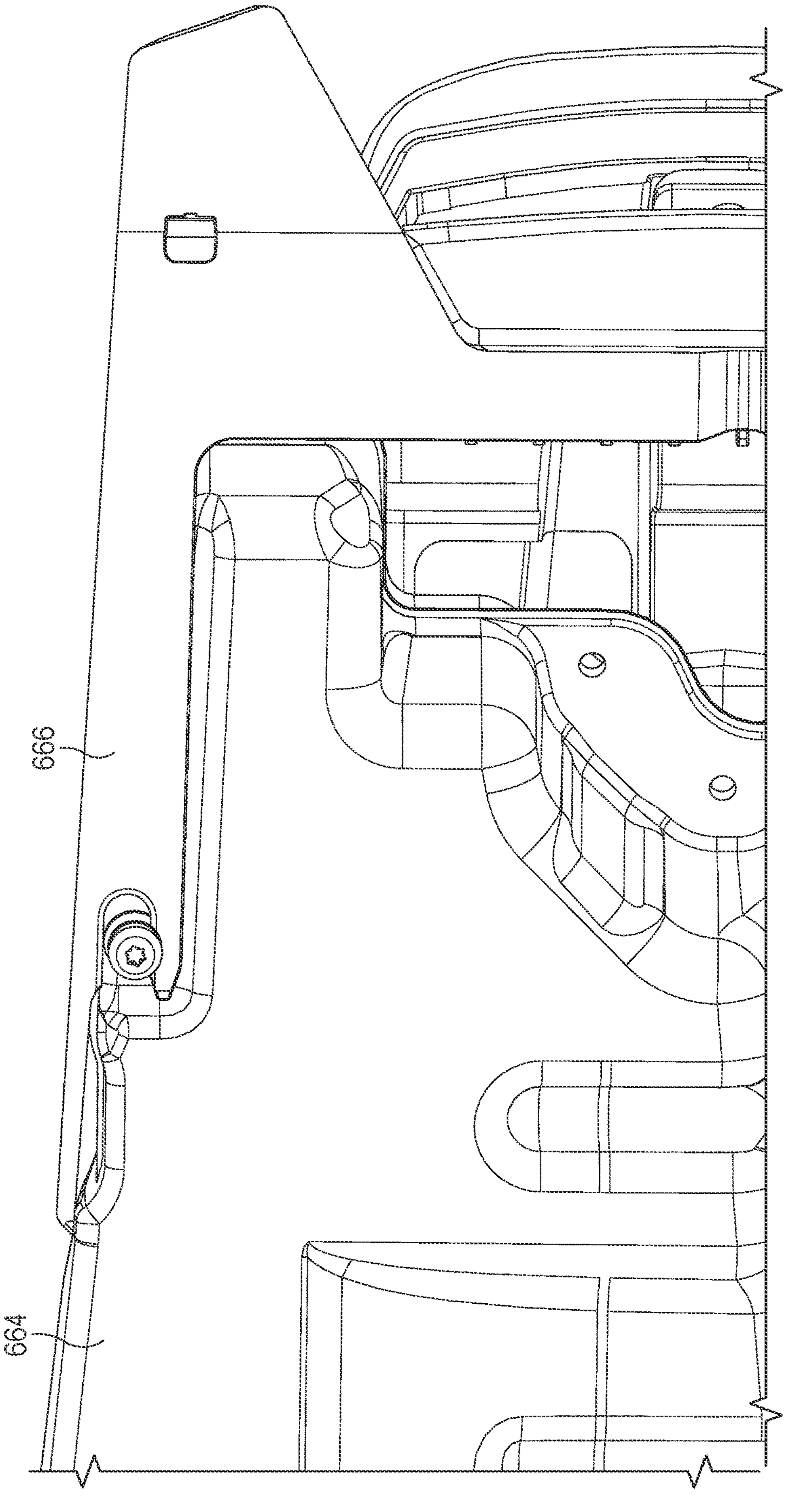
FIG. 62 illustrates a bottom isometric view of a fuel tank and seat assembly, according to some embodiments.

FIG. 58 is a side view of two different running board support tubes used for two different models for comparison purposes. As shown, the one model (high performance) includes a tube that extends further outboard from the forward frame and is secured to the suspension assembly at a point higher than the tube for the other model that does not extend outboard as far from the forward frame.

Figure 63:
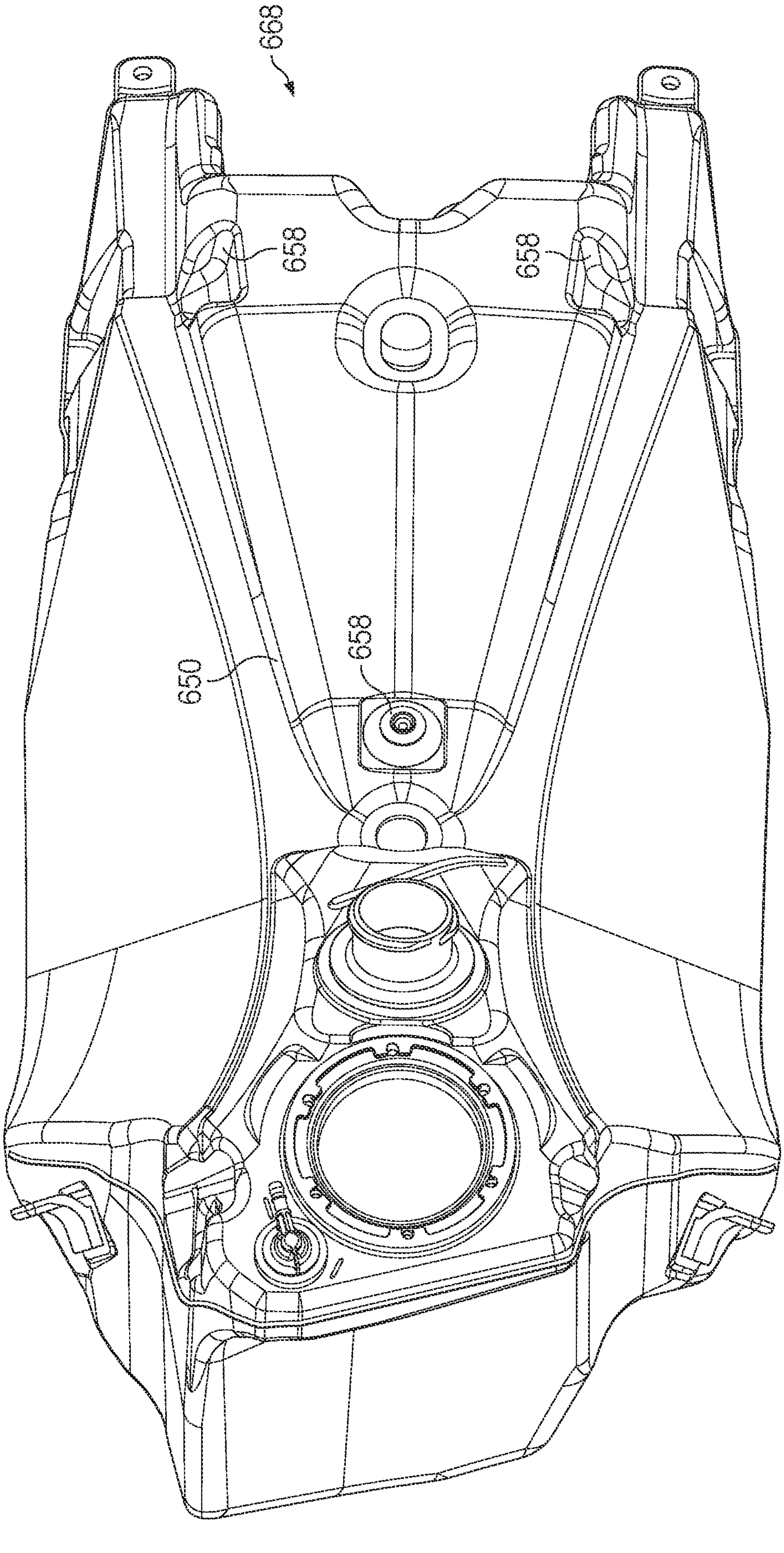
FIG. 63 illustrates a top view of a fuel tank, according to some embodiments.
Figure 64:
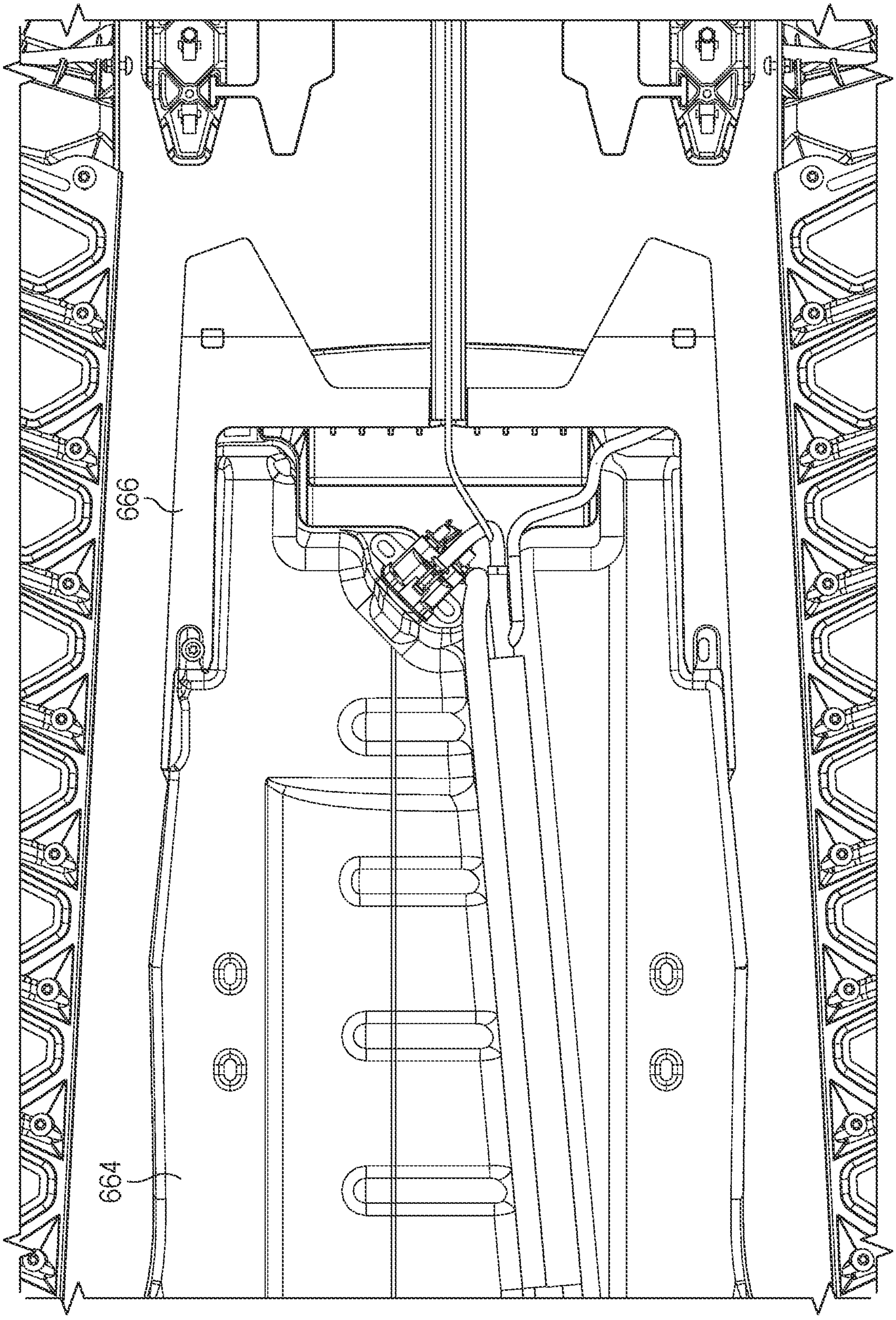
FIG. 64 illustrates a bottom view of a fuel tank and rear panel, according to some embodiments.
Figure 65:
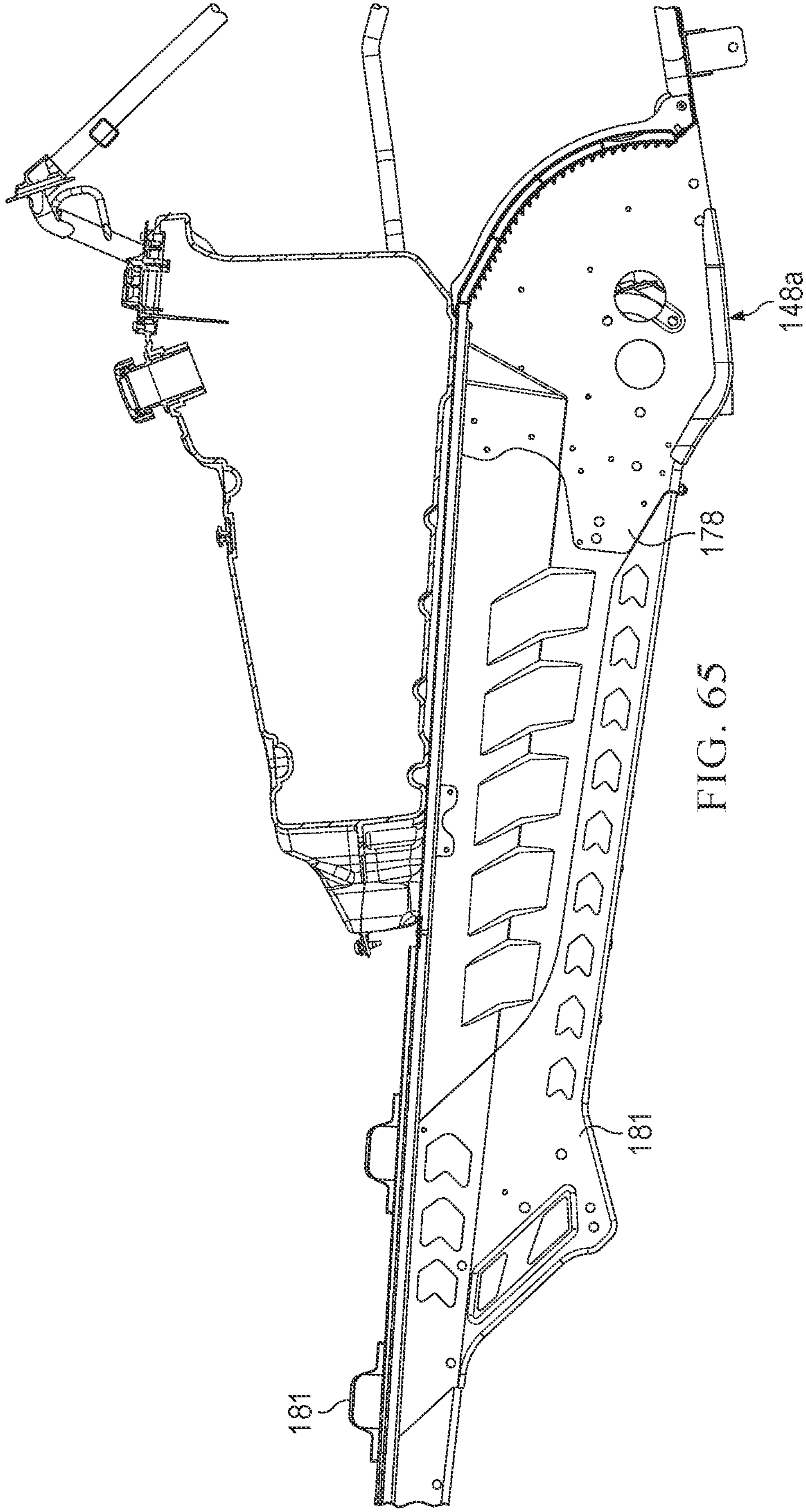
FIG. 65 illustrates a right side view of a running board support and quick attach feature, according to some embodiments.
Figure 66:
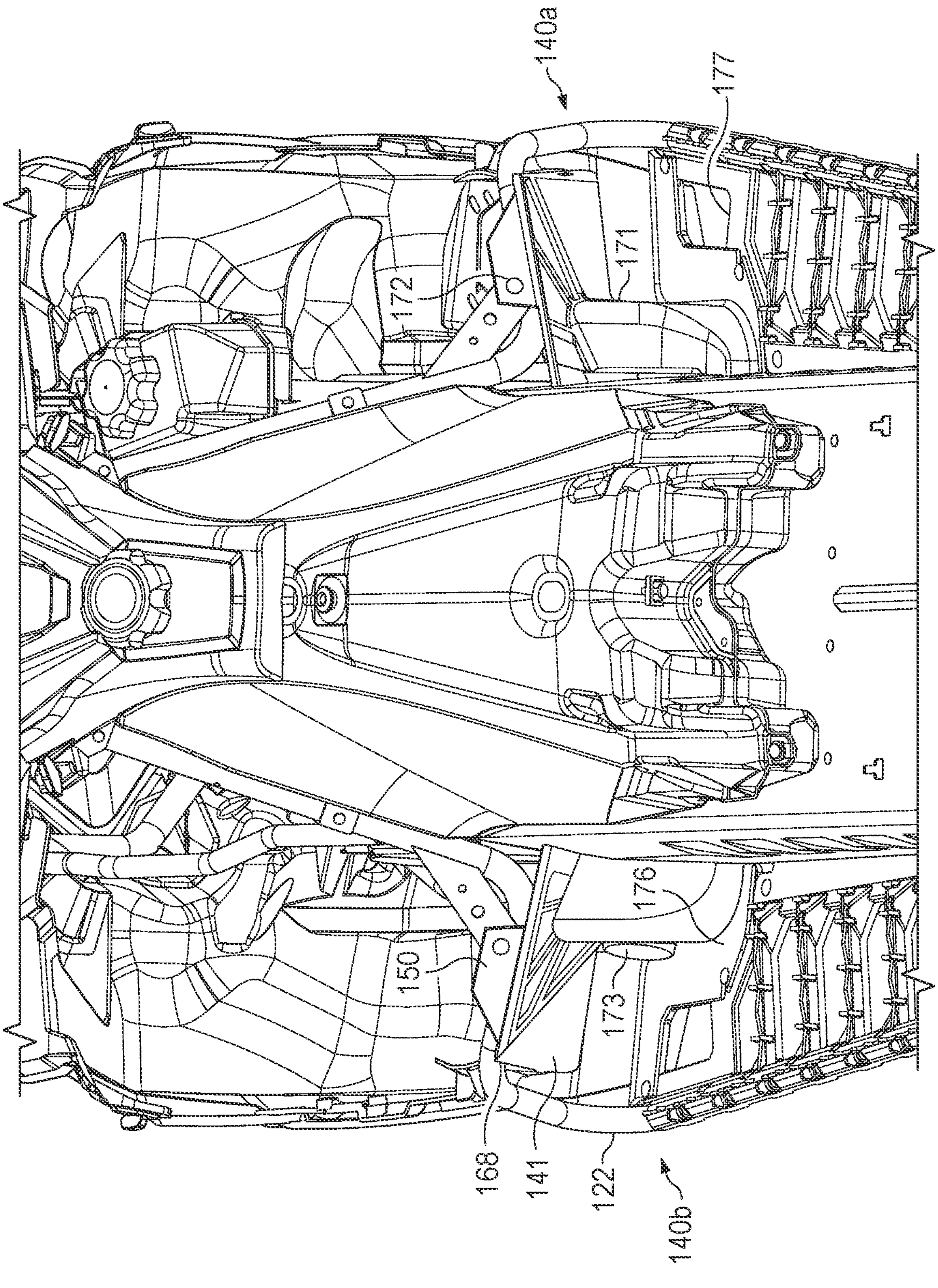
FIG. 66 illustrates a perspective top view of fuel tank, toe stop, and running board components, according to some embodiments.
Figure 67:
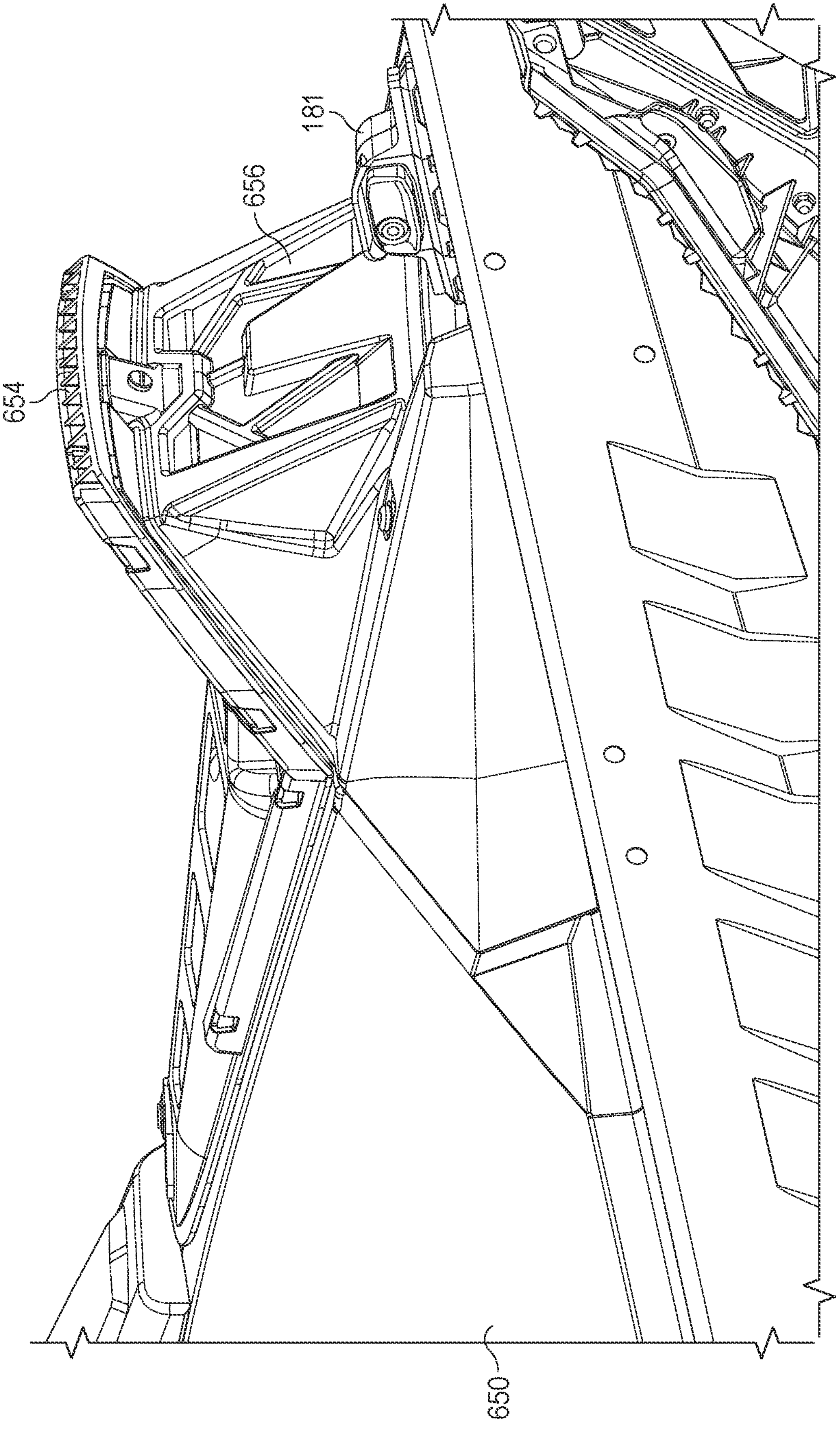
FIG. 67 illustrates an isometric view of a fuel tank and seat assembly, according to some embodiments.
Figure 68:
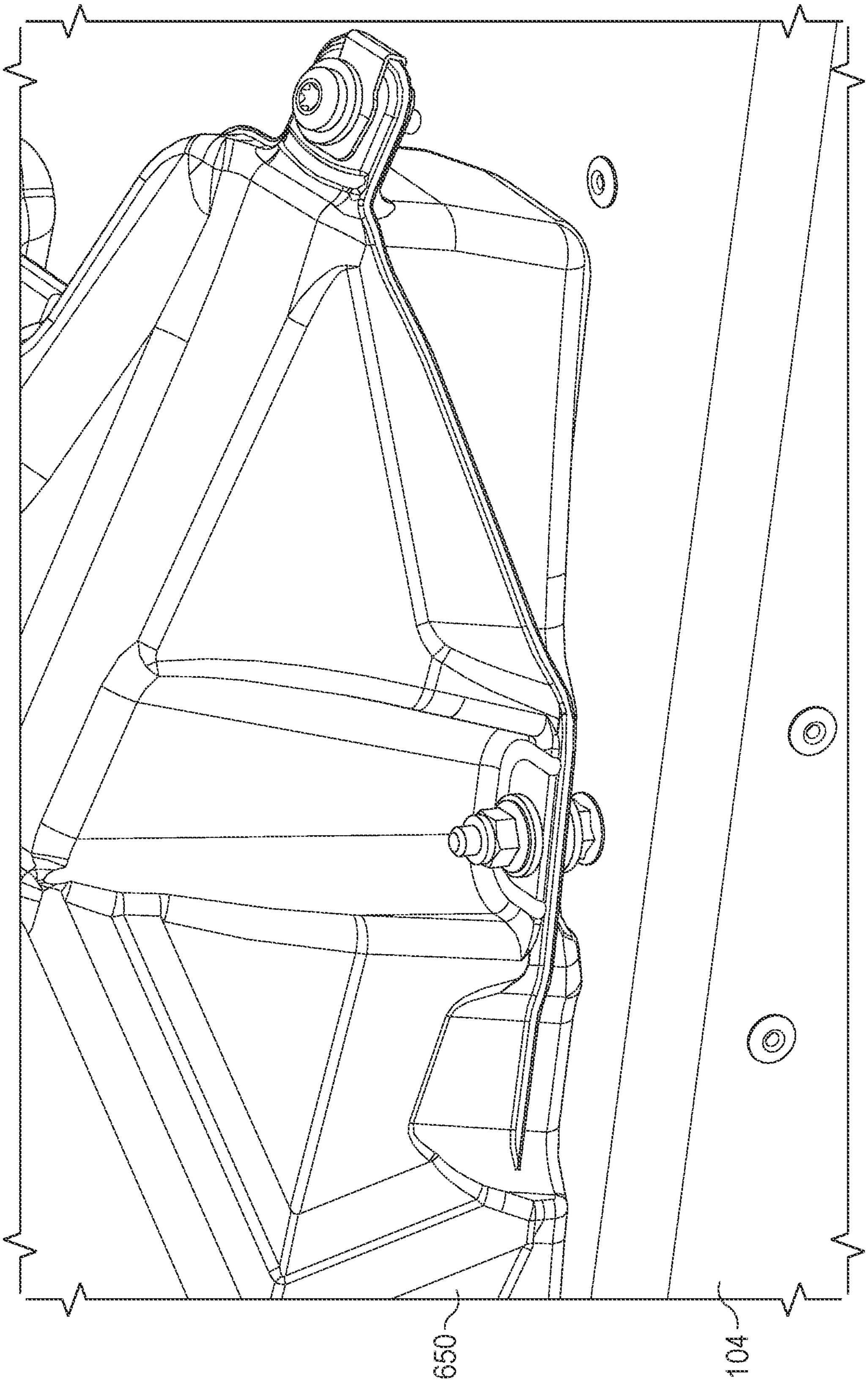
FIG. 68 illustrates an isometric view of a fuel tank disposed on a tunnel, according to some embodiments.

FIGS. 59-68 illustrate a seat support assembly in an illustrative embodiment. The support assembly may include a fuel tank 650 with mounting features 658 for securing a seat or seat frame 652 thereto. A rear panel 656 slidingly engages the fuel tank 650 to define a compartment 668 therebetween that may be used for storage or to house a battery 660 therein. The mounting features 658 may be integral with the fuel tank 650 and may provide a locking feature with the seat frame to provide for more stability both vertically, laterally, and in the forward/rearward directions. The mounting features 658 may be positioned on a raised portion of the fuel tank that may have a triangular shape that is at least partially surrounded by a flat or flangelike surface. A seat fastener feature 662 may be provided on the rear panel 656 for engaging a portion of the seat or the seat frame 652. The underside 664 of the fuel tank 650 may be upwardly recessed along the lower perimeter to slidingly receive extensions 666 of the rear panel 656 therealong so that the extensions 666 of the rear panel 656 are positioned between the underside 664 of the fuel tank 650 and the upper surface of the tunnel. As shown in FIG. 65, a removable accessory mount 181 may be secured to both the tunnel 104 and the running board support 184. As shown in FIG. 63, the fuel tank 650 may have a convex outer shape and may be almost entirely contained within the rider envelope (all positioned inboard of the upper legs of the front frame member and greater than 95% of the fuel tank volume is positioned inboard of the tunnel side walls, and optionally greater than 97% of the fuel tank volume is positioned inboard of the tunnel side walls, and optionally 99% or greater.

Figure 69B:
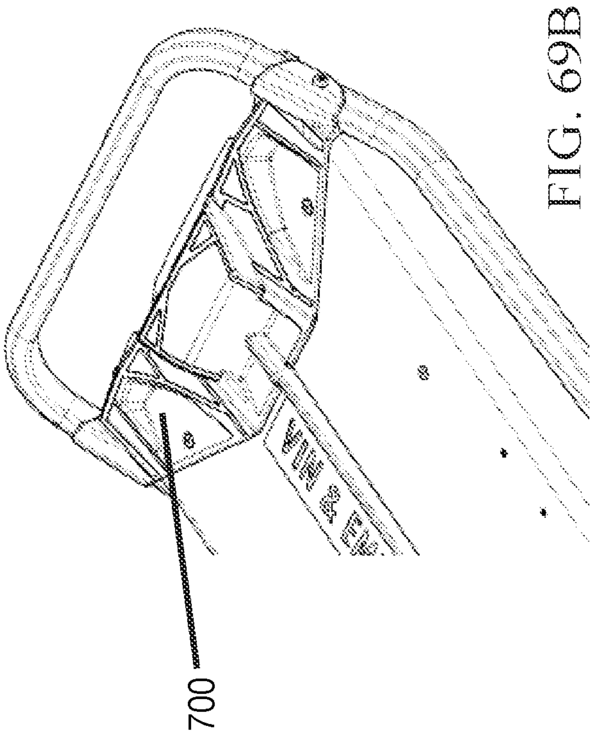
FIG. 69B illustrates an isometric view of a structural composite taillight housing, according to some embodiments.
Figure 69A:
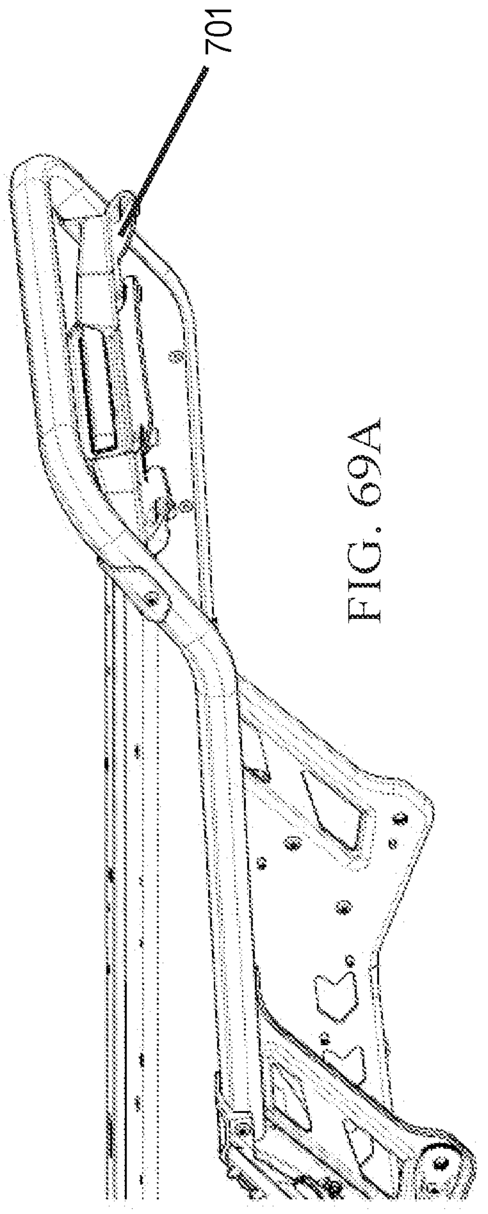
FIG. 69A illustrates an isometric view of a structural composite taillight housing, according to some embodiments.
Figure 70A:
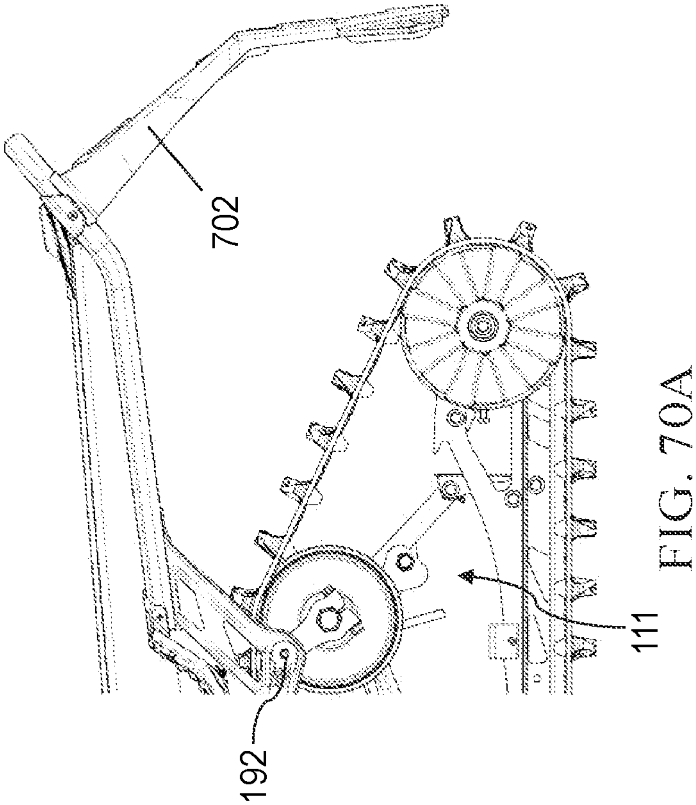
FIG. 70A illustrates a left side view of a snowmobile with a snow flap, according to some embodiments.
Figure 70B:
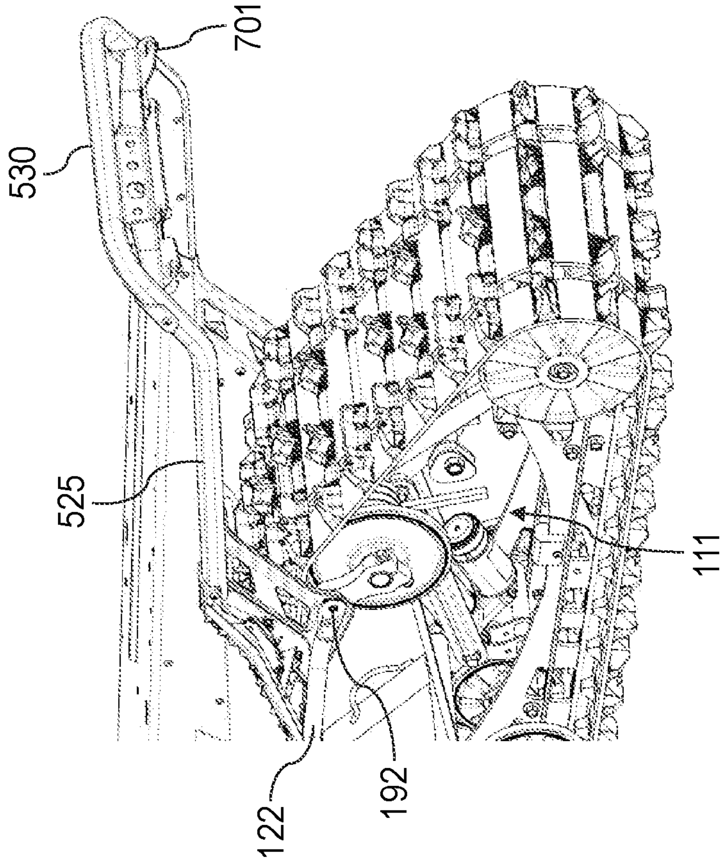
FIG. 70B illustrates an isometric view of a structural composite taillight housing with a mounting point, according to some embodiments.

FIGS. 69 and 70 show a structural composite taillight housing 700 that is positioned on the upper surface of the rearward end of the tunnel 104. The composite may comprise a polymeric matrix and a fiber reinforcement. The structural composite taillight housing 700 houses the taillight and provides a structural reinforcement on the upper surface of the rearward end of the tunnel 104 that optionally may allow for thinner gauges of tunnel material and may optionally eliminate internal tunnel reinforcements at the rearward end. The structural composite taillight housing 700 also provides a plurality of mounting points 701 for a snow flap 702 that helps to maintain the snow flap position away from the track and rear suspension components. As shown in FIGS. 69 and 70, the ends of the structural composite taillight housing 700 extend around the sides of the rear bumper or grab bar and may engage the outer sides of the snow flap 702.

As discussed above with reference to FIGS. 26-31, a toe stop 140 is attached to the foot support member 124 and provides a place to receive the rider's foot. Additional views of a toe stop 140 are illustrated in FIGS. 57, 66, and 71-76. A first embodiment of a pair of toe stops 140*a*/140*b* with one or more of the features described below is illustrated in FIGS. 77-89. A second embodiment of a pair of toe stops 140*c*/140*d* with one or more of the features described below is illustrated in FIGS. 90-101. The figures illustrate the toe stop 140 from the front/forward side 10, rear/rearward side 12, the top 14, the bottom 16, the outboard side 127, and the inboard side 128.

In one aspect, the toe stop 140 is a unitary body that can receive the rider's foot and may at least partially define a housing for one or more vehicle components. In some implementations, the unitary toe stop 140 is a molded polymeric composite material. In another aspect, the toe stops 140 may be a right toe stop 140*a*/140*c* for placement of the rider's right foot and a left toe stop 140*b*/140*d* for placement of the rider's left foot (see e.g., FIG. 66). As discussed below in greater detail, the right and left toe stops 140*a*/140*c*, 140*b*/40*d* may have different shapes. In another aspect, the toe stop 140 includes features that at least partially house vehicle components including, but not limited to, the belt case assembly or the brake assembly. Thus, parts can be reduced and assembly simplified. In one aspect, the toe stop 140 defines a recess/space to receive one or more internal components. In some implementations, the toe stop has a zig-zag shape (see e.g., FIG. 31). In a further aspect, the toe stop 140 includes features configured to be used with body paneling of different snowmobiles 100.

The toe stop 140 may include one or more of the following features: a bottom flange 176 that is engageable with a forward end of the foot support member 124, an outboard wall 197 that is engageable with a body panel, a forward wall 163, a toe hook 141, an inboard wall 171/173 that may at least partially house a vehicle component, and a rearward wall 230 that may partially house a vehicle component. The toe stop 140 may be removably secured to one or more components, including, but not limited to, the foot support member 124, the forward frame 312, the bottom out protector 148, the support member 122, the heat exchanger end cap 178, and the tunnel 104. For example, the toe stop 140 may be removably secured to mounting features 135/137 of the foot support member 124 (see e.g., FIGS. 21A-B, 31, 87B, 99B, and 101). The toe stop 140 may also be removably secured to mounting features 424/426 of the bottom-out protector 148 (see e.g. FIGS. 27B, 44).

Figure 80A:
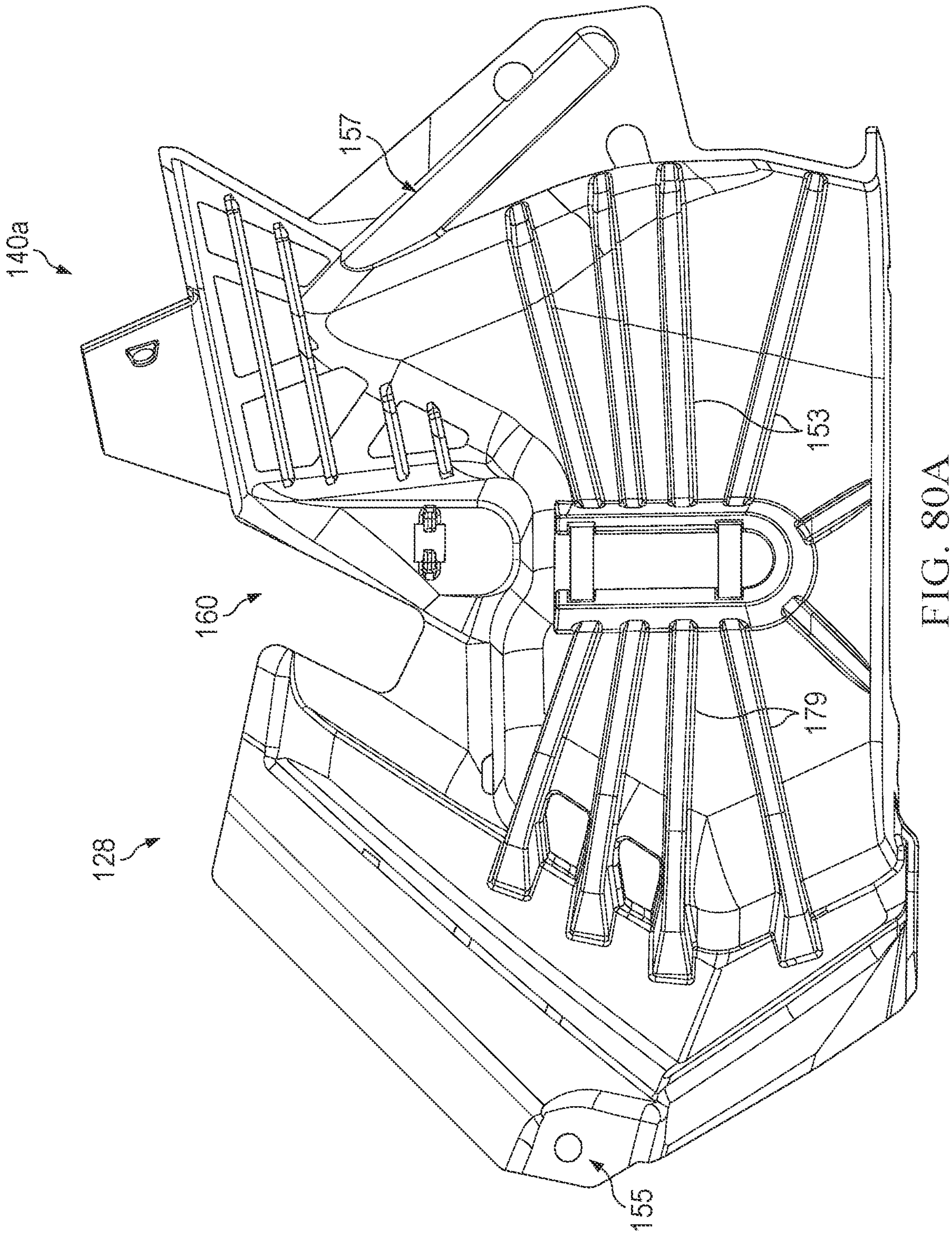
FIG. 80A illustrates an isometric view of the toe stop of FIGS. 77A and 77B, according to some embodiments.
Figure 80B:
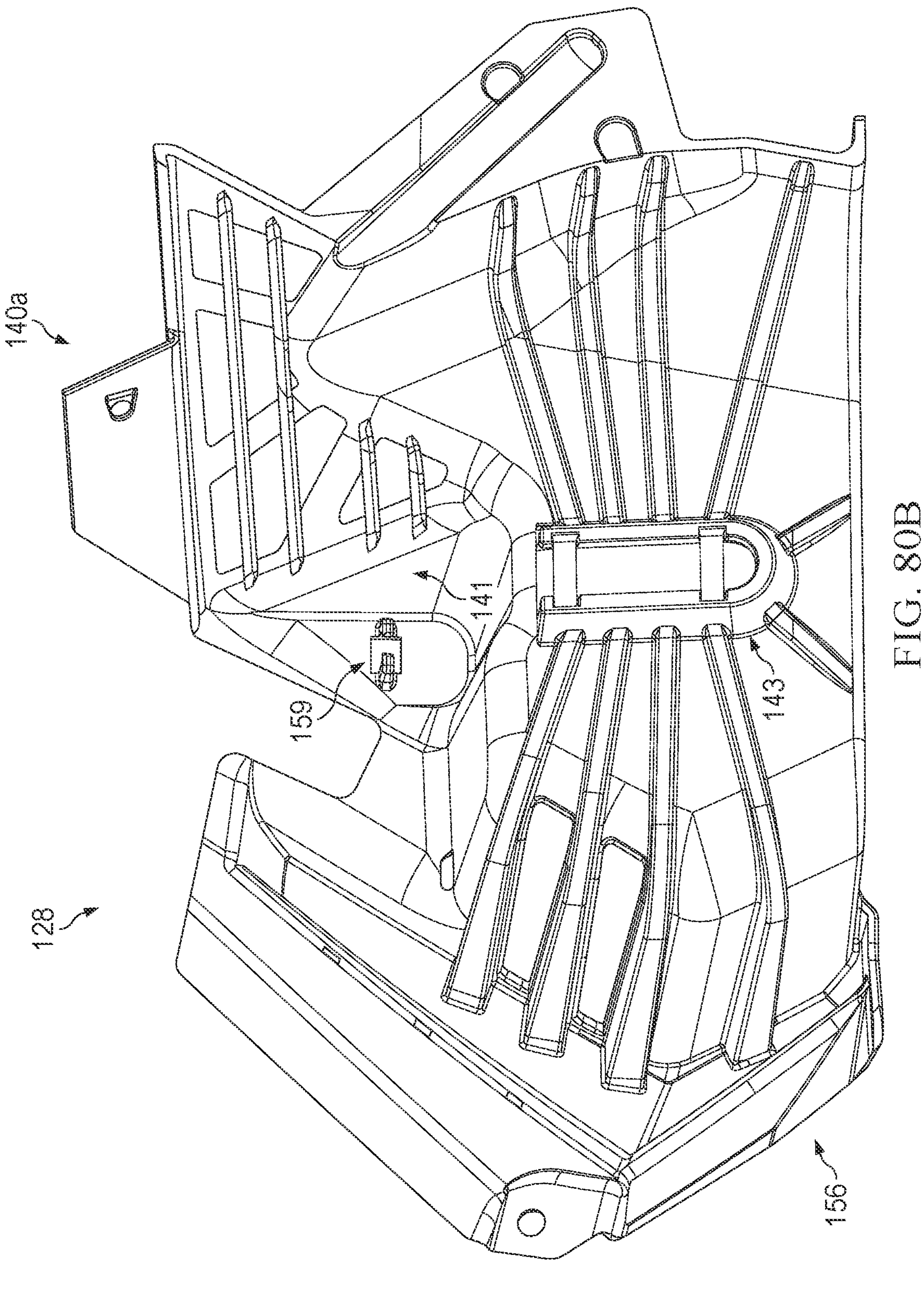
FIG. 80B illustrates an isometric view of the toe stop of FIGS. 77A and 77B, according to some embodiments.

Optionally, the toe stop 140 includes one or more ribs 153/179 (see e.g., FIGS. 80A, and 92B). One or more ribs 179 may be located on the forward surface of the forward wall 163. One or more ribs 153 may be located on the inboard surface of inboard wall 171/173 and/or the forward surface of the rearward wall 230. In one aspect, the ribs 153/179 strengthen areas of the walls 163/171/173/230 where openings 144/162/175/231 are located. The toe stop 140 may be removably secured to one or more components, including, but not limited to, the foot support member 124, the forward frame 312, the bottom out protector 148, and the support member 122, the heat exchanger end cap 178, and the tunnel 104.

The bottom flange 176 forms a bottom surface of the toe stop 140. The bottom flange 176 may have a zig-zag configuration (see e.g., FIGS. 79B and 93B). In some implementations, the bottom flange 176 is wider than in other implementations. In some embodiments, the rearward end region of the bottom flange 176, adjacent to the rearward wall 230, is narrower than the other regions (see e.g., FIGS. 77B and 79B). In some embodiments, the bottom flange 176 has a narrow portion between two wider portions (see e.g., FIG. 93B). The bottom flange 176 includes one or more slots 165 to receive a fastener 142 for coupling the toe stop 140 to the running board assembly 120 (see e.g., FIGS. 31 and 71). Slots 165 may be U-shaped. The location of one or more of the slots 165 may differ between embodiments of the toe stop 140 (e.g., compare the positions of the inboard, rearward slot 165*a* in FIGS. 79B and 93B). In one non-limiting example, the slot has a diameter of 5 mm to receive a fastener with a 10 mm diameter head. The bottom flange 176 may extend from the rearward wall 230, the inboard wall 173, and/or the forward wall 163 (see e.g., FIG. 72). In at least one embodiment, an opening 177 is defined by the bottom flange 176, and the foot support member 124.

Figure 71:
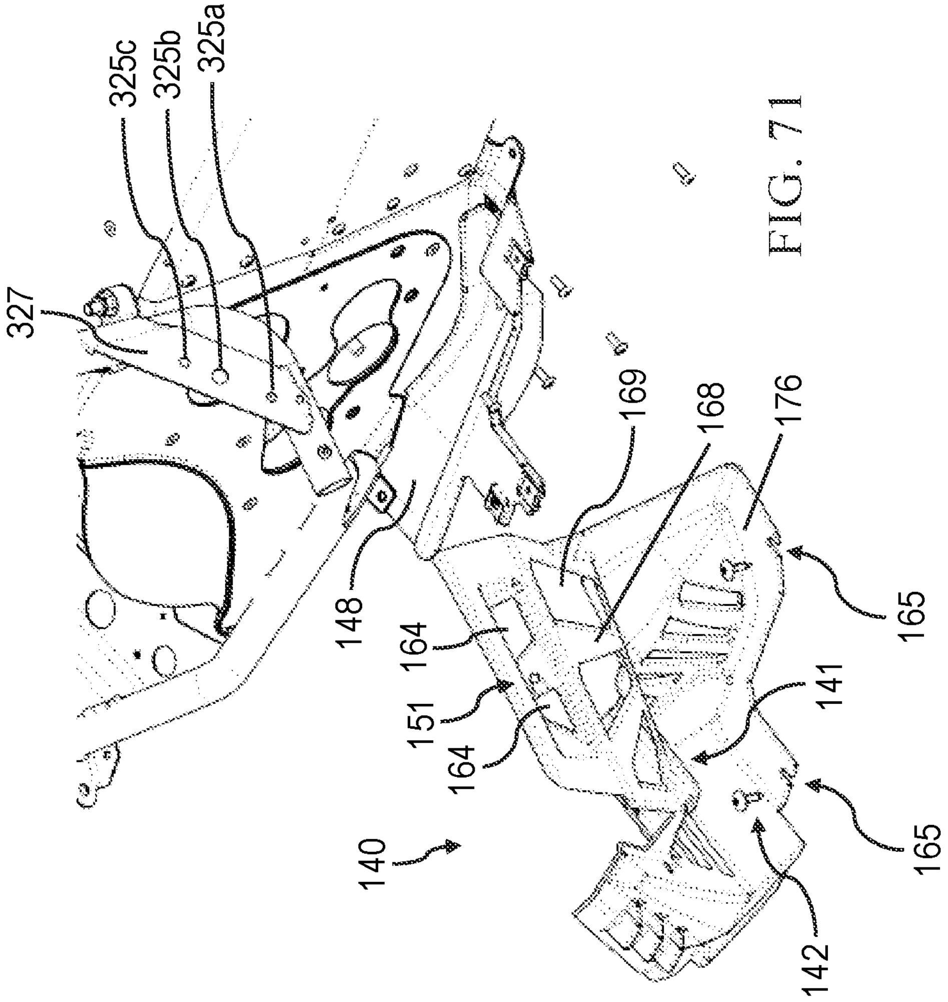
FIG. 71 illustrates an exploded view of a toe stop according to some embodiments.
Figure 72:
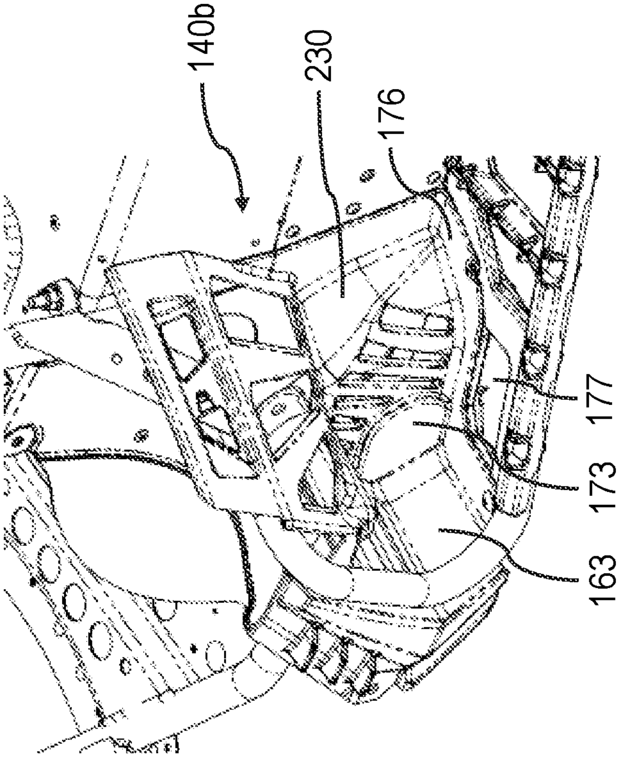
FIG. 72 illustrates a rear perspective view of a toe stop, according to some embodiments.
Figure 73:
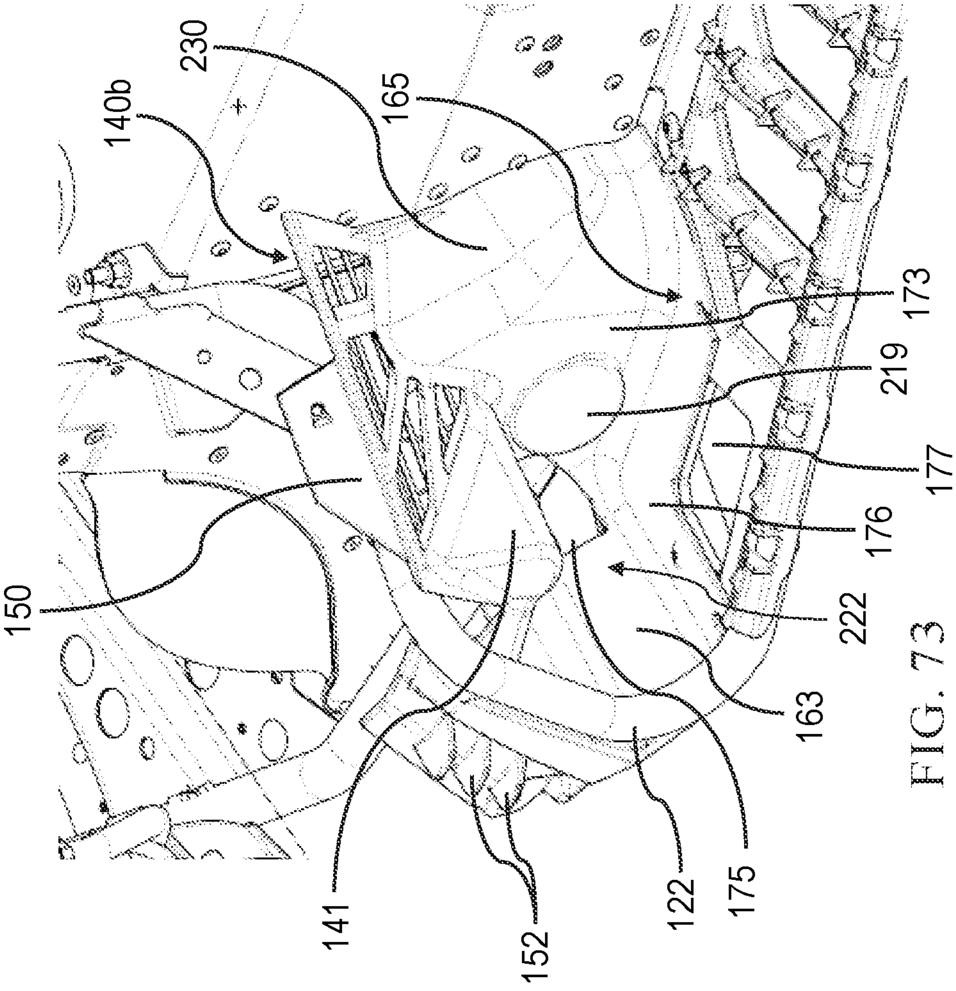
FIG. 73 illustrates a rear perspective view of a toe stop that may be part of the running board assembly 120A of FIG. 7, according to some embodiments.
Figure 74:
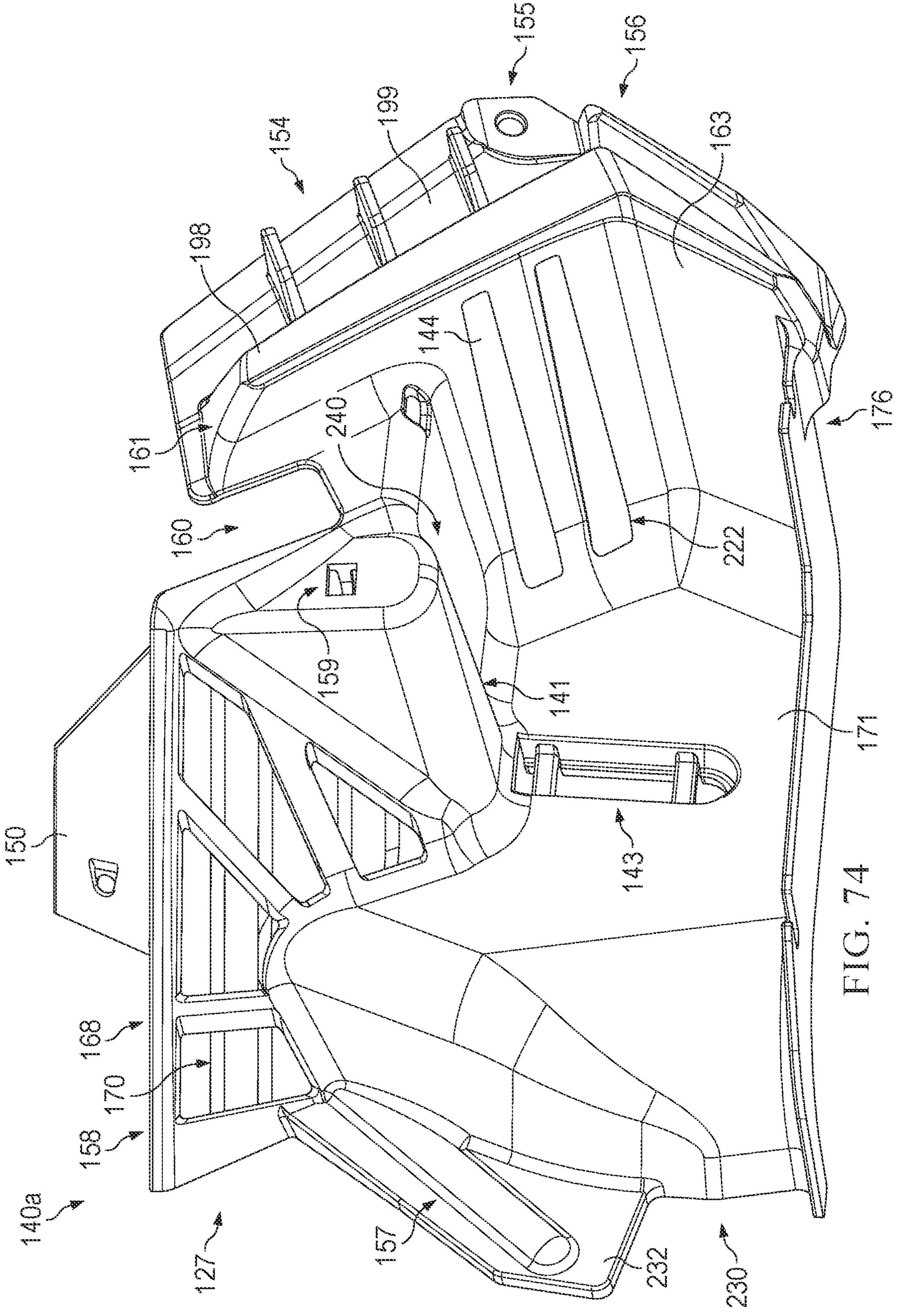
FIG. 74 illustrates a perspective view of a toe stop that may be part of the running board assembly 120A of FIG. 7, according to some embodiments.
Figure 75:
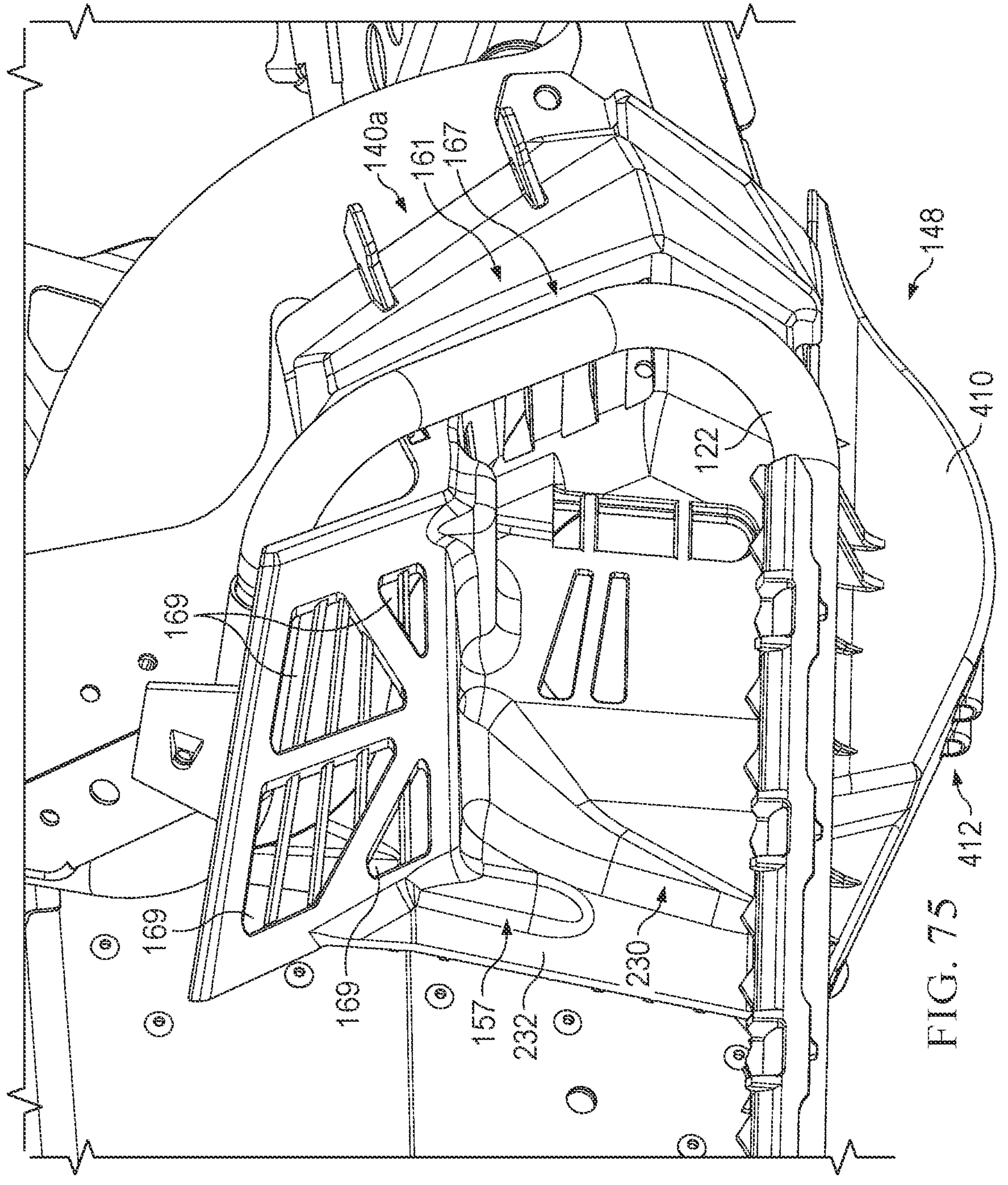
FIG. 75 illustrates a side perspective view of a toe stop and a bottom out protector that may be part of the running board assembly 120B of FIG. 10, according to some embodiments.
Figure 76:
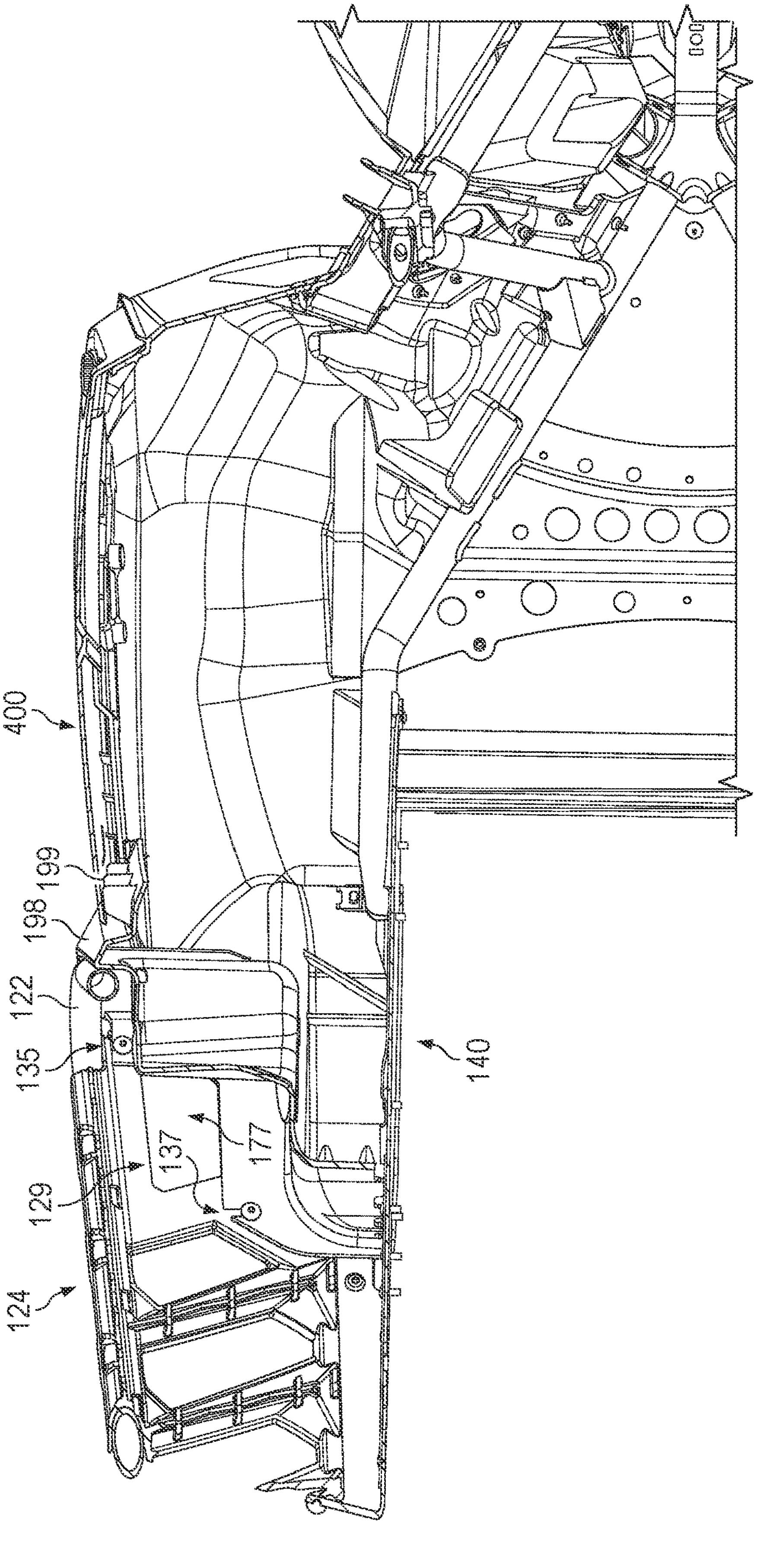
FIG. 76 illustrates a cross-sectional view of a toe stop and body panel, according to some embodiments.
Figure 86A:
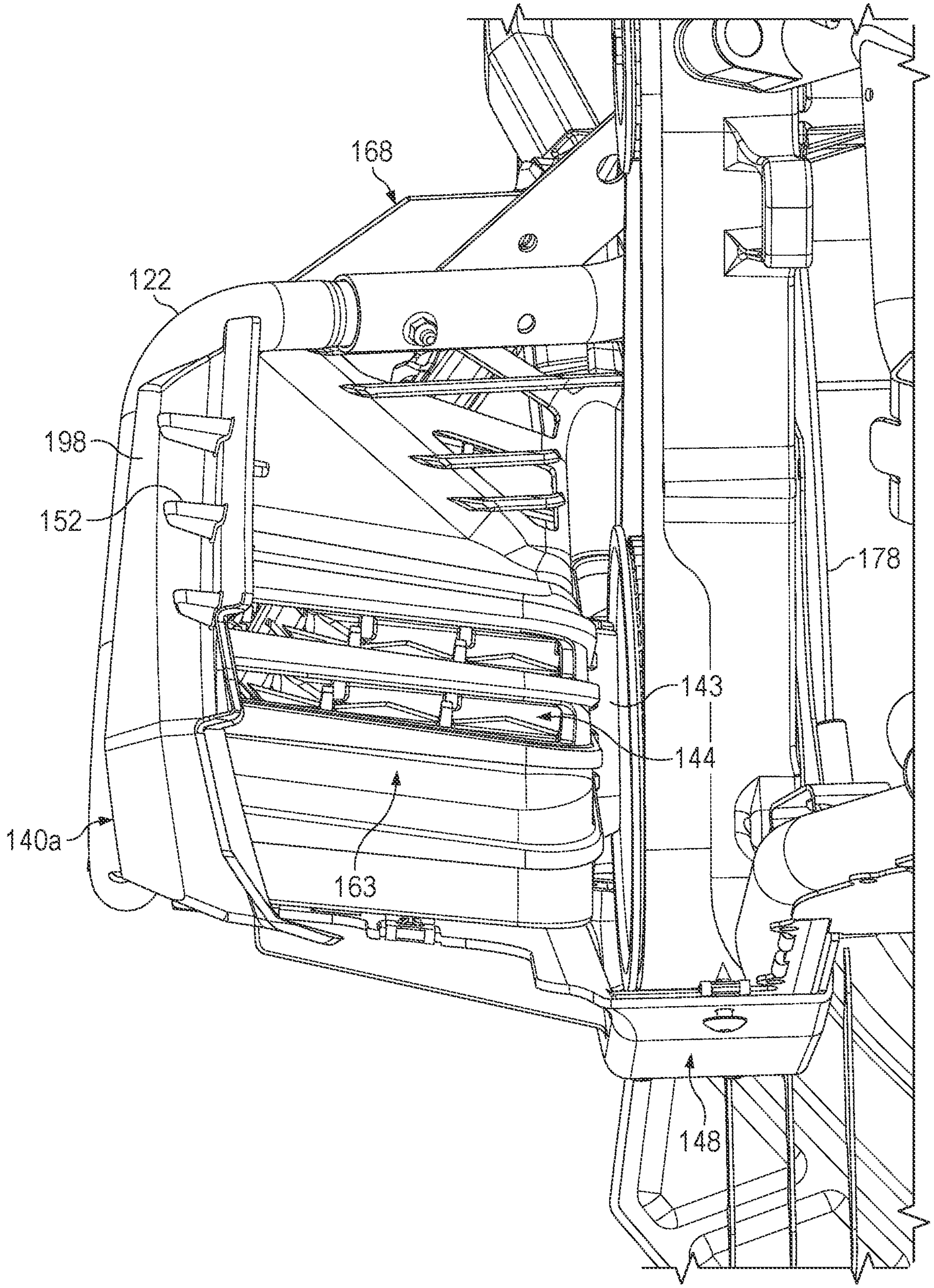
Figure 86B:
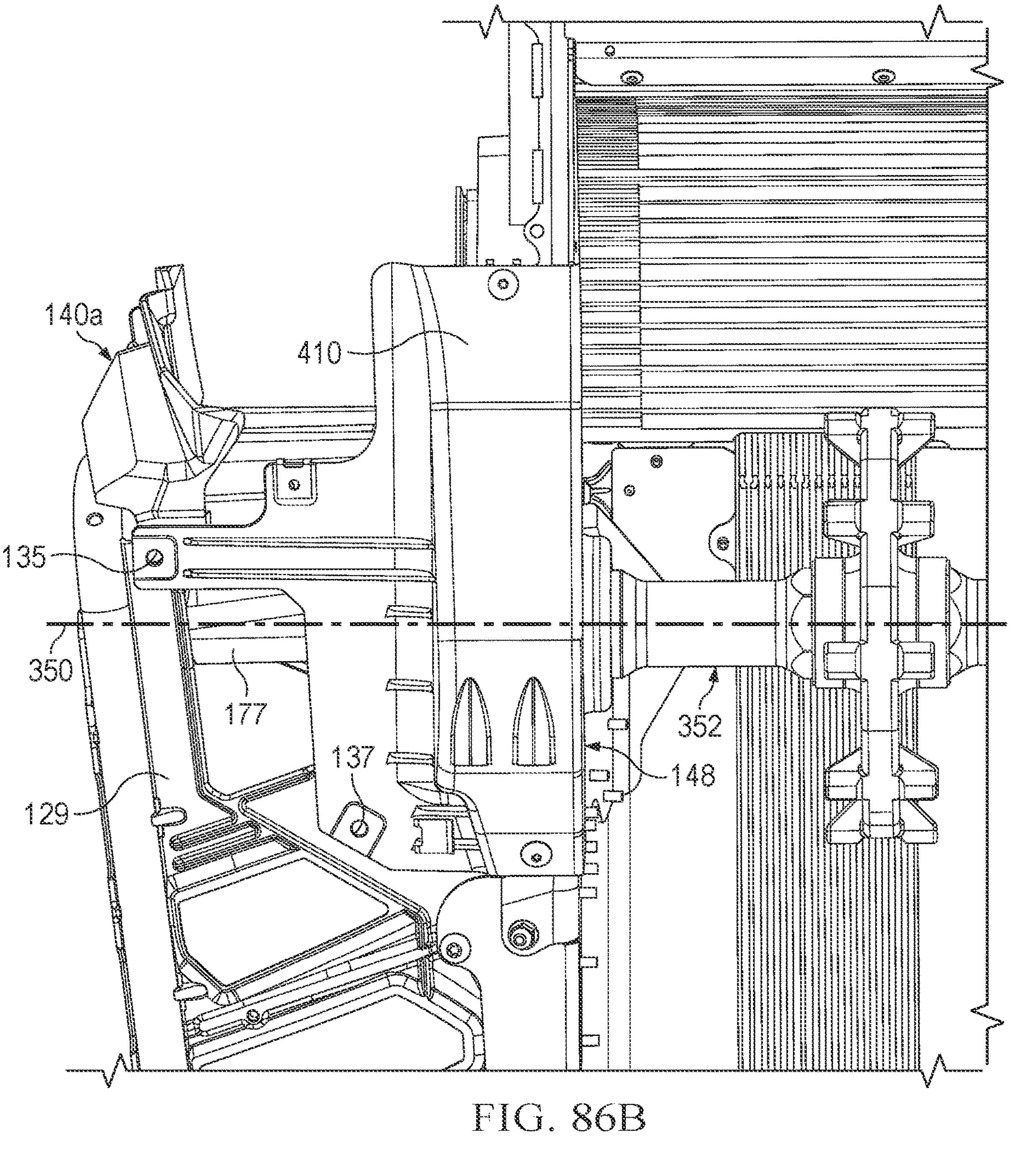

For example, as shown in FIGS. 71-73, the toe stop 140 may be positioned with the bottom flange 176 positioned over the flange at the forward end of the foot support member 124 with the slots 165 of the toe stop 140 aligned with the openings defined by the foot support member flange to receive the fasteners 142 to removably secure the toe stop 140 thereto. As shown in FIG. 86B, one of the openings in the foot support member flange may be positioned forward of the track drive shaft axis of rotation, and one may be positioned rearward of the track drive shaft axis of rotation. For example, the outboard portion of the foot support member 124 may extend forward of the track drive shaft axis of rotation, and the inboard side of the foot support member 124 may be positioned rearward of the track drive shaft axis of rotation. Similarly, one of the slots 165 on the toe stop 140 may be positioned forward of the track drive shaft axis of rotation and one may be positioned rearward of the track drive shaft axis of rotation, and both may be positioned outboard of the inboard wall 171. Accordingly spacing is provided for the inboard wall 171 of the toe stop 140 to define a chamber for housing one or more vehicle components while still providing sufficient spacing for the opening 177 to be defined by the toe stop 140 and the foot support member 124 to allow snow to pass therethrough. As described in detail below, the bottom out protector 148 may be removably secured to the underside of the foot support member flange and removably secured thereto to define the opening 177 on the underside of the foot support member 124 (see e.g., FIGS. 31, 57, 86B, and 101) that is aligned with the opening 177 partially defined by the toe stop 140.

Figure 77A:
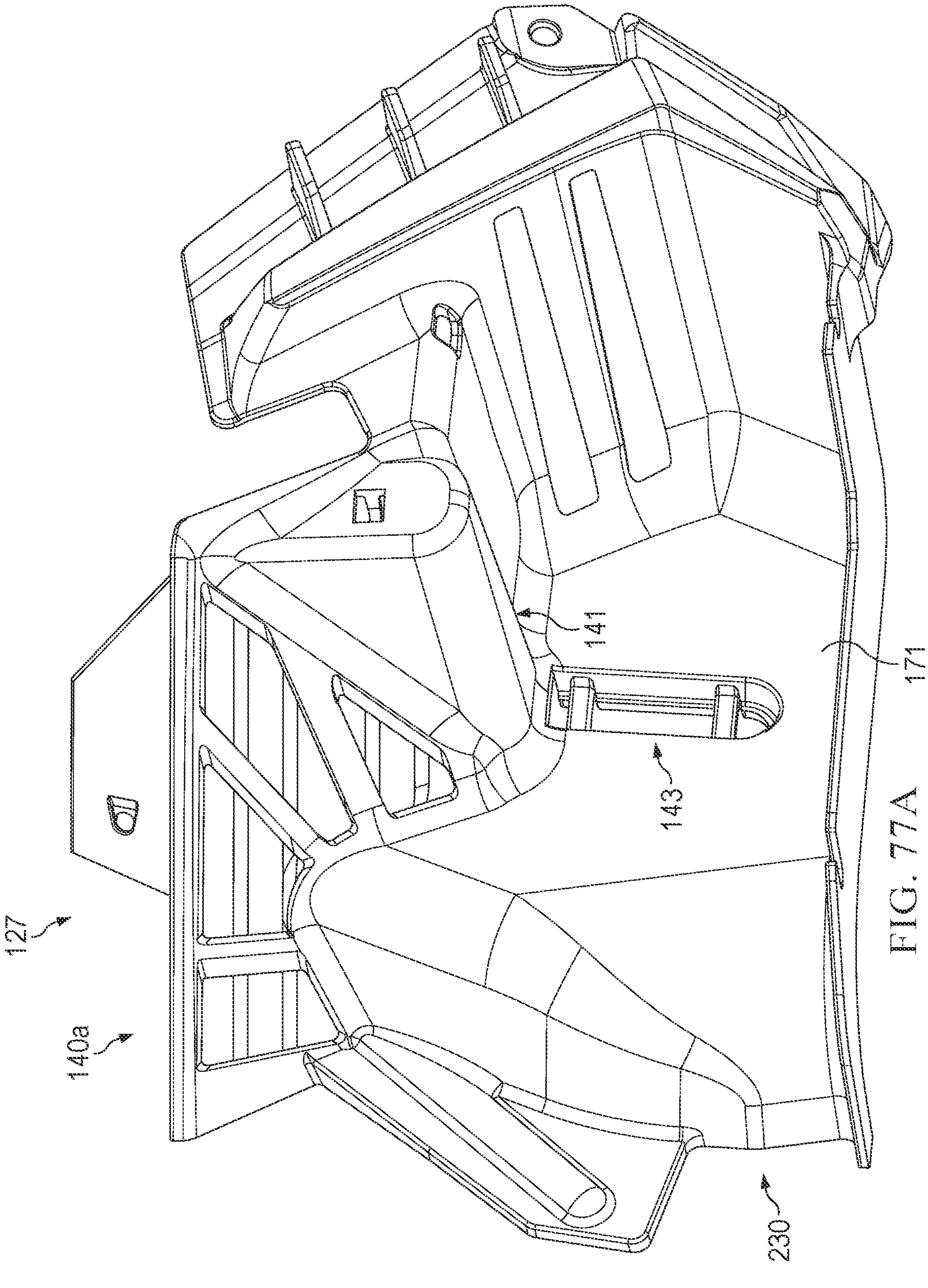
FIG. 77A illustrates an isometric view of a right toe stop that may be part of the running board assembly 120A of FIG. 7, according to some embodiments.
Figure 77B:
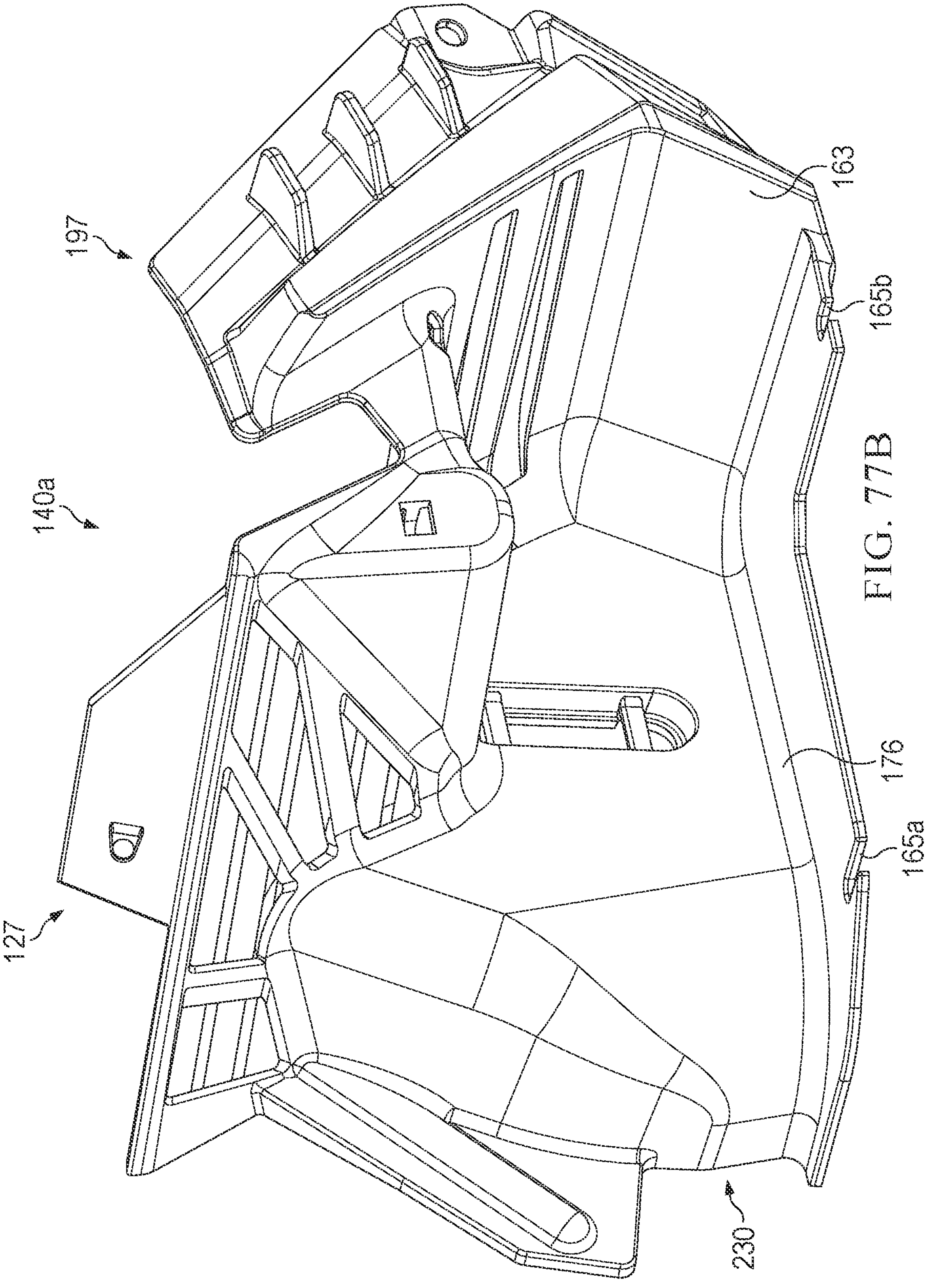
FIG. 77B illustrates an isometric view of a right toe stop that may be part of the running board assembly 120A of FIG. 7, according to some embodiments.
Figure 78A:
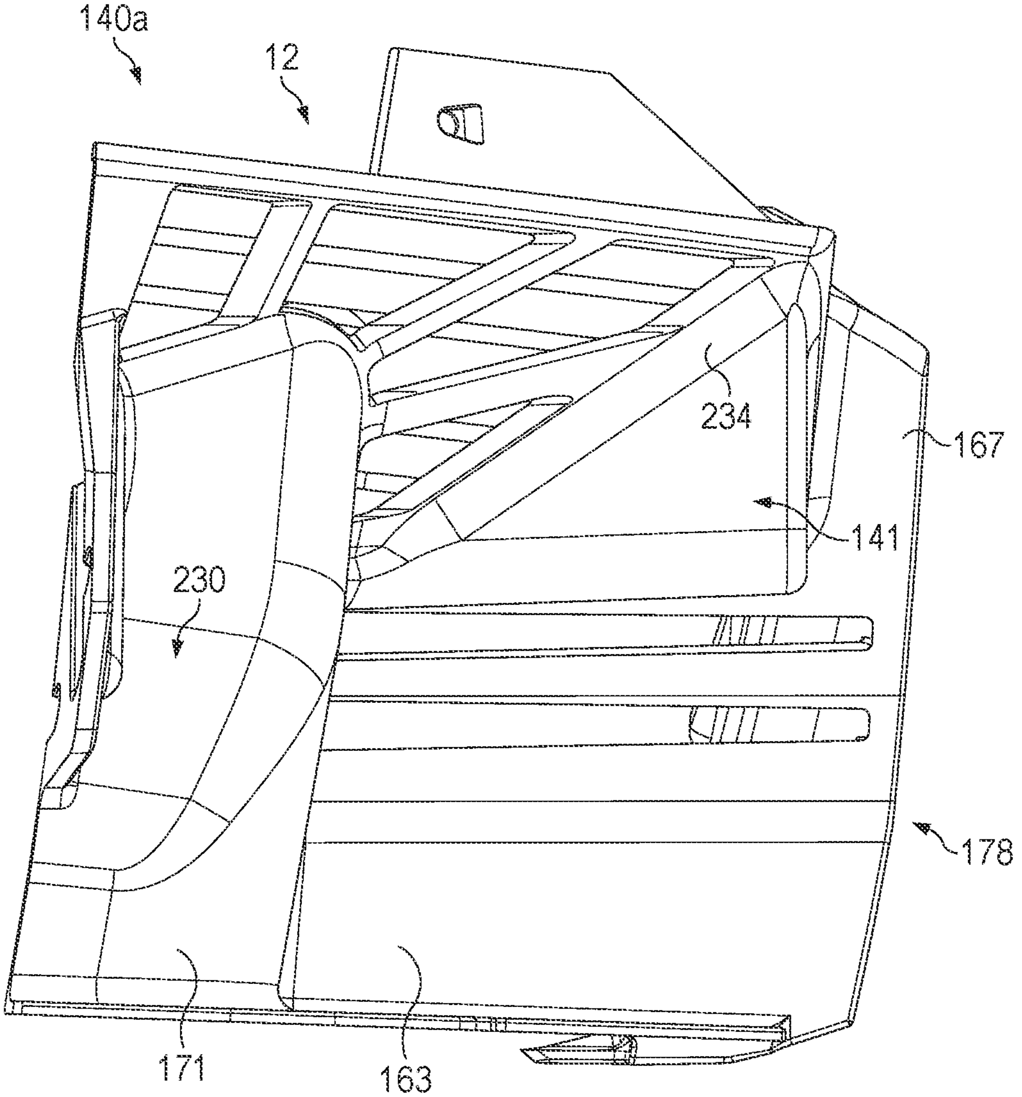
FIG. 78A illustrates an isometric view of the rearward facing side of the toe stop of FIGS. 77A and 77B, according to some embodiments.
Figure 78B:
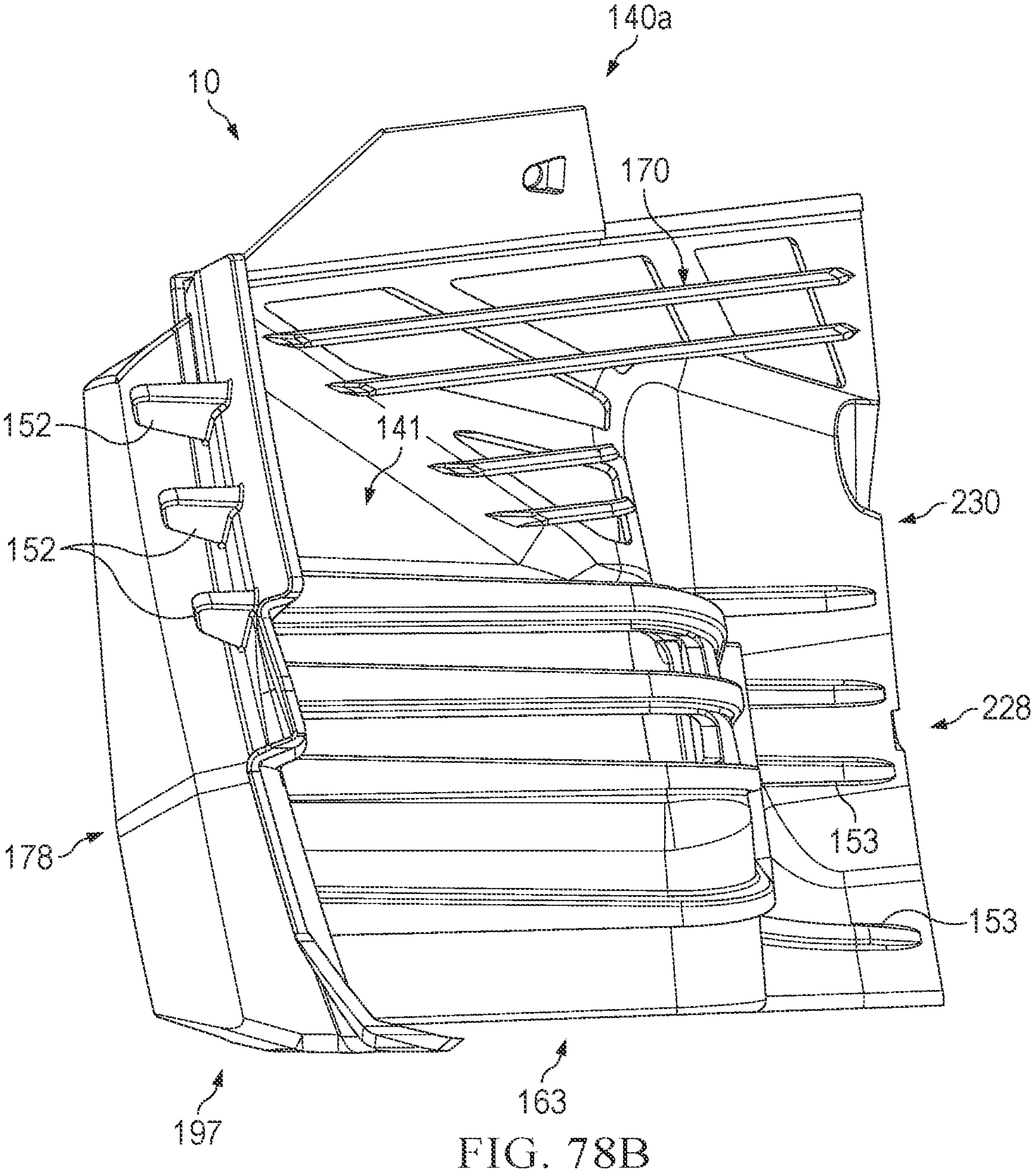
FIG. 78B illustrates an isometric view the rearward facing side of the toe stop of FIGS. 77A and 77B, according to some embodiments.
Figure 79A:
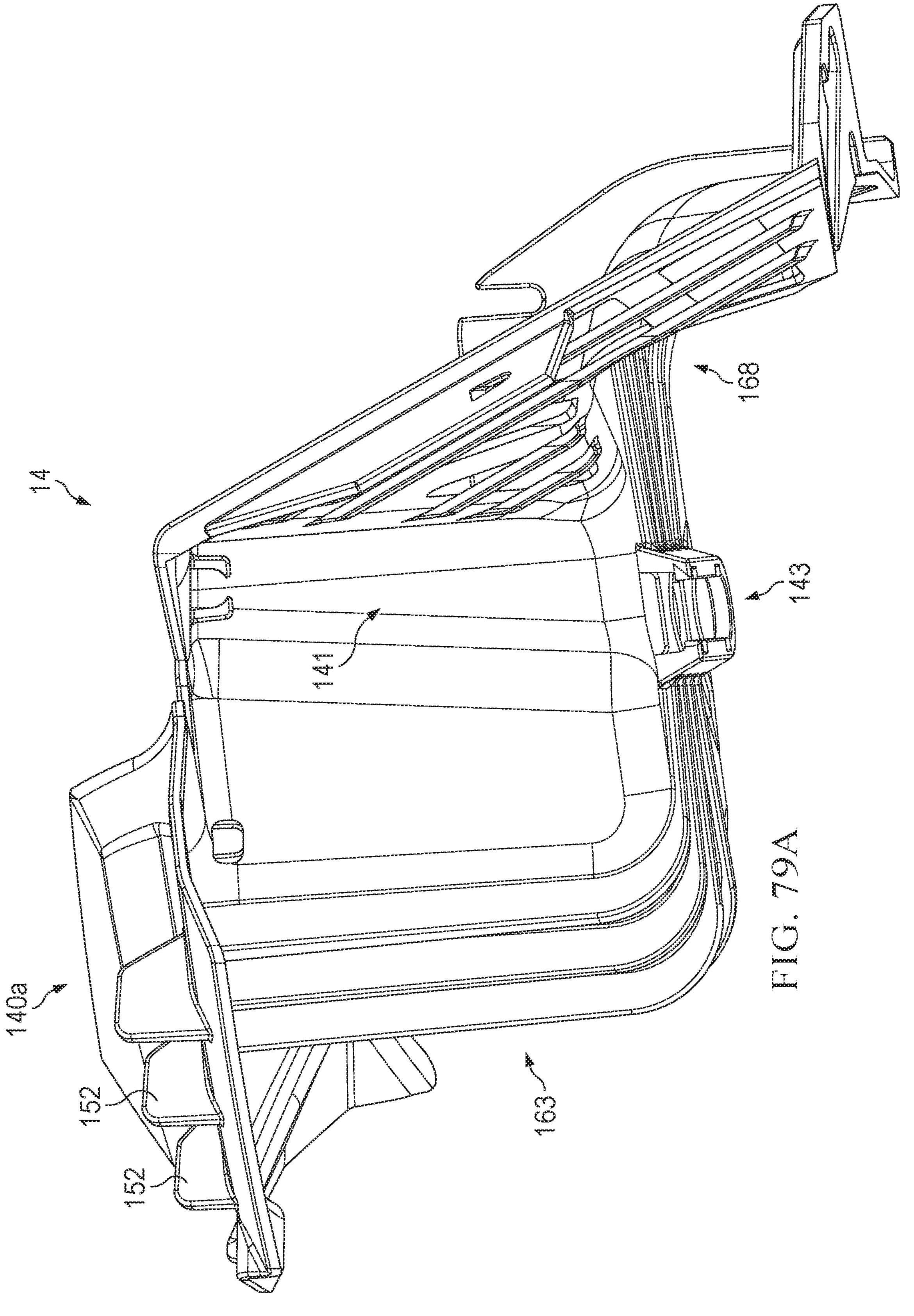
FIG. 79A illustrates an isometric view of the toe stop of FIGS. 77A and 77B, according to some embodiments.
Figure 79B:
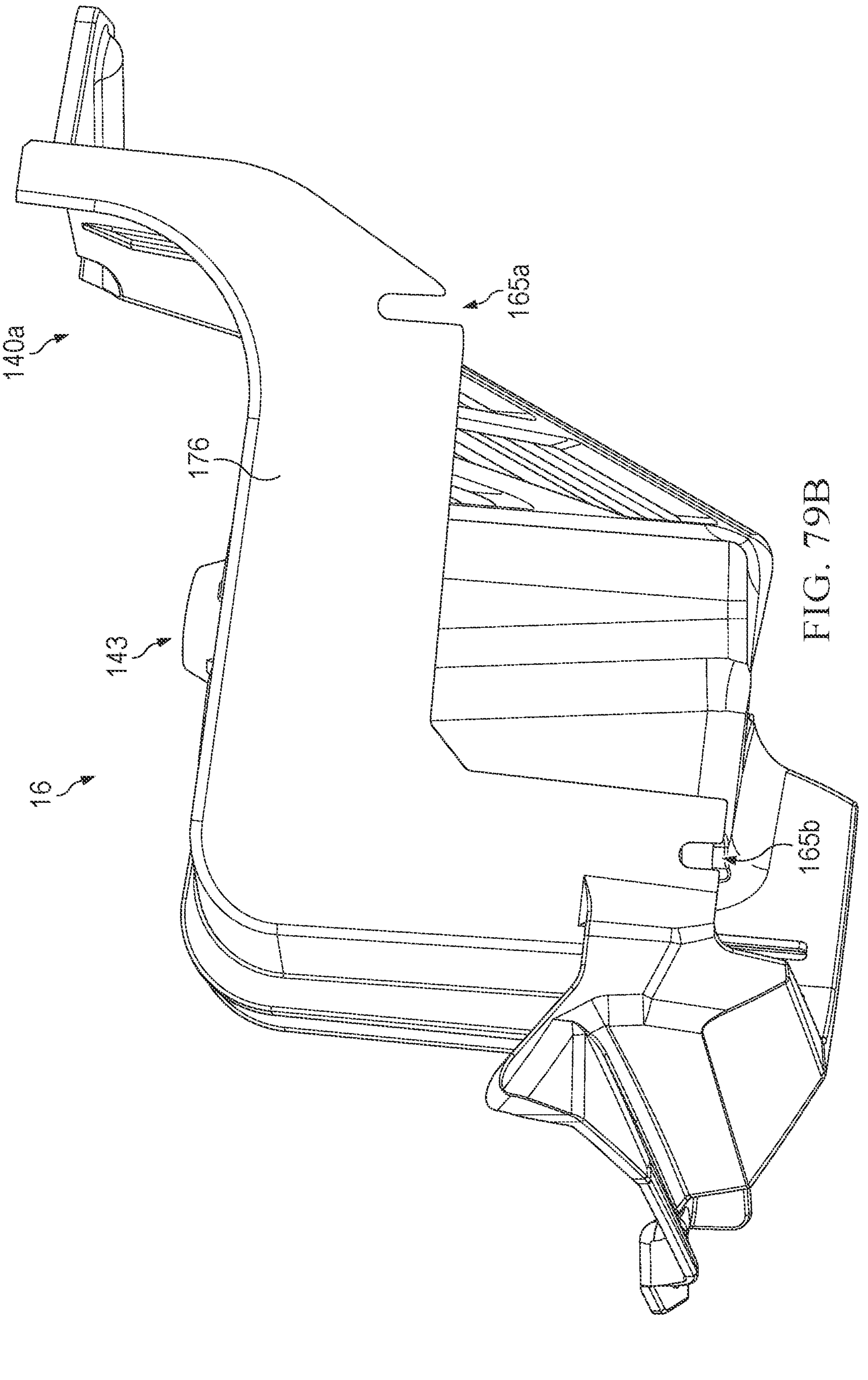
FIG. 79B illustrates an isometric view of the toe stop of FIGS. 77A and 77B, according to some embodiments.

In an illustrative example as shown in FIGS. 77B, 78B and 91A, the outboard wall 197 is positioned at least partially forward of the bottom flange 176 of the toe stop 140. The outboard wall 197 may have a shape that is configured to extend along the toe pocket and include a side panel interface 154 that may be overlapped by the body paneling 400 and optionally the skid plate 402. The outboard wall 197 may be configured in a V-shape (see e.g., FIGS. 78A-7B). For example, the apex of the V may be oriented towards the outboard side of the snowmobile 100 (see e.g., lines 36 and 37 of FIG. 96A). The side panel interface 154 includes a first portion 198 and a second portion 199 extending forward from the outboard wall 197 and forward of the toe pocket defined by the toe stop 140 (see e.g., FIGS. 27A-B). One or more ribs 152 extend out from the second portion 199 that is overlapped by one or both of the body paneling 400 and the skid plate 402. The ribs 152 may extend outboard for different lengths (see e.g., FIG. 83B).

Optionally, the outboard wall 197 may include a feature for removably securing the body panel 400 and/or the skid plate 402 thereto. In an illustrative example, the feature may be a mounting point 155 or aperture is positioned below the bottom rib 152 at an outboardmost point of the outboard wall 197. The mounting point 155 may be configured to receive a U-clip (see e.g., FIG. 89) that is co-axially aligned with an aperture defined in the mounting point 155. A fastener may be utilized to removably couple the toe stop 140 and the body panel 140 and/or the skid plate 402 together. A skid plate interface 156 extends forward from the outboard wall 197 and may be positioned below the mounting point 155 (see e.g., FIGS. 26, 27A, and 30). In some implementations, an interior/inboard face of the skid plate 402 overlaps and/or directly contacts the skid plate interface 156 (see e.g., FIG. 85A).

When the toe stop 140 is coupled to the snowmobile 100, the first portion 198 is visible 198 while the second portion 199 is positioned behind the body panel 400 and/or the skid plate 402 and is not visible, or only partially visible, when viewed from the side (see e.g., FIGS. 85A-B and 98A-B). The first portion 198 is positioned along the length of the vehicle between the body panel 400 and the support member 122. In some implementations, the one or more ribs 152 abut the inboard (inner) surface of the body panel 400—in other words, the body panel 400 rests on the one or more ribs 152. In one aspect, the space between adjacent ribs 152 and the body panel 400 provide a passageway for air to vent, e.g., underhood hot air may vent (see e.g., FIG. 76). In a non-limiting example, the ribs 152 provide a standoff between the toe stop 140 and the body paneling 400 to define a gap therebetween that is a ventilation feature positioned outboard of the toe pocket for air to flow out of the engine compartment and/or the belt case assembly 354 covered by the body paneling 400 and/or the toe stop 140. As the first portion 198 extends rearward and outboard of the second portion 199, the air flowing out of the gap defined by the toe stop 140 and the body panel 140 deflects off the first portion 198 and flows outboard away from the rider's envelope The forward wall 163 at least partially defines the toe pocket and separates the toe pocket from the engine compartment. The forward wall may include a lower wall that extends forward and upward from the bottom flange 176, and an upper wall that extends forward and downward from an upper panel 240 of the toe stop 140 (that is positioned forward of the toe grip 141) at least partially forward of the support member 122 and the mounting point 317 of the forward frame 312 to intersect the lower wall. The forward wall 163 may form a V-shape with the apex directed forward (see e.g., FIG. 78A). The forward wall 163 may form the rearward side of the outboard wall 197 (see e.g., FIG. 74). As best shown in FIGS. 78A-78B, the forward wall 163 may extend inboard from the outboard wall 197 to the inboard wall 171. As discussed above, the forward wall 163 may include one or more openings 144. The openings 144 may extend horizontally from the outboard wall 197 to the inboard wall 171, may optionally only be provided in the upper wall of the forward wall 163. Placement of the openings 144 at the upper portion of the toe pocket allows warm air to flow downward from the engine compartment or belt casing 354 and across the toe pocket region while inhibiting snow from entering.

In some implementations, the toe stop 140 is an abutment for one or more components of the running board assembly 120. For example, a portion of the forward wall 163 and/or the outboard wall 197 may form a channel 161 with a rearward facing support face 167 for the support member 122 (see e.g., FIG. 74). In other words, the support member 122 is positioned adjacent to the rearward side of the forward wall 163 and/or outboard wall 197. As illustrated for example, in FIGS. 85A-85B, when the toe stop 140 is coupled to the snowmobile 100, the support member 122 extends from the forward end of the foot support member 124 where it is received by the toe stop 140 along the lower and upper portions of the rearward facing side of the toe stop 140. The support member 122 is positioned in the vertical channel 161 as the support tube 122 extends upward and rearward from its forwardmost point before extending inboard to engage the mounting point 317 of the forward frame 312. The support member 122 may be exposed on the outboard side 127—in other words it is not covered by a body panel 400, or toe stop 140.

The toe stop 140 may include one or more features such as a toe hook 141 (see e.g., FIG. 74) positioned in and/or above the toe pocket that provides a grip for the rider's foot. In one aspect, since the toe hook 141 is a part of the unitary toe stop 140, the toe hook 141 is not directly fastened to the frame. In another aspect, since the toe stop 140 is polymeric composite material, the toe stop 140 is not a metal tube or formed part like a conventional toe stop. In at least one embodiment, the toe stop 140 includes a curved bottom (see e.g., FIG. 81A). In some implementations, the toe hook 141 has a triangular shape defining a forward recess (see e.g., FIG. 80B). In one example, an apex of the triangular shaped toe hook 141 points rearward (see e.g., FIG. 66). In another example, an apex of the triangular shaped toe hook 141 points downward (see e.g., FIG. 78A). In other implementations, the toe hook 141 has a rectangular or U shape defining a recess (see e.g., FIGS. 90A-B).

In at least one embodiment, the toe hook 141 is adjacent to a panel 168 that extends inboard therefrom. In some implementations, the toe hook 141 includes an angled edge that extends from the outboard end of the upper edge of panel 168 downward and inward towards the inboard wall 171 (see e.g., FIG. 78A). In one example, the rearward side of the toe hook 141 is an extension of the panel 168 (see also FIG. 78B). In other implementations, the toe hook 141 is positioned under the panel 168 (see e.g., FIGS. 90A and 92A) and the panel 168 extends upward and rearward therefrom. The toe hook 141 may be at least partially positioned rearward of the forward wall 163. The forward wall 163 may extend further outboard than the toe hook 141 (see e.g., FIGS. 78A, 83A, and 92A) to accommodate the forward end of the support member 122. In some implementations, an upper panel 240 is positioned between the forward wall 163 and the toe hook 141 (see e.g., FIG. 91A).

The outboard wall 197, the forward wall 163, the upper panel 240, and/or the toe hook 141 may define a toe pocket configured to receive at least the toe portion of the rider's foot. In some implementations, the bottom flange 176 and forward wall 163 is substantially C-shaped, with an upper portion of the forward wall 163 curving rearward to form a ceiling of the toe pocket (see e.g., FIG. 31). In other implementations, the upper panel 240 extends rearward from the forward wall 163 to the toe hook 141 to at least partially form the ceiling of the toe pocket (see e.g., FIG. 91A). As shown in FIGS. 91A and 94A, at least a portion of the toe hook 141 extends downward into the toe pocket below the upper panel 240.

Optionally, a clearance feature 160 may be positioned forward of and/or above the toe hook 141 (see e.g., FIG. 74) and rearward of the first portion 198. The clearance feature 160 is sized to receive the support member 122 forward of the toe hook 141 (see e.g., FIG. 27A) so that the support member 122 extends inboard forward of the panel 168. In one example, the clearance feature 160 is a U-shaped slot. In some implementations, the U-shaped clearance feature 160 is formed by the panel 168, panel 240, and the outboard wall 197 (see e.g., FIGS. 74 and 91A). The support member 122 may extend alongside and/or rest against the forward facing surface 166 of the panel 168 (see e.g., FIGS. 75 and 88A).

The inboard wall 171/173 extends rearward from the forward wall 163. In one aspect, an inboard surface of the inboard wall 171/173 defines at least a portion of a chamber for receiving a vehicle component therein and thereby separates the rider's foot therefrom. In a non-limiting example, the inboard wall 171/173 defines a chamber that receives one or more of a belt case assembly including, but not limited to, a belt, a bottom drive sprocket or gear, a belt housing assembly, and a track drive shaft. Accordingly, the toe stop 140 eliminates the need for a separate housing components. For example, the belt case does not require a separate cover, which reduces the weight of the belt housing assembly 354 (see e.g., FIG. 28). A portion of the inboard wall 171/173 may be positioned under the toe hook 141 that extends outboard from the inboard wall.

Figure 42A:
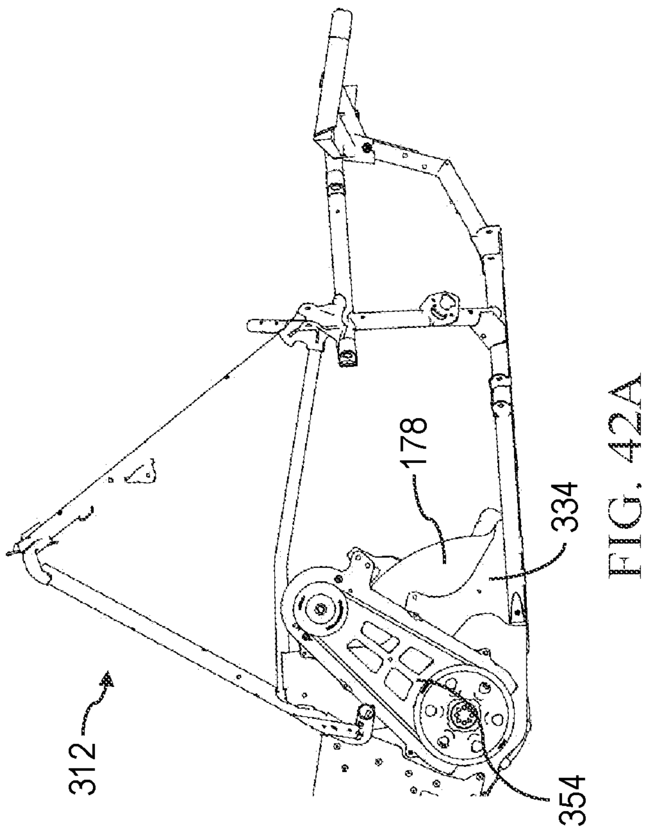
FIG. 42A illustrates a right side view of a snowmobile frame, according to some embodiments.
Figure 42B:
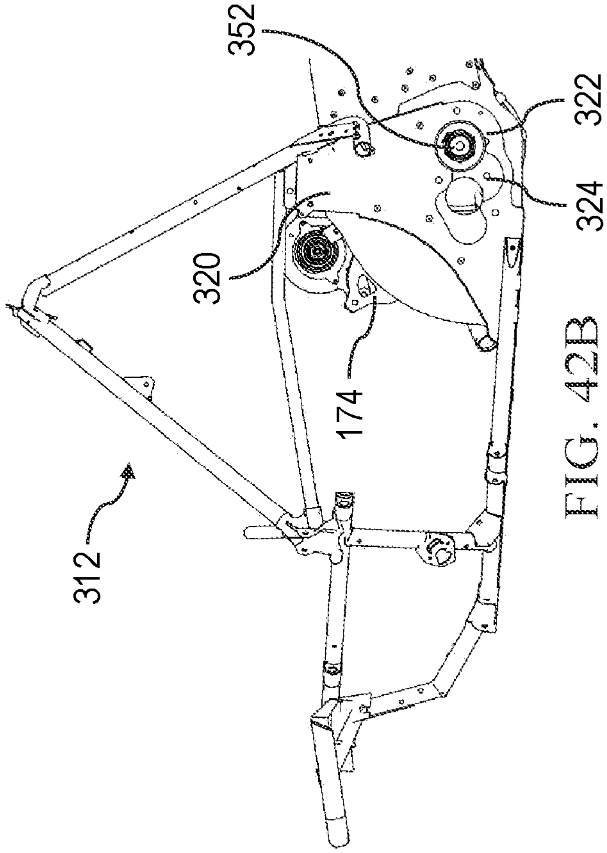
FIG. 42B illustrates a left side view of the snowmobile frame of FIG. 42A, according to some embodiments.
Figure 42C:
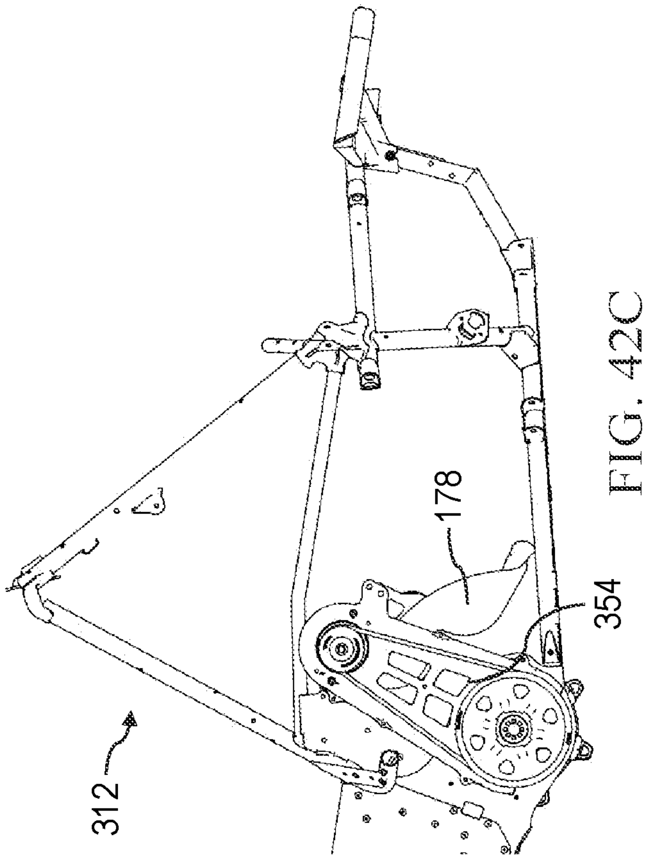
FIG. 42C illustrates a right side view of another snowmobile frame, according to some embodiments.
Figure 42D:
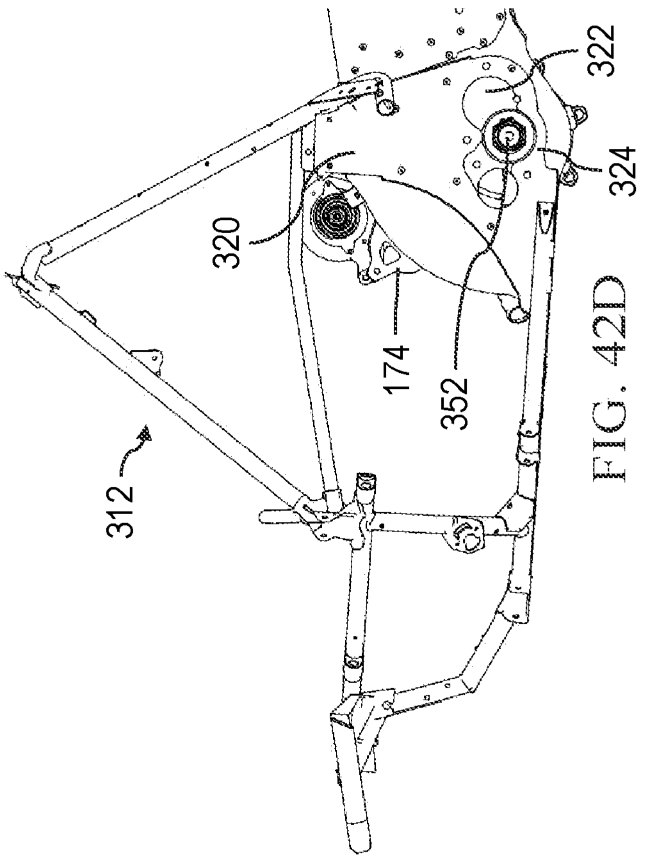
FIG. 42D illustrates a left side view of the snowmobile frame of FIG. 42C, according to some embodiments.
Figure 81A:
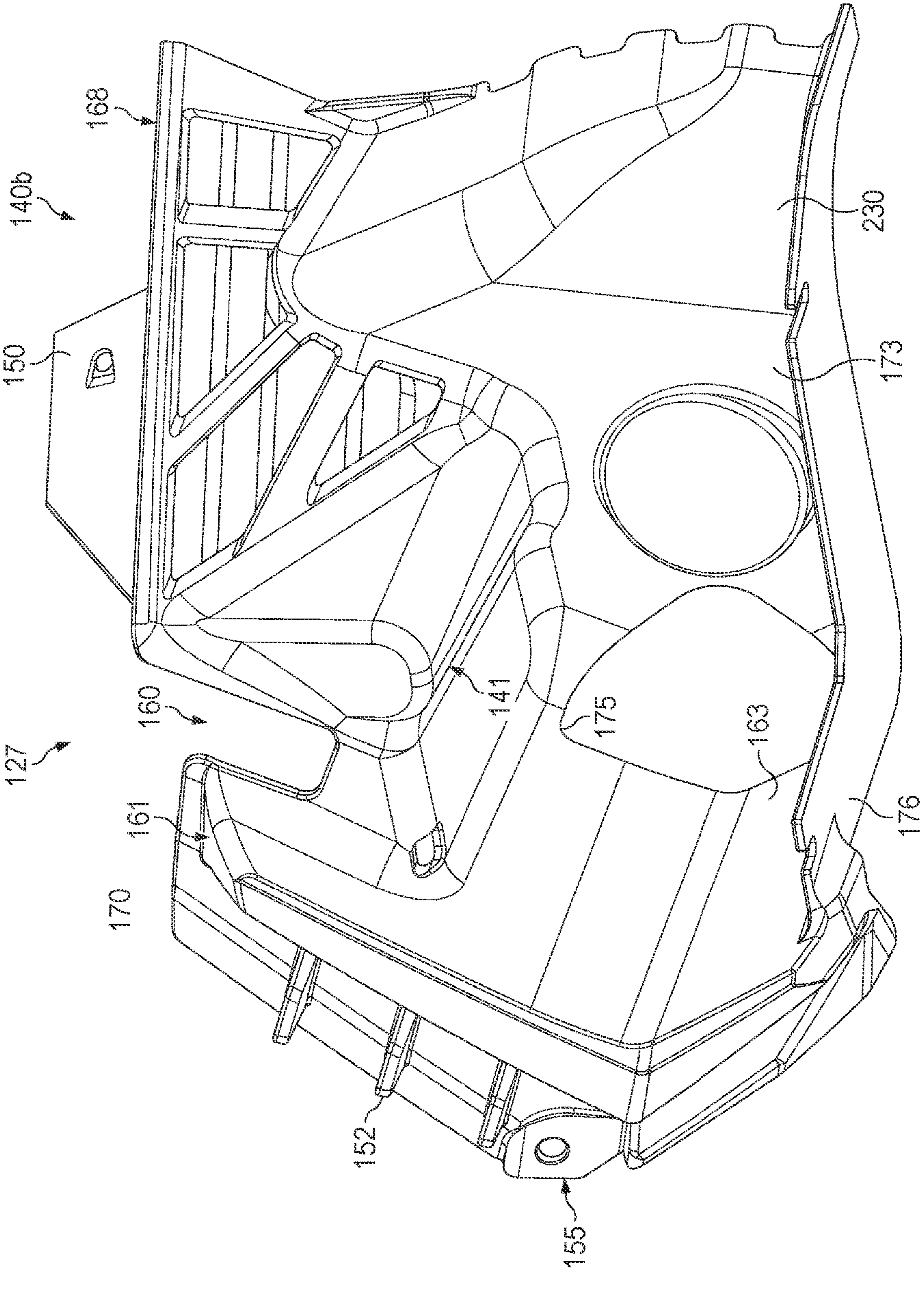
FIG. 81A illustrates an isometric view of a left toe stop that may be part of the running board assembly 120A of FIG. 7, according to some embodiments.
Figure 81B:
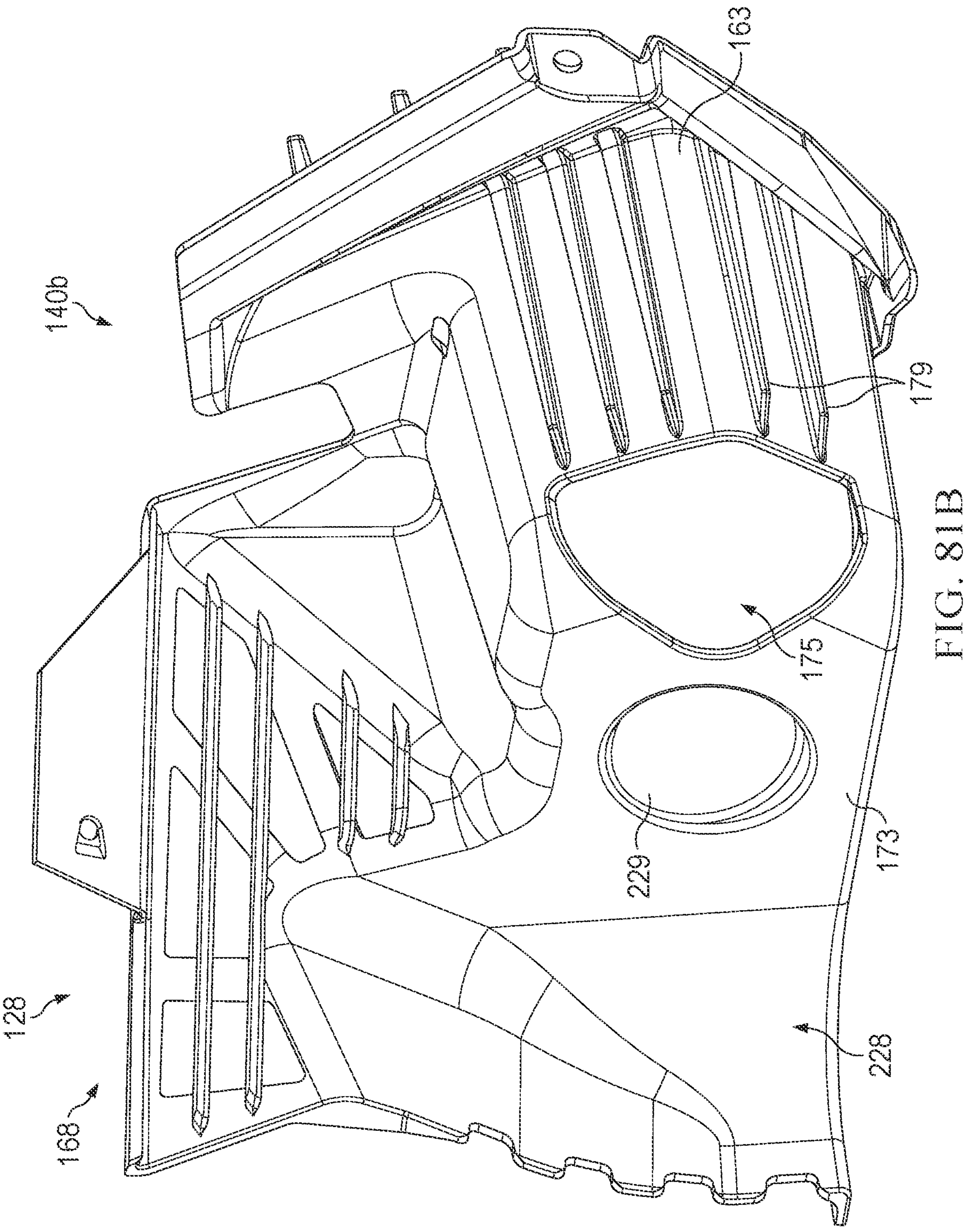
FIG. 81B illustrates an isometric view of a left toe stop that may be part of the running board assembly 120A of FIG. 7, according to some embodiments.

In an illustrative example, inboard wall 171/173 may define a chamber 228 that receives a brake component including, but not limited to, a track drive shaft, a rotor and/or a caliper (see e.g., FIGS. 77 and 81). As shown in FIGS. 81A, 81B, 94A and 94B, the inboard wall 173 may also define a second chamber 229 that extends outboard to receive a portion of the brake assembly or drive shaft therein. In one illustrative example, the second chamber 229 receives an end of the drive shaft 352. The shape of the inboard wall 171/173 and one or more other dimensions of the toe stop 140 such as the width from inboard side to outboard side of the toe stop 140 may differ depending on the drive shaft position of the snowmobile 100 and/or the orientation of the foot support 124. For example, the toe stops 140 shown in FIGS. 77 and 81 may be part of the running board assembly 120A of FIG. 7 wherein the track drive shaft is positioned as shown in FIGS. 42A and 42B. The toe stops 140 shown in FIGS. 90 and 94 may be part of the running board assembly 120B of FIG. 10 wherein the track drive shaft is positioned as shown in FIGS. 42C and 42D. The inboard wall 171/173 may include one or more openings for venting. For example, the inboard wall 171 may include one or more openings 162 (see e.g., FIG. 90B). As another example, the inboard wall 173 may include one or more openings 175 for venting the brake caliper (see e.g., FIG. 81A). As shown in FIG. 85B, the brake caliper 353 may extend through the opening 175 and outboard of at least a portion of the inboard wall 173. In an illustrative example, the running board assembly 120A may include a first support tube 122A (FIG. 58) and a first support bracket 184A (FIGS. 37A-B), and the running board assembly 120B may include a second support tube 122B (FIGS. 37C-D) that is different than the first support tube 122A, and a second support bracket 184B that is different than the first support bracket 184A.

Figure 87A:
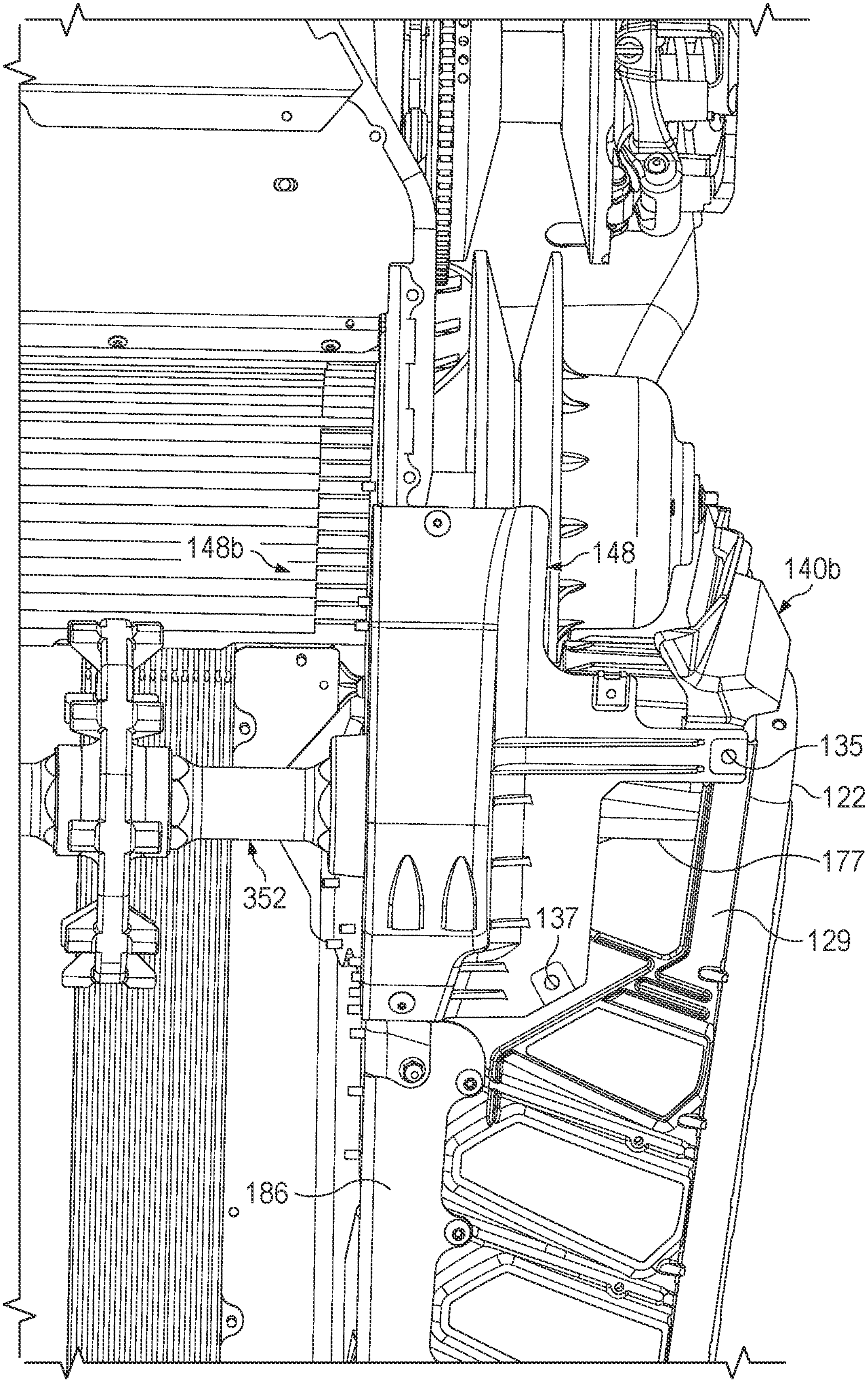
Figure 87B:
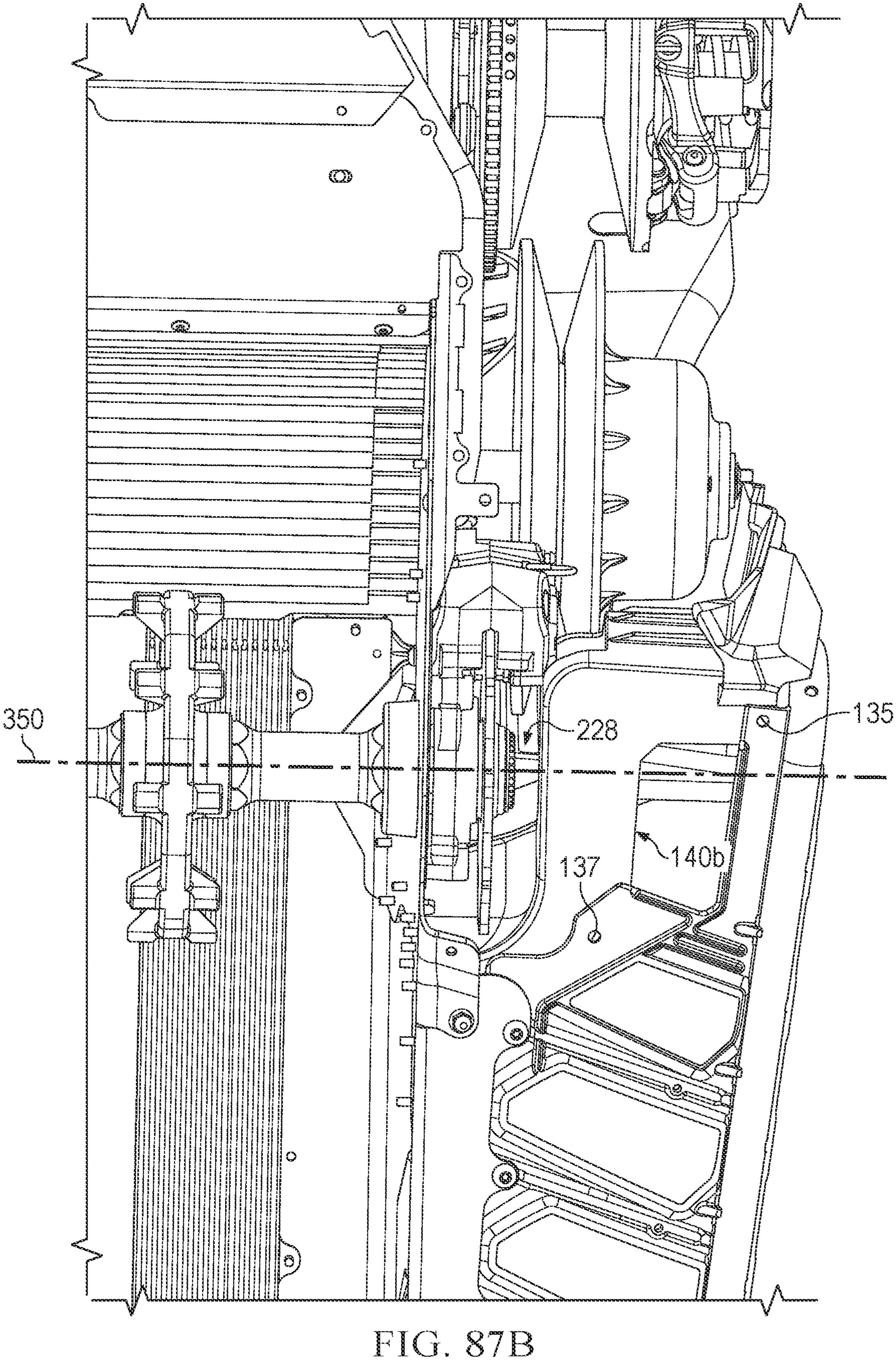
Figure 88A:
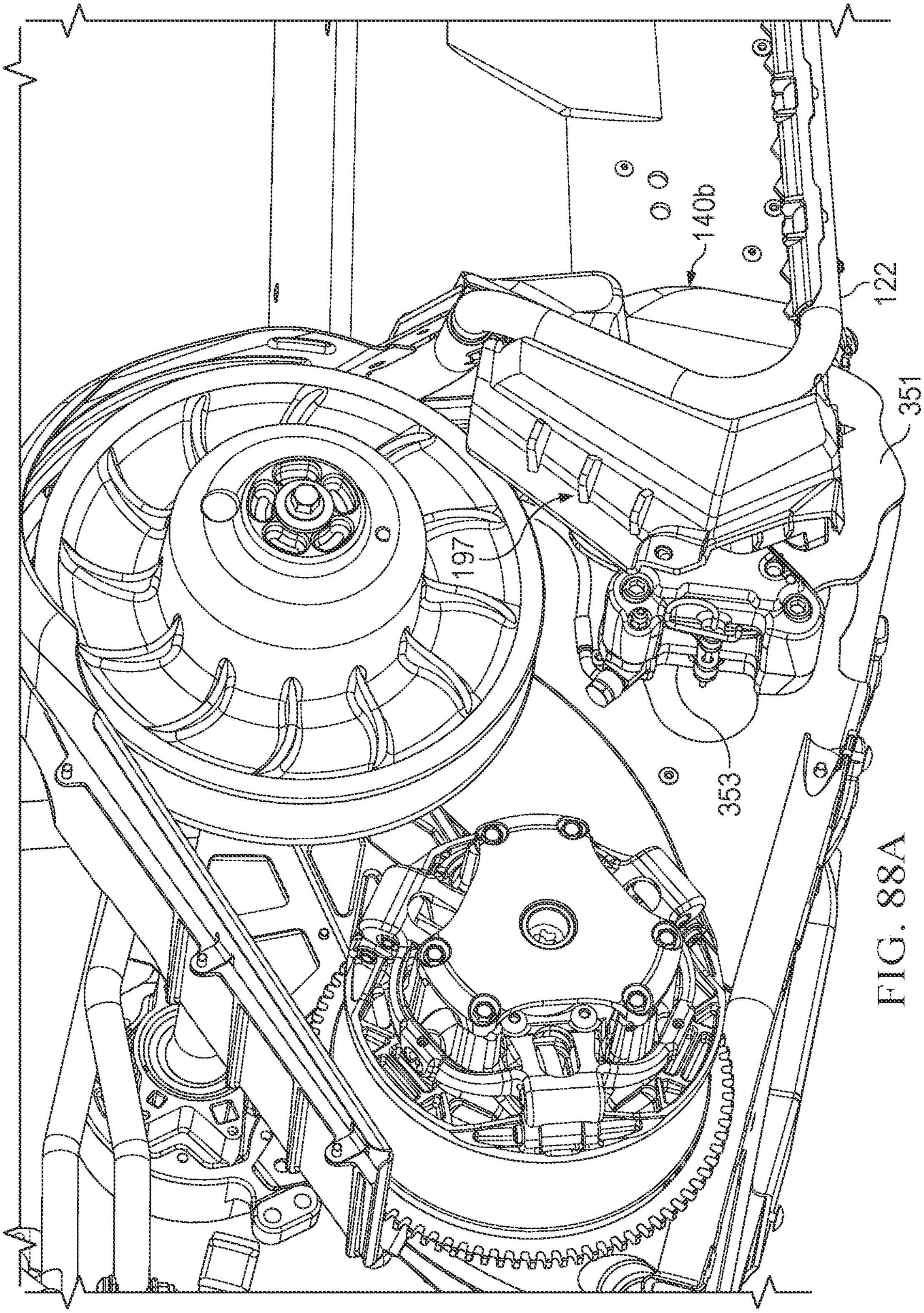
Figure 88B:
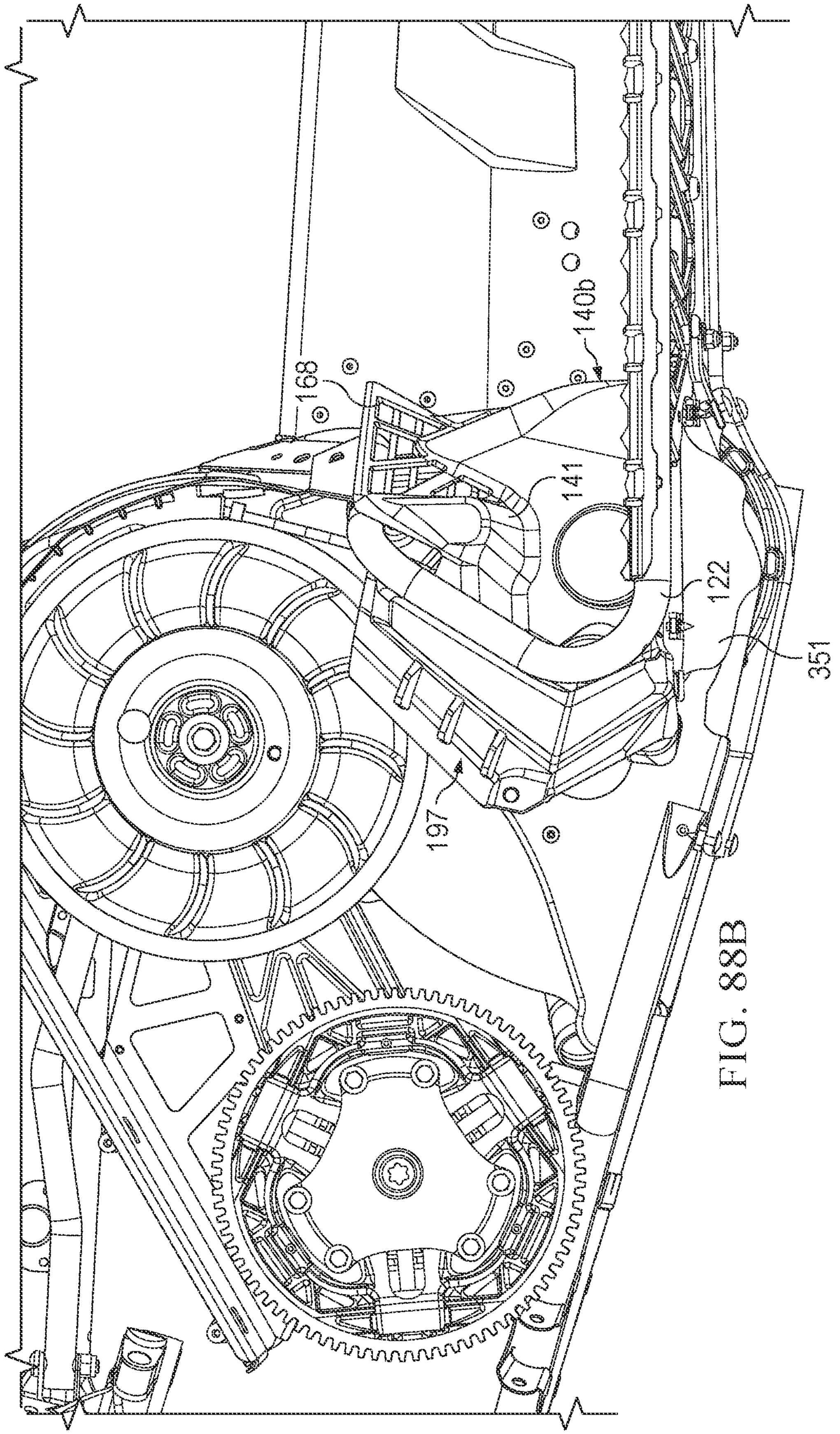
Figure 89:
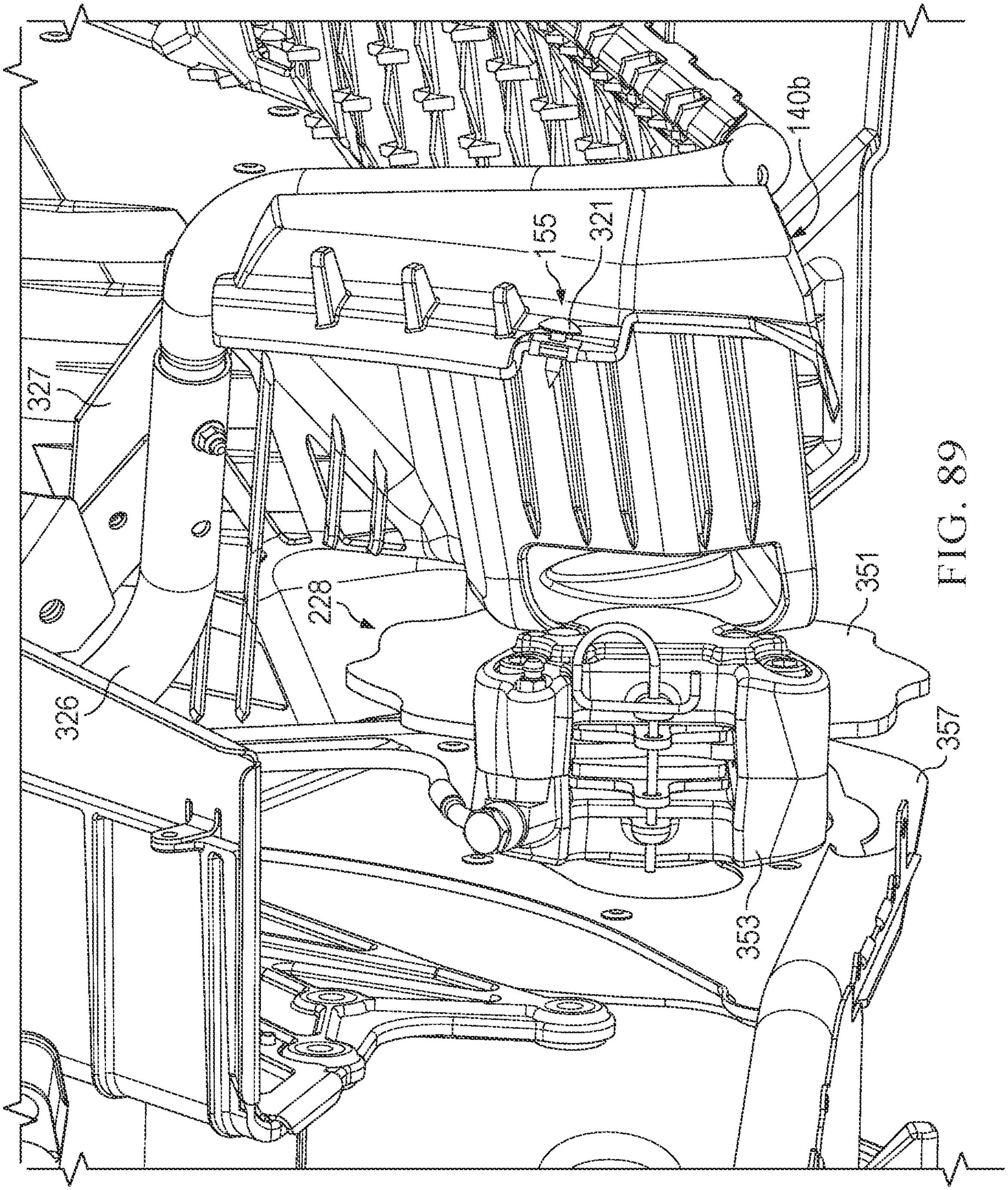

The inboard wall 171/173 may curve inboard to form the rearward wall 230 (see e.g., FIGS. 73, 77A and 96A) that with the inboard wall 171/173 may define the chamber 228 for receiving the vehicle component therein (see e.g., FIGS. 78B, 81B, 83B, 87B). The inboard side of the rearward wall 230 may be positioned adjacent the side panel 182 of the tunnel 104 and/or the heat exchanger end cap 178 to form the chamber with the inboard wall 171/173 and the side panel 182 and/or heat exchanger end cap 178. The rearward wall 230 may be shaped to conform with the shape of the component that is housed in the chamber. In an illustrative example, the rearward wall 230 is shaped to conform with the lower portion of the belt assembly 354 as shown in FIG. 29. In another illustrative example, the rearward wall 230 is shaped to conform to the shape of a brake rotor 351 as shown in FIGS. 87B and 88A. The rearward wall 230 may include one or more openings 231 (see e.g., FIG. 96A) for providing ventilation to the component housed in the chamber.

The panel 168 may extend inboard from the toe hook 141 and be positioned above the inboard wall 171/173. In some implementations, the rearward surface of the lower portion of the panel 168 abuts or otherwise intersects the rearward surface of the toe hook 141 (see e.g., FIGS. 66 and 74). The panel 168 may extend outboard from the inboard side of the toe stop 140 at an angle that is different than the angle that the toe hook 141 extends outboard from the inboard side 171/173. Accordingly, the inboard side of the panel 168 may be positioned rearward of the outboard end of the panel 168 (see e.g., FIG. 66). The inboard side of the panel 168 may be positioned rearward of the toe hook 141, and the outboard side of the panel 168 may intersect the toe hook 141. The panel 168 may include one or more openings 169. Openings 169 may vent air from the engine bay 108. In one example, the panel 168 has three openings 169 (see e.g., FIG. 75). In another example, the panel 168 has four openings 169 (see e.g., FIGS. 26 and 77). Optionally, one or more ribs 170 may extend over the openings 169 (see e.g., FIG. 26). The ribs 170 may be positioned on the forward side of the panel 168. In one aspect, the ribs 170 add strength to the panel 168.

Figure 85A:
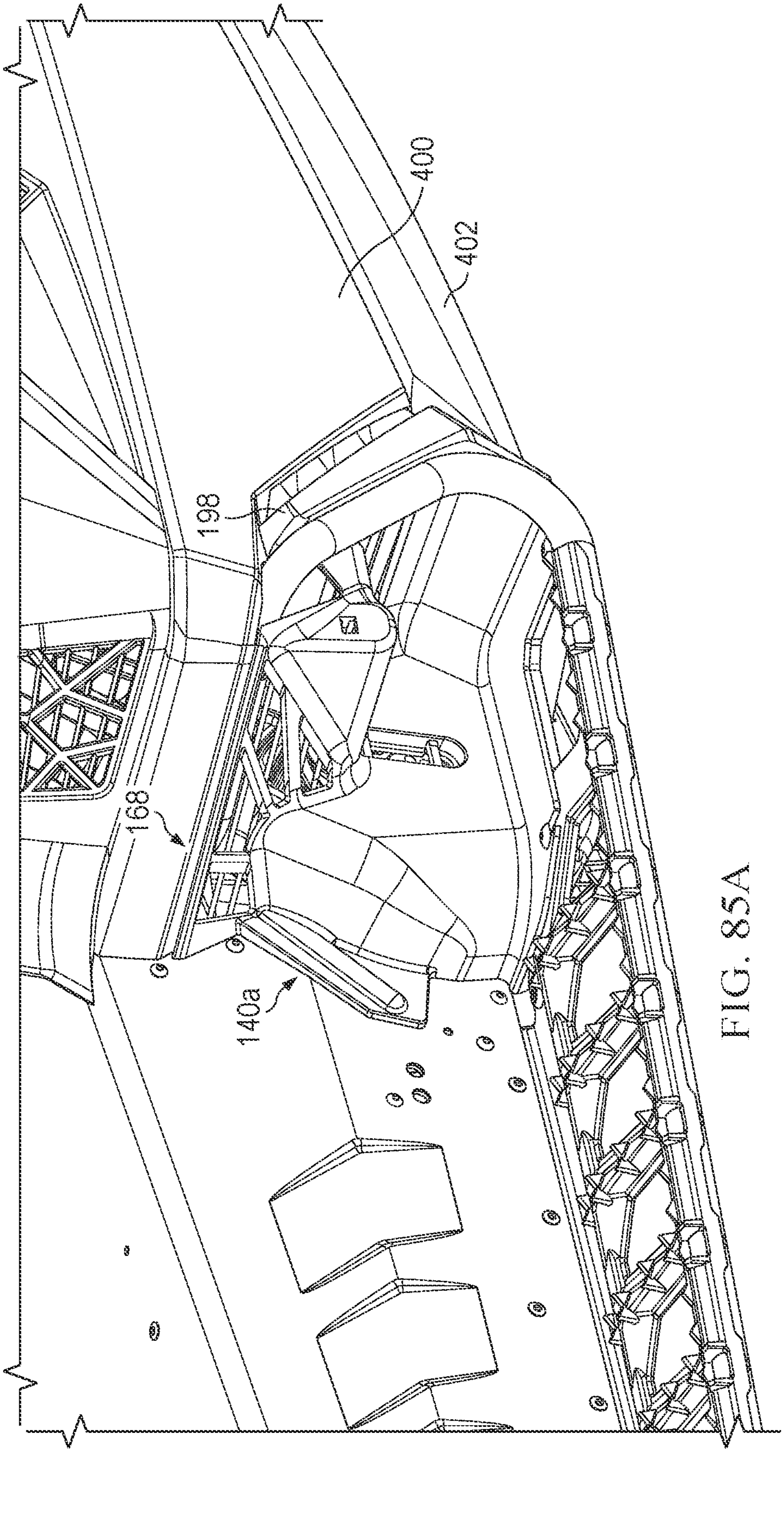
Figure 85B:
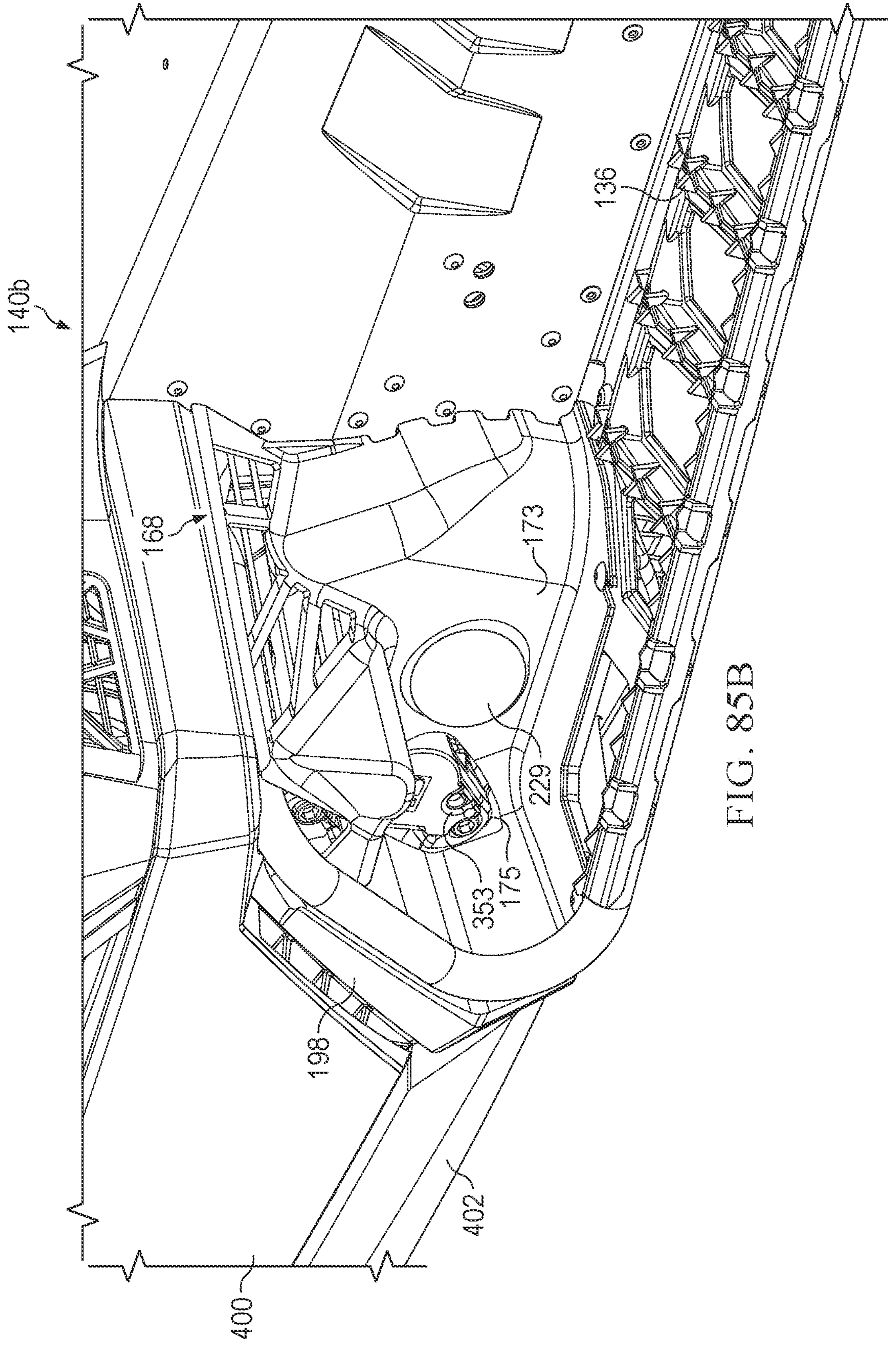

The panel 168 may include an attachment feature 158 to couple the toe stop 140 to the body panel 400 (see e.g., FIGS. 85A-85B). For example, the upper edge of the panel 168 may include the attachment feature. In some implementations the attachment feature 158 is a hook feature—e.g., the panel 168 includes a hook feature configured to mate with a hook feature of the body panel 400. In other implementations, the panel 168 includes a ledge surface configured for the bottom edge of the body panel 400 to rest upon. The attachment feature 158 may extend along the upper edge of the panel 168 from the outboard side to the inboard side and is positioned forward of a frame mount member 150 extending therefrom.

The frame mount member 150 provides an aperture 151 or another feature for removably securing the toe stop 140 to the forward frame 312. The frame mount member 150 may extend upward from the upper portion of the panel 168. In one example, the frame mount member 150 extends upward and forward from the panel 168 (see e.g., FIG. 27A). In some implementations, the frame mount member 150 extends along only a portion of the upper end of the panel (see e.g., FIG. 66). In other implementations, the frame mount member 150 extends along a majority of the upper end of the panel 168 (see e.g., FIG. 71). In one example, the frame mount member 150 is positioned in the middle of the panel 168 (see e.g., FIG. 90). Optionally, the frame mount member 150 further includes one or more apertures 164 (see e.g., FIG. 71).

The frame mount member 150 may include one or more mounting apertures 151. In one aspect, the toe stop 140 may be coupled to a mounting member 327 of the forward frame 312 by the frame mount member 150. The mounting member 327 is coupled to the rearward leg 326 and includes one or more apertures 325 (see e.g., FIGS. 31 and 71). In an illustrative example, the mounting member 327 has a lower aperture 325*a*, a middle aperture 325*b*, and an upper aperture 325*c* that may be utilize for the attachment of different snowmobile components, including the toe stop 140. The frame mount member 150 may be positioned on the mounting member 327 and a fastener 172 may extend through an aperture 151 in the frame mount member 150 and through an aperture 325 in the mounting member 327 (see e.g., FIG. 66). In an illustrative example, the toe stop 140 may be attached via the lower aperture 325*a* of the mounting member 327 and a guard member 355 may be attached via the middle aperture 325*b* of the mounting member 327 (see e.g., FIGS. 59 and 66). The frame mount member 150 may be coupled to the rearward side of the mounting member 327 (see also, FIGS. 27A, and 28). When the toe stop 140 is coupled to a snowmobile 100, the frame mount member 150 is positioned inside the chamber formed by the body panel 400 (see e.g., FIGS. 85A-85B and 98A-98B) and the panel 168.

The toe stop 140 may include one or more sensor mount/mounting features 143 for a sensor 145 (see, FIGS. 26, 27A, 79A-79B). The sensor mount 143 may be located or otherwise accessible from the inboard surface of the inboard wall 171/173. In an illustrative example, the inboard wall 171 may include a sensor mount 143 (se e.g., FIGS. 77A, 80A, 80B, 90A, 90B, and 91B). As shown in FIG. 26, the sensor 145 may include a wire/cable 183 and a connector 196 (see e.g., FIG. 29). In some embodiments, the sensor 145 is a speed sensor. At least a portion of the sensor 145 may be fabricated from a polymeric material. As illustrated in FIG. 26, the mount 143 may define a channel on the inboard side of the inboard wall 171/173 with an open end at the top, and the sensor 145 may slide into the channel of the sensor mount 143 through the opening at the top until the bottom of the sensor 145 is supported by the bottom/closed end of the channel of the sensor mount 143. As shown in FIG. 86B, the sensor 145 is secured in the sensor mount 143 opposite the track drive shaft 352 or a component of the belt housing assembly 354 to sense rotation thereof for one or more purposes, including, but not limited to, measuring or calculating the speed of the vehicle. A gap is provided between the sensor 145 and the object being measured by the offset provided between the tunnel 104 (or heat exchanger end cap 178) and the inboard wall 171/173 by the rearward wall 230. In one aspect, the sensor mount 143 is configured to provide a snug fit with the sensor 145 without mechanical fasteners—in other words by an interference fit. The sensor cable 183 may extend from the sensor mount 143 so that it is positioned inboard from the toe stop 140 and forward from the panel 168 and frame mount member 150 (see also FIGS. 29 and 31). The sensor cable 183 may be forward of the rearward leg 326. The sensor cable 183 may be further positioned rearward of the belt housing assembly 354. In one aspect, the arrangement positions the sensor 145 outside the belt housing assembly 354. In one aspect, the mount 143 extends from the inboard surface of the inboard wall 171/173 to position the sensor 145 at least partially within the belt housing assembly 354 but spaced apart from any component in the belt housing assembly 354 and supported only by the toe stop mount 140.

Figure 82A:
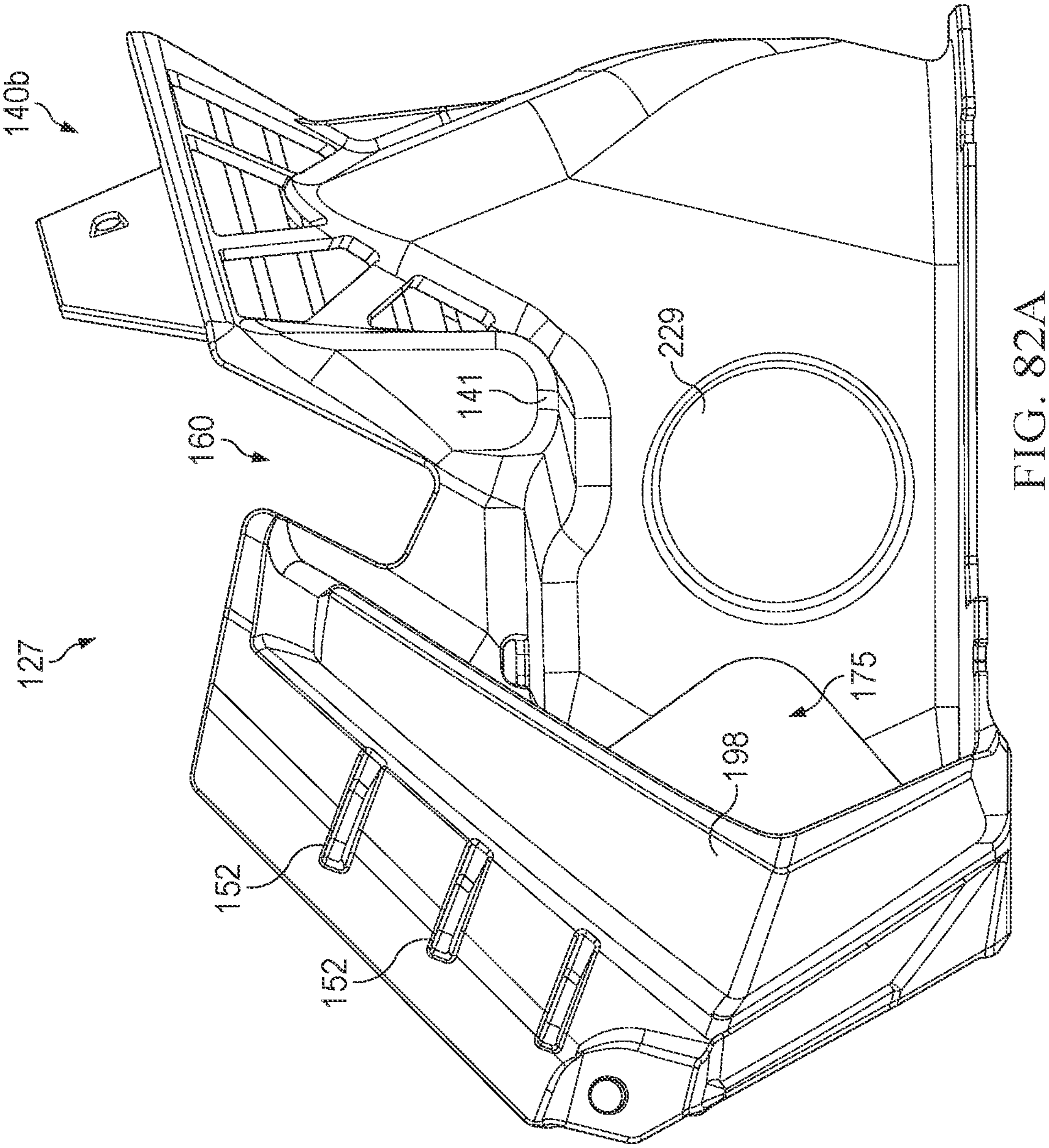
FIG. 82A illustrates an isometric view of the left side toe stop of FIGS. 81A and 81B, according to some embodiments.
Figure 82B:
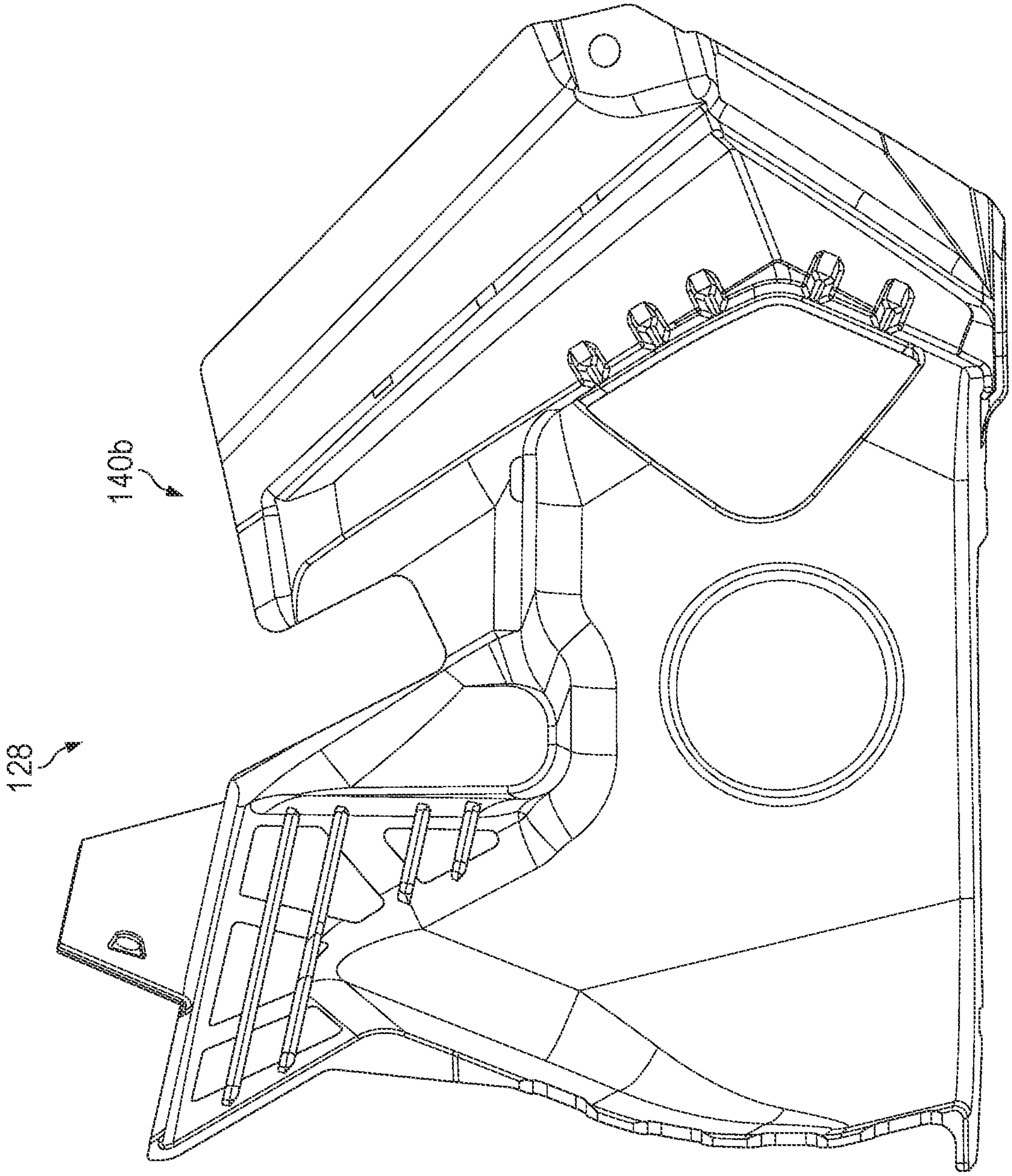
FIG. 82B illustrates an isometric view of the left side toe stop of FIGS. 81A and 81B, according to some embodiments.
Figure 83A:
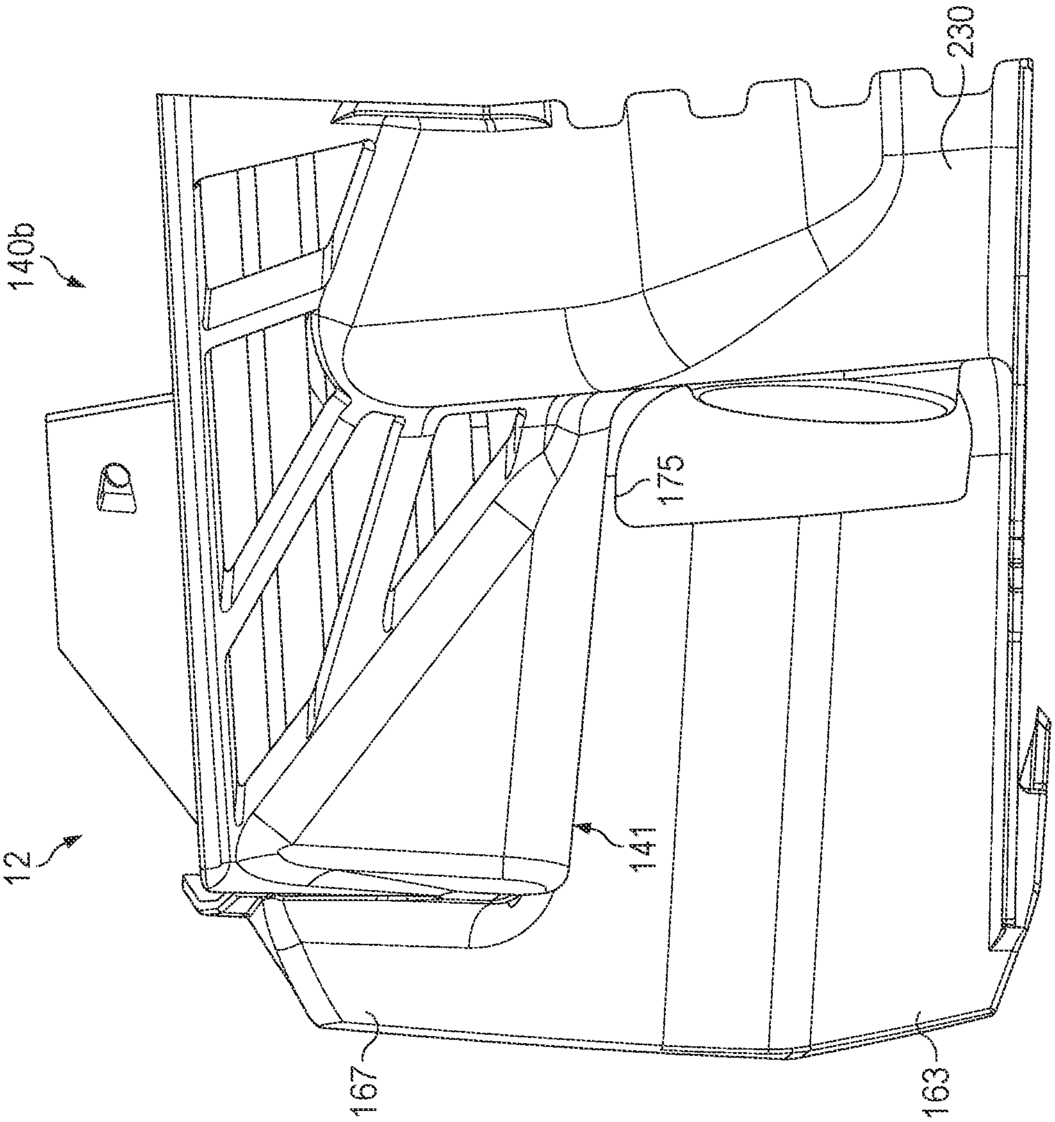
FIG. 83A illustrates an isometric view of the left side toe stop of FIGS. 81A and 81B, according to some embodiments.
Figure 83B:
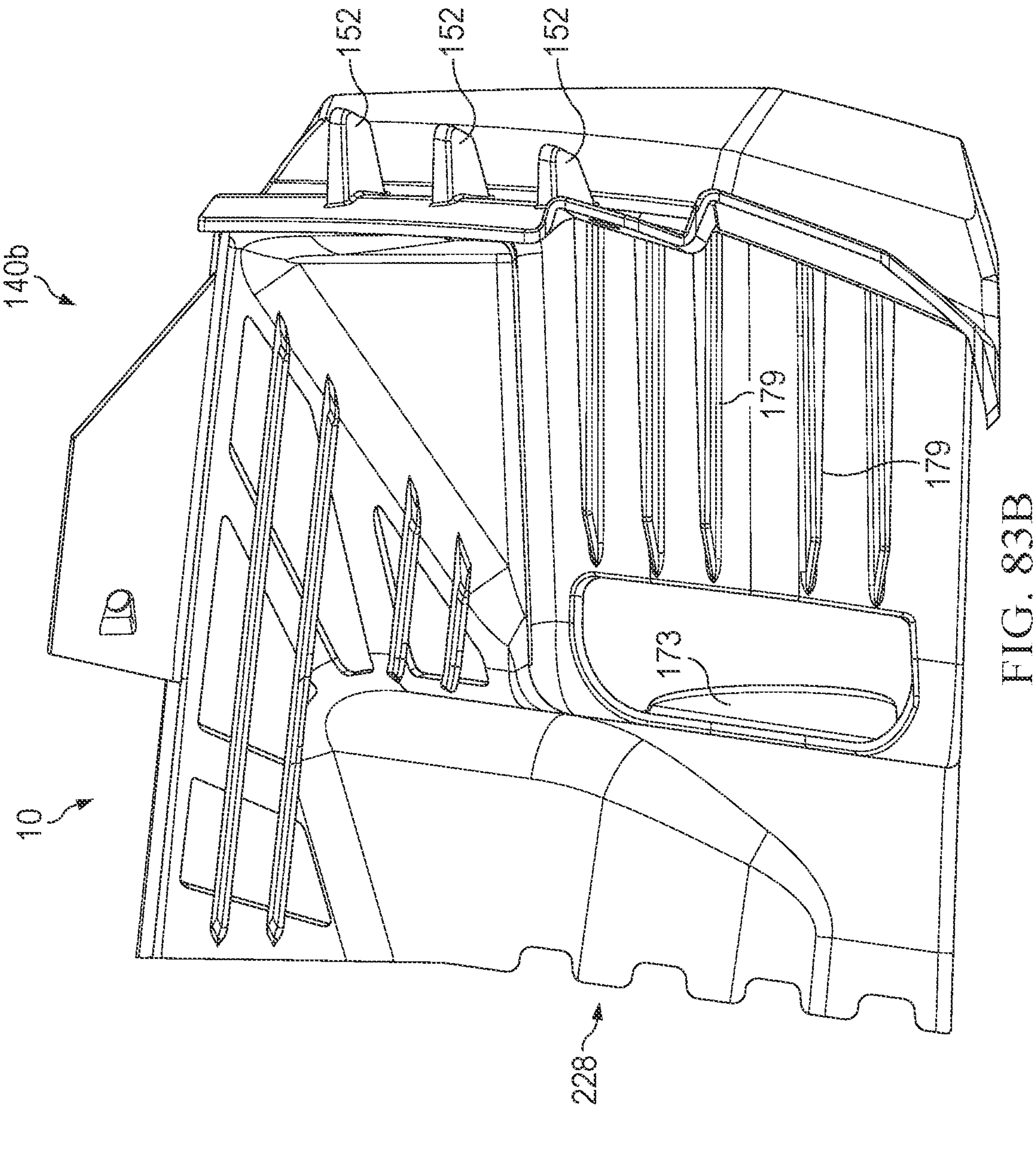
FIG. 83B illustrates an isometric view of the left side toe stop of FIGS. 81A and 81B, according to some embodiments.
Figure 84A:
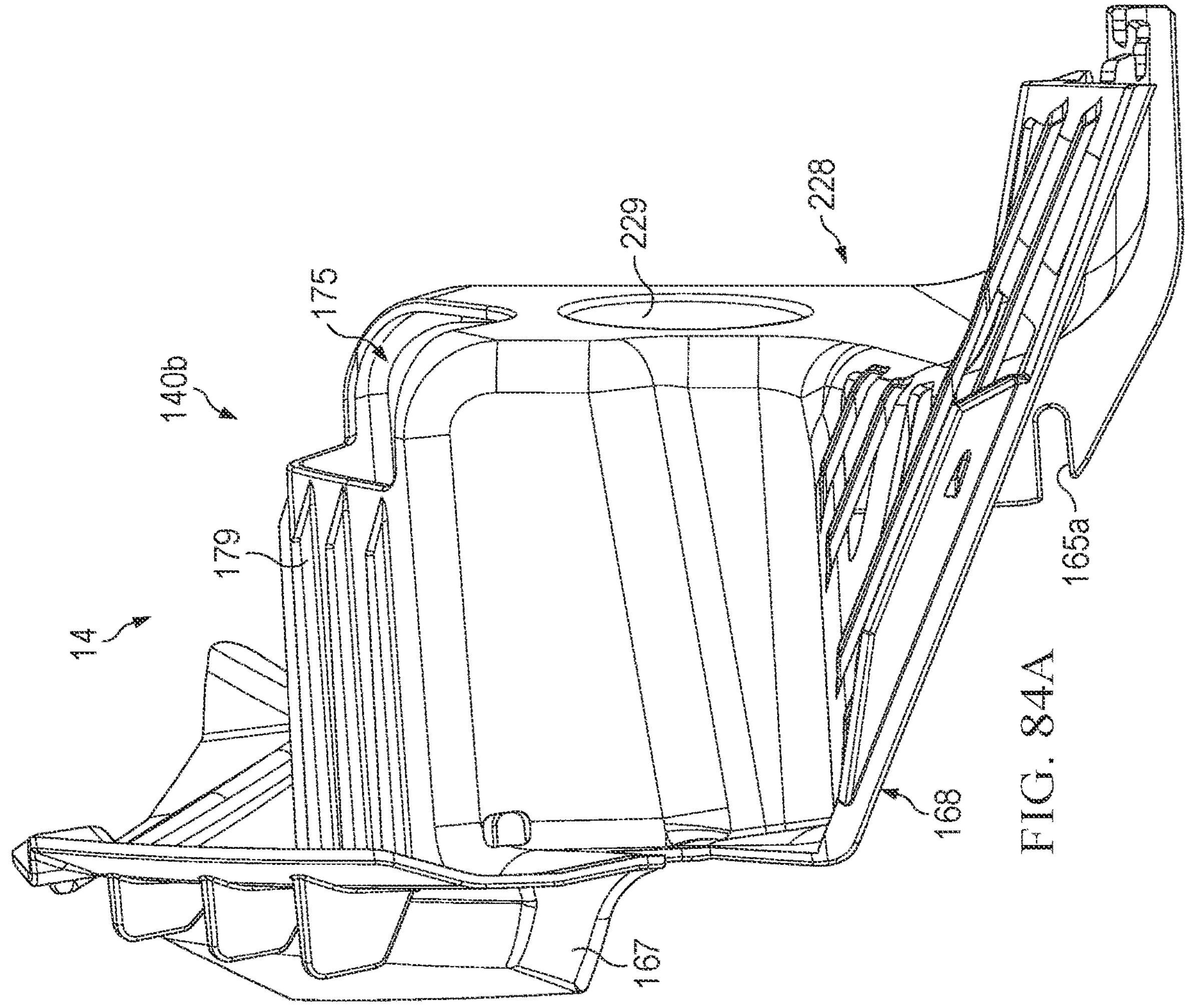
FIG. 84A illustrates an isometric view of the left side toe stop of FIGS. 81A and 81B, according to some embodiments.
Figure 84B:
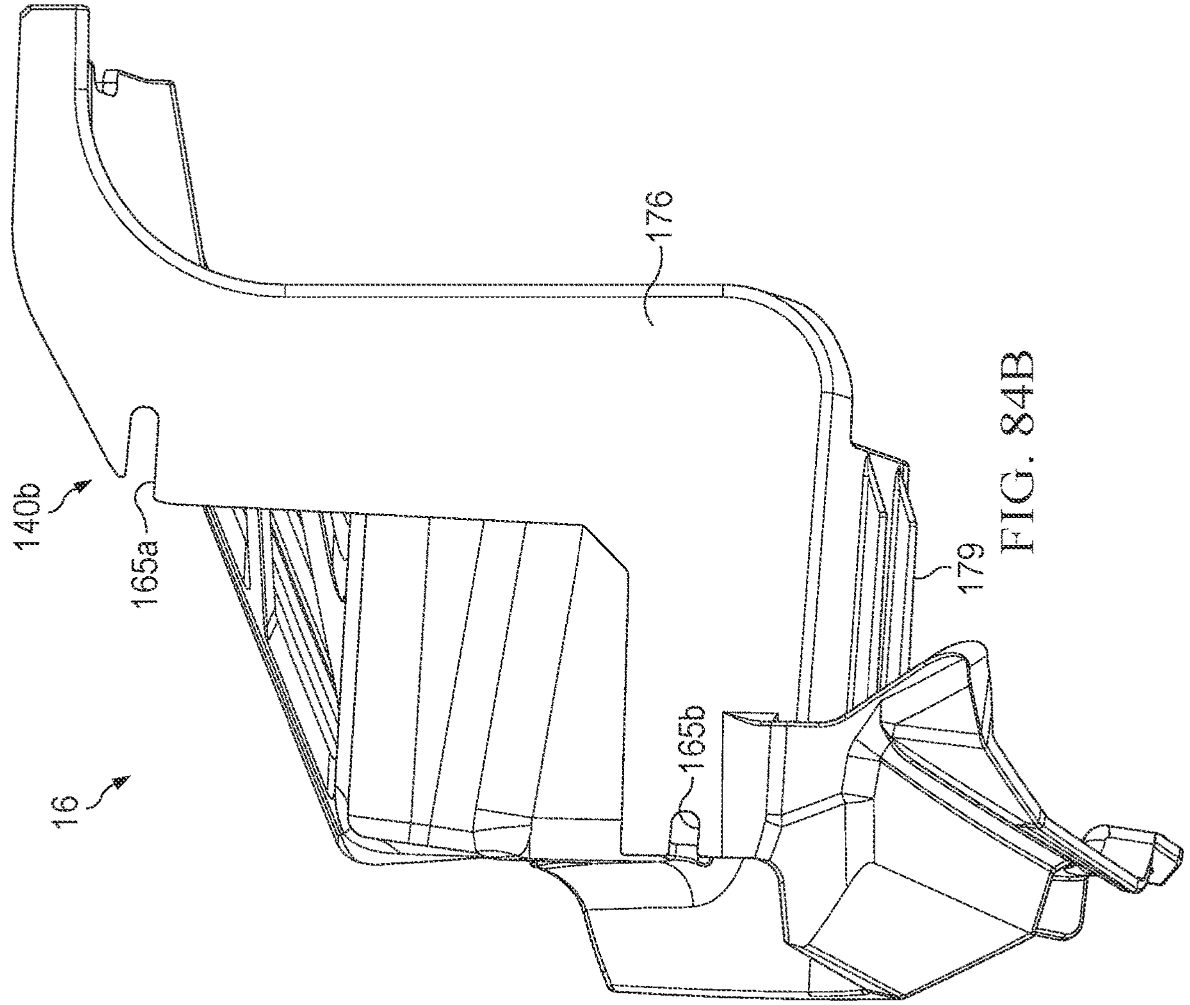
FIG. 84B illustrates an isometric view of the left side toe stop of FIGS. 81A and 81B, according to some embodiments.

The position of the mount 143 and the sensor 145 on the inboard wall 171/173 may depend on the location of the track drive shaft 352 and/or the belt housing assembly 354. As shown from the inboard view of FIG. 80A, the location of at least a portion of the toe hook 141 along the vehicle may overlap with a portion of the mount 143, and optionally the toe hook 141 overlaps with the track drive shaft 352 or the axis of rotation of the track drive shaft 352 along the length of the vehicle when the track drive shaft 352 and belt housing assembly 354 are provided in the position shown in FIGS. 42A and 42B. As shown from the inboard view of FIG. 90A, the location of at least a portion of the toe hook 141 along the vehicle may positioned rearward of the mount 143, and optionally the toe hook 141 is positioned rearward of the track drive shaft 352 or the axis of rotation of the track drive shaft 352 along the length of the vehicle when the track drive shaft 352 and belt housing assembly 354 are provided in the position shown in FIGS. 42C and 42D. In both illustrative examples, the toe grip may be provided forward of the rearwardmost position of the belt or the belt housing assembly 354. In addition to, or alternatively, the toe hook 141 may at least partially overlap the chamber 229 in the inboard wall 173 along the length of the vehicle as shown in FIG. 82A or be positioned entirely almost rearward of it as shown in FIG. 94A depending on the location of the track drive shaft 352.

The toe stop 140 may include a wire retaining feature 159 for one or more vehicle components. In some implementations, the wire retaining feature 159 forms a part of or is otherwise defined by a portion of the toe hook 141 (see also, FIG. 27A). The wire retaining feature 159 may comprise one or more fingers extending inboard from an inboard surface of the toe hook 141 to retain the wire therebetween inside of the body panel 400. In other implementations, the wire retaining feature 159 forms a part of or is otherwise defined by a portion of the panel 240 positioned forward of the toe hook 141 and rearward of the outboard wall 197 (see e.g., FIG. 91A). In such an illustrative example, the wire retaining feature 159 may include on or more fingers extending inboard from an inboard surface of the panel 240 to retain the wire therebetween inside of the body panel 400, and may be positioned along or beneath the clearance feature 160.

In some implementations, the wire retaining feature 159 is configured to hold and/or secure the position of one or more wires/cables 183 of the sensor 145 in the sensor mount 143. In one non-limiting example, the wire retaining feature 159 includes two keys or fingers to route the wire/cable 183 and retain it at that position. In one implementation, the wire retaining feature 159 includes an aperture on an outboard side of the toe stop 140 so that a tool can access the wire retaining feature 159 positioned on the inboard side of the toe stop 140 and secure the sensor wire/cable 183 to the wire retaining feature 159. As discussed above, the belt case drive assembly 354 may not include a cover so, in one aspect, the wire retaining feature 159 positions the sensor wire/cable 183 away from the drive train 112.

In an illustrative example, the toe stop 140 includes a wire guide 157. The channel 157 may be included in a wall 232 that extends rearward from the inboard wall 171/173 and/or the rearward wall 230. The channel 157 is partially defined by the side panel 182 of the tunnel 104 or the heat exchanger end cap 178 when the wall 232 is positioned thereagainst. The channel 157 includes an open end at a forward end of the wall 232 so that a wire or other item can be routed from inside the region enclosed by the toe stop 140 and the body panel 400 through the open end and rearward along the side panel 182 or the end cap 178. An aperture is provided in the side panel 182 or the end cap 178 for routing the wiring to, for example, a suspension component. In some implementations, the wire guide 157 guides, locates, protects, and/or secures a wire extending from the main harness to the rear suspension. The wire guide 157 may be a channel in a panel/wall 232 extending from the rearward wall 230 (see e.g., FIGS. 74 and 75).

In at least one embodiment, method 200 further includes attaching a toe stop to the foot support member.

As discussed above with reference to FIGS. 40A-42D, the snowmobile 100 may include a heat exchanger assembly 174, according to some embodiments. One or more components of the heat exchanger assembly 174 may be made from aluminum. The heat exchanger assembly 174 may be coupled to a forward end of the tunnel 104. The heat exchanger assembly 174 may include a body 440 extending between a right end cap 178*a*, adjacent to a rider's right foot, and a left end cap 178*b*, adjacent to a rider's left foot. A heat dissipating plate 438 may extend rearward from the body 440 (see e.g., FIGS. 103-104), the body 440 including a front wall 437 and a rear wall 445. The end caps 178*a*, 178*b* and the heat dissipating plate 438 may be attached to the body 440 by welds 460 (see e.g., FIG. 104). The heat dissipating plate 438 may be U-shaped with a single conduit 439 in fluid communication with the heat dissipating plate 438 (see e.g., FIG. 103). The length of the heat dissipating plate 438 may be approximately 70-90% the length of the tunnel 104 (see e.g., FIG. 40B). In some embodiments, the rear end of the heat dissipating plate 438 is positioned adjacent to an end of the tunnel 104. The conduit 439 may be attached to the heat dissipating plate 438 by a weld 460 (see e.g., FIG. 104). When the heat exchanger assembly 174 is coupled to a snowmobile 100, the conduit 439 may be positioned in a slot 105 of the tunnel 104 (see e.g., FIG. 55).

The body 440 may further include a conduit 447 in fluid communication with the chamber formed by the forward wall 437 and the rear wall 445 of the body 440 (see e.g., FIG. 104). The chamber formed by the forward and rear walls 445 may include one or more fluid channels. The conduit 447 may be positioned adjacent to the right end cap 178*a*. The conduit 447 may further be positioned adjacent to a lower end of the body 440. The conduit 447 may be positioned below the lower mount 444. A weld 460 may be used to secure the conduit 447 to the body 440. The conduits 439/447 may be connected to the engine cooling jacket inlets/outlets so that heat transfer fluid flows through both the body 440 and the dissipating plate 438. In one illustrative example, the conduit 447 is coupled to, and in fluid communication with, a conduit 107 of the engine 106 (see e.g., FIG. 126). The end caps 178*a*, 178*b* may be positioned on the ends of the body 440 to seal the fluid channels housed in the body 440.

The body 440 may be curved, with the bottom edge positioned forward of the upper edge (see e.g., FIGS. 104-105). In some embodiments, both the forward wall 437 and the rear wall 445 are curved. The forward wall 437 and the rear wall 445 may define a chamber in fluid communication with the heat dissipating plate 438. The upper edge of the body 440 may include one or more tabs 441 for mounting the heat exchanger assembly 174 to the tunnel 104 (see e.g., FIG. 105). The bottom edge may include one or more tabs 443 for mounting the heat exchanger assembly 174 to a forward frame assembly 302 (see e.g., FIGS. 42A-42D). For example, the tabs 443 may couple the heat exchanger assembly 174 to a belly pan 319 (see e.g., FIG. 118). The body 440 may be coupled to the end caps 178*a*, 178*b* at a location rearward of the forward edge 466 (see e.g., FIGS. 104-105). In one aspect, this configuration provides space for a weld to attach the end caps 178*a*, 178*b* and the body 440 together.

Optionally, an upper mount 442 may be located on the forward wall 437 of the body 440 (see e.g., FIG. 104). The upper mount 442 may be positioned adjacent to an upper edge of the body 440. Upper mount 442 may secure and/or position electrical wire (not shown). The upper mount 442 may attached to the body 440 by a weld 460.

Optionally, a lower mount 444 may be located on a forward wall 437 of the body 440 (see e.g., FIG. 104). The lower mount 444 may be attached to the body 440 by a weld 460. The lower mount 444 may be positioned closer to the right end cap 178*a* than the upper mount 442. The lower mount 444 couple the heat exchange assembly 174 to one or more components of the snowmobile 100. Components that may be coupled to the lower mount 444 include the engine 106, and/or a recoil housing for an engine 106.

Optionally, the forward wall 437 of the body 440 includes an indentation 446 (see e.g., FIG. 104). The indentation 446 may be positioned adjacent a lower end of the body 440. The indentation 446 may further be positioned adjacent to the left end cap 178*b*. The indentation 446 may accommodate the water pump 109 of the engine 106 (see e.g., FIG. 126).

In some embodiments, the end cap 178*a*, 178*b* may be a one-piece construction, i.e., cast, molded, and/or formed from a single body. The end cap 178*a*, 178*b* may be thicker than the side panels 182 of the tunnel 104. The end caps 178*a*, 178*b* may be configured to provide structural support to the side panels 182 of the tunnel 104. Thus, the tunnel 104 may be thinner compared to a conventional snowmobile tunnel, reducing the weight of the snowmobile 100. In other words, a thin side panel 182 may be used over the entire length of the tunnel 104, and the end caps 178*a*, 178*b* may provide structural support in region(s) where greater structural support is desired. The right and left end caps 178*a*/178*b* may have the same shape. For example, the right and left end caps 178*a*/178*b* may be mirror images (see e.g., FIG. 108). When coupled to the snowmobile 100, the end caps 178*a*, 178*b* are oriented parallel to a longitudinal axis 2 of the snowmobile 100.

In one aspect, the end caps 178*a*, 178*b* are larger than a conventional heat exchanger end cap. For example, the end caps 178*a*, 178*b* may be longer than a conventional end cap. For example, the length of the end caps 178*a*, 178*b* in a forward to rearward direction may be about 0.8 to 1.4 times the width (distance side to side). As another example, the longitudinal extent of the end caps 178*a*, 178*b* rearward of the rear edge of the body 440 may be 1.1 to 1.6 times the longitudinal extent of the body 440. The end caps 178*a*, 178*b* may provide more surface area for heat deflection. The end caps 178*a*, 178*b* as described herein may also reduce the number of components of a snowmobile.

Each end cap 178*a*, 178*b* may include a wall 435, a forward tab 458, a lower mounting flange 452 (also referred to hereinafter as a "second mounting flange"), and/or an upper mounting flange 454 (also referred to hereinafter as a "first mounting flange"). In some implementations, the forward tab 458, the lower mounting flange 452, and the upper mounting flange 454 may be integrated with the wall 435, i.e., the forward tab 458, the lower mounting flange 452, and the upper mounting flange 454 are not attached to the wall 435 as separate components joined with welds or fasteners. The wall 435 includes a forward edge 466, a bottom edge 468, a rear edge 470, and an upper edge 472. Some end cap features may vary between the end caps 178*a*, 178*b* that are configured to be coupled to different snowmobile models using a common forward frame 302 as shown in FIGS. 42A/B and 42C/D. For example, the position, orientation, and/or shape of a common feature may differ between end cap embodiments. As one example, the contour of the rear edge 470 may differ (see e.g., FIGS. 107 and 110). As another example the distance between the lower mount 452 and the rear edge 470 may differ. As another example, the location of the openings for receiving the track drive shaft 352 and brake components may differ. Other examples are discussed below in greater detail.

The forward edge 466 may be curvilinear. A portion of the forward edge 466 may have the same curve/shape as the body 440, e.g., convex (see e.g., FIG. 104). A section of the forward edge 466 may extend forward to form the forward tab 458. The forward tab 458 may extend parallel to a longitudinal axis 2 of the snowmobile 100. The forward edge 466 may include a single forward tab 458. The forward tab 458 may be positioned forward of the bottom edge of the body 440 (see e.g., FIG. 106). In some embodiments, the forward tab 458 is positioned below the convex section of the forward edge 466. The forward tab 458 may include an opening 449 to receive a fastener for coupling the end caps 178*a*, 178*b* to the forward frame assembly 302, as discussed below in greater detail. The opening 449 may be oriented perpendicular to the longitudinal axis 2 of the snowmobile 100 (i.e., a horizontal orientation).

The bottom edge 468 may be curvilinear. The bottom edge 468 may extend downward from the forward edge 466 to a curve 469 and upward from the curve 469 to the rear edge 470. The forward tab may form a part of the bottom edge 468 (FIG. 104). In an illustrative example, the curve 469 defines a bottom most point of the end caps 178*a*, 178*b*. The curve 469 and adjacent regions of the bottom edge 468 may be received in a channel in the bottom-out protector 148*a*, 148*b* as shown in FIG. 118. Accordingly, the bottom-out protector 148*a*, 148*b* may be positioned on both the inboard and outboard sides of the heat exchanger end caps 178*a*, 178*b*.

The lower mounting flange 452 may be positioned along the bottom edge 468 of the wall 435 and extend outward. In some embodiments, the lower mounting flange 452 is positioned between the curve 469 and the rear edge 470. In one example, the lower mounting flange 452 is positioned rearward of the body 440. In other embodiments, the lower mounting flange 452 is positioned below the upper mounting flange 454. The bottom edge 468 may have a single lower mounting flange 452. The transition between the lower mounting flange 452 and the lower mounting flange 452 may be curved. In some embodiments, the curved shape of the lower mounting flange 452 matches the curve of the bottom edge 468 from which the lower mounting flange 452 extends. The lower mounting flange 452 may have a rectangular shape. The lower mounting flange 452 may further have a curved shape (see e.g., FIG. 109). The shape of the lower mounting flange 452 may be the same for the right and left end caps 178*a*/178*b*.

The lower mounting flange 452 may couple the end caps 178*a*, 178*b* to the running board support 184, the bottom-out protector 148, and optionally the foot support member 124 (see e.g., FIGS. 44, 57, 118-119, 121, and 122). The lower mounting flange 452 may include one or more openings to receive a fastener. In one example, the lower mounting flange 452 has two openings—a forward opening 451 and a rearward opening 452. The openings 451/452 may be oriented vertically. The forward opening 451 may be aligned with an opening 418 of a bottom-out protector 148 (see e.g., FIG. 118). In an illustrative example, the rearward opening 453 may be aligned with opening 212 of the mounting surface 186 when the running board support 184 is coupled to the snowmobile 100 of FIG. 7 (see e.g., FIG. 37A). A fastener 480 may be inserted downward through opening 212 of the mounting surface 186 and through the rearward opening 453 (see e.g., FIGS. 113 and 122). In an illustrative example, the rearward opening 453 may be aligned with the forwardmost aperture 187 of the mounting surface 186 when the running board support 184 is coupled to the snowmobile of FIG. 10. A fastener 480/130 may be inserted upward through the rearward opening 453 (see e.g., FIGS. 99B and 101) through aperture 187 and through the forwardmost opening 133 (see e.g., FIGS. 18, 21A-B, and 23A-B) along the first rail 600 of the foot support member 124.

The section of the bottom edge 468 extending rearward from the lower mounting flange 452 to the rear edge 470 may be a mating region 474 configured to mate/abut a region 214 of the running board support 184 (see e.g., FIGS. 37A, 111, 113, and 122). This configuration provides for one single layer, e.g., the end caps 178*a*, 178*b* or the running board support 184, to be attached to another single layer, e.g., the tunnel 104. Accordingly, each of end caps 178*a*, 178*b* and the running board support 184 may directly abut the interior surface of the tunnel 104.

The rear edge 470 may be curvilinear. As discussed above, the contour of the rear end 470 of the end caps 178*a*, 178*b* may vary. For example, a portion the rear edge 470 below the emboss 456 maybe positioned further rearward than the emboss 456. In some embodiments, this configuration forms a rearward tab 459 (compare FIGS. 104 and 109). In one example, the lower mounting flange 452 of the end caps 178*a*, 178*b* with a rearward tab 459 is positioned farther away from the rear edge 470, which increases the length of the region 474 that mates with region 214 of the running board support 184. This configuration may provide added strength to the tunnel 104. Accordingly, different sets of the end caps 178*a*, 178*b* may be used with the common forward frame assembly 302 to provide different snowmobile models. As shown in FIGS. 42A and 42B, a first set of end caps 178*a* and 178*b* (for example, end caps 178*a* and 178*b* of FIG. 106) may be provided with a first track drive shaft opening 448 position and a first brake assembly opening 450 position with respect to the common forward frame assembly 302 for the snowmobile shown in FIG. 7. As shown in FIGS. 42C-D, a second set of end caps 178*a* and 178*b* (for example, end caps 178*a* and 178*b* of FIGS. 109 and 110) may be provided with a second track drive shaft opening 448 position and a second brake assembly opening 450 with respect to the common frame assembly 302 for the snowmobile shown in FIG. 10. The first track drive shaft opening 448 position is different than the second track drive shaft opening 448 position with respect to the common forward frame assembly 302, and the first brake assembly opening 450 position is different than the second brake assembly opening 450 position with respect to the common forward frame assembly 302.

The upper mounting flange 454 may be positioned along an upper edge 472 of the wall 435. The upper mounting flange 454 may be positioned rearward of the body 440 (see e.g., FIG. 105). The upper mounting flange 454 may extend inward and have a horizontal orientation. The upper mounting flange 454 may have a triangular shape. The shape of the upper mounting flange 454 for left and right end caps 178*a*/178*b* and/or for different end cap embodiments may be the same. In some embodiments, the upper mounting flange 454 couples the end caps 178*a*, 178*b* to the tunnel 104. As illustrated for example in FIG. 111, a fastener 479 may extend upward through an opening in the upper mounting flange 454 to couple the end caps 178*a*, 178*b* to the upper inner surface of the tunnel 104 (see also FIGS. 40B and 55).

The upper mounting flange 454 may extend inward from an emboss 456 that extends downward from the upper mounting flange 454. As discussed below in greater detail, the emboss 456 may include one or more apertures/openings configured to receive a fastener. In some embodiments, the emboss 456 is configured to mate with an inner surface of the tunnel 104 (see e.g., FIGS. 122 and 127). For example, the emboss 456 may have a V-shape with an inwardly positioned apex joining a forward section 455 and a rearward section 457 (see e.g., FIGS. 105 and 116). This configuration may allow the end caps 178*a*, 178*b* to be square to the body 440 for easier manufacturing. The forward section 455 may have a triangular shape. The rearward section 457 may have a generally rectangular shape with a curvilinear side forming a part of the rear edge 470. In some embodiments, the shape of emboss 456 is the same for the right and left end caps 178*a*/178*b* and/or different embodiments of the end caps 178 (see e.g., FIGS. 105 and 109).

The wall 435 defines a plurality of openings (see e.g., FIGS. 107, 111, and 117). In some embodiments, the right and left end caps 178*a*/178*b* differ in the number of openings defined by the wall 435, the size of the openings, and/or the placement of the openings. In other embodiments, the number, size, and placement of the openings defined by the end caps 178*a*, 178*b* may vary between different snowmobile models.

Some of the openings 448/450 defined by the end caps 178*a*, 178*b* are configured to expose/accommodate an interior component. For example, the right end cap 178*a* may include an opening 448 for the track drive shaft 352 (see e.g., FIG. 118). The opening 448 may be positioned above the curve 469 (see e.g., FIG. 109). The left end cap 178*b* may have one or more openings 448, 150 aligned with the opening 322/324 of the metal sheet 320 (see e.g., FIG. 117). In one example, wall 435 of the left end cap 178*b* has two openings, a forward opening 450 to accommodate a caliper of a brake assembly and a rearward opening 448*b* to accommodate a track drive shaft 352. An indentation 476 may extend from opening 450 to accommodate a brake caliper. The orientation of the indentation 476 may vary either downward, e.g., indentation 476*a*, or upward, e.g., 476*b* (see e.g., FIGS. 107 and 110).

In some embodiments, one or more of the openings may be sized to receive a fastener to couple, or removably couple, the end caps 178*a*, 178*b* to one or more components, such as the tunnel 104, the rear suspension 488, and/or one or more components of the forward frame assembly 302. The majority of the openings for coupling the end caps 178*a*, 178*b* to other components may be positioned rearward of the body 440 (see e.g., areas 28, 30, 32, and 34 of FIGS. 105-107 and 110-111). For example, the opening 449 of the forward tab 458 may be the only opening/aperture positioned forward of the body 440. In one aspect, the interconnection of components provides added strength to the assembly. Openings positioned within the wall 435 have a horizontal axis.

Fasteners that may be utilized to interconnect the end caps 178*a*, 178*b* with other components include, but are not limited to, screws and rivets. For example, rivets may be utilized to couple the end caps 178*a*, 178*b* with the forward frame assembly 302 and/or the tunnel 104. The end caps 178*a*, 178*b* may be coupled to the tunnel 104 by fasteners 478 extending through openings located in area 28 (see e.g., FIG. 17). Some of the openings in area 28 utilized to couple the end caps 178*a*, 178*b* to the tunnel 104 are located in the emboss 456. In some embodiments, the openings in emboss 456 are located in the rearward section 457.

The end caps 178*a*, 178*b* may be coupled to one or more components of the forward frame assembly 302. For example, the end caps 178*a*, 178*b* may be positioned in a rear opening of the forward frame assembly 302 between the metal sheets 320/334. The openings located in area 32 may be utilized to couple, optionally removably, the end caps 178*a*, 178*b* to the metal sheet 320/334 of the forward frame assembly 302 with fasteners inserted through coaxially aligned holes in the metal sheets 320/334. The openings in area 32 may be positioned above the brake caliper opening 450 and/or the track drive shaft opening 448. As another example, openings 449/463 may be utilized to couple the end caps 178*a*, 178*b* to one or more openings 333 in the lower horizontal member 332 of the forward frame assembly 302 (see e.g., FIGS. 107, 119, 122, and 125). Opening 463 is positioned adjacent to the bottom edge 468 and rearward of the body 440 and the forward tab 458. Opening 449 is positioned on the forward tab 458 forward of the body 440. The metal sheet 320/334 may also be positioned between the end caps 178*a*, 178*b* and the lower horizontal member 332. Openings 321 in the metal sheet 320/334 may be aligned with openings 333/449/463 in the lower horizontal member 332, the forward tab 458, and the wall 435 (see e.g., FIG. 125). In some embodiments, rivets attach the end caps 178*a*, 178*b* to the lower horizontal member 332 via openings 449 and 463 to provide a stable joint with the heat exchanger assembly wherein mounting points are positioned on both sides of the body 440. The openings 475 and/or 477 in the end caps 178*a*, 178*b* may be attached to a component of the belt housing assembly 354 (see e.g., FIGS. 42A, 42C, 109, and 128). One or more of openings 475 may be configured for fasteners to extend through the end cap 178, through the metal sheet 334, and into the belt housing assembly 354 and one or more of openings 477 may be configured for fasteners to extend through the end caps 178*a*, 178*b* to the belt housing assembly 354.

Openings located in area 30 may be utilized to couple the end caps 178*a*, 178*b* to a rear suspension arm 488 as shown in FIG. 118. Accordingly, the area 30 includes forward and rearward apertures for receiving fasteners to secure the suspension arm 488 in a forward or a rearward position. Such a configuration allows for the modification of the suspension, or otherwise use a rear suspension arm 488 with different lengths without having to provide a separate heat exchanger end cap dedicated to a particular rear suspension arm 488 configuration. The position and/or orientation of the openings in area 30 may vary. For example, for the embodiment illustrated in FIG. 107, area 30*a* is rearward of area 28*a*, whereas area 30*b* of the embodiment illustrated in FIG. 110 is within area 28*b*. Additionally, area 30*a* is oriented at a different angle than area 30*b*. In one aspect, this provides for an alternative attachment point for the rear suspension arm 488. In one non-limiting illustrative example, a panel 482 is attached to the tunnel 104. The panel 482 may be attached by one or more fasteners (see e.g., FIG. 116). The panel 482 may be attached to either the inside and/or the outside of the tunnel 104 to tailor the thickness/strength of the region to support a rear suspension component, such as rear suspension arm 488.

In at least one embodiment, the end caps 178*a*, 178*b* includes a wall 435 and a mounting flange 454 extending inward from the wall. The inward extending mounting flange 454 includes an aperture 461 configured to receive a fastener 479. The aperture has a vertical axis. The end caps 178*a*, 178*b* may further include a mounting flange 452 extending outward from the wall 435. The outward extending mounting flange 452 includes an aperture 451/453 configured to receive a fastener 480. The aperture 451/453 has a vertical axis. The end caps 178*a*, 178*b* may further include a mounting tab 458 extending forward from the wall 435. The mounting tab 458 includes an aperture 449 configured to receive a fastener. The aperture 449 has a horizontal axis. Mounting flange 454 may be positioned along an upper edge 472 of the wall 435 and mounting flange 452 may be positioned along a bottom edge 468 of the wall 435.

In at least one embodiment, the end caps 178*a*, 178*b* include a forward edge 466 with a single mounting tab 458 with an aperture 449 configured to receive a fastener. The end caps 178*a*, 178*b* may further include an inward extending mounting flange 454 with an aperture 461 configured to receive a fastener. The end caps 178*a*, 178*b* may further include an outward extending mounting flange 452 with an aperture 451/453 configured to receive a fastener.

In at least one embodiment, the end caps 178*a*, 178*b* include a bottom edge 468. A rear section 474 of the bottom edge 468 is configured to mate with a support member 184 that is coupled to the tunnel 104 and/or a component of the running board assembly 120. The end caps 178*a*, 178*b* may further include a mounting flange 452 positioned along the bottom edge 468 forward of the rear mating section 474. The mounting flange 452 may include one or more openings 451/453 to couple the end caps 178*a*, 178*b* to a bottom-out protector 148 and/or a support member 186, and/or a foot support member 124.

In at least one embodiment, the end caps 178*a*, 178*b* include a flat body, e.g., wall 435, with an outward extending mounting flange 452, and an inward extending mounting flange 454. The flat body 435 may include a plurality of apertures configured to receive a fastener, an opening 448 for a track drive shaft, or other vehicle component. The flat body 435 may further include an opening 450 for a brake assembly component such as a portion of a caliper. The outward extending mounting flange 452 may have a rectangular shape. The outward extending mounting flange 452 may include one or more apertures configured to receive a fastener. The transition between the body 435 and the outward extending mounting flange 452 may be curved. The inward extending mounting flange 454 may have a triangular shape. The inward extending mounting flange 454 may include one or more apertures 461 configured to receive a fastener. The inward extending mounting flange 454 may extend from an upper edge of a V-shaped emboss 456. One section 457 of the emboss 456 may include one or more apertures configured to receive a fastener.

In at least one embodiment, when the end caps 178*a*, 178*b* are coupled to a snowmobile 100, a portion of the bottom edge 468 may be positioned within a channel of a bottom-out protector 148 (see e.g., FIGS. 13, 65, 118-119, and 121). For example, the bottom-out protector 148 may slide onto the bottom of the end caps 178*a*, 178*b*. The end caps 178*a*, 178*b* may also be coupled to one or more components of the forward frame assembly 302, to the tunnel 104, and/or to a support member 184, as discussed above.

According to one or more aspects of the present disclosure, a toe stop includes a composite body that includes: a first portion defining a toe pocket; and a second portion at least partially defining a chamber positioned inboard of the toe pocket, wherein the chamber is shaped to at least partially house a vehicle component therein.

In one or more embodiments of the toe stop according to the previous paragraph, the chamber is partially defined by an inboard wall, the inboard wall comprising a sensor mount configured to receive a sensor.

In one or more embodiments of the toe stop according to any one of the previous paragraphs, the chamber is partially defined by a rearward wall extending inward from the inboard wall, the composite body further comprising a wire guide panel extending from the rearward wall, the wire guide panel comprising a wire guide.

In one or more embodiments of the toe stop according to any one of the previous paragraphs, the toe pocket is partially defined by a toe hook and a forward wall and the toe hook is positioned rearward of the forward wall.

According to one or more aspects of the present disclosure, a toe stop includes a composite body. The composite body includes a first portion defining a toe pocket; and a wall positioned inboard of the first portion and extending rearward therefrom, wherein an inboard side of the wall defines a channel configured to receive at least a portion of a wire harness for an electrical component therein.

According to one or more aspects of the present disclosure, a toe stop includes a composite body. The composite body includes a toe pocket; and a wall positioned inboard of the toe pocket and extending rearward therefrom, wherein the wall defines a sensor mount.

In one or more embodiments of the toe stop according to the previous paragraph, the toe hook is further positioned above the sensor mount.

According to one or more aspects of the present disclosure, a toe stop includes a unitary body. The unitary body includes a bottom flange forming a bottom surface of the top stop; a forward wall extending upward from the bottom flange; an inboard wall extending upward from the bottom flange and rearward from the forward wall; and a rearward wall extending upward from the bottom flange and inward from the inboard wall. A toe pocket is partially defined by the forward wall and the inboard wall.

In one or more embodiments of the toe stop according to the previous paragraph, the bottom flange includes one or more slots for attaching the toe stop to a running board assembly of a snowmobile.

In one or more embodiments of the toe stop according to any one of the previous paragraphs, the unitary body further including an outboard wall positioned forward of the bottom flange and extending forward from the forward wall. The outboard wall includes a side panel interface and/or a skid plate interface.

In one or more embodiments of the toe stop according to any one of the previous paragraphs, the outboard wall includes the side panel interface and the skid plate interface, wherein the side panel interface is positioned above the skid plate interface.

In one or more embodiments of the toe stop according to any one of the previous paragraphs, the outboard wall is V-shaped.

In one or more embodiments of the toe stop according to any one of the previous paragraphs, the toe stop further including one or more ribs extending outward from an outboard surface of the outboard wall.

In one or more embodiments of the toe stop according to any one of the previous paragraphs, the outboard wall includes a skid plate mounting point located above the skid plate interface.

In one or more embodiments of the toe stop according to any one of the previous paragraphs, the skid plate mounting point is further located below the one or more ribs.

In one or more embodiments of the toe stop according to any one of the previous paragraphs, the unitary body further includes a toe hook positioned rearward of the forward wall, wherein the toe pocket is further defined by the toe hook.

In one or more embodiments of the toe stop according to any one of the previous paragraphs, the toe hook comprises a wire retaining feature positioned on an outboard side of the toe hook.

In one or more embodiments of the toe stop according to any one of the previous paragraphs, the toe hook has a triangular or rectangular shape.

In one or more embodiments of the toe stop according to any one of the previous paragraphs, the toe stop further includes a toe hook panel positioned forward of the forward wall, above the inboard wall, and rearward of the rearward wall, the toe hook extending inboard to an inboard side of the toe stop; and a frame mount member extending upwards from an upper edge of the toe hook panel, the frame mount member including a mounting aperture for mounting the toe stop to a forward frame.

In one or more embodiments of the toe stop according to any one of the previous paragraphs, the toe hook is positioned along a rearward surface of the toe hook panel.

In one or more embodiments of the toe stop according to any one of the previous paragraphs, the toe hook is positioned along a bottom surface of the toe hook panel.

In one or more embodiments of the toe stop according to any one of the previous paragraphs, the toe hook panel defines one or more openings.

In one or more embodiments of the toe stop according to any one of the previous paragraphs, the toe stop including one or more ribs extend over the one or more openings.

In one or more embodiments of the toe stop according to any one of the previous paragraphs, the ribs are positioned on a forward surface of the toe hook panel.

In one or more embodiments of the toe stop according to any one of the previous paragraphs, an upper edge of the toe hook panel includes an attachment feature for coupling the toe stop to a body panel of a snowmobile.

In one or more embodiments of the toe stop according to any one of the previous paragraphs, the toe stop further includes a panel extending forward from the toe hook to the forward wall. The panel, the toe hook and the forward wall define a clearance feature sized to receive a tubular running board support member.

In one or more embodiments of the toe stop according to any one of the previous paragraphs, the inward wall and the rearward wall defining a chamber for a belt assembly positioned inboard from the toe stop.

In one or more embodiments of the toe stop according to any one of the previous paragraphs, the inward wall and the rearward wall defining a chamber for a belt assembly positioned inboard from the toe stop.

In one or more embodiments of the toe stop according to any one of the previous paragraphs, the toe stop including one or more vent holes.

In one or more embodiments of the toe stop according to any one of the previous paragraphs, the one or more vent holes includes a vent hole in the inboard wall, the forward wall, and/or the rearward wall.

In one or more embodiments of the toe stop according to any one of the previous paragraphs, a forward surface of the toe stop includes one or more ribs.

In one or more embodiments of the toe stop according to any one of the previous paragraphs, the toe stop is unitary.

In one or more embodiments of the toe stop according to any one of the previous paragraphs, the toe stop is a molded polymeric composite material.

In one or more embodiments of the toe stop according to any one of the previous paragraphs, the toe stop further including a sensor coupled to the sensor mount feature by an interference fit.

In one or more embodiments of the toe stop according to any one of the previous paragraphs, the toe stop is coupled to a running board assembly of a snowmobile.

According to one or more aspects of the present disclosure, a snowmobile, includes a body including a tunnel and a running board assembly secured to the body. The running board assembly including a support member positioned outboard of the tunnel, and a foot support member having an inboard side removably secured to the tunnel. A toe stop is coupled to the foot support member, wherein the toe stop is a molded polymeric composite material.

In one or more embodiments of the toe stop according to the previous paragraph, the foot support member is formed of a material having thermal conductivity of less than 1 W/m-° K.

In one or more embodiments of the toe stop according to any one of the previous paragraphs, the support member and the foot support member are removably attached to the tunnel and the foot support member is removably secured to the support member.

In one or more embodiments of the toe stop according to any one of the previous paragraphs, the foot support member defines a plurality of apertures extending from near the inboard side to near the outboard side of the foot support member and configured to shed snow or other debris therethrough.

In one or more embodiments of the toe stop according to any one of the previous paragraphs, the toe stops define a plurality of openings in fluid communication with an engine bay of the snowmobile. The openings are configured to exhaust air warmed by the engine from inside the engine bay.

According to one or more aspects of the present disclosure, a method of assembling a snowmobile that includes a body defining a tunnel is presented. The method includes attaching a support member to the tunnel using a first plurality of fasteners such that the support member is located outboard of the tunnel; attaching inboard sides of a foot support member to the tunnel using a second plurality of fasteners; securing outboard sides of the foot support member to the support member using a plurality of flexible clips integrally formed with the foot support member that is defined on an outboard side of the foot support member; and attaching a toe stop to the foot support member using one or more second fasteners, the toe stop comprising a bottom flange with one or more slots, each slot configured to receive one of the second fasteners.

In one or more embodiments of the method according to the previous paragraph, the toe stop comprises a plurality of openings and attaching the toe stop includes arranging the plurality of openings such that they are in fluid communication with an engine bay of the snowmobile and configured to exhaust air warmed by the engine from inside the engine bay.

According to one or more aspects of the present disclosure, a snowmobile includes a body including a tunnel and a running board assembly secured to the body. The running board assembly further includes a support member positioned outboard of the tunnel, a foot support member having an inboard side removably secured to the tunnel, and an outboard side removably secured to the support member by a plurality of flexible clips defined on an outboard side of the foot support member. Each of the flexible clips wraps around at least 51% of a circumference of the support member and is sized to apply a compressive force to the support member.

In one or more embodiments of the snowmobile according to the previous paragraph, each of the flexible clips wraps around at least 60% of a circumference of the support member.

In one or more embodiments of the snowmobile according to any one of the previous paragraphs, each of the flexible clips wraps around no more than 75% of a circumference of the support member.

In one or more embodiments of the snowmobile according to any one of the previous paragraphs, the foot support member is formed of a material having thermal conductivity of less than 1 W/m-° K.

In one or more embodiments of the snowmobile according to any one of the previous paragraphs, the foot support member is formed of a polymeric composite material.

In one or more embodiments of the snowmobile according to any one of the previous paragraphs, the plurality of flexible clips are integrally formed with the foot support member of the same polymeric composite material.

In one or more embodiments of the snowmobile according to any one of the previous paragraphs, the support member and the foot support member are removably attached to the tunnel and the foot support member is removably secured to the support member.

In one or more embodiments of the snowmobile according to any one of the previous paragraphs, the support member is removably attached to the tunnel by a plurality of threaded fasteners.

In one or more embodiments of the snowmobile according to any one of the previous paragraphs, the foot support member defines a plurality of apertures extending from near the inboard side to near the outboard side of the foot support member and configured to shed snow or other debris therethrough.

In one or more embodiments of the snowmobile according to any one of the previous paragraphs, the foot support member defines a plurality of serrated ridges extending from a top surface of the foot support member and located intermediate the plurality of apertures. The plurality of serrated ridges are configured to enhance traction of a rider's boot with the running boards.

In one or more embodiments of the snowmobile according to any one of the previous paragraphs, the running board assembly further includes front toe stops attached to the foot support member and the tunnel.

In one or more embodiments of the snowmobile according to any one of the previous paragraphs, the front toe stops define a plurality of openings in fluid communication with an engine bay of the snowmobile. The openings are configured to exhaust air warmed by the engine from inside the engine bay.

In one or more embodiments of the snowmobile according to any one of the previous paragraphs, the running board assembly further includes rear kick-up panels that are attached to the foot support member and the tunnel.

In one or more embodiments of the snowmobile according to any one of the previous paragraphs, the snowmobile further includes bottom-out protectors that project from the body and are located outboard of the tunnel and are located inboard of the support member of the running board assembly. The bottom-out protectors are positioned on the body in a location lower than the tunnel and the foot support member.

In one or more embodiments of the snowmobile according to any one of the previous paragraphs, the bottom-out protectors are formed from an unfilled thermoplastic olefin material.

According to one or more aspects of the present disclosure, a method of assembling a snowmobile that includes a body defining a tunnel is presented. The method includes attaching a support member to the tunnel using a first plurality of fasteners such that the support member is located outboard of the tunnel, attaching inboard sides of a foot support member to the tunnel using a second plurality of fasteners and securing outboard sides of the foot support member to the support member using a plurality of flexible clips integrally formed with the foot support member that is defined on an outboard side of the foot support member. Each of the flexible clips wraps around at least 51% and at most 75% of a circumference of the support member and is sized to apply a compressive force to the support member.

In one or more embodiments of the method according to the previous paragraph, the method further includes attaching front toe stops to the foot support member and the tunnel and arranging a plurality of openings in the front toe stops such that they are in fluid communication with an engine bay of the snowmobile and configured to exhaust air warmed by the engine from inside the engine bay.

In one or more embodiments of the method according to any one of the previous paragraphs, the method further includes attaching rear kick-up panels to the foot support member and the tunnel.

In one or more embodiments of the method according to any one of the previous paragraphs, the method further attaching bottom-out protectors formed from an unfilled thermoplastic olefin material to the body. The bottom-out protectors are located outboard of the tunnel and inboard of the support member to which the plurality of flexible clips defined on the outboard side of the foot support member are secured. The bottom-out protectors are positioned on the body in a location lower than the tunnel and the foot support member.

According to one or more aspects of the present disclosure, a snowmobile includes a chassis, a tunnel attached to the chassis, a running board assembly, and bottom-out protectors projecting from the chassis and located outboard of the tunnel and inboard of an outboard side of the running board assembly. The bottom-out protectors are positioned on the chassis in a location lower than the tunnel and the running board assembly. The bottom-out protectors are formed from a thermoplastic olefin material.

According to one or more aspects of the present disclosure, a composite running board includes a first side rail that is securable to a snowmobile and a second side rail positioned outboard of the first side rail. The second side rail at least partially defines a channel shaped to receive a support. The composite running board further includes a plurality of cross members extending from the first side rail to the second side rail.

In one or more embodiments of the composite running board according to the previous paragraph, the channel extends along a length of the second rail.

In one or more embodiments of the composite running board according to any one of the previous paragraphs, the support has a tubular shape.

In one or more embodiments of the composite running board according to any one of the previous paragraphs, the lower surface of the running board defines the channel and the lower surface of the running board that defines the channel is curved to form a downward facing opening that extends along a length of the second side rail for receiving a support in the channel.

In one or more embodiments of the composite running board according to any one of the previous paragraphs, a first plurality of retaining members extend toward the opening from the second rail along an outboard side of the downward facing opening.

In one or more embodiments of the composite running board according to any one of the previous paragraphs, the second side rail defines a first plurality of upwardly facing holes on the upper surface to the channel. The first plurality of upwardly facing holes are aligned along the length of the second side rail. At least some of the first plurality of retaining members are positioned outboard and adjacent the first plurality of upwardly facing holes.

In one or more embodiments of the composite running board according to any one of the previous paragraphs, a first plurality of retaining members extend toward the opening from the lower surface of the running board along an inboard side of a downwardly facing opening.

In one or more embodiments of the composite running board according to any one of the previous paragraphs, a second plurality of retaining members extend toward the opening from the lower surface of the running board along an inboard side of the downwardly facing opening.

In one or more embodiments of the composite running board according to any one of the previous paragraphs, the second side rail defines a second plurality of upwardly facing openings on the upper surface to the channel that are aligned along the length of the second side rail. The second plurality of upwardly facing openings are positioned on an inboard side of the channel and the first plurality of openings are positioned on an outboard side of the channel.

In one or more embodiments of the composite running board according to any one of the previous paragraphs, a first plurality of retaining members extend toward the opening from the second rail along an outboard side of the downward facing opening.

In one or more embodiments of the composite running board according to any one of the previous paragraphs, the first plurality of retaining members are offset from the second plurality of retaining members along the length of the second rail.

In one or more embodiments of the composite running board according to any one of the previous paragraphs, the first plurality of upwardly facing openings and the second plurality of upwardly facing openings are offset from each other along the length of the second side rail.

In one or more embodiments of the composite running board according to any one of the previous paragraphs, the first plurality of retaining members are at least partially positioned along a leading edge of the cross members and extend outboard therefrom toward the downwardly facing opening.

According to one or more aspects of the present disclosure, a composite running board includes a first side rail securable to a snowmobile and a second side rail positioned outboard of the first side rail. The second side rail includes a plurality of features that are fastenable to a support member. The composite running board further includes a plurality of cross members extending from the first side rail to the second side rail. The first side rail, the second side rail, and the cross members include a fiber reinforced polymer.

According to one or more aspects of the present disclosure, a composite running board includes a first side rail that is securable to a snowmobile and a second side rail positioned outboard of the first side rail, the second side rail at least partially defines retaining member shaped to engage a support. The composite running board further includes a plurality of cross members extending from the first side rail to the second side rail. The first side rail, the second side rail, and the cross members include a fiber reinforced polymer.

According to one or more aspects of the present disclosure, a composite running board includes a first side rail securable to the side of a snowmobile and a second side rail positioned outboard of the first side rail. The second side rail includes an outboard edge that defines a channel extending along a length of the second rail and shaped to receive a plurality of support members. The composite running board further includes a plurality of cross members extending from the first side rail to the second side rail.

According to one or more aspects of the present disclosure, a snowmobile tunnel assembly includes a tunnel including a center plate and a first side panel including a first end connected to the center plate and a second end extending therefrom. The snowmobile tunnel assembly further has a second side panel including a first end connected to the center plate and a second end extending therefrom. The snowmobile tunnel assembly additionally includes a first running board support secured to the first side panel. The first running board support has a mounting surface extending outboard from the first side panel.

In one or more embodiments of the snowmobile tunnel assembly according to the previous paragraph, the first side panel has a first thickness and the mounting surface of the first support has a second thickness that is greater than the first thickness.

In one or more embodiments of the snowmobile tunnel assembly according to any one of the previous paragraphs, the tunnel includes a first material and the first running board support includes a second material that is different than the first material.

In one or more embodiments of the snowmobile tunnel assembly according to any one of the previous paragraphs, the first support includes a first vertical member that is secured to an inboard surface of the first panel. The mounting surface extends from the vertical member beneath the second end of the first panel and outboard therefrom.

In one or more embodiments of the snowmobile tunnel assembly according to any one of the previous paragraphs, the snowmobile tunnel assembly further includes a running board including a first side rail, a second side rail, and a plurality of cross members extending between the first rail and the second rail. The running board is secured to the mounting surface with the first side rail positioned adjacent and parallel to the first side panel of the tunnel.

In one or more embodiments of the snowmobile tunnel assembly according to any one of the previous paragraphs, the snowmobile tunnel assembly further includes a running board including a first side rail, a second side rail, and a plurality of cross member extending between the first rail and the second rail. The running board is secured to the mounting surface with the first side rail positioned adjacent to the first side panel of the tunnel. A rearward end of the first side rail is positioned a first distance from the first side panel and a forward end of the first side rail is positioned at a second distance from the first side panel that is greater than the first distance.

In one or more embodiments of the snowmobile tunnel assembly according to any one of the previous paragraphs, the mounting surface has a length extending at least partially between a forward end of the tunnel and a rearward end of the tunnel. The mounting surface extends outboard from the first panel a distance at the forward end that is greater than a distance at the rearward end.

In one or more embodiments of the snowmobile tunnel assembly according to any one of the previous paragraphs, the first support includes a rear suspension mounting point vertically offset from the mounting surface.

According to one or more aspects of the present disclosure, a method of making a snowmobile with a common running board is presented. The method includes providing a tunnel assembly including a tunnel including a center plate, a first side panel including a first end connected to the center plate and a second end extending therefrom, and a second side panel including a first end connected to the center plate and a second end extending therefrom and securing either a first running board support or a second running board support to the first side panel. The first running board support includes a mounting surface with a first dimension and the second running board support includes a mounting surface with a second dimension that is different than the first dimension. The method further includes securing a common running board including a longitudinal centerline to the mounting surface of either the first running board support or the second running board support. The longitudinal centerline of the running board is positioned at a first angle with respect to the first side panel when secured to the first running board support and is positioned at a second angle with respect to the first side panel when secured to the second running board support. The first angle is different than the second angle.

In one or more embodiments of the method according to the previous paragraph, the method further includes providing a common forward frame assembly including a first side including a tube mounting member and an inner perimeter defining a first opening, a second side positioned adjacent the first side, the second side including a tube mounting member and an inner perimeter defining a second opening. A rearward portion of the first side and the second side define a rearward opening therebetween. The method additionally includes securing the tunnel assembly to the forward frame with a portion of the tunnel assembly positioned in the rearward opening between the first side and the second side and securing either a first running board support tube associated with the first running board support to the tube mounting member on the first side of the forward frame assembly, or a second running board support tube associated with the second running board support to the tube mounting member on the first side of the forward frame assembly. The first running board support tube has a length that is different than the second running board support tube. The method also includes securing a second side rail of the common running board that is positioned outboard of a first side rail of the common running board to either the first running board support tube or the second running board support tube.

According to one or more aspects of the present disclosure, a method of assembling two different types of snowmobiles with a common forward frame is presented. The method includes providing a common forward frame including a longitudinal centerline and a running board mounting point positioned outboard of the longitudinal centerline, providing a first running board assembly, e.g., a running board assembly of a high performance snowmobile having a shorter chassis, including a forward mount, providing a second running board assembly that is different than the first running board assembly, e.g., a running board assembly of a snowmobile designed for hills and mountains having a longer chassis, the second running board assembly including a forward mount, and securing the forward mount of either the first running board assembly or the second running board assembly to the running board mounting point. The first running board assembly is located at a first position with respect to the longitudinal centerline of the forward frame when secured to the running board mounting point. The second running board assembly is located at a second position with respect to the longitudinal centerline of the forward frame when secured to the running board mounting point. The first position is different than the second position.

In one or more embodiments of the method according to the previous paragraph, the running board mounting point extends outward and forwardly from the forward frame.

In one or more embodiments of the method according to any one of the previous paragraphs, the running board mounting point is positioned below an upper surface of a tunnel secured to the forward frame.

In one or more embodiments of the method according to any one of the previous paragraphs, the forward mount of the first running board assembly extends outward from the centerline of the vehicle farther than the forward mount of the second running board assembly.

In one or more embodiments of the method according to any one of the previous paragraphs, the common forward frame includes a control arm mounting point and the method further includes providing a first suspension assembly including a control arm and a spindle that includes a lower A-arm ball joint, providing a second suspension assembly that is different than the first suspension assembly, the second suspension assembly including a control arm and a spindle that includes a lower A-arm ball joint; and securing the control arm of the first suspension assembly to the control arm mounting point when the first running board assembly is secured to the forward mount or the second suspension assembly to the control arm mounting point when the second running board assembly is secured to the forward mount. The first lower A-arm ball joint is positioned at a different position with respect to the common frame, e.g., from or along the common front frame, than the second lower A-arm ball joint when the respective suspension assembly is secured to the common front frame.

In one or more embodiments of the method according to any one of the previous paragraphs, the forward mount of the first running board assembly extends outward from the centerline of the vehicle farther than the forward mount of the second running board assembly, and the lower A-arm ball joint of the first suspension assembly extends outward from the centerline of the vehicle farther than the lower A-arm ball joint of the second suspension assembly.

In one or more embodiments of the method according to any one of the previous paragraphs, the forward mount of the first running board assembly extends outward from the centerline of the vehicle farther than the forward mount of the second running board assembly, and the lower A-arm ball joint of the first suspension assembly farther forward with respect to the common frame than the lower A-arm ball joint of the second suspension assembly.

In one or more embodiments of the method according to any one of the previous paragraphs, the forward mount of the first running board assembly extends outward from the centerline of the vehicle farther than the forward mount of the second running board assembly, and the lower A-arm ball joint of the first suspension assembly is positioned along the centerline of the forward frame farther forward from the running board mounting point than the lower A-arm ball joint of the second suspension assembly.

While the disclosed snowmobile has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the particular embodiment(s) disclosed, but that the invention will include all embodiments falling within the scope of the appended claims.

The invention claimed is:

1. A heat exchanger assembly, comprising:

a body including a forward wall and a rear wall; and two end caps attached to the body, each of the two end caps including:

a curved forward edge, a forward mount positioned forward of the body, an inward extending mounting flange positioned rearward of the body, and an outward extending mounting flange positioned rearward of the body, wherein the body extends between the two end caps.

2. The heat exchanger assembly of claim 1, wherein the body defines a curved shape at least partially following the curved forward edge of the two end caps.

3. The heat exchanger assembly of claim 1, further comprising a heat dissipation plate extending rearward from the body, the heat dissipation plate in fluid communication with a first conduit.

4. The heat exchanger assembly of claim 3, wherein the forward wall and the rear wall define a chamber therebetween, the chamber in fluid communication with the heat dissipation plate.

5. The heat exchanger assembly of claim 4, further comprising a second conduit extending forward from the forward wall, the second conduit in fluid communication with the chamber and the heat dissipation plate.

6. The heat exchanger assembly of claim 1, wherein each of the two end caps further include a side wall, the side wall having a plurality of apertures configured to receive a plurality of fasteners, wherein the plurality of apertures is positioned rearward of the body.

7. The heat exchanger assembly of claim 6, wherein the plurality of apertures is positioned rearward of the inward extending mounting flange and the outward extending mounting flange.

8. The heat exchanger assembly of claim 1, wherein the body is attached to the two end caps rearward of the curved forward edge.

9. A snow vehicle, comprising:

a tunnel;

a support bracket coupled to the tunnel;

a heat exchanger assembly including a body and an end cap, the end cap including:

a forward mount, a first mounting flange coupled to the tunnel, wherein the first mounting flange extends inward toward a longitudinal centerline of the tunnel, and wherein the first mounting flange is positioned rearward of the body, and a second mounting flange coupled to the support bracket; and a forward frame assembly coupled to the forward mount.

10. The snow vehicle of claim 9, wherein the second mounting flange extends outward away from the longitudinal centerline of the tunnel, the second mounting flange positioned rearward of the body, wherein the support bracket extends rearward from the second mounting flange.

11. The snow vehicle of claim 9, further comprising a drive track shaft, wherein the end cap includes an opening configured to receive the drive track shaft, the drive track shaft extending through the heat exchanger assembly.

12. The snow vehicle of claim 9, wherein the tunnel includes a forward edge and wherein the body is coupled to the forward edge of the tunnel by one or more tabs positioned along an upper end of the body.

13. The snow vehicle of claim 9, wherein the end cap includes a side wall having a plurality of apertures, each of the plurality of apertures configured to receive a fastener to secure the side wall of the end cap to a side panel of the tunnel.

14. The snow vehicle of claim 9, further including a bottom-out protector, the second mounting flange coupled to the bottom-out protector.

15. The snow vehicle of claim 9, wherein the heat exchanger assembly includes a heat dissipation plate extending rearward from the body along an inner surface of the tunnel.

16. The snow vehicle of claim 9, wherein the tunnel has a first wall thickness and the end cap has a second wall thickness, wherein the second wall thickness is greater than the first wall thickness.

17. A snowmobile, comprising:

a tunnel;

a forward frame assembly;

a bottom-out protector; and a heat exchanger end cap, wherein the heat exchanger end cap includes:

a forward mount coupled to the forward frame assembly, a first mounting flange coupled to the tunnel, and a second mounting flange coupled to the bottom-out protector.

18. The snowmobile of claim 17, wherein the forward frame assembly includes a metal plate, and wherein an inner surface of the metal plate abuts an outer surface of the heat exchanger end cap.

19. The snowmobile of claim 18, wherein the heat exchanger end cap includes a forward tab extending parallel to a longitudinal centerline of the snowmobile, the forward tab configured to secure to a lower member of the forward frame assembly.

20. The snowmobile of claim 17, including a support bracket coupled to the second mounting flange, wherein the tunnel includes a top panel and a side panel, wherein the support bracket is positioned along the side panel of the tunnel.

* * * * *